(12) United States Patent
Li et al.

(10) Patent No.: US 11,907,526 B2
(45) Date of Patent: Feb. 20, 2024

(54) TOUCH REGION ADJUSTMENT METHOD AND APPARATUS FOR DETERMINING A GRASPING GESTURE OF A USER ON AN ELECTRONIC DEVICE

(71) Applicant: Huawei Technologies Co., Ltd., Shenzhen (CN)

(72) Inventors: Hang Li, Shenzhen (CN); Weigang Cai, Shanghai (CN); Junyong Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/783,407

(22) PCT Filed: Dec. 4, 2020

(86) PCT No.: PCT/CN2020/133997
§ 371 (c)(1),
(2) Date: Jun. 8, 2022

(87) PCT Pub. No.: WO2021/115210
PCT Pub. Date: Jun. 17, 2021

(65) Prior Publication Data
US 2023/0012245 A1 Jan. 12, 2023

(30) Foreign Application Priority Data

Dec. 9, 2019 (CN) .......................... 201911251873.9
Sep. 17, 2020 (CN) .......................... 202010982063.7

(51) Int. Cl.
*G06F 3/04886* (2022.01)
*G06F 3/041* (2006.01)
(Continued)

(52) U.S. Cl.
CPC ........ *G06F 3/04886* (2013.01); *G06F 1/1643* (2013.01); *G06F 1/1652* (2013.01);
(Continued)

(58) Field of Classification Search
CPC ...... G06F 3/0416; G06F 3/044; G06F 3/0446; G06F 3/04186; G06F 3/04847;
(Continued)

(56) References Cited

U.S. PATENT DOCUMENTS

2011/0043457 A1 2/2011 Oliver et al.
2012/0293454 A1 11/2012 Tsai et al.
(Continued)

FOREIGN PATENT DOCUMENTS

| CN | 102999198 A | 3/2013 |
|---|---|---|
| CN | 103995668 A | 8/2014 |

(Continued)

OTHER PUBLICATIONS

Zhang Chong, et al., "Samsung Galaxy Note Edge with curved and flat surfaces," 2014, 6 pages with English abstract.

*Primary Examiner* — Darlene M Ritchie
(74) *Attorney, Agent, or Firm* — Conley Rose, P.C.

(57) ABSTRACT

A touch region adjustment method includes: determining a region on a touch display of a terminal device and in which a sensing parameter changes to determine a grasping gesture of a user for the terminal device; and adjusting a location of a touch response region on the touch display based on the grasping gesture of the user for the electronic device to avoid an accidental touch caused by the grasping gesture of the user for the screen of the terminal device.

20 Claims, 74 Drawing Sheets

(51) Int. Cl.
  *G06F 3/044*   (2006.01)
  *G06F 1/16*   (2006.01)
(52) U.S. Cl.
  CPC ............ *G06F 3/044* (2013.01); *G06F 3/0416* (2013.01); *G06F 3/04186* (2019.05); *G06F 1/1626* (2013.01); *G06F 1/1694* (2013.01); *G06F 3/0446* (2019.05); *G06F 2200/1614* (2013.01); *G06F 2203/04102* (2013.01)
(58) Field of Classification Search
  CPC .. G06F 3/0488; G06F 3/04886; G06F 1/1694; G06F 1/1626; G06F 1/1652; G06F 1/1643; G06F 2200/1614; G06F 2203/04102
  See application file for complete search history.

(56) References Cited

U.S. PATENT DOCUMENTS

| | | | |
|---|---|---|---|
| 2013/0069886 | A1 | 3/2013 | Wang |
| 2015/0160699 | A1 | 6/2015 | Choi et al. |
| 2015/0338954 | A1 | 11/2015 | Yang et al. |
| 2016/0004377 | A1 | 1/2016 | Liu et al. |
| 2016/0054831 | A1 | 2/2016 | Tsai et al. |
| 2016/0062515 | A1 | 3/2016 | Bae et al. |
| 2016/0266674 | A1 | 9/2016 | Schropp, Jr. |
| 2017/0003798 | A1* | 1/2017 | Peng ............... G06F 1/1684 |
| 2018/0136776 | A1* | 5/2018 | Xie ............... G06F 3/0416 |
| 2019/0039576 | A1 | 2/2019 | Ansaldi |
| 2019/0235703 | A1 | 8/2019 | Yin et al. |
| 2019/0258380 | A1 | 8/2019 | Chen et al. |
| 2022/0053080 | A1 | 2/2022 | Xu |

FOREIGN PATENT DOCUMENTS

| | | |
|---|---|---|
| CN | 104020878 A | 9/2014 |
| CN | 104571919 A | 4/2015 |
| CN | 104615303 A | 5/2015 |
| CN | 106569713 A | 4/2017 |
| CN | 106681638 A | 5/2017 |
| CN | 106708263 A | 5/2017 |
| CN | 106855785 A | 6/2017 |
| CN | 106873895 A | 6/2017 |
| CN | 107577372 A | 1/2018 |
| CN | 107678592 A | 2/2018 |
| CN | 108021259 A | 5/2018 |
| CN | 109782944 A | 5/2019 |
| CN | 109804339 A | 5/2019 |
| EP | 3514667 A1 | 7/2019 |
| JP | 2011501261 A | 1/2011 |
| RU | 2519351 C2 | 6/2014 |
| RU | 2618921 C2 | 5/2017 |
| WO | 2015025549 A1 | 2/2015 |
| WO | 2019071571 A1 | 4/2019 |

* cited by examiner

TOUCH REGION ADJUSTMENT METHOD AND APPARATUS FOR DETERMINING A GRASPING GESTURE OF A USER ON AN ELECTRONIC DEVICE

CROSS-REFERENCE TO RELATED APPLICATIONS

This is a U.S. National Stage of International Patent Application No. PCT/CN2020/133997 filed on Dec. 4, 2020, which claims priority to Chinese Patent Application No. 201911251873.9 filed on Dec. 9, 2019 and Chinese Patent Application No. 202010982063.7 filed on Sep. 17, 2020. All of the aforementioned patent applications are hereby incorporated by reference in their entireties.

This application claims priority to Chinese Patent Application No. 201911251873.9, filed with the Chinese Patent Office on Dec. 9, 2019 and entitled "TOUCH REGION ADJUSTMENT METHOD AND APPARATUS", and to Chinese Patent Application No. 202010982063.7, filed with the Chinese Patent Office on Sep. 17, 2020 and entitled "TOUCH REGION ADJUSTMENT METHOD AND APPARATUS", which are incorporated herein by reference in its entirety.

TECHNICAL FIELD

This application relates to the field of electronic device technologies, and specifically, to a touch region adjustment method and an apparatus.

BACKGROUND

With popularization of bezel-less screens, to improve screen utilization of an electronic device, an over 100% bezel-less screen begins to be applied to some electronic devices. The over 100% bezel-less screen means that in addition to a screen on the front of the electronic device, some specific functions may be extended to another region. Correspondingly, the another region usually includes an extended touch region, so that after a touch is received in the extended touch region, the electronic device implements the specific function. For example, touch regions may be disposed in side regions (for example, regions such as left and right sides or top and bottom sides) of some electronic devices, After the region is touched, the electronic device performs an operation corresponding to the touch region, to implement side interaction.

However, in a research process of this application, the inventor finds that when grasping the electronic device, a user sometimes accidentally touches the extended touch region. In this case, the electronic device still performs the operation corresponding to the touch region even if the operation is not required by the user. In other words, the electronic device performs the operation that is not required by the user. For example, when a touch region is extended to a side region of an electronic device, if the user touches the side touch region in a process of grasping the electronic device, the electronic device performs an operation corresponding to the side touch region.

SUMMARY

To resolve a conventional-technology problem that a user accidentally touches an extended touch region when grasping an electronic device, embodiments of this application disclose a touch region adjustment method and an apparatus.

According to a first aspect, this application provides a touch region adjustment method, including: obtaining a first region on a touch display of a terminal device and in which a sensing parameter changes; determining, based on a location of the first region on the touch display of the terminal device, a gesture of grasping the terminal device; and adjusting a location of a touch region on the touch display of the terminal device based on the gesture of grasping the terminal device, so that the touch region is far away from the first region. The foregoing method can effectively avoid an accidental touch of the user on the terminal device, thereby improving user experience.

In a possible implementation of the first aspect, the sensing parameter includes a pressure parameter, a temperature parameter, a capacitance parameter, and the like. Anti-accidental touch is implemented by using different parameters, to enhance precision of the anti-accidental touch, and improve user experience.

In another possible implementation of the first aspect, before the determining, based on a location of the first region on the touch display of the terminal device, a gesture of grasping the terminal device, the method further includes: calculating a change amount of the sensing parameter in the first region. A first region in which a change amount of a sensing parameter is greater than a first threshold is a first target region. By calculating the change amount of the sensing parameter in the first region, anti-accidental touch can be implemented more precisely, and user experience can be improved.

According to a second aspect, this application provides a terminal device, including a memory, a processor, and a computer program that is stored in the memory and that can run on the processor. When executing the computer program, the processor performs the following steps: obtaining a first region on a touch display of the terminal device and in which a sensing parameter changes; determining, based on a location of the first region on the touch display of the terminal device, a gesture of grasping the terminal device; and adjusting a location of a touch region on the touch display of the terminal device based on the gesture of grasping, the terminal device, so that the touch region is far away from the first region. The foregoing method and steps can effectively avoid an accidental touch of the user on the terminal device, thereby improving user experience.

In a possible implementation of the second aspect, the sensing parameter includes a pressure parameter, a temperature parameter, a capacitance parameter, and the like. Anti-accidental touch is implemented by using different parameters, to enhance precision of the anti-accidental touch, and improve user experience.

In another possible implementation of the second aspect, before the determining, based on a location of the first region on the touch display of the terminal device, a gesture of grasping the terminal device, the method further includes: calculating a change amount of the sensing parameter in the first region. A first region in which a change amount of a sensing parameter is greater than a first threshold is a first target region. By calculating the change amount of the sensing parameter in the first region, anti-accidental touch can be implemented more precisely, and user experience can be improved.

According to a third aspect, this application provides a touch region adjustment method. The method includes: An electronic device receives a first touch input performed on a touchscreen of the electronic device; the electronic device determines a first contact surface of the first touch input, and obtains touch information of the first contact surface, where the touch information includes capacitance information; the electronic device determines a first touch region and a first non-touch region on the touchscreen of the electronic device based on the touch information of the first contact surface, where a distance between the first touch region and the first contact surface is a first distance value, and the first non-touch region includes the first contact surface; the electronic device receives a second touch input performed on the first touch region; the electronic device displays a first user interface in response to the second touch input; the electronic device receives a third touch input performed on the first non-touch region; and the electronic device does not change display content on the electronic device in response to the third touch input.

In this embodiment of this application, the first touch input may include a touch input of holding the mobile terminal by a user. The electronic device may determine a contact surface of the first touch input, and obtain touch information of the contact surface. The electronic device may adaptively adjust a touch region and a non-touch region on the touchscreen based on the touch information of the contact surface, and keep the touch region far away from the contact surface. In response to the second touch input for the touch region, the electronic device may perform a function corresponding to the touch operation, for example, displaying the first user interface. In response to the third touch input for the non-touch region, the electronic device may not perform a function corresponding to the touch operation, to be specific, does not change the display content on the electronic device. In this way, a location of the touch region is adaptively adjusted, thereby effectively reducing an accidental touch risk, and improving user experience.

In a possible implementation, the first contact surface is located on a first side screen on the touchscreen. That the electronic device determines a first touch region and a first non-touch region on the touchscreen of the electronic device based on the touch information of the first contact surface includes: The electronic device determines the first touch region and the first non-touch region on the first side screen based on the touch information of the first contact surface. The touch information may further include one or more of a height of the contact surface, a width of the contact surface, and an area of the contact surface. A region other than the first touch region on the first side screen is the first non-touch region. In this way, the electronic device may determine a touch region on a side screen based on touch information of at least one contact surface on the side screen.

In a possible implementation, the first contact surface is located on a first side screen on the touchscreen. Before the electronic device determines the first touch region and the first non-touch region on the touchscreen of the electronic device based on the touch information of the first contact surface, the method further includes: The electronic device determines a second contact surface of the first touch input, and obtains touch information of the second contact surface, where the second contact surface is located on the first side screen. That the electronic device determines a first touch region and a first non-touch region on the touchscreen of the electronic device based on the touch information of the first contact surface includes: The electronic device determines the first touch region and the first non-touch region on the first side screen based on the touch information of the first contact surface and the touch information of the second contact surface. A distance between the first touch region and the second contact surface is the first distance value. The touch information may further include one or more of heights of the contact surfaces, widths of the contact surfaces, and areas of the contact surfaces. A region other than the first touch region on the first side screen is the first non-touch region. In this way, based on touch information of two contact surfaces on one side screen, the electronic device may determine a touch region on the side screen, and a distance between the touch region and either of the two contact surfaces is the first distance value. This effectively reduces an accidental touch risk, and improves user experience.

In a possible implementation, after the electronic device determines the first touch region and the first non-touch region on the touchscreen of the electronic device based on the touch information of the first contact surface, the method further includes: The electronic device receives a fourth touch input performed on the touchscreen; the electronic device determines a third contact surface of the fourth touch input, arid obtains touch information of the third contact surface, where the third contact surface is located on the first side screen on the touchscreen, and the touch information may further include one or more of a height of the contact surface, a width of the contact surface, and an area of the contact surface; the electronic device determines, based on the touch information of the third contact surface, that the first side screen on the touchscreen is a non-touch region; the electronic device receives a fifth touch input performed on the first side screen; and the electronic device does not change the display content on the electronic device in response to the fifth touch input. In this way, based on touch information of at least one contact surface on one side screen, the electronic device may determine that the side screen is a non-touch region. This effectively reduces an accidental touch risk.

In a possible implementation, before the electronic device determines, based on the touch information of the third contact surface, that the first side screen on the touchscreen is a non-touch region, the method further includes: the electronic device determines a fourth contact surface of the fourth touch input, and obtains touch information of the fourth contact surface, where the fourth contact surface is located on the first side screen. That the electronic device determines, based on the touch information of the third contact surface, that the first side screen on the touchscreen is a non-touch region includes: The electronic device determines, based on the touch information of the third contact surface and the touch information of the fourth contact surface, that the first side screen is a non-touch region. In this way, based on touch information of two contact surfaces on one side screen, the electronic device may determine that the entire side screen is a non-touch region. This effectively reduces an accidental touch risk.

In a possible implementation, the first contact surface is located on a first side screen on the touchscreen. Before the electronic device determines the first touch region and the first non-touch region on the touchscreen of the electronic device based on the touch information of the first contact surface, the method further includes: The electronic device determines a fifth contact surface of the first touch input, and obtains touch information of the fifth contact surface, where the fifth contact surface is located on a second side screen of the touchscreen. That the electronic device determines a first touch region and a first non-touch region on the touchscreen of the electronic device based on the touch information of the first contact surface includes: The electronic device determines the first touch region and the first non-touch region on the first side screen based on the touch information of the first contact surface, and determines a second touch region and a second non-touch region on the second side screen based on the touch information of the fifth contact surface distance between the second touch region and the fifth contact surface is a second distance value, a region other than the first touch region on the first side screen is the first non-touch region, and a region other than the second touch region on the second side screen is the second non-touch region. In this way, based on touch information of at least one contact surface on the first side screen and touch information of at least one contact surface on the second side screen, the electronic device determines that the two side screens each include a touch region.

In a possible implementation, the first contact surface is located on a first side screen on the touchscreen. Before the electronic device determines the first touch region and the first non-touch region on the touchscreen of the electronic device based on the touch information of the first contact surface, the method further includes: The electronic device determines a sixth contact surface of the first touch input, and obtains touch information of the sixth contact surface, where the sixth contact surface is located on a second side screen of the touchscreen. That the electronic device determines a first touch region and a first non-touch region on the touchscreen of the electronic device based on the touch information of the first contact surface includes: The electronic device determines the first touch region and the first non-touch region on the first side screen based on the touch information of the first contact surface, and determines, based on the touch information of the sixth contact surface, that the second side screen is a non-touch region. A region other than the first touch region on the first side screen is the first non-touch region. In this way, based on touch information of at least one contact surface on the first side screen and touch information of at least one contact surface on the second side screen, the electronic device determines that one side screen includes a touch region, and the entire other side screen is a non-touch region.

In a possible implementation, that the electronic device determines the first touch region and the first non-touch region on the first side screen based on the touch information of the first contact surface includes: When the touch information of the first contact surface meets a first preset condition, the electronic device determines that a type of the first contact surface is a thenar contact surface; and when a distance between the first contact surface and a first end of the first side screen is greater than or equal to a first preset value, the electronic device determines that the first touch region is located between the first end of the first side screen and the first contact surface. The first preset condition is that the height of the contact surface is greater than a first height threshold, and a ratio of a capacitance value of a most edge coordinate column of the contact surface to a capacitance value of a secondary edge coordinate column of the contact surface falls within a first ratio range. Alternatively, the first preset condition is that the height of the contact surface is greater than a first height threshold, a ratio of the height of the contact surface to the width of the contact surface is greater than a first height ratio, and a ratio of a capacitance value of a most edge coordinate column of the contact surface to a capacitance value of a secondary edge coordinate column of the contact surface falls within a first ratio range. Alternatively, the first preset condition is that a ratio of the height of the contact surface to the width of the contact surface is greater than a first height ratio, the area of the contact surface is greater than a first area threshold, and a ratio of a capacitance value of a most edge coordinate column of the contact surface to a capacitance value of a secondary edge coordinate column of the contact surface falls within a first ratio range. A value in the first ratio range is greater than or equal to 1. The most edge coordinate column of the contact surface is a coordinate column, closest to a long side of the electronic device, in a touchscreen array that corresponds to the contact surface and that is on the touchscreen. The secondary edge coordinate column of the contact surface is a coordinate column, second closest to the long side of the electronic device, in the touchscreen array that corresponds to the contact surface and that is on the touchscreen.

In a possible implementation, that the electronic device determines the first touch region and the first non-touch region on the first side screen based on the touch information of the first contact surface includes: When the touch information of the first contact surface meets a second preset condition, the electronic device determines that a type of the first contact surface is a finger grasping contact surface; and when the distance between the first contact surface and the first end of the first side screen is greater than or equal to a second preset value, the electronic device determines that the first touch region is located between the first end of the first side screen and the first contact surface. The first contact surface is a finger grasping contact surface closest to the first end of the first side screen. The second preset condition is that the height of the contact surface falls within a first height range, and the ratio of the capacitance value of the most edge coordinate column of the contact surface to the capacitance value of the secondary edge coordinate column of the contact surface falls within a second ratio range. Alternatively, the second preset condition is that the height of the contact surface falls within a first height range, the ratio of the height of the contact surface to the width of the contact surface falls within a third ratio range, and the ratio of the capacitance value of the most edge coordinate column of the contact surface to the capacitance value of the secondary edge coordinate column of the contact surface falls within a second ratio range. Alternatively, the second preset condition is that the ratio of the height of the contact surface to the width of the contact surface falls within a third ratio range, the area of the contact surface falls within a first area range, and the ratio of the capacitance value of the most edge coordinate column of the contact surface to the capacitance value of the secondary edge coordinate column of the contact surface falls within a second ratio range. A value in the first height range is less than or equal to the first height threshold. A value in the second ratio range is greater than or equal to 1. The value in the second ratio range is greater than or equal to the value in the first ratio range. A value in the third ratio range is less than or equal to the first height ratio. A value in the first area range is less than or equal to the first area threshold.

In a possible implementation, that the electronic device determines the first touch region and the first non-touch region on the first side screen based on the touch information of the first contact surface includes: When the touch information of the first contact surface meets a third preset condition, the electronic device determines that a type of the first contact surface is a finger putting contact surface; and when the distance between the first contact surface and the first end of the first side screen is greater than or equal to a third preset value, the electronic device determines that the first touch region is located between the first end of the first side screen and the first contact surface. The third preset condition is that the height of the contact surface falls within a second height range, and the ratio of the capacitance value of the most edge coordinate column of the contact surface to the capacitance value of the secondary edge coordinate column of the contact surface falls within a fourth ratio range. Alternatively, the third preset condition is that the height of the contact surface is greater than a second height range, a ratio of the height of the contact surface to the width of the contact surface falls within a fifth ratio range, and a ratio of a capacitance value of a most edge coordinate column of the contact surface to a capacitance value of a secondary edge coordinate column of the contact surface falls within a fourth ratio range. Alternatively, the third preset condition is that a ratio of the height of the contact surface to the width of the contact surface falls within a fifth ratio range, the area of the contact surface falls within a second area range, and a ratio of a capacitance value of a most edge coordinate column of the contact surface to a capacitance value of a secondary edge coordinate column of the contact surface falls within a fourth ratio range. A value in the second height range is less than or equal to the first height threshold. A value in the fourth ratio range is less than or equal to 1. A value in the fifth ratio range is less than or equal to the value in the third ratio range. A value in the second ratio range is less than or equal to the first area threshold.

In a possible implementation, that the electronic device determines the first touch region and the first non-touch region on the first side screen based on the touch information of the first contact surface includes: When the touch information of the first contact surface meets a fourth preset condition, the electronic device determines that a type of the first contact surface is a thumb-index web contact surface; and when the distance between the first contact surface and the first end of the first side screen is greater than or equal to a fourth preset value, the electronic device determines that the first touch region is located between the first end of the first side screen and the first contact surface. The fourth preset condition is that the height of the contact surface falls within a third height range, and the ratio of the capacitance value of the most edge coordinate column of the contact surface to the capacitance value of the secondary edge coordinate column of the contact surface falls within a sixth ratio range. Alternatively, the fourth preset condition is that the height of the contact surface is greater than a third height range, the ratio of the height of the contact surface to the width of the contact surface falls within a seventh ratio range, and the ratio of the capacitance value of the most edge coordinate column of the contact surface to the capacitance value of the secondary edge coordinate column of the contact surface falls within a sixth ratio range. Alternatively, the fourth preset condition is that the ratio of the height of the contact surface to the width of the contact surface falls within a seventh ratio range, the area of the contact surface falls within a third area range, and the ratio of the capacitance value of the most edge coordinate column of the contact surface to the capacitance value of the secondary edge coordinate column of the contact surface falls within a sixth ratio range. A value in the third height range is less than or equal to the first height threshold, and the value in the third height range is greater than or equal to the value in the second height range. A value in the sixth ratio range is greater than or equal to 1, and the value in the sixth ratio range is less than or equal to the value in the second ratio range. A value in the seventh ratio range is less than or equal to the first height ratio, and the value in the seventh ratio range is greater than or equal to the value in the fifth ratio range. A value in the third area range is less than or equal to the first area threshold.

In a possible implementation, that the electronic device determines the first touch region and the first non-touch region on the first side screen of the electronic device based on the touch information of the first contact surface includes: When both the touch information of the first contact surface and the touch information of the second contact surface meet a third preset condition, the electronic device determines that a type of the first contact surface is a finger putting contact surface; and when a distance between the first contact surface and the second contact surface is greater than or equal to a fifth preset value, the electronic device determines that the first touch region is located between the first contact surface and the second contact surface.

In a possible implementation, that the electronic device determines the first touch region and the first non-touch region on the first side screen of the electronic device based on the touch information of the first contact surface includes: When both the touch information of the first contact surface and the touch information of the second contact surface meet a fourth preset condition, the electronic device determines that a type of the first contact surface is a thumb-index web contact surface; and when the distance between the first contact surface and the second contact surface is greater than or equal to a sixth preset value, the electronic device determines that the first touch region is located between the first contact surface and the second contact surface.

In an implementation, in the fourth preset condition, a value in the sixth ratio range is greater than or equal to 1, a value in the third height range is greater than or equal to a value in the second height range, a value in the seventh ratio range is greater than or equal to a value in the fifth ratio range, and a value in the third area range is greater than or equal to a value in the second area range.

In a possible implementation, the third contact surface is located on the first side screen on the touchscreen. That the electronic device determines, based on the touch information of the third contact surface, that the first side screen on the touchscreen is a non-touch region includes: When the touch information of the third contact surface meets a first preset condition, and a distance between the third contact surface and a first end of the first side screen is less than a first preset value, the electronic device determines that the first side screen is a non-touch region.

In a possible implementation, the third contact surface is located on the first side screen on the touchscreen. That the electronic device determines, based on the touch information of the third contact surface, that the first side screen on the touchscreen is a non-touch region includes: When the touch information of the third contact surface meets a second preset condition, and a distance between the third contact surface and a first end of the first side screen is less than a second preset value, the electronic device determines that the first side screen is a non-touch region.

In a possible implementation, the third contact surface is located on the first side screen on the touchscreen. That the electronic device determines, based on the touch information of the third contact surface, that the first side screen on the touchscreen is a non-touch region includes: When the touch information of the third contact surface meets a third preset condition, and a distance between the third contact surface and a first end of the first side screen is less than a third preset value, the electronic device determines that the first side screen is a non-touch region.

In a possible implementation, the third contact surface is located on the first side screen on the touchscreen. That the electronic device determines, based on the touch information of the third contact surface, that the first side screen on the touchscreen is a non-touch region includes: When the touch information of the third contact surface meets a fourth preset condition, and a distance between the third contact surface and a first end of the first side screen is less than a fourth preset value, the electronic device determines that the first side screen is a non-touch region.

In a possible implementation, that the electronic device determines, based on the touch information of the third contact surface and the touch information of the fourth contact surface, that the first side screen is a non-touch region includes: When both the touch information of the third contact surface and the touch information of the fourth contact surface meet a third preset condition, and a distance between the third contact surface and the fourth contact surface is less than a fifth preset value, the electronic device determines that the first side screen is a non-touch region.

In a possible implementation, that the electronic device determines, based on the touch information of the third contact surface and the touch information of the fourth contact surface, that the first side screen is a non-touch region includes: When both the touch information of the third contact surface and the touch information of the fourth contact surface meet a fourth preset condition, and a distance between the third contact surface and the fourth contact surface is less than a sixth preset value, the electronic device determines that the first side screen is a non-touch region.

In a possible implementation, that the electronic device determines, based on the touch information of the third contact surface and the touch information of the fourth contact surface, that the first side screen is a non-touch region includes: When both the touch information of the third contact surface and the touch information of the fourth contact surface meet a fourth preset condition, the electronic device determines that both the third contact surface and the fourth contact surface are thumb-index web contact surfaces, and the electronic device determines that the first side screen is a non-touch region.

In a possible implementation, the first contact surface is located on a rear screen of the electronic device. That the electronic device determines a first touch region and a first non-touch region on the touchscreen of the electronic device based on the touch information of the first contact surface includes: when a distance between a first side of the first contact surface and the top of the first side screen on the touchscreen is greater than or equal to a seventh preset value, the electronic device determines that the first touch region on the first side screen is located between the top of the first side screen and the first side, where the first side is adjacent to the first side screen, and a distance between the first contact surface and the first side is the first distance value.

In a possible implementation, that the electronic device determines a first touch region and a first non-touch region on the touchscreen of the electronic device based on the touch information of the first contact surface includes: The electronic device determines a holding state of the user based on the touch information of the first contact surface, and determines the first touch region and the first non-touch region on the first side screen based on the holding state of the user. The holding state of the user includes left-hand longitudinal holding, right-hand longitudinal holding, two-hand longitudinal holding, left-hand transverse holding, right-hand transverse holding, and two-hand transverse holding.

In a possible implementation, the first end of the first side screen is the top of the first side screen; or the first end of the first side screen is the top of the first side screen or the bottom of the first side screen.

According to a fourth aspect, this application provides an electronic device, including a touchscreen, a memory, one or more processors, and one or more programs. The one or more programs are stored in the memory. When executing the one or more programs, the one or more processors enable the electronic device to perform the touch region adjustment method in any possible implementation of the third aspect.

According to a fifth aspect, this application provides a computer-readable storage medium. The computer-readable storage medium stores a computer program, and when the computer program runs on a computer, the computer is enabled to perform the method and the steps according to any one of the first aspect and the third aspect.

According to the touch region adjustment method disclosed in the embodiments of this application, a first region on a touch display of a terminal device and in which a sensing parameter changes can be determined, a gesture of grasping the electronic device can be determined based on a location of the first region, and a location of a touch region on the touch display of the terminal device can be adjusted based on the gesture. In this way, an adjusted touch region is far away from the first region, to avoid an accidental touch on the touch region and improve user experience.

DESCRIPTION OF EMBODIMENTS

In the specification, claims, and accompanying drawings of this application, the terms "first", "second", "third" and the like are intended to distinguish different objects but do not limit a particular sequence. The first or the second may further include more steps, not limited to one step or feature.

In the embodiments of this application, words such as "example" or "for example" are used to give an example, an illustration, or a description. Any embodiment or design scheme described as "example" or "for example" in the embodiments of this application should not be explained as being more preferred or having more advantages than another embodiment or design scheme. Exactly, use of the word "example" or "for example" is intended to present a relative concept in a specific manner.

To resolve a conventional-technology problem that a user accidentally touches a touch region when grasping an electronic device, the embodiments of this application disclose a touch region adjustment method and an apparatus.

The touch region adjustment method disclosed in the embodiments of this application may be applied to a plurality of types of electronic devices. For example, the electronic device may be a device such as a mobile phone, a tablet computer, a handheld computer, a netbook, a personal digital assistant (Personal Digital Assistant, PDA), a wearable electronic device, or a smartwatch. Certainly, the electronic device may alternatively be of another type. This is not limited in the embodiments of this application.

Figure 1:
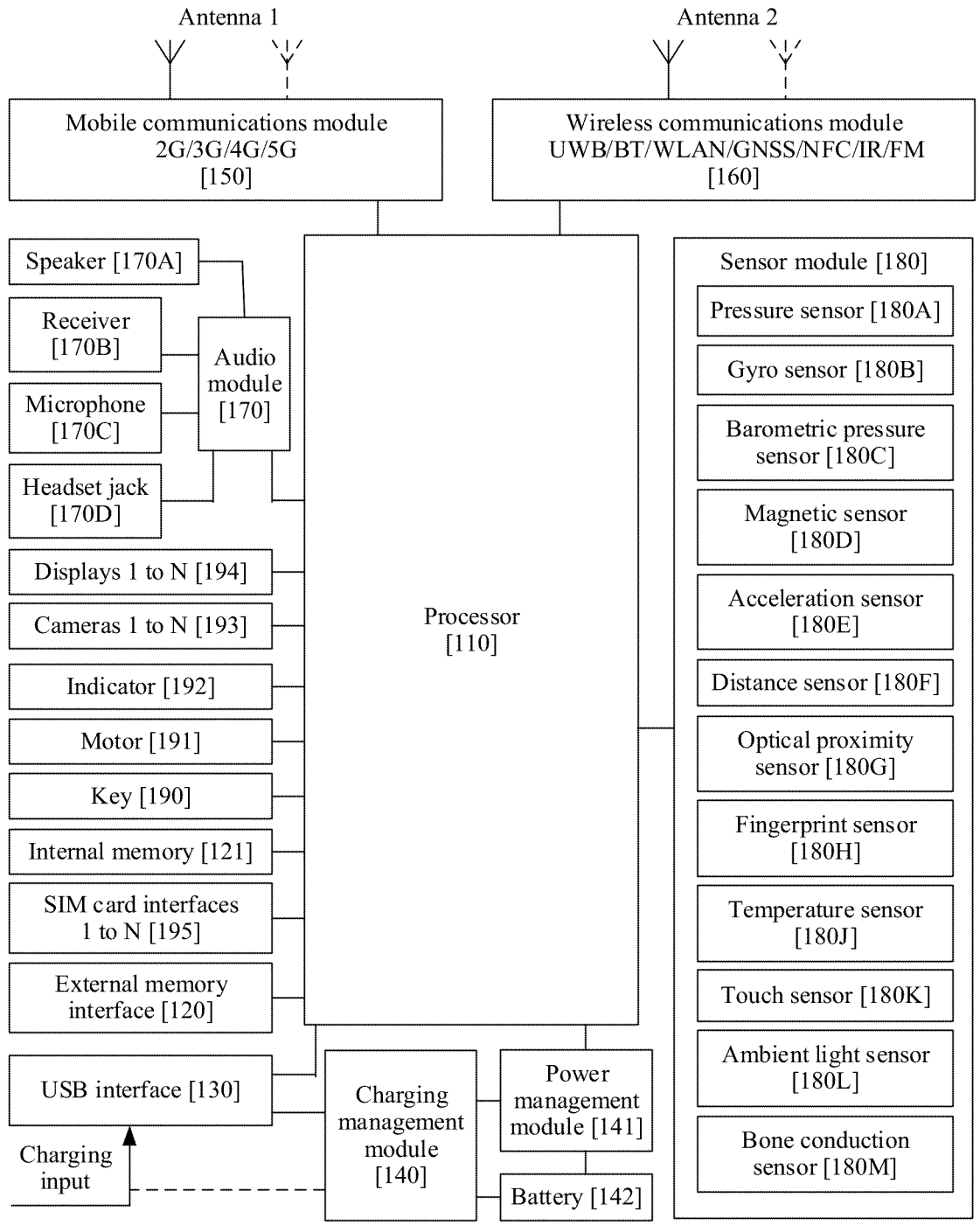
FIG. 1 is a schematic structural diagram of an electronic device according to an embodiment of this application.

In the embodiments of this application, a structure of the electronic device may be shown in FIG. 1. FIG. 1 is a schematic structural diagram of the electronic device to which the touch region adjustment method disclosed in the embodiments of this application is applied.

As shown in FIG. 1, the electronic device may include a processor 110, an external memory interface 120, an internal memory 121, a universal serial bus (universal serial bus, USB) interface 130, a charging management module 140, a power management module 141, a battery 142, a sensor module 180, a key 190, a motor 191, an indicator 192, a camera 193, a display 194, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. Further, when the electronic device is a mobile phone, the electronic device may further include: an antenna 1, an antenna 2, a mobile communications module 150, a wireless communications module 160, an audio module 170, a speaker 170A, a receiver 170B, a microphone 170C, a headset jack 170D, and a subscriber identification module (subscriber identification module, SIM) card interface 195.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device. The controller may generate an operation control signal based on instruction operation code and a lime sequence signal, to complete control of instruction reading and instruction execution.

The memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments of this application, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement the function of answering a call through the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C port, or the like. The USB interface 130 may be configured to connect to a charger to charge the electronic device, or may be configured to transmit data between the electronic device and a peripheral device, or may be configured to connect to a headset for playing audio by using the headset. Alternatively, the interface may be configured to connect to another electronic device, for example, an AR device.

It may be understood that an interface connection relationship between the modules shown in this embodiment is merely an example for description, and does not constitute a limitation on the structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device. The charging management module 140 may further supply power to the electronic device through the power management module 141 while charging the battery 142.

The power management module 141 is configured to connect the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may further be configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device may be configured to cover one or more communication bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide wireless communication solutions applied to the electronic device, including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC) technology, an infrared (infrared, IR) technology, and the like. The wireless communications module 160 may be one or more devices integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the electronic device is coupled to the mobile communications module 150, and the antenna 2 is coupled to the wireless communications module 160, so that the electronic device may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE) BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device implements the display function through the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. A liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like may be used for the display panel. In some embodiments, the electronic device may include one or N displays 194, where N is a positive integer greater than 1.

A series of graphical user interfaces (graphical user interface, GUI) may be displayed on the display 194 of the electronic device, and all these GUIs are of a home screen of the electronic device. Generally, a size of the display 194 of the electronic device is fixed, and limited controls can be displayed only on the display 194 of the electronic device. The control is a GUI element. The control is a software component included in an application, and controls all data processed by the application and an interaction operation related to the data. The user may interact with the control by performing direct manipulation (direct manipulation). In this way, related information about the application is read or edited. Usually, the control may include visual interface elements such as an icon, a key, a menu, a tab, a text box, a dialog box, a status bar, a navigation bar, and a widget. For example, in this embodiment of this application, the display 194 may display a virtual key.

The electronic device may implement the photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, namely, converting the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device may include one or N cameras 193, where N is a positive integer greater than 1.

The digital signal processor is configured to process a digital signal, and may process other digital signals in addition to the digital image signal. For example, when the electronic device selects a frequency, the digital signal processor is configured to perform Fourier transform and the like on frequency energy.

The video codec is configured to compress or decompress a digital video. The electronic device may support one or more video codecs. In this way, the electronic device can play or record videos in a plurality of encoding formats, for example, moving picture experts group (moving picture experts group, MPEG) 1, MPEG 2, MPEG 3, MPEG 4, and the like.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device may be implemented through the NPU, for example, image recognition, facial recognition, speech recognition, and text understanding.

The external memory interface 120 may be configured to connect to an external memory card, for example, a micro SD card, to extend a storage capability of the electronic device. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to execute various function applications of the electronic device and data processing. For example, in this embodiment, the processor 110 may adjust a control region by executing the instructions stored in the internal memory 121 and by using the solution disclosed in the embodiments of this application. The internal memory 121 may include a program storage area and a data storage area. The program storage area may store an operating system, an application required by at least one function (for example, a voice playing function or an image playing function), and the like. The data storage area may store data (such as audio data and a phone book) created when the electronic device is used, and the like. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs the instructions stored in the internal memory 121 and/or the instructions stored in the memory disposed in the processor, to execute various function applications of the electronic device and data processing.

The electronic device may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may listen to music or answer a hands-free call through the speaker 170A.

The receiver 170B, also referred to as an "earpiece", is configured to convert an electrical audio signal into a sound signal. When a call is answered or voice information is received by using the electronic device, the receiver 170B may be put close to a human ear to receive a voice.

The microphone 170C, also referred to as a "mike" or a "microphone", is configured to convert a sound signal into an electrical signal. When making a call or sending voice information, a user may make a sound near the microphone 170C, to input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines pressure intensity based on a capacitance change. When a touch operation is performed on the display 194, the electronic device detects intensity of the touch operation by using the pressure sensor 180A. The electronic device may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating a new SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall sensor. The electronic device may detect opening and closing of a flip leather case by using the magnetic sensor 180D. In some embodiments, when the electronic device is a clamshell phone, the electronic device may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations in various directions (usually on three axes) of the electronic device, and may detect magnitude and a direction of the gravity when the electronic device is still. The acceleration sensor 180E may further be configured to identify a posture of the electronic device, and is applied to an application such as switching between a landscape mode and a portrait mode or a pedometer.

The distance sensor 180E is configured to measure a distance. The electronic device may measure the distance in an infrared or a laser manner. In some embodiments, in a photographing scenario, the electronic device may measure a distance by using the distance sensor 180F, to implement quick focusing.

The optical proximity sensor 180G may include a light emitting diode (LED) and an optical detector, for example, a photodiode. The light-emitting diode may be an infrared light-emitting diode. The electronic device emits infrared light through the light emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device is in a pocket, to avoid an accidental touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats up the battery 142, to avoid abnormal shutdown of the electronic device due to a low temperature. In some other embodiments, when the temperature is lower than still another threshold, the electronic device boosts an output voltage of the battery 142 to avoid abnormal shutdown due to a low temperature.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device at a location different from that of the display 194.

The bone conduction sensor 180M may obtain a vibration signal. In some embodiments, the bone conduction sensor 180M may obtain a vibration signal of a vibration hone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key or a touch key. The electronic device may receive a key input, and generate a key signal input related to a user setting and function control of the electronic device.

The motor 191 may generate a vibration prompt. The motor 191 may be configured to provide an incoming call vibration prompt and a touch vibration feedback. For example, touch operations performed on different applications for example, photographing and audio playing) may correspond to different vibration feedback effects. The motor 191 may also correspond to different vibration feedback effects for touch operations performed on different regions of the display 194. Different application scenarios (for example, a time reminder, information receiving, an alarm clock, a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device. The electronic device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may further be compatible with an external memory card. The electronic device interacts with a network by using the SIM card, to implement functions such as calling and data communication. In some embodiments, an eSIM, namely, an embedded SIM card is used for the electronic device. The eSIM card may be embedded in the electronic device, and cannot be separated from the electronic device.

In addition, an operating system runs on the foregoing components, for example, an iOS operating system developed by Apple, an Android operating system developed by Google, and a Windows operating system developed by Microsoft. An application may be installed and run on the operating system.

The iOS operating system, the Android operating system, or the Windows operating system may be installed on the electronic device in the embodiments of this application, or another operating system may be installed on the electronic device. This is not limited in the embodiments of this application.

It should be noted that the top, the bottom, the left, the right, an upper side, and a lower side mentioned in the embodiments of this application are relative, and are example descriptions in a specific implementation, and should not constitute a limitation on the embodiments of this application.

In addition, in this embodiment of this application, the display 194 generally includes a touch region. In this case, when an icon is displayed on the display 194 and a touch for the icon is received, the electronic device may perform an operation corresponding to the icon.

Further, to improve screen utilization of electronic devices, currently some electronic devices further support a 100% bezel-less screen. In other words, in addition to a display screen of the electronic device, some specific functions can be extended to another region. In this case, a touch region is disposed in the another region. When the electronic device is required to perform the specific function, the user touches the touch region located in the another region, so that the electronic device performs a corresponding operation. Therefore, when a volume of the electronic device remains unchanged, the touch region in the another region is touched, so that the electronic device can implement the specific function, to improve utilization of the another region of the electronic device.

A plurality of types of screens may alternatively be applied to the electronic device to which the method disclosed in the embodiments of this application is applied. Correspondingly, in addition to the display screen of the electronic device, the another region to which the specific function is extended may also be of a plurality of types. In this embodiment of this application, the display screen of the electronic device may be referred to as a first screen, the another region to which the specific function is extended is a second screen, and a touch region is disposed on the second screen. When receiving a touch for the touch region on the second screen, the electronic device may perform the specific function.

For example, when the specific function extended on the second screen is brightness adjustment, and brightness of an image displayed by the electronic device needs to be adjusted, the user may touch the touch region on the second screen. After receiving the touch of the user, the electronic device performs a corresponding brightness adjustment operation.

In this case, in an example, the first screen of the electronic device is a front screen region of the electronic device, and the second screen may be a side region of the electronic device. The side region generally refers to side regions on left and right sides of the electronic device. For example, when a horizon display is applied to the electronic device, referring to a front view shown in FIG. 2A and a side view shown in FIG. 2B, the second screen is side regions on the left and right sides of the electronic device. The horizon display may also be referred to as a curved display.

In another example, the first screen of the electronic device is a front screen region of the electronic device, and the second screen may be a side region and a rear region of the electronic device. The side region generally refers to side regions on left and right sides of the electronic device. For example, referring to a three-dimensional diagram shown in FIG. 3, when a surround display is applied to the electronic device, the second screen is a side region and a rear region of the electronic device.

In addition, in another example, a screen applied to the electronic device is a foldable display, and the foldable display may be folded along a folding line, to divide the entire foldable display into two displays: a first display and a second display. In addition, based on a folding degree, the first display and the second display may present a plurality of states, such as an unfolded state and a folded state.

Figure 4A:
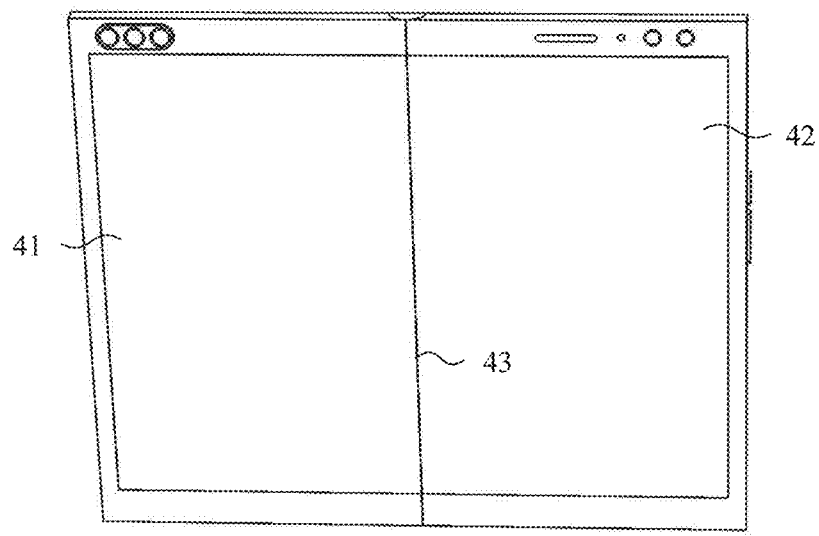
FIG. 4A is a schematic diagram of an electronic device to which a foldable display is applied according to an embodiment of this application.
Figure 4B:
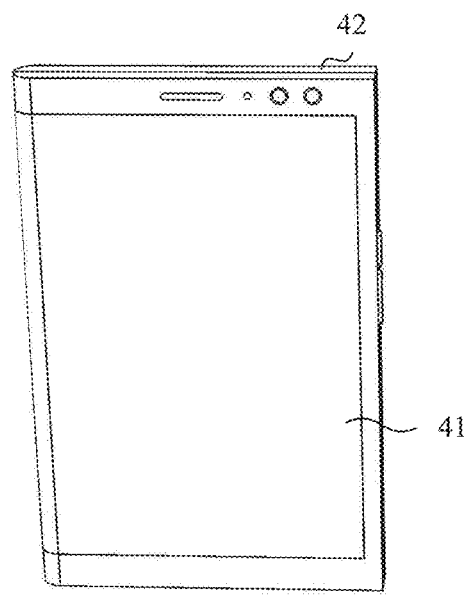
FIG. 4B is a schematic diagram of another electronic device to which a foldable display is applied according to an embodiment of this application.
Figure 4C:
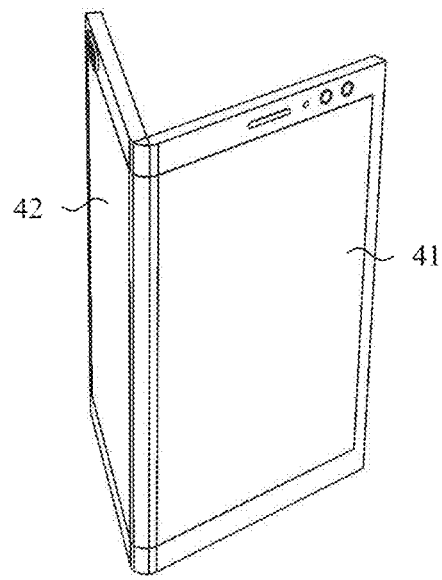
FIG. 4C is a schematic diagram of another electronic device to which a foldable display is applied according to an embodiment of this application.

Refer to schematic diagrams of the foldable display shown in FIG. 4A, FIG. 4B, and FIG. 4C. In FIG. 4A, a first display 41 and a second display 42 are not folded, and the first display 41 and the second display 42 are spliced to form an independent display screen.

Correspondingly, in this embodiment of this application, when the first display 41 and the second display 42 are in the unfolded state, in other words, states of the first display 41 and the second display 42 are shown in FIG. 4A, the display screen obtained by splicing the first display 41 and the second display 42 is usually used as the first screen of the electronic device. A side region of the spliced display screen is used as the second screen. In addition, in FIG. 4A, a folding line 43 is between the first display 41 and the second display 42.

In addition, in FIG. 4B and FIG. 4C, the two displays are in the folded state. In FIG. 4B, an included angle between the two displays is relatively small. In this case, either of the displays is usually used as a display screen to display an image, and the other display is the rear of the electronic device. For example, in FIG. 4B, the first display 41 may be used as the display screen of the electronic device, and the second display 42 is the rear of the electronic device.

Correspondingly, the first display 41 and the second display 42 are in the folded state, and the included angle between the first display 41 and the second display 42 is relatively small. In other words, the first display 41 and the second display 42 are shown in FIG. 4B. In this case, the display screen of the electronic device is usually used as the first screen, and a rear region and a side region of the electronic device are used as the second screen.

It is generally considered that when the included angle between the first display 41 and the second display 42 is less than an angle threshold, the included angle between the first display 41 and the second display 42 is relatively small. The angle threshold may be preset, and in a use process of the electronic device, the angle threshold may further be adjusted. For example, the angle threshold may be 10 degrees. Certainly, the angle threshold may alternatively be another angle value. This is not limited in this embodiment of this application.

In FIG. 4C, the included angle between the two displays is relatively large. In this case, both the two displays may be used as display screens, and the first display 41 and the second display 42 may separately display different images.

Correspondingly, the first display 41 and the second display 42 are in the folded state, and the included angle between the first display 41 and the second display 42 is relatively large. In other words, the first display 41 and the second display 42 are shown in FIG. 4C. In this case, both the two displays may be used as the first screen, and the side region is used as the second screen.

It is generally considered that when the included angle between the first display 41 and the second display 42 is not less than the angle threshold, the included angle between the first display 41 and the second display 42 is relatively large.

In other words, the electronic device to which the method disclosed in the embodiments of this application is applied includes both the first screen and the second screen. The first screen is the display screen of the electronic device, the second screen is another region different from the display screen in the electronic device, and the second screen includes the touch region. After receiving a touch for the touch region on the second screen, the electronic device performs an operation corresponding to the touch. In addition, the second screen includes at least a side region of the electronic device. When the surround display is applied to the electronic device, the second screen further includes the rear region of the electronic device. In addition, when the foldable display is applied to the electronic device, and the included angle between the first display and the second display in the foldable display is relatively small, the second screen further includes the rear region of the electronic device.

Certainly, a screen in another form may alternatively be applied to the electronic device. Correspondingly, the first screen and the second screen of the electronic device may alternatively be in another form. This is not limited in the embodiments of this application.

The second screen of the electronic device in this application includes the touch region. Therefore, when grasping the electronic device, the user may accidentally touch the touch region on the second screen. Consequently, the electronic device still performs a function corresponding to the touch region even if the function is not required by the user. In other words, the electronic device performs an operation that is not required by the user. To resolve the problem, the of embodiments of this application disclose a touch region adjustment method and an apparatus.

Figure 5A:
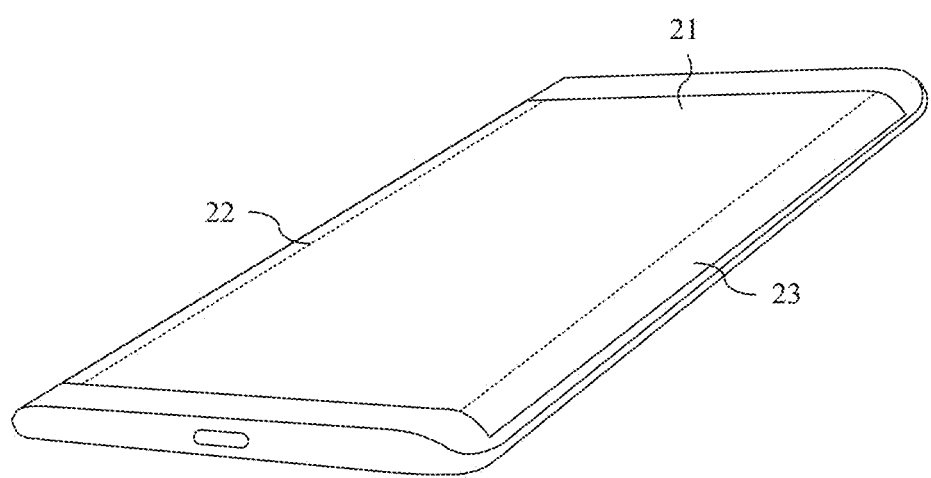
FIG. 5A and FIG. 5B are schematic diagrams of another electronic device to which a horizon display is applied according to an embodiment of this application.
Figure 5B:
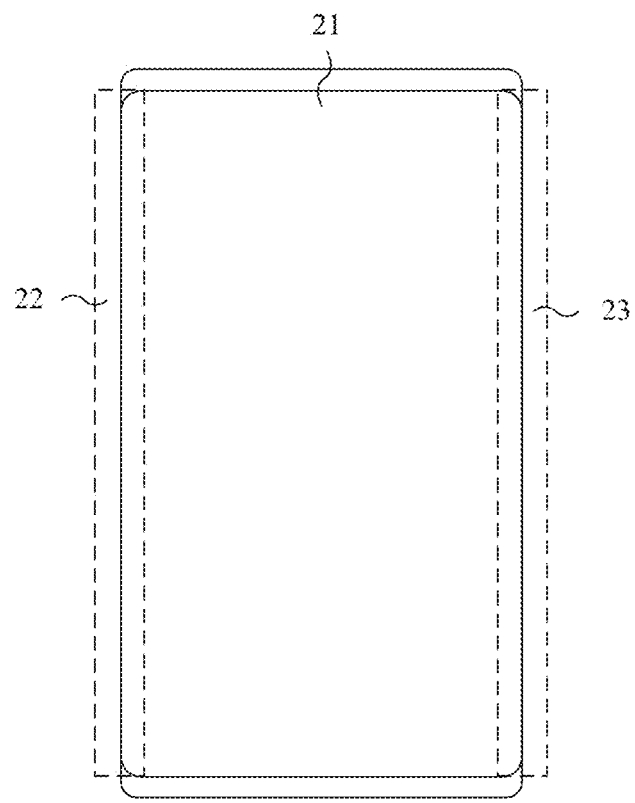

For example, FIG. 5A is a schematic three-dimensional diagram of another electronic device configured with a horizon display according to an embodiment of this application. FIG. 5A shows a front view of the electronic device. As shown in FIG. 5A and FIG. 5B, a display screen of the electronic device includes a front screen 21, a side screen 22, and a side screen 23. The front screen 21 is connected to the side screen 22 and the side screen 23. The side screen 22 and the side screen 23 are curved side screens located on side surfaces of the electronic device. The side screen 22 and the side screen 23 each occupies a part of or all the side surface, of the electronic device, on which the side screen 22 or the side screen 23 is located. The side surface of the electronic device may further include a side frame. A rear housing of the electronic device is disposed on the rear of the electronic device.

Figure 6A:
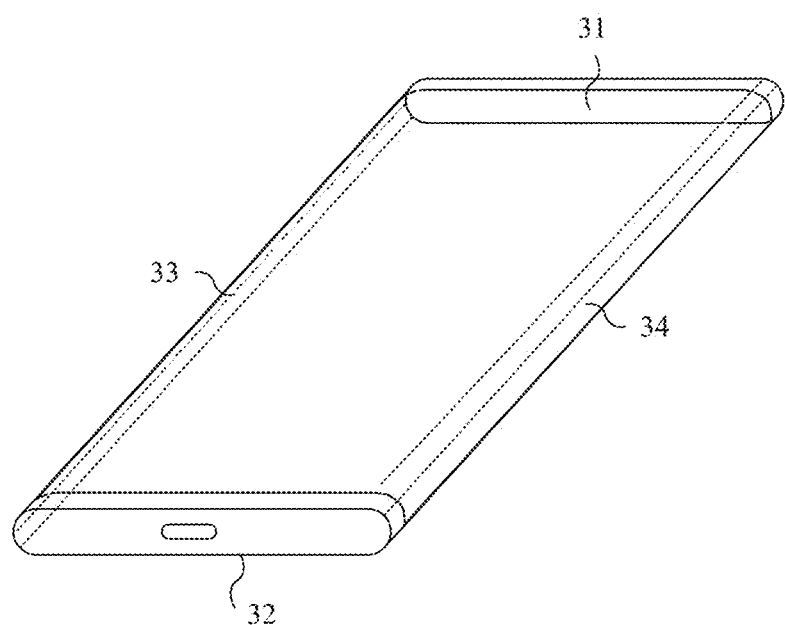
FIG. 6A and FIG. 6B are schematic diagrams of another electronic device to which a surround display is applied according to an embodiment of this application.
Figure 6B:
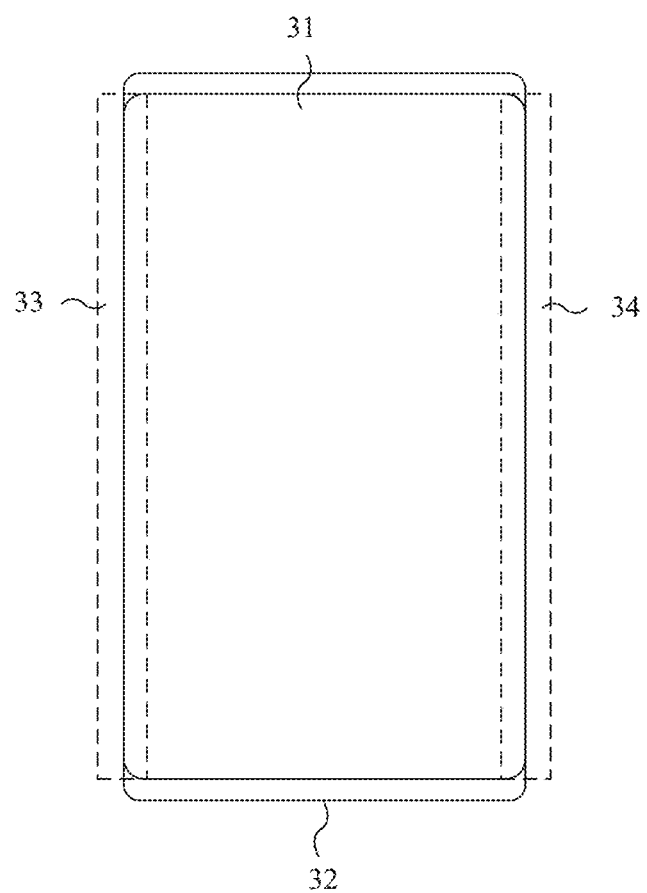

For example, FIG. 6A is a schematic three-dimensional diagram of another electronic device configured with a surround display according to an embodiment of this application. FIG. 6B shows a front view of the electronic device. As shown in FIG. 6A and FIG. 6B, a screen of the electronic device includes a screen 31, a screen 32, a side screen 33, and a side screen 34. The screen 31 is located on either of front and rear surfaces of the electronic device, and the screen 32 is located on the other one of the front and rear surfaces of the electronic device. The side screen 33 and the side screen 34 are curved side screens located on side surfaces of the electronic device. As shown in FIG. 6A, the surround display does not have a side frame of a conventional terminal device.

Figure 7A:
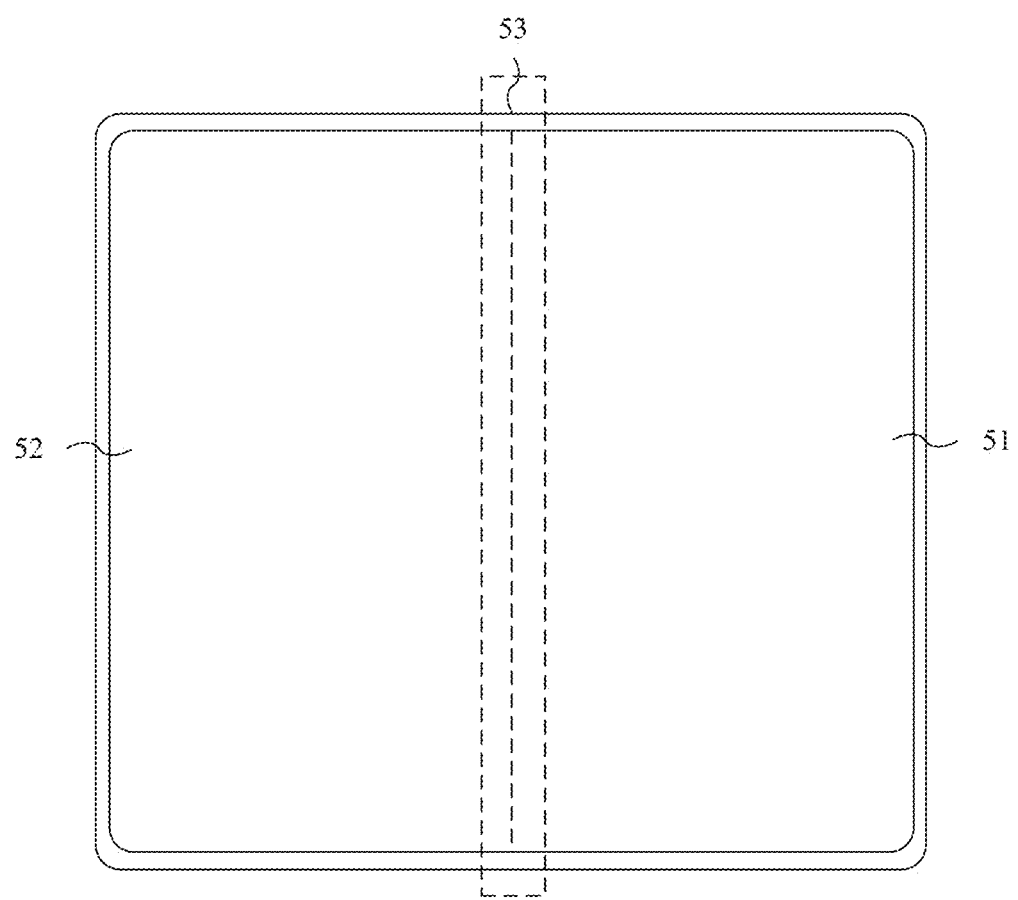
FIG. 7A to FIG. 7C are schematic diagrams of another electronic device to which a foldable display is applied according to an embodiment of this application.
Figure 7B:
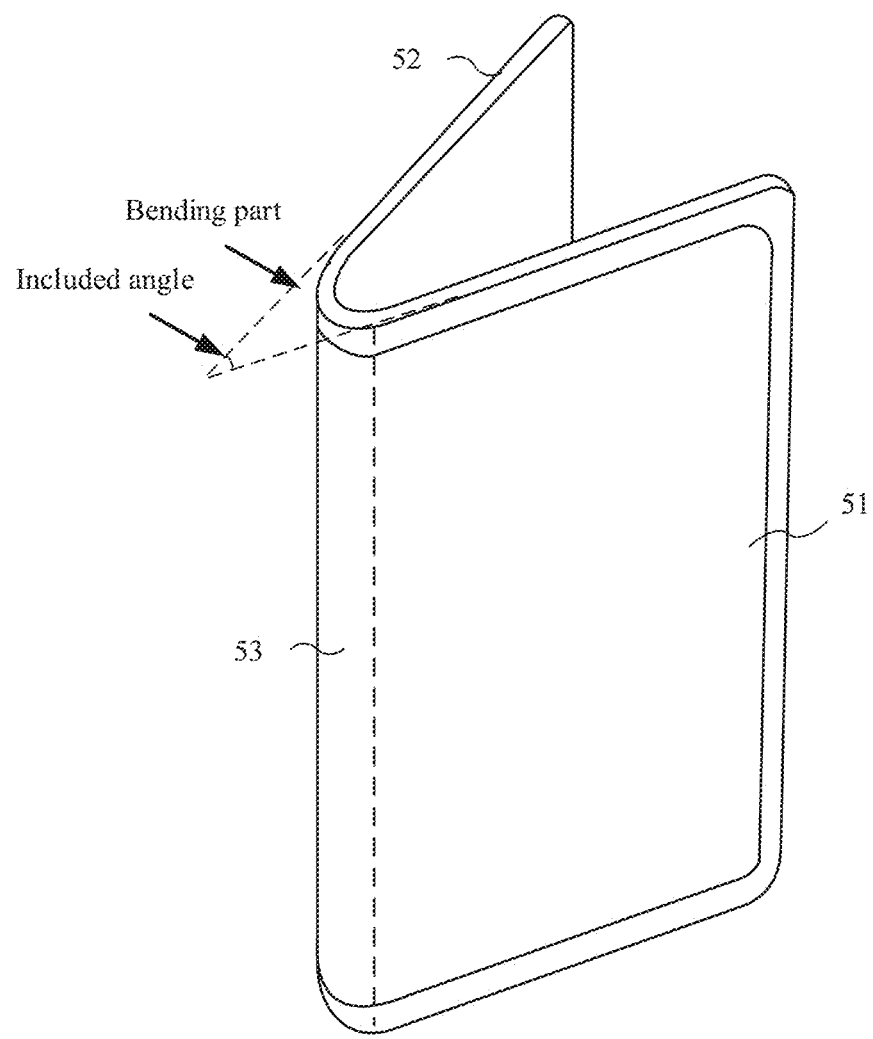
Figure 7C:
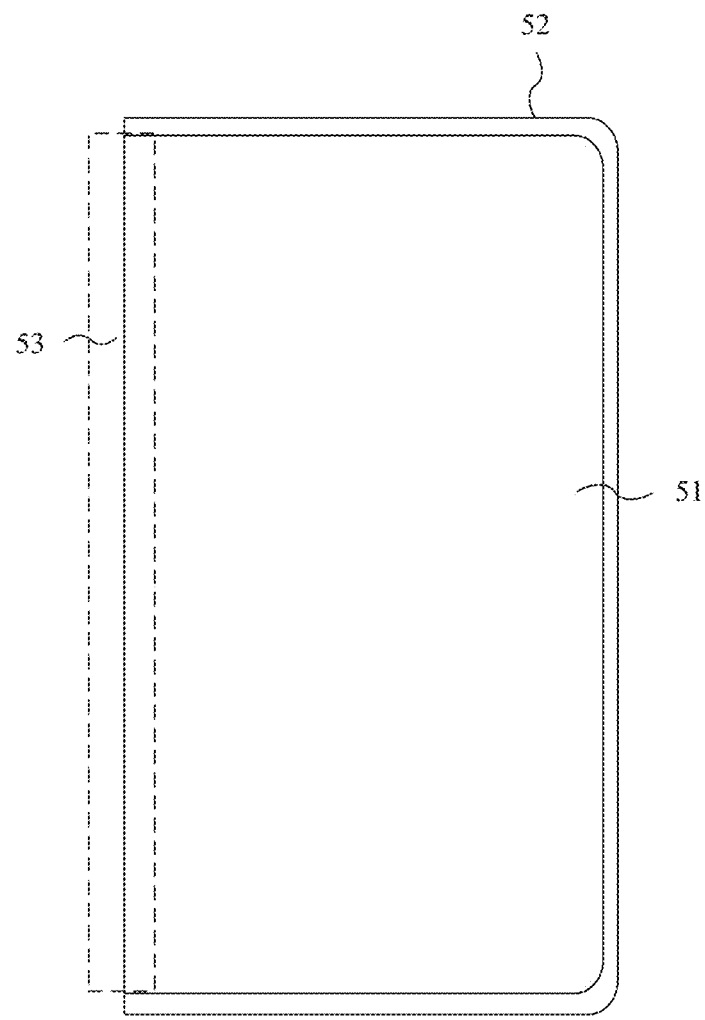

For example, FIG. 7A to FIG. 7C show different forms of another electronic device configured with a foldable display according to an embodiment of this application. As shown in FIG. 7A to FIG. 7C, screens of the electronic device may include a screen 51, a screen 52, and a screen 53. The screen 53 is connected to the screen 51 and the screen 52. The screen 53 is a foldable region of the electronic device. When the screen 53 is bent or deformed, the screen 53 may form a side screen of the electronic device. As shown in FIG. 7A, the screen 53 is not bent, the screen of the electronic device is in an unfolded state, and an included angle formed between the screen 51 and the screen 52 is equal to 180 degrees. As shown in FIG. 7B, the screen 53 is bent, the screen of the electronic device is in a semi-folded state, and an included angle 1 formed between the screen 51 and the screen 52 is greater than 0 degrees and less than 180 degrees. As shown in FIG. 7C, the screen 53 is bent, a display 194 of the electronic device is in a fully folded state, and an included angle formed between the screen 51 and the screen 52 is equal to 0 degrees. Aside screen is disposed on each of left and right side surfaces of the electronic device shown in FIG. 5A and FIG. 6A, but there is only one side screen on the electronic device that is configured with the foldable display and in the folded state.

In some embodiments of this application, when the included angle 1 between the screen 51 and the screen 52 is greater than an angle threshold 1, the screen 53 forms a side screen of the electronic device. For example, the angle threshold 1 is equal to 10 degrees.

The side screen of the display 194 shown in FIG. 5A to FIG. 7C is a curved or even foldable screen. The screen of the electronic device in the embodiments of this application may be a flexible screen made of a flexible material. The flexible screen made of the flexible material uses non-rigid glass as a substrate, so that the curved screen has better elasticity and is not easily broken. The screen shown in FIG. 5A to FIG. 7C may be an integrated flexible screen, or may be formed by splicing a rigid screen and a flexible screen.

In this embodiment of this application, the side screen may also be referred to as a side region.

The following describes a schematic structural diagram of a screen of an electronic device according to an embodiment of this application.

Figure 8A:
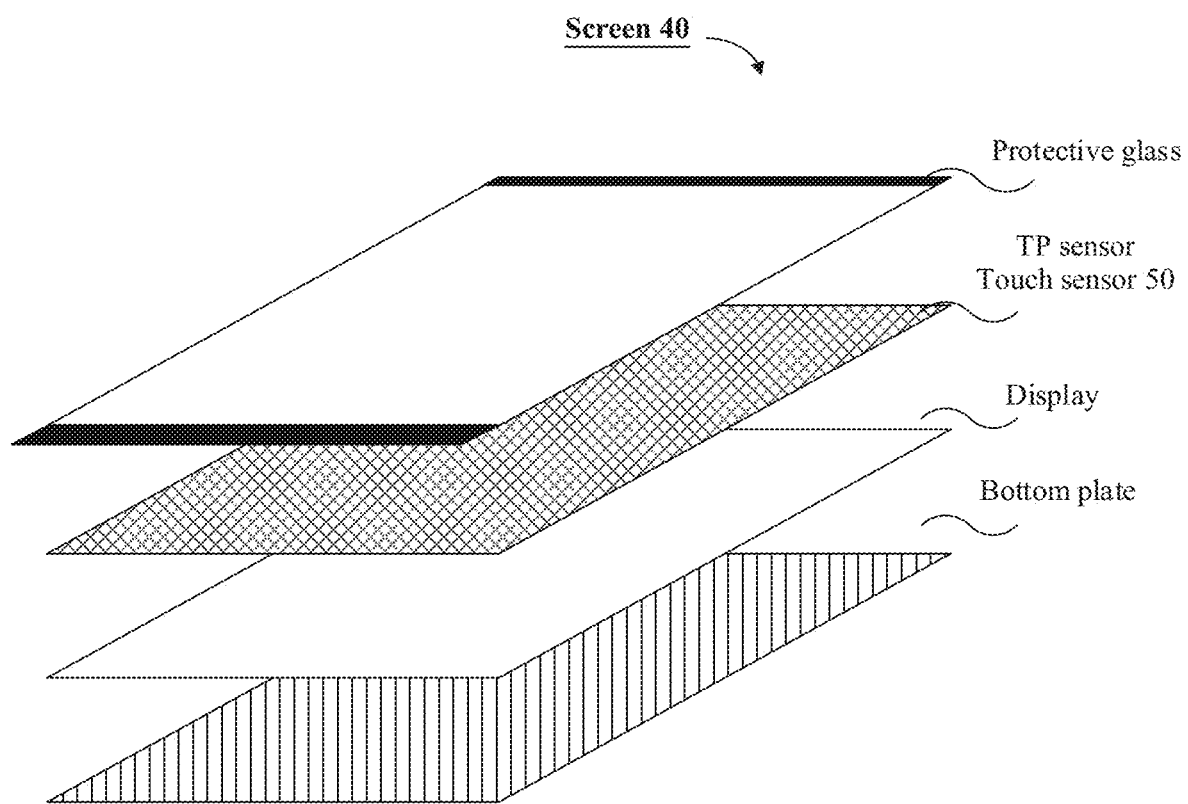
FIG. 8A is a schematic structural diagram of a screen according to an embodiment of this application.

FIG. 8A shows a screen 40 of an electronic device according to an embodiment of this application. The screen 40 of the terminal may include protective glass, a touch sensor 50, a display, and a bottom plate. The screen 40 may be the curved display, the surround display, or the foldable display shown in FIG. 2A to FIG. 7C. The touch sensor 50 and the display may form a touchscreen. The touch sensor 50 may be the touch sensor 180K in the foregoing embodiment, and the display may be the display 194 in the foregoing embodiment. For specific content, refer to the apparatus embodiment shown in FIG. 1. Details are not described herein.

The touch sensor 50 may include an X-axis electrode layer and a Y-axis electrode layer. The X-axis electrode layer and the Y-axis electrode layer are cross-distributed on the touch sensor 50 to form an M×N distributed array shown in FIG. 8B. The electronic device detects a change of a capacitance value of each coordinate point by scanning the X axis and the Y axis at a specific detection frequency, and may determine touch information of a user based on the change of the capacitance value of each coordinate point. The touch information may include a touch location and a touch area of a contact surface of the user on the display 194.

In an implementation, when a hand of the user touches the touchscreen, the hand of the user absorbs, from a Tx electrode, a part of an excitation signal sent by the Tx electrode, and therefore, the excitation signal received by the Rx electrode is weakened. When scanning and detecting magnitude of a mutual capacitance of each coordinate point on the touch sensor 50, the terminal may calculate the touch location of the user based on a capacitance change amount of each coordinate point. In another implementation, when a hand of the user touches the touchscreen, a capacitance of the hand is superimposed on a screen capacitance (a self-capacitance formed by a Tx electrode and the ground, or a self-capacitance formed by an Rx electrode and the ground) of the touchscreen, to change an amount of the screen capacitance. When scanning and detecting magnitude of a self-capacitance of each electrode at each coordinate point on the touch sensor 50, the terminal max determine the touch location of the hand of the user based on a capacitance change amount of each electrode at each coordinate point.

Figure 8B:
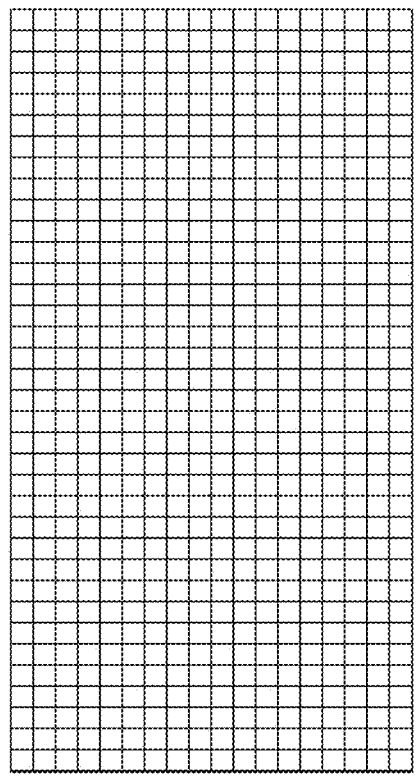
FIG. 8B is a schematic structural diagram of a touch sensor according to an embodiment of this application.

In some embodiments, a larger contact area between the hand of the user and a screen region corresponding to each grid in the touchscreen array shown in FIG. 8B indicates a larger capacitance change amount of a coordinate point corresponding to the grid. It may be understood that a greater pressing force of the hand of the user on a grid indicates a larger contact area between the hand of the user and the grid.

In some embodiments, the electronic device may have the following three detection states for a touch operation performed by the user on the touchscreen: an active (Active) state, an idle (Idle) state, and a sleep (Sleep) state. In the active state, the terminal detects the touch operation on the touchscreen by using a first frequency. For example, the first frequency is 120 Hz. In the idle state, the terminal detects the touch operation on the touchscreen by using a second frequency. For example, the second frequency is 1 Hz or 10 Hz. Sleep state: In the sleep state, the terminal does not detect the touch operation on the touchscreen.

In some embodiments of this application, the electronic device may determine, based on location distribution of side screens on the display 194, a side screen corresponding to coordinate points in an $X^{th}$ column to an $(X+n)^{th}$ column in the M×N touchscreen array. For example, for the curved display shown in FIG. 5A and FIG. 5B, the electronic device determines that coordinate points in a first column to an $n^{th}$ column in the M×N touchscreen array correspond to the side screen 21, and coordinate points in an $(N-n+1)^{th}$ column to an $N^{th}$ column correspond to the side screen 22. For example, for the foldable display shown in FIG. 7A to FIG. 7C, the electronic device determines that n columns of coordinate points in the middle of the M×N touchscreen array correspond to the side screen 53.

A conventional electronic device including a side frame provides the user with some shortcut functions by using a physical key disposed on the side frame. Usually, the functions are frequently used or common functions, for example, powering on/off, volume increasing/decreasing, or screenshot taking. However, the side screens shown in FIG. 5A to FIG. 7C replace some or all of conventional side frames. The side screen may be a touch region for exchanging information with the user, and continue to provide the foregoing shortcut functions and other more functions (for example, photo shooting, call answering, a smart assistant, and quick payment) for the user. For example, the side screen of the electronic device may receive a sliding operation of the user, and in response to the detected sliding operation, the electronic device may adjust display brightness of the display.

In this way, while increasing a screen-to-body ratio of the electronic device, the side screen further increases an interaction manner between the electronic device and the user, thereby improving user experience. However, a side surface of the electronic device is a location held by a palm of the user. Therefore, in a holding state, a risk of a misoperation on the side screen that is used as the touch region for information exchange greatly increases.

Therefore, in the holding state, how to effectively control information exchange between the side screen and the user is a major problem. According to the touch region adjustment method provided in the embodiments of this application, a touch region operable by the user on the side screen may be adjusted based on the holding state of the user. The provided method conforms to a use habit of the user, effectively reduces a misoperation risk in a process of interaction between the user and the side screen, and improves user experience of using the side screen.

In addition to the electronic devices shown in FIG. 5A to FIG. 7C, the touch region adjustment method provided in the embodiments of this application is further applicable to another type of display having a side screen. This is not specifically limited herein.

An embodiment of this application discloses a touch region adjustment method. The method is applied to an electronic device. The electronic device includes a first screen and a second screen. The first screen is a display screen of the electronic device, the second screen is another region different from the display screen in the electronic device, and the second screen includes a touch region. In addition, the second screen includes at least a side region of the electronic device.

Figure 9:
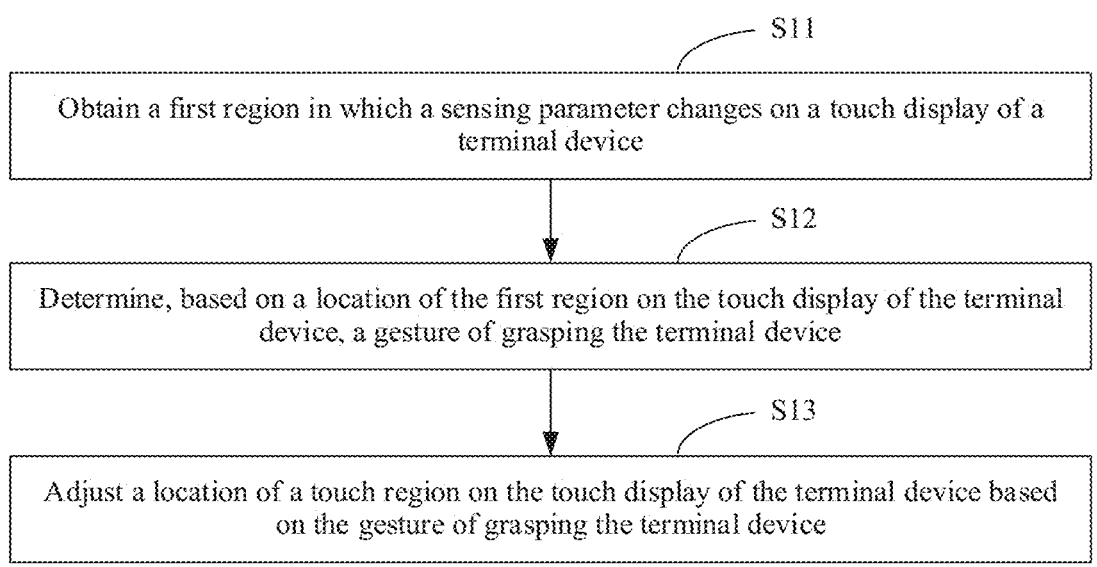
FIG. 9 is a schematic diagram of a working procedure of a touch region adjustment method according to an embodiment of this application.

In this case, referring to a schematic diagram of a working procedure shown in FIG. 9, the touch region adjustment method disclosed in this embodiment of this application includes the following steps:

Step S11: Determine a first region located on the second screen and in which a sensing parameter changes.

In this embodiment of this application, a touched region on the second screen is determined based on a change of the sensing parameter on the second screen. The sensing parameter may be in a plurality of forms.

Figure 2A:
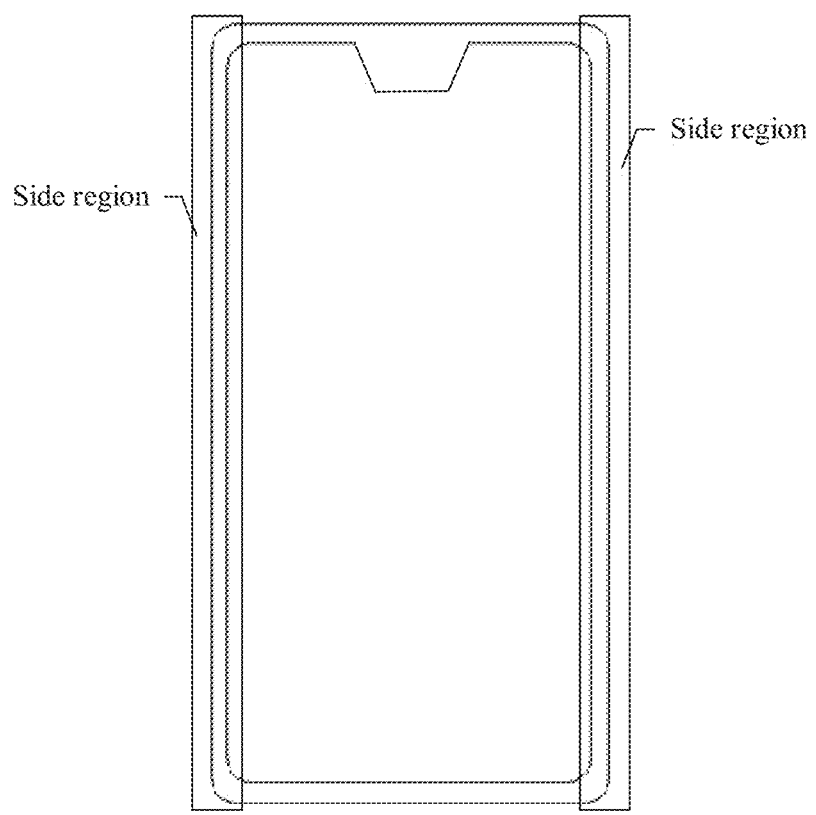
FIG. 2A is a front view of an electronic device to which a horizon display is applied according to an embodiment of this application.
Figure 2B:
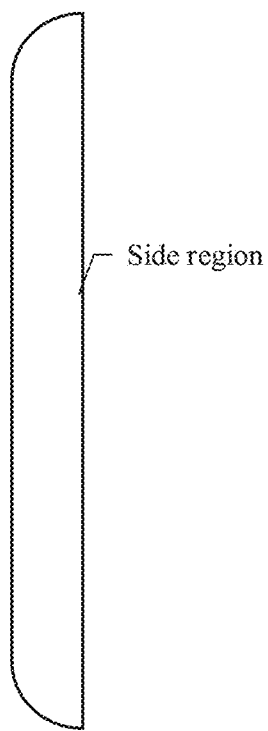
FIG. 2B is a side view of an electronic device to which a horizon display is applied according to an embodiment of this application.
Figure 3:
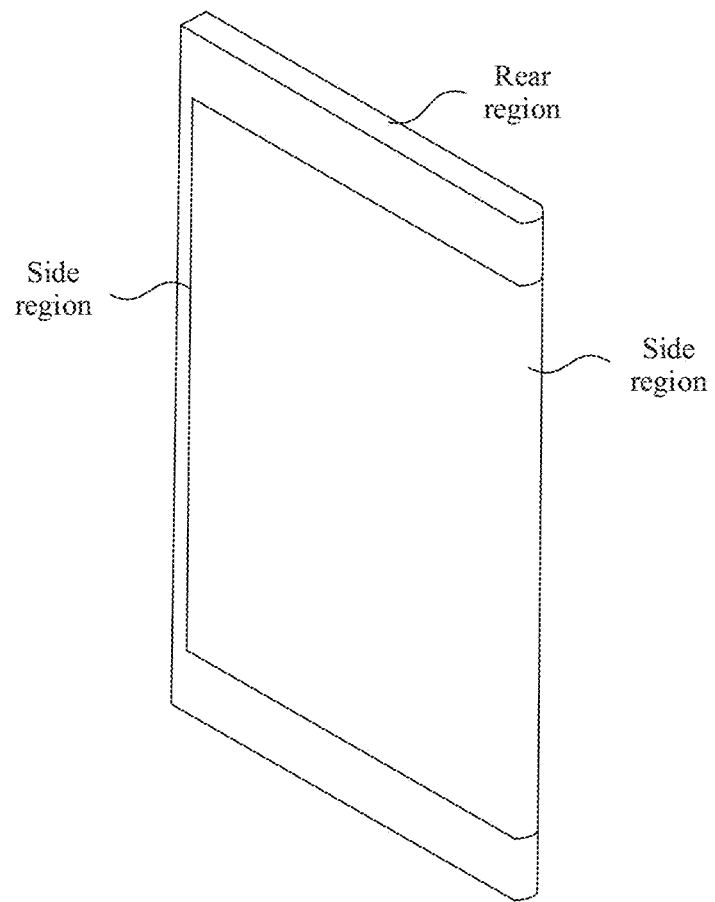
FIG. 3 is a three-dimensional diagram of an electronic device to which a surround display is applied according to an embodiment of this application.

Referring to FIG. 2A, the second screen of the electronic device may include the side region of the electronic device. Referring to FIG. 3, the second screen of the electronic device may include the side region and a rear region of the electronic device. Referring to FIG. 4A, when the electronic device is in a folded state, the second screen may include the side region and a rear region of the electronic device.

For example, a pressure sensor is disposed on the second screen. When a region on the second screen is touched, the pressure sensor can sense a change in pressure of the touched region, and determine the region in which the pressure changes as the first region. In this case, the sensing parameter is pressure.

In another example, a temperature sensor is disposed on the second screen. When a region on the second screen is touched, the temperature sensor can sense a change in temperature of the touched region, and determine the region in which the temperature changes as the first region. In this case, the sensing parameter is a temperature.

Alternatively, a capacitance sensor is disposed on the second screen. When a region on the second screen is touched, the capacitance sensor can sense a change in capacitance of the touched region, and determine the region in which the capacitance changes as the first region. In this case, the sensing parameter is capacitance.

Certainly, another type of sensor may alternatively be disposed on the second screen. Correspondingly; the sensing parameter may alternatively be a parameter in another form. This is not limited in this embodiment of this application. In addition, different types of sensors may be disposed on the second screen at the same time. Correspondingly, the sensing parameter may be a combination of a plurality of types of parameters. For example, both the pressure sensor and the temperature sensor are disposed on the second screen. In this case, the sensing parameter includes both the pressure sensor and the temperature sensor.

Step S12: Determine, based on a location of the first region on the second screen, a gesture of grasping the electronic device.

It should be noted that the electronic device may determine one or more first regions located on the second screen and in which sensing parameters change. The electronic device may determine, based on locations of the one or more first regions on the second screen, the gesture of grasping the electronic device.

In an actual application scenario, there is a plurality of gestures of grasping the electronic device. For example, the gestures include grasping a lower half of the electronic device with one hand, grasping a middle part of the electronic device with one hand, and grasping four corners of the electronic device with two hands.

In this case, in step S12, contact locations/a contact location between the side region and a thenar, a finger, and/or a palm may be separately determined based on the location of the first region on the second screen, to determine a current gesture of grasping the electronic device.

Step S13: Adjust a location of the touch region on the second screen based on the gesture of grasping the electronic device, so that an adjusted touch region is far away from the first region.

Whether a touch region on the second screen is touched can be determined by the gesture of grasping the electronic device and a current location of the touch region on the second screen. When the touch region on the second screen is relatively easy to be touched, the location of the touch region on the second screen is adjusted. The adjusted touch region is far away from the first region, and the first region is usually a region in which a user grasps the electronic device. Therefore, when the adjusted touch region is far away from the first region, it indicates that the adjusted touch region is far away from the region in which the electronic device is grasped, and a possibility that the touch region is accidentally touched is reduced.

For example, when the second screen is the side region of the electronic device, and the gesture of grasping the electronic device is grasping the lower half of the electronic device with one hand, the touch region may be adjusted to an upper half the side region, so that the adjusted touch region is far away from the first region, thereby avoiding an accidental touch on the touch region.

According to the touch region adjustment method disclosed in this embodiment of this application, the first region located on the second screen and in which the sensing parameter changes can be determined, the gesture of grasping the electronic device can be determined based on the location of the first region on the second screen, and the location of the touch region on the second screen can be adjusted based on the gesture. The touch region on the second screen is an extended touch region. In other words, in the solution disclosed in this embodiment of this application, the location of the touch region on the second screen is adjusted based on the gesture of grasping the electronic device, so that the adjusted touch region is far away from the first region, thereby avoiding the accidental touch on the touch region on the second screen, and improving user experience.

In addition, in this embodiment of this application, the electronic device sets a function corresponding to the touch region of the second screen. After the touch region is touched, the electronic device implements the function. After the location of the touch region of the second screen is adjusted according to the solution in this embodiment of this application, when the adjusted touch region is touched, the electronic device performs the function of the touch region. In other words, even if the location of the touch region of the second screen is adjusted, the electronic device can still implement the corresponding function.

For example, when the touch region in the side region is used to adjust volume of the electronic device, and the touch region is located at a first location in the side region, after the touch region is adjusted to a second location of the side region, if the side region is touched, the electronic device determines whether a touched region is at the second location. When the electronic device determines that the touched region is at the second location, the electronic device performs a corresponding volume adjustment operation.

Figure 10A:
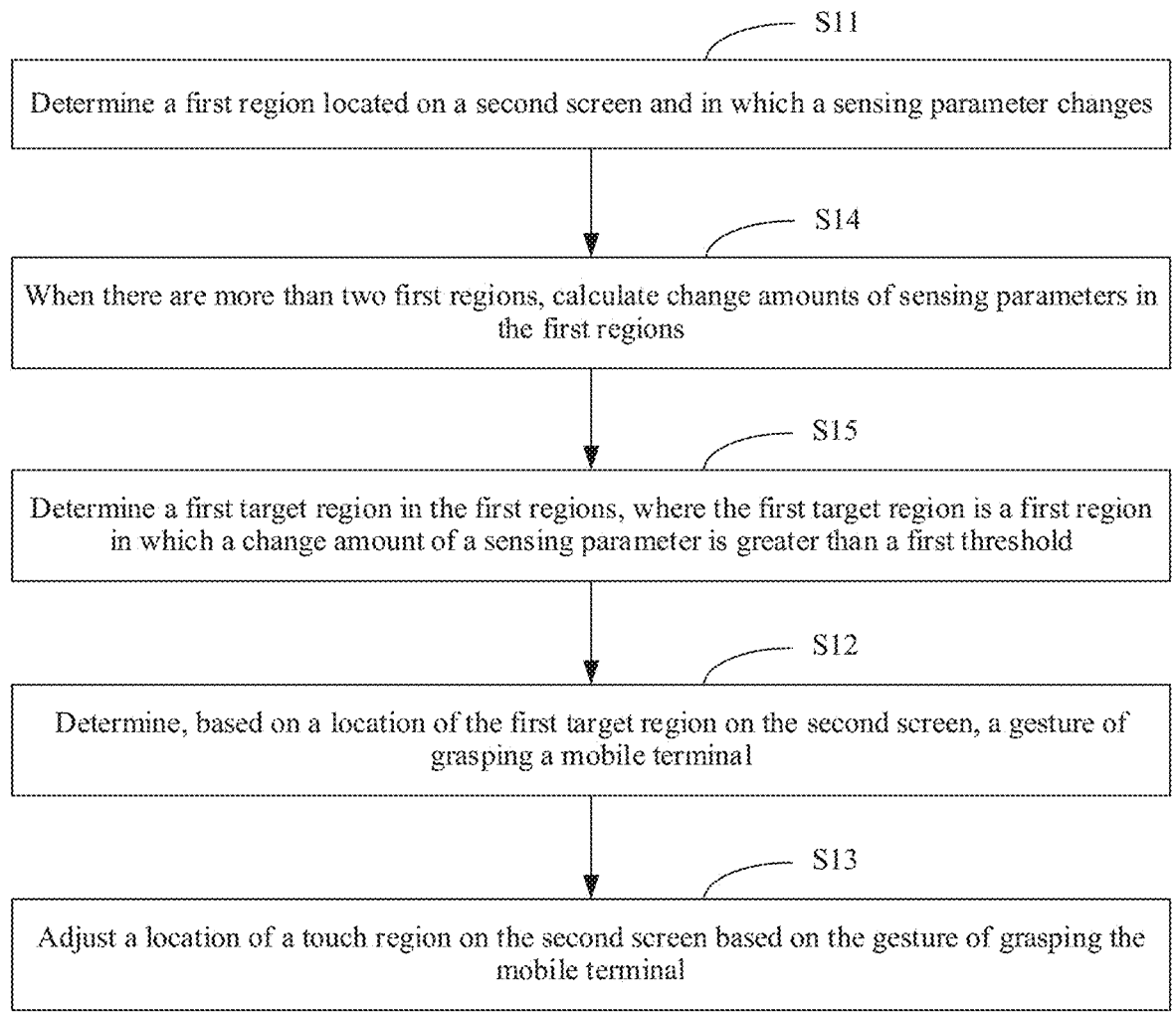
FIG. 10A is a schematic diagram of a working procedure of another touch region adjustment method according to an embodiment of this application.

In step S12, an operation of determining, based on the location of the first region on the second screen, the gesture of grasping the electronic device is disclosed. The first region is a region on the second screen of the electronic device and in which the sensing parameter changes. In some application scenarios, due to external interference, sensing parameters in some regions of the second screen also change. Therefore, to improve accuracy of determining the gesture of grasping the electronic device, this application discloses some other embodiments. In this embodiment, referring to a schematic diagram of a working procedure shown in FIG. 10A, before the gesture of grasping the electronic device is determined based on the location of the first region on the second screen, the method further includes the following steps:

Step S14: When there are more than two first regions, calculate change amounts of sensing parameters in the first regions.

Step S15: Determine a first target region in the first regions, where the first target region is a first region in which a change amount of a sensing parameter is greater than a first threshold.

In this case, the determining, based on the location of the first region on the second screen, the gesture of grasping the electronic device in step S12 includes:

determining, based on a location of the first target region on the second screen, the gesture of grasping the electronic device.

In other words, in this embodiment of this application, after the first regions are determined, the change amount of the sensing parameter in each first region is further calculated. Then, the first target region is determined based on a comparison between the change amount and the first threshold, and the gesture of grasping the electronic device is determined based on the location of the first target region on the second screen.

Sometimes, the electronic device is interfered, so that the sensing parameter on the second screen changes. For example, the second screen sometimes contacts an external object (for example, a leaf or a raindrop), and a sensing parameter at a location at which the second screen touches the external object changes. When the sensing parameter at the location on the second screen changes due to interference from the external object, a change amount of the sensing parameter at the location is usually relatively small. According to the foregoing steps, the first target region in which the change amount of the sensing parameter is greater than the first threshold is determined, and the gesture of grasping the electronic device is determined based on the first target region, so that impact caused by the interference can be reduced, and the accuracy of determining the gesture of grasping the electronic device can be improved.

Figure 10B:
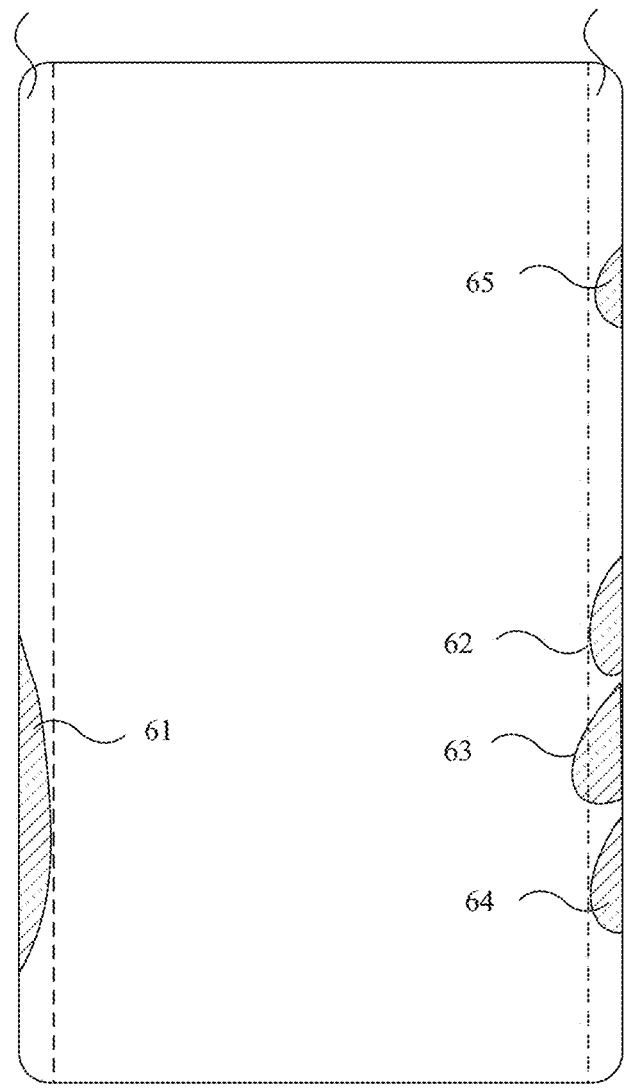
FIG. 10B is a schematic diagram of a first region according to an embodiment of this application.

For example, as shown in FIG. 10B, the electronic device determines five first regions located on the second screen, including a first region 61, a first region 62, a first region 63, a first region 64, and a first region 65. The electronic device calculates a change amount of a sensing parameter in each first region shown in FIG. 10B. The change amount of the sensing parameter in each of the first region 61, the first region 62, the first region 63, and the first region 64 is greater than the first threshold, and the change amount of the sensing parameter in the first region 65 is less than or equal to the first threshold. The electronic device determines a first region in which a change amount of a sensing parameter is greater than the first threshold as the first target region. As shown in FIG. 10B, the first target region includes the first region 61, the first region 62, the first region 63, and the first region 64. The electronic device may determine, based on the first target region, the gesture of grasping the electronic device. As shown in FIG. 10B, the first target region includes a contact region (namely, the first region 61) between the thenar and a left side region on the second screen, and contact regions (namely, the first region 62, the first region 63, and the first region 64) between fingers of the user and a right side region on the second screen. Therefore, the electronic device determines that the user holds the electronic device with a single left hand.

By performing operations in step S13 and step S14, the first target region can be determined based on the change amount of the sensing parameter in each first region, and then accuracy of the gesture of grasping the electronic device is determined based on the first target region. According to these embodiments, impact of the external interference can be reduced, and the accuracy of determining the gesture of grasping the electronic device is further improved.

Figure 11A:
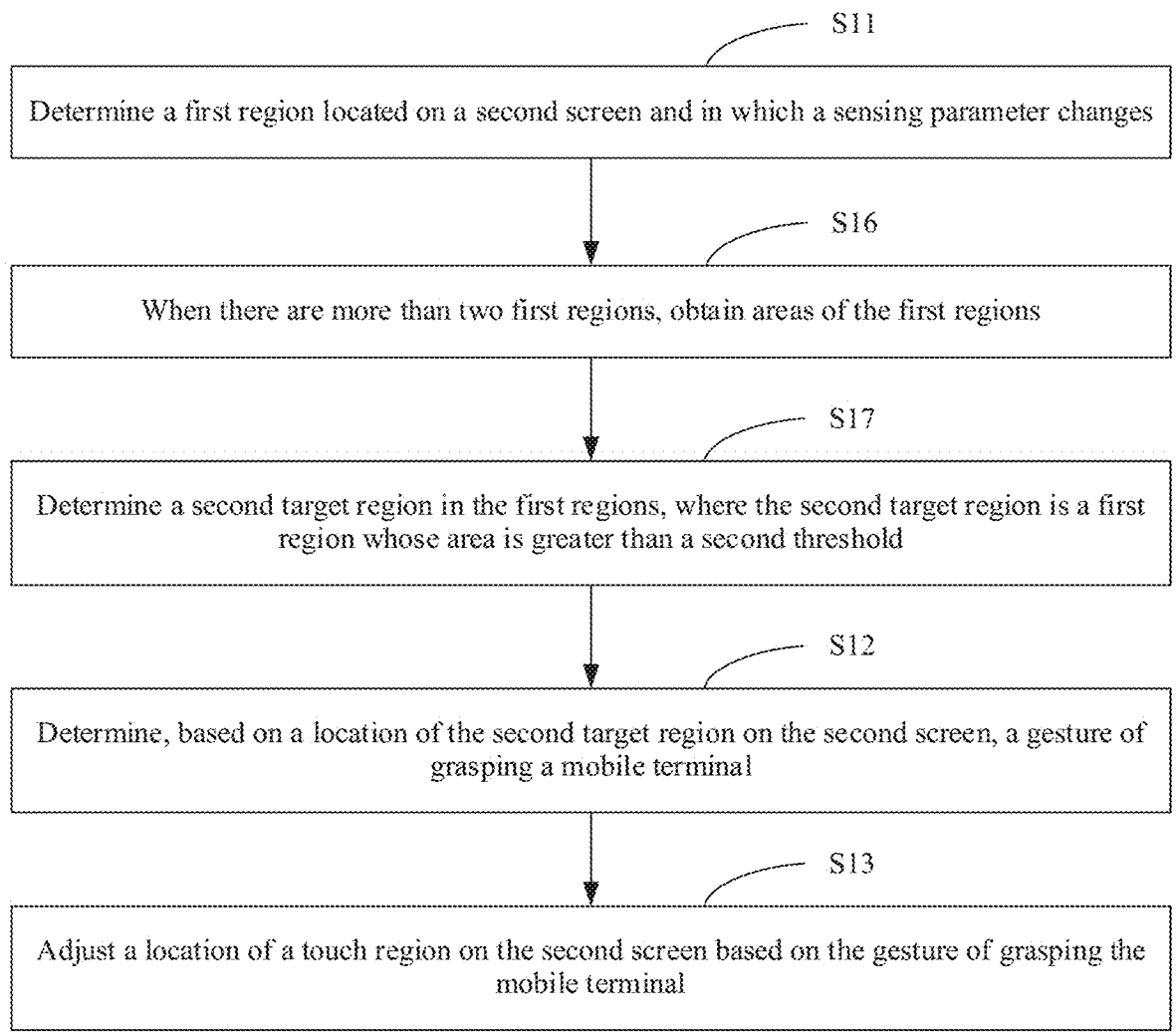
FIG. 11A is a schematic diagram of a working procedure of another touch region adjustment method according to an embodiment of this application.

Alternatively, in another feasible implementation, referring to a schematic diagram of a working procedure shown in FIG. 11A, before the gesture of grasping the electronic device is determined based on the location of the first region on the second screen, the method further includes the following steps:

Step S16: When there are more than two first regions, obtain areas of the first regions.

Step S17: Determine a second target region in the first regions, where the second target region is a first region whose area is greater than a second threshold.

In this case, the determining, based on the location of the first region on the second screen, the gesture of grasping the electronic device in step S12 includes:

determining, based on a location of the second target region on the second screen, the gesture of grasping the electronic device.

Sometimes, the electronic device is interfered, so that the sensing parameter on the second screen changes. An area of a first region caused by interference is usually relatively small. In this case, when an area of a first region is not greater than the second threshold, it is generally considered that the first region is caused by interference. In this embodiment of this application, the second threshold may be determined based on a size range of a human palm. For example, sizes of palms of a plurality of users may be obtained in a big data collection manner. Based on this, areas occupied by fingers in the palm are counted, and then the second threshold is determined to be slightly smaller than a minimum value of the areas occupied by the fingers. In this case, when the user touches the second screen of the electronic device, an area of a first region caused by the touch operation is greater than the second threshold.

Certainly, the second threshold may be set in another manner. This is not limited in this embodiment of this application.

By performing operations in step S16 and step S17, the second target region whose area is greater than the second threshold in the first regions can be determined based on an area of each first region, and then the gesture of grasping the electronic device can be determined based on the second target region, so that the impact of the external interference can be reduced, and the accuracy of determining the gesture of grasping the electronic device is further improved.

Figure 11B:
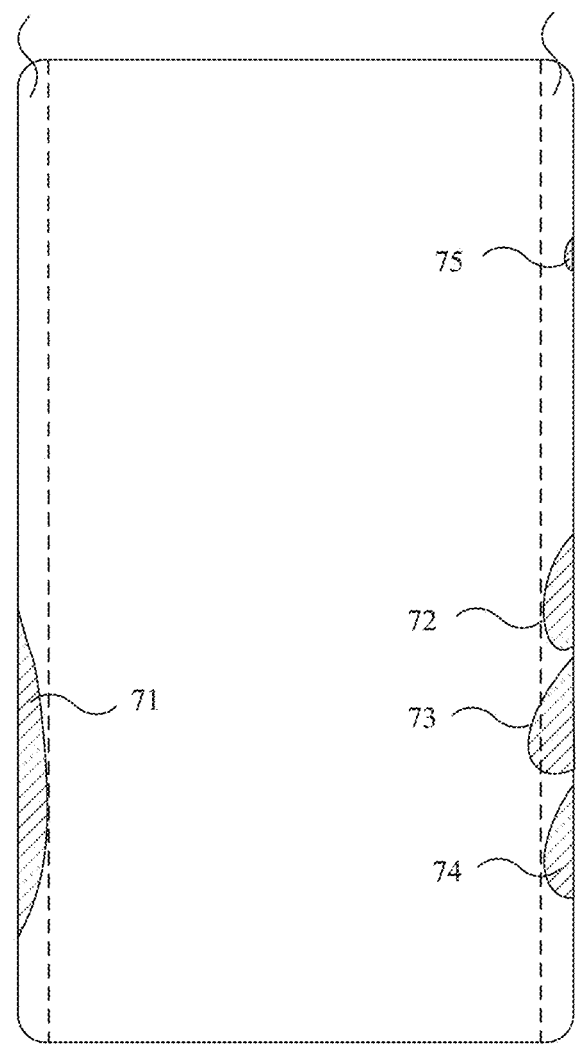
FIG. 11B is a schematic diagram of another first region according to an embodiment of this application.

For example, as shown in FIG. 11B, the electronic device determines five first regions located on the second screen, including a first region 71, a first region 72, a first region 73, a first region 74, and a first region 75. The electronic device determines an area of each first region shown in FIG. 11B. Areas of the first region 71, the first region 72, the first region 73, and the first region 64 are all greater than the second threshold, and an area of the first region 75 is less than or equal to the second threshold. The electronic device determines a first region whose area is greater than the second threshold as the first target region. As shown in FIG. 11B, the first target region includes the first region 71, the first region 72, the first region 73, and the first region 74. The electronic device may determine, based on the first target region, the gesture of grasping the electronic device. Similar to FIG. 10B, the electronic device may determine, based on the first target region shown in FIG. 11B, that the gesture of grasping the electronic device is single left-hand holding.

The operations in step S13 and step S14 and the operations in step S16 and step S17 respectively disclose solutions of determining the first target region based on the change amounts of the sensing parameters and determining the second target region based on the areas of the first regions. In another feasible implementation, a corresponding target region may alternatively be determined based on the change amounts of the sensing parameters and the areas of the first regions.

In this case, after the first target region in the first regions is determined based on the change amounts of the sensing parameters, and the second target region in the first regions is determined based on the areas of the first regions, an overlapping region between the first target region and the second target region is determined. Correspondingly, in this embodiment, the determining, based on the location of the first region on the second screen, the gesture of grasping the electronic device includes: determining, based on the overlapping region between the first target region and the second target region, the gesture of grasping the electronic device.

Figure 11C:
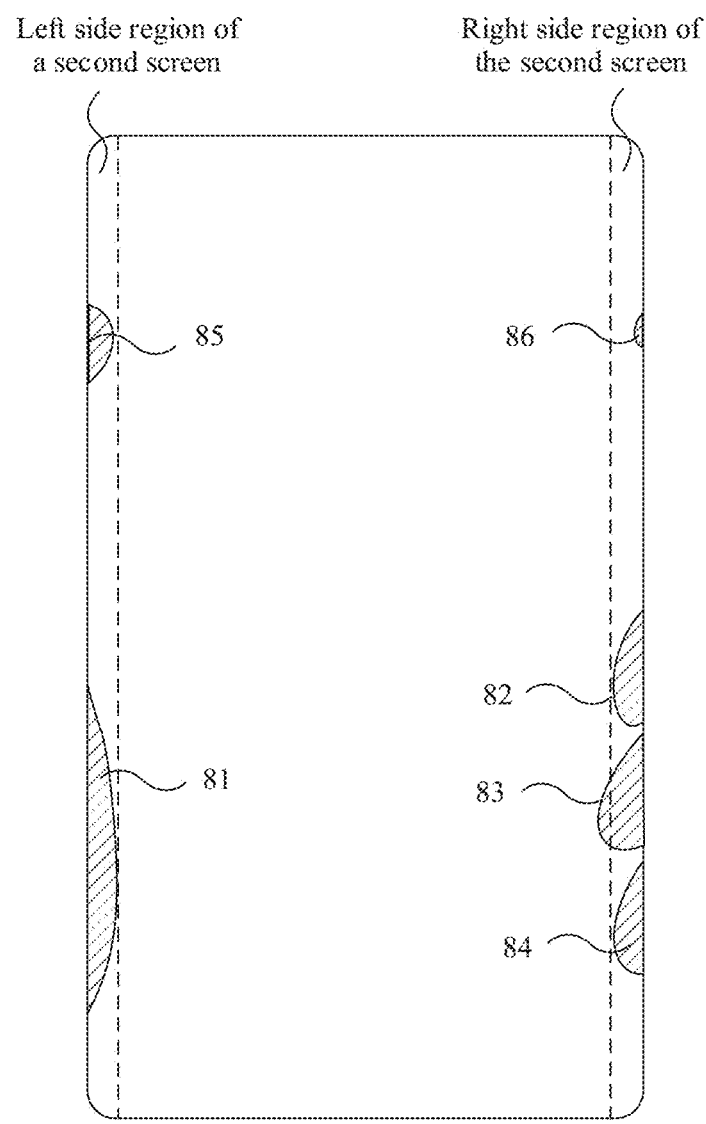
FIG. 11C is a schematic diagram of another first region according to an embodiment of this application.

For example, as shown in FIG. 11C, the electronic device determines six first regions located on the second screen, including a first region 81, a first region 82, a first region 83, a first region 84, a first region 85, and a first region 86. The electronic device calculates a change amount of a sensing parameter in each first region shown in FIG. 11C and an area of each first region. The change amount of the sensing parameter in each of the first region 81, the first region 82, the first region 83, and the first region 84 is greater than the first threshold, and areas of the first region 81, the first region 82, the first region 83, and the first region 84 are all greater than the second threshold. The change amount of the sensing parameter in the first region 85 is less than the first threshold. An area of the first region 86 is less than the second threshold. The electronic device determines, as the first target region, a first region in which a change amount of a sensing parameter is greater than the first threshold and whose area is greater than the second threshold. As shown in FIG. 11C, the first target region includes the first region 81, the first region 82, the first region 83, and the first region 84. The electronic device may determine, based on the first target region, the gesture of grasping the electronic device. Similar to FIG. 10B, the electronic device may determine, based on the first target region shown in FIG. 11C, that the gesture of grasping the electronic device is single left-hand holding.

In the foregoing solution, both the change amount of the sensing parameter and the area of the first region are considered, so that the impact of the external interference can further be reduced, and the accuracy of subsequently determining the gesture of grasping the electronic device can be improved.

In the foregoing embodiment, an operation of determining the gesture of grasping the electronic device based on the location of the first region on the second screen is disclosed. There is often a plurality of gestures of grasping the electronic device, and screens applied to different electronic devices are often different. Therefore, in this embodiment of this application, the gesture of grasping the electronic device may be determined in a plurality of manners.

In this embodiment of this application, the second screen of the electronic device is generally in a plurality of forms. In one form, the second screen of the electronic device includes the side region of the electronic device.

For example, when a horizon display is applied to the electronic device, the second screen is the side region of the electronic device.

Alternatively, in another example, a foldable display is used for the electronic device. The foldable display includes a first display and a second display. When the first display and the second display are in an unfolded state, that is, the first display and the second display are spliced into one display, that is, the first display and the second display are shown in FIG. 4A, the spliced display may be used as the first screen, and a side region of the spliced display is the second screen. In other words, when the foldable display is used for the electronic device, and the first display and the second display in the foldable display are in the unfolded state, the second screen includes the side region of the electronic device.

In addition, when an included angle between the first display and the second display in the foldable display is relatively large, that is, the first display and the second display are shown in FIG. 4C, both the two displays may be used as the first screen, and side regions of the two displays are respectively used as the second screen. In other words, when the foldable display is used for the electronic device, and the included angle between the first display and the second display in the foldable display is relatively large, the second screen separately includes the side regions of the first display and the second display.

When the foldable display is applied to the electronic device, a state (namely, an unfolded state or a folded state) of the foldable display needs to be determined. In this embodiment of this application, the included angle between the first display and the second display may be determined. When the included angle between the first display and the second display is 180 degrees, it is determined that the state of the foldable display is the unfolded state. When the included angle between the first display and the second display is not 180 degrees, it is determined that the state of the foldable display is the folded state.

In addition, after it is determined that the state of the foldable display is the folded state, the included angle between the first display and the second display may further be compared with an angle threshold (for example, 10 degrees). When the included angle between the first display and the second display is greater than the angle threshold, it is considered that the included angle between the first display and the second display is relatively large, and the first display and the second display are in a state shown in FIG. 4C.

In this embodiment of this application, one or more sensors may be disposed in the electronic device, and the included angle between the first display and the second display is determined based on data detected by the one or more sensors.

For example, a gyroscope and an acceleration sensor may be disposed on each of the first display and the second display of the electronic device. The gyroscope disposed on the first display may detect a rotational angular velocity when the first display rotates, and the acceleration sensor on the first display may detect an acceleration generated when the first display moves. Correspondingly, the gyroscope disposed on the second display may detect a rotational angular velocity when the second display rotates, and the acceleration sensor on the second display may detect an acceleration generated when the second display moves. Then, the included angle between the first display and the second display may be obtained through calculation based on the rotational angular velocity and the acceleration of the first display and the rotational angular velocity and the acceleration of the second display.

Figure 12:
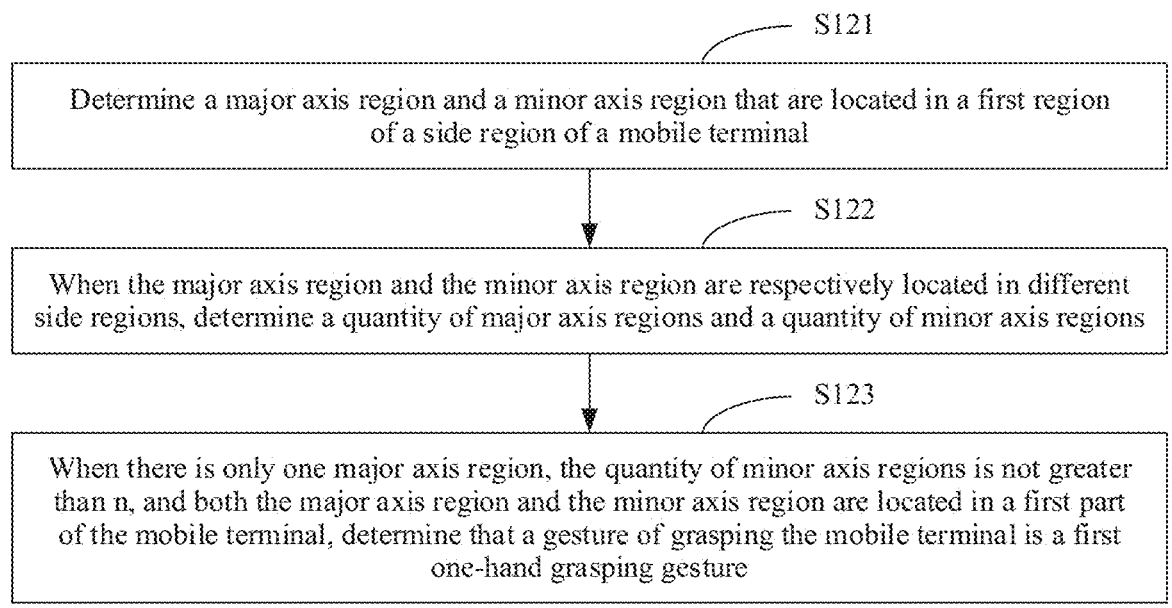
FIG. 12 is a schematic diagram of a working procedure of another touch region adjustment method according to an embodiment of this application.

When the first screen includes the side region of the electronic device, referring to a schematic diagram of a working procedure shown in FIG. 12, the determining, based on the location of the first region on the second screen, the gesture of grasping the electronic device includes the following steps:

Step S121: Determine, based on lengths of first regions located in the side region of the electronic device, a major axis region and a minor axis region in the first regions located in the side region of the electronic device, where the major axis region is a first region whose length is greater than or equal to a third threshold in the first regions, and the minor axis region is a first region whose length is less than or equal to a fourth threshold in the first regions.

In an implementation, the third threshold is equal to the fourth threshold.

In step S121, the first regions are divided into two types according to the length: the major axis region and the minor axis region. When the user grasps the electronic device, a location such as a thumb, thenar, or palm of the user usually contacts a side region on one side of the electronic device, so that a major axis region appears at the location in the side region on the one side. In other words, the major axis region corresponds to the location at which the thumb, the thenar, the palm, or the like contacts the side region when the user grasps the electronic device. However, the remaining fingers often contact a side region on the other side of the electronic device, so that a minor axis region appears at a location in the side region on the other side. In other words, the minor axis region corresponds to a location at which another finger touches the side region when the user grasps the electronic device.

In some embodiments, the length of the first region is a maximum length of the first region along a long side of the electronic device. In addition, in this embodiment of this application, the third threshold and the fourth threshold are predetermined. For example, in a big data collection manner, a length of a side region contacted by the location such as the thumb, the thenar, or the palm and a length of a side region contacted by the finger other than the thumb when a plurality of users grasps the electronic device with one hand may be obtained in advance. Based on this, the third threshold and the fourth threshold are determined.

Certainly, the third threshold and the fourth threshold may be determined in another manner. This is not limited in this embodiment of this application.

Step S122: When the major axis region and the minor axis region are respectively located in different side regions, determine a quantity of major axis regions and a quantity of minor axis regions.

In some embodiments, the electronic device determines a quantity of major axis regions and minor axis regions on each side region. When the major axis region of the electronic device is located only on one side region of the electronic device, and the minor axis region of the electronic device is located only on another side region of the electronic device, the electronic device performs step 123. When both the two side regions of the electronic device include the major axis region, the electronic device determines that the gesture of grasping the electronic device is two-hand longitudinal holding.

When the electronic device is grasped by the user, the location such as the thumb, the thenar, or the palm, and the other fingers than the thumb are located on different sides. In other words, the major axis region and the minor axis regions should be located on different side regions. If the major axis region and any one of the minor axis regions are located in a same side region, it indicates that the major axis region or any one of the minor axis regions is not an area in which a sensing parameter changes due to the user grasping the electronic device, and cannot be used to determine the gesture of grasping the electronic device. Therefore, in time foregoing step, when it is determined that the major axis region and the minor axis region are respectively located in different side regions, the quantity of major axis regions and the quantity of minor axis regions are further determined.

Step S123: When there is only one major axis region, the quantity of minor axis regions is not greater than n, and both the major axis region and the minor axis region are located in a first part of the electronic device, determine that the gesture of grasping the electronic device is a first one-hand grasping gesture.

The electronic device is divided into the first part and a second part along a dividing line, and a direction of the dividing line is parallel to a width direction of the electronic device. Generally, the dividing line is located in a middle location of the electronic device. When the electronic device is placed in a vertical state, the dividing line divides the electronic device into two parts: an upper half region and a lower half region. The first part is the lower half region of the electronic device, and the first part is the upper half region of the electronic device.

Figure 13:
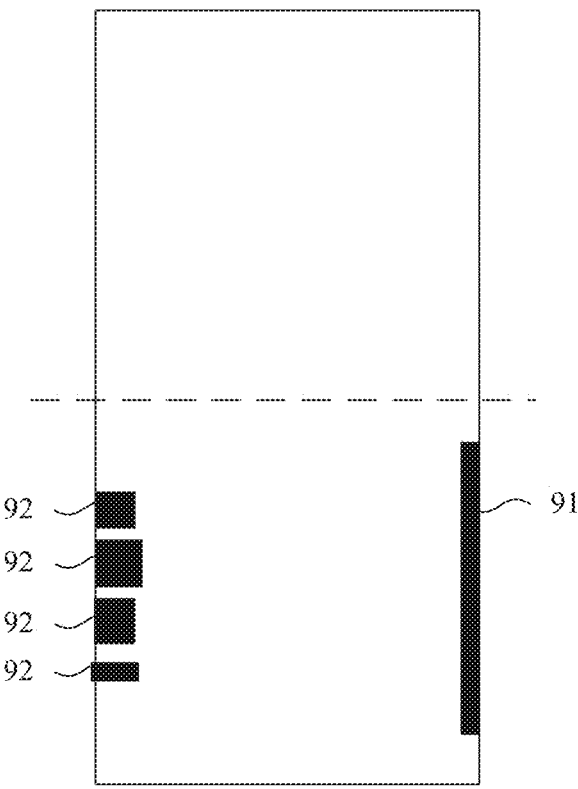
FIG. 13 is a schematic diagram of a first region of an electronic device according to an embodiment of this application.

FIG. 13 is a schematic diagram of a first region of the electronic device. In FIG. 13, parts in black are first regions in the side regions, and the first regions include a major axis region 91 and minor axis regions 92. In addition, a dashed line in FIG. 13 is a dividing line.

In this embodiment of this application, n is a preset positive integer. When the user grasps the electronic device, the location such as the thumb, the thenar, or the palm, and the other fingers than the thumb are located on different sides. In this case, there is only one major axis region. However, fingers contacting the side region are usually other fingers than the thumb, and are no more than 4. Therefore, n may be usually set to 4.

If there is at least one major axis region, it indicates that a change of a sensing parameter in the major axis region is not caused by the user grasping the electronic device. In addition, if the quantity of minor axis regions is greater than n, it indicates that a change of a sensing parameter in the minor axis region is not caused by the user grasping the electronic device. In both cases, the gesture of grasping the electronic device does not need to be determined by using the first region.

It can be learned from operations in step S121 to step S123 that when there is only one major axis region, the quantity of minor axis regions is not greater than n, and both the major axis region and the minor axis region are located in the first part of the electronic device, it is determined that the gesture of grasping the electronic device is the first one-hand grasping gesture. The first one-hand grasping gesture means that the electronic device is grasped with one hand (for example, held with a right hand longitudinally or a left hand longitudinally), and the user grasps the first part of the electronic device.

In addition, when the gesture of grasping the electronic device is the first one-hand grasping gesture, adjusting the location of the touch region on the second screen based on the gesture of grasping the electronic device includes the following steps.

First, a second region located in a second part of a first side region and whose distance from the major axis region is a first distance h1 is determined, where the first side region is a side region in which the major axis region is located. In FIG. 13, the first side region is a right side region.

In this embodiment of this application, a distance between two regions refers to a shortest distance between the two regions. When the distance between the two regions is determined, a connection line between any two points that are separately located in the two regions may be determined, and a length of a shortest connection line in connection lines is the distance between the two regions. In an implementation, the shortest distance between the two regions refers to a shortest distance between the two regions along the long side of the electronic device.

Figure 14:
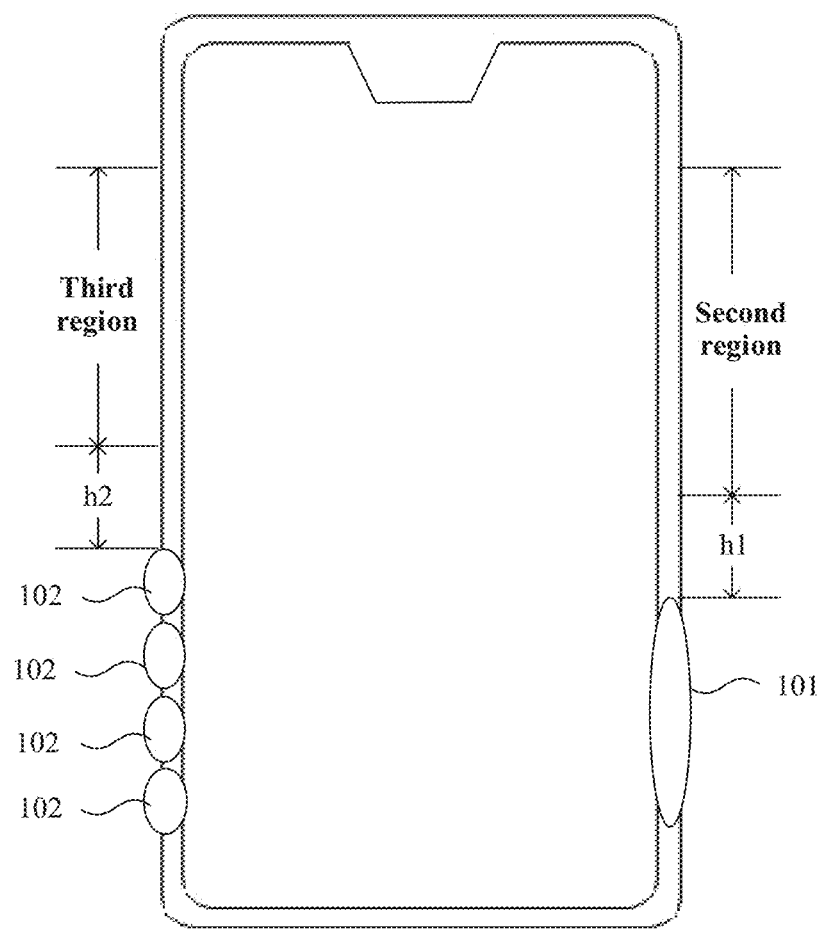
FIG. 14 is a schematic diagram of a first one-hand grasping gesture according to an embodiment of this application.

Then, a third region located in a second part of a second side region and whose distance from the minor axis region is a second distance h2 is determined, where the second side region is a side region in which the minor axis region is located. In FIG. 14, the second side region is a left side region.

Finally, a first touch region is adjusted to the second region and/or the third region. The first touch region is a touch region located in the side region of the electronic device.

Referring to FIG. 13, in some embodiments, when the major axis region is located in a lower half region of a side region, and the minor axis region is located in a lower half region of another side region, the electronic device determines that the grasping gesture is the first one-hand grasping gesture.

It can be learned from FIG. 13 and FIG. 14 that, in some embodiments, when the major axis region is located in a lower half region of a side region 1 of the electronic device, and the minor axis region is located in a lower half region of a side region 2 of the electronic device, the electronic device determines that the first touch region is located in an upper half region of the side region and an upper half region of the side region 2. A shortest distance between the major axis region in the side region 1 and the first touch region is h1, and a shortest distance between the minor axis region in the side region 2 and the first touch region is h2.

Both the second region and the third region are regions far away from the palm of the user. In this case, the first touch region may be adjusted to the second region or the third region. In addition, when the first touch region corresponds to more than two functions, the first touch region may further be divided into a first touch sub-region and a second touch sub-region. The first touch sub-region and the second touch sub-region correspond to different functions, and are respectively adjusted to the second region and the third region. For example, when the functions corresponding to the first touch region include brightness adjustment and volume adjustment, it may be determined that the function corresponding to the first touch sub-region is the brightness adjustment, and the first touch sub-region is adjusted to the second region; and it may be determined that the function corresponding to the second touch sub-region is the volume adjustment, and the second touch sub-region is adjusted to the third region.

To clarify the second region and the third region, an embodiment of this application discloses a schematic diagram of the first one-hand grasping gesture, as shown in FIG. 14. In the schematic diagram, a location 101 such as a thumb, thenar, or a palm is included, and when the location contacts the electronic device, a major axis region appears. In addition, other fingers 102 than the thumb are included, and when the other fingers 102 contact the electronic device, minor axis regions appear. In addition, in FIG. 14, the second region located in the second part of the first side region and whose distance from the major axis region is the first distance h1 is included. Because a distance between the second region and the location such as the thumb, the thenar or the palm is the first distance h1, the second region can be far away from the location such as the thumb, the thenar, or the palm. In addition, in FIG. 15, the third region located in the second part of the second side region and whose distance from the minor axis region is the second distance h2 is included. Because a distance between the third region and the other fingers than the thumb is h2, the third region can be far away from the other fingers than the thumb. Therefore, after the first touch region is adjusted to the second region and/or the third region, the finger of the user usually does not accidentally touch the first touch region again.

In addition, in this embodiment of this application, the first distance h1 and the second distance h2 may be a same distance, or may be different distances. This is not limited in this embodiment of this application.

Figure 15:
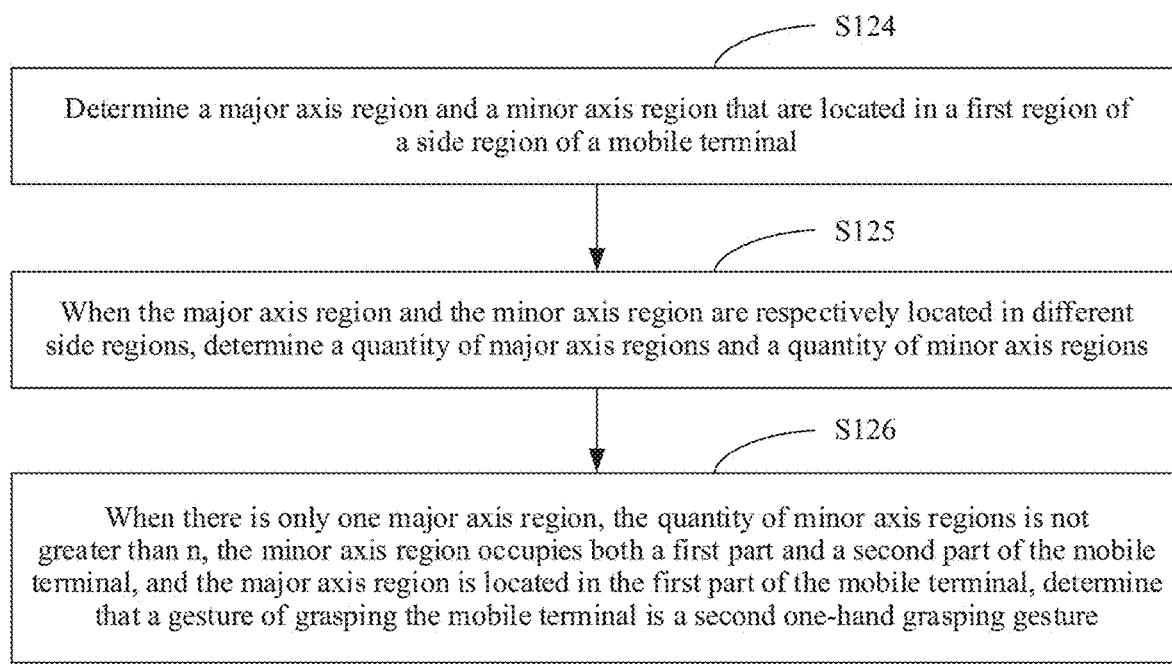
FIG. 15 is a schematic diagram of a working procedure of another touch region adjustment method according to an embodiment of this application.

In another feasible manner, referring to a schematic diagram of a working procedure shown in FIG. 15, when the second screen of the electronic device includes the side region of the electronic device, the determining, based on the location of the first region on the second screen, the gesture of grasping the electronic device includes the following steps:

Step S124: Determine, based on lengths of first regions located in the side region of the electronic device, a major axis region and a minor axis region in the first regions located in the side region of the electronic device, where the major axis region is a region whose length is not less than a third threshold in the first regions, and the minor axis region is a first region whose length is not greater than a fourth threshold in the first regions.

Step S125: When the major axis region and the minor axis region are respectively located in different side regions, determine a quantity of major axis regions and a quantity of minor axis regions.

An operation process of step S124 and step S125 may be the same as an operation process of step S121 and step S122, and reference may be made to each other. Details are not described herein again.

Step S126: When there is only one major axis region, the quantity of minor axis regions is not greater than n, the minor axis region occupies both a first part and a second part of the electronic device, and the major axis region is located in the first part of the electronic device, determine that the gesture of grasping the electronic device is a second one-hand grasping gesture.

The electronic device is divided into the first part and the second part along a dividing line, and a direction of the dividing line is parallel to a width direction of the electronic device. Generally, the dividing line is located in a middle location of the electronic device. When the electronic device is placed in a vertical state, the dividing line divides the electronic device into two parts: an upper half region and a lower half region. The first part is the lower half region of the electronic device, and the first part is the upper half region of the electronic device.

Figure 16:
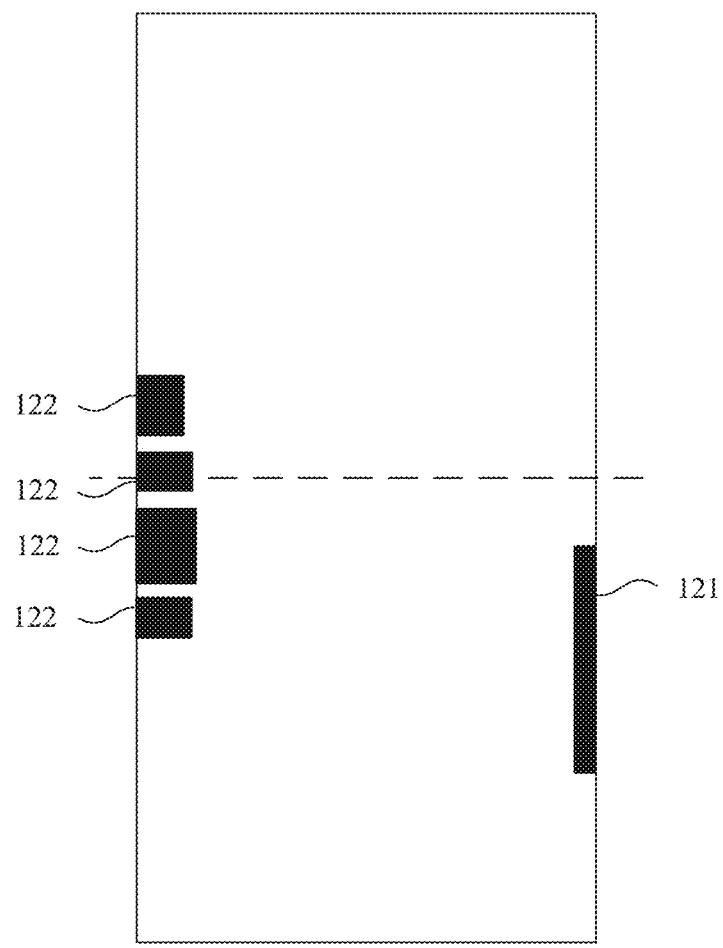
FIG. 16 is a schematic diagram of a first region of another electronic device according to an embodiment of this application.

FIG. 16 is a schematic diagram of a first region of the electronic device. In FIG. 16, parts in black are first regions in the side regions, and the first regions include a major axis region 121 and minor axis regions 122. In addition, a dashed line in FIG. 16 is a dividing line.

In this embodiment of this application, n is a preset positive integer. When the user grasps the electronic device, the location such as the thumb, the thenar, or the palm, and the other fingers than the thumb are located on different sides. In this case, there is only one major axis region. However, fingers contacting the side region are usually other fingers than the thumb, and are no more than 4. Therefore, n may be usually set to 4.

If there is at least one major axis region, it indicates that a change of a sensing parameter in the major axis region is not caused by the user grasping the electronic device. In addition, if the quantity of minor axis regions is greater than n, it indicates that a change of a sensing parameter in the minor axis region is not caused by the user grasping the electronic device. In both cases, the gesture of grasping the electronic device does not need to be determined by using the first region.

It can be learned from operations in step S124 to step S126 that when there is only one major axis region, the quantity of minor axis regions is not greater than n, the minor axis region occupies both the first part and the second part of the electronic device, and the major axis region is located in the first part of the electronic device, it is determined that the gesture of grasping the electronic device is the second one-hand grasping gesture.

The second one-hand grasping gesture means that the electronic device is grasped with one hand, the location such as the thumb, the thenar, or the palm is located in the first part of the electronic device, and a part of the other fingers than the thumb is located in the first part of the electronic device, and another part is located in the second part of the electronic device.

In addition, when the gesture of grasping the electronic device is the first one-hand grasping gesture, adjusting the location of the touch region on the second screen based on the gesture of grasping the electronic device includes the following steps.

First, a fourth region located in a second part of a first side region and whose distance from the major axis region is a third distance h3 is determined, where the first side region is a side region in which the major axis region is located. In FIG. 16, the first side region is a right side region.

Then, a first touch region is adjusted to the fourth region. The first touch region is a touch region located in the side region of the electronic device.

When the gesture of grasping the electronic device is the second one-hand grasping gesture, the determined fourth region is relatively far away from the location such as the thumb, the thenar, or the palm, so that an accidental touch on the first touch region can be reduced. In addition, because the minor axis region occupies both the first part and the second part of the electronic device, a side region in which the minor axis region is located is no longer used as the first touch region. This avoids an accidental touch of the finger on the first touch region.

Figure 17:
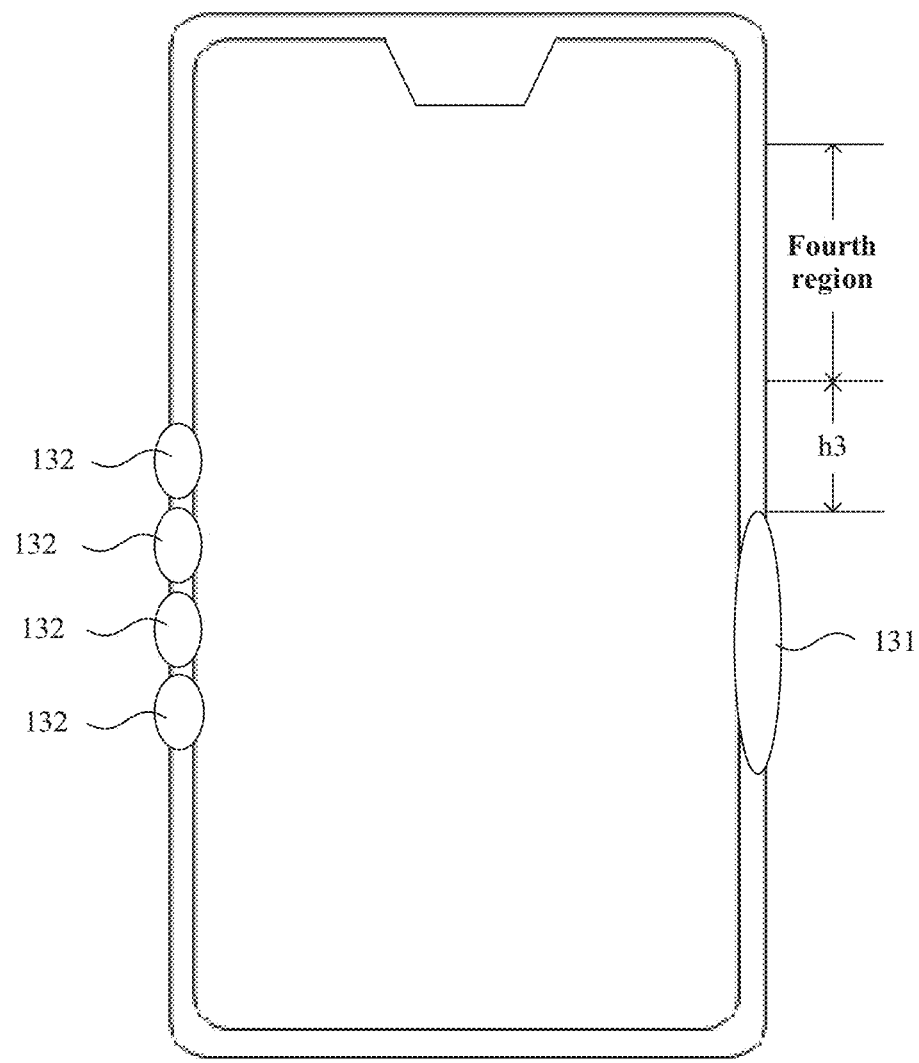
FIG. 17 is a schematic diagram of a second one-hand grasping gesture according to an embodiment of this application.

To clarify the fourth region, an embodiment of this application discloses a schematic diagram of the second one-hand grasping gesture, as shown in FIG. 17. In the schematic diagram, a location 131 such as a thumb, thenar, or a palm is included, and when the location contacts the electronic device, a major axis region appears. In addition, other fingers 132 than the thumb are included, and when the other fingers 102 contact the electronic device, minor axis regions appear. In addition, in FIG. 17, the fourth region located in the second part of the first side region and whose distance from the major axis region is the third distance h3 is included, and the minor axis region is included. Because a distance between the fourth region and the location such as the thumb, the thenar or the palm is the third distance h3, the fourth region can be far away from the location such as the thumb, the thenar, or the palm. Therefore, after the first touch region is adjusted to the fourth region, the finger of the user usually does not accidentally touch the first touch region again.

Referring to FIG. 16, in some embodiments, when the major axis region is located in a lower half region of a side region, and some or all the minor axis regions are located in an upper half region of another side region, the electronic device determines that the grasping gesture is the second one-hand grasping gesture.

It can be learned from FIG. 16 and FIG. 17 that, in some embodiments, when the major axis region is located in a lower half region of a side region 1 of the electronic device, and some or all the minor axis regions are located in an upper half region of a side region 2 of the electronic device, the electronic device determines that the first touch region is located in an upper half region of the side region 1. A shortest distance between the major axis region in the side region 1 and the first touch region is h3. It may be understood that all side regions 2 are non-touch regions.

In addition, in this embodiment of this application, the third distance h3 may be a same distance as the first distance h1 or the second distance h2, or may be a distance different from both the first distance h1 and the second distance h2. This is not limited in this embodiment of this application.

Figure 18:
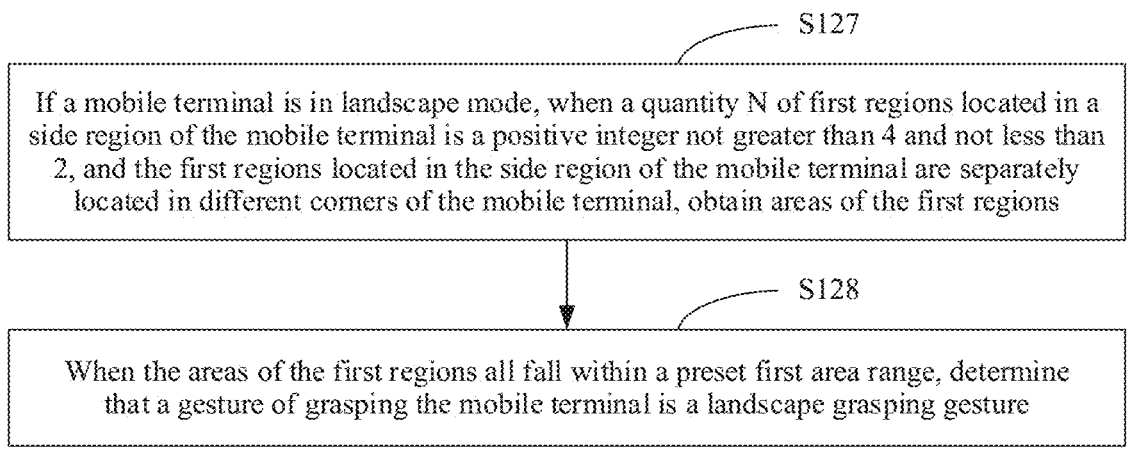
FIG. 18 is a schematic diagram of a working procedure of another touch region adjustment method according to an embodiment of this application.

In another feasible manner, referring to a schematic diagram of a working procedure shown in FIG. 18, when the second screen of the electronic device includes the side region of the electronic device, the determining, based on the location of the first region on the second screen, the gesture of grasping the electronic device includes the following steps:

Step S127: if the electronic device is in landscape mode, when a quantity N of first regions located in the side region of the electronic device is a positive integer not greater than 4 and not less than 2, and the first regions located in the side region of the electronic device are separately located in different corners of the electronic device, obtain areas of the first regions.

In this embodiment of this application, N is a positive integer not greater than 4 and not less than 2. To be specific, a value of N is 2, 3, or 4.

If the electronic device is in landscape mode, when the quantity N of first regions located in the side region of the electronic device is a positive integer not greater than 4 and not less than 2, and the first regions located in the side region of the electronic device are separately located in different corners of the electronic device, it indicates that the first regions may be caused when the user holds corners of the electronic device. In this case, when holding the corners of the electronic device, the user usually uses at least two fingers and at most four fingers (in other words, four fingers hold four corners of the electronic device). Therefore, N is a positive integer not greater than 4 and not less than 2.

Step S128: When the areas of the first regions all fall within a preset first area range, determine that the gesture of grasping the electronic device is a landscape grasping gesture.

When the user holds the corners of the electronic device, the first regions are separately generated when different lingers of the user touch the side region. An area of a contact surface formed by the finger in the side region needs to fall within a specific range (namely, the preset first area range). In this case, when the areas, obtained in step S127, of the first regions all fall within the preset first area range, it indicates that all the first regions are caused by a grasping gesture of the user. Therefore, it may be determined that the gesture of grasping the electronic device is the landscape grasping gesture.

In addition, in this embodiment of this application, the first area range needs to be predetermined. For example, areas of side regions contacted by fingers of a plurality of users when the users hold the four corners of the electronic device may be obtained in advance in a big data collection manner. Based on this, the first area range may be determined.

Certainly, the first area range may be determined in another manner. This is not limited in this embodiment of this application.

Figure 19:
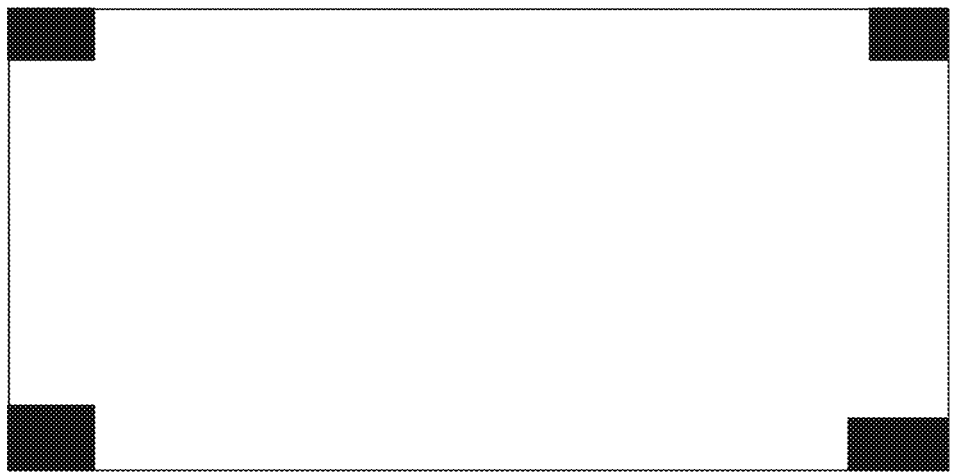
FIG. 19 is a schematic diagram of a first region of another electronic device according to an embodiment of this application.

In addition, according to step S127 and step S128, whether the gesture of grasping the electronic device is the landscape grasping gesture may be determined. When the quantity of first regions is 4, that is, the landscape grasping gesture is completed by four fingers for example, thumbs and index fingers of both hands) of the user, and the four fingers respectively hold the four corners of the electronic device, a schematic diagram of the first regions is shown in FIG. 19. In FIG. 19, a part in black is a first region in the side region, and there are four first regions. The four first regions are respectively located at the four corners of the electronic device.

When the gesture of grasping the electronic device is the landscape grasping gesture, adjusting the location of the touch region on the second screen based on the gesture of grasping the electronic device includes the following steps.

First, a fifth region located in the side region of the electronic device is determined, and a distance between the fifth region and the first region is not less than a fourth distance h4.

Then, a first touch region is adjusted to the fifth region. The first touch region is a touch region located in the side region of the electronic device.

In this embodiment of this application, when the gesture of grasping the electronic device is the landscape grasping gesture, the first touch region is adjusted to the fifth region, and the distance between the fifth region and the first region is not less than the fourth distance h4. Therefore, a distance between the adjusted first touch region and the first region is not less than the fourth distance h4. In other words, the adjusted first touch region is far away from the palm of the user, so that the adjusted first touch region can be prevented from being accidentally touched.

Figure 20:
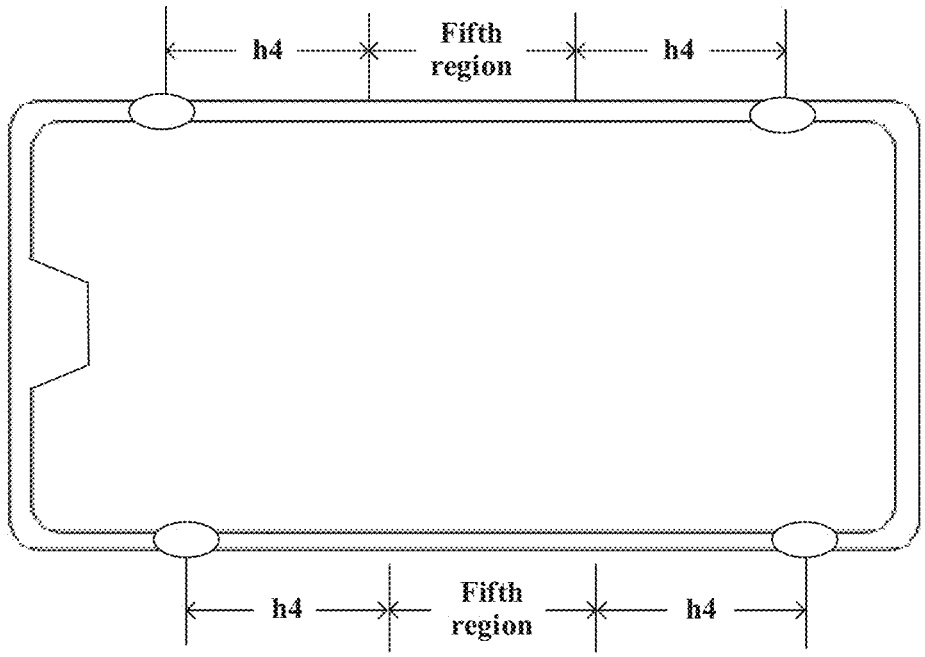
FIG. 20 is a schematic diagram of a landscape grasping gesture according to an embodiment of this application.

To clarify the fifth region, an embodiment of this application discloses a schematic diagram of the landscape grasping gesture, as shown in FIG. 20. In the schematic diagram, the quantity of first regions is set to four, and the first regions are respectively located at the four corners of the electronic device. A distance between the fifth region and each first region is not less than the fourth distance h4.

Further, in this embodiment of this application, when the electronic device is in a non-horizontal state, after the fifth region located in the side region of the electronic device is determined, the method further includes:

determining a fifth region in an upper side region of the electronic device.

In this case, adjusting the touch region to the fifth region includes:

adjusting the first touch region to the fifth region in the upper side region of the electronic device.

When the electronic device is in landscape mode, if the electronic device is further in the non-horizontal state, when the user makes the landscape grasping gesture, the thumb is usually placed in a lower side region of the electronic device, and the index finger is usually placed in the upper side region of the electronic device. Compared with the thumb, the index finger is generally more flexible. Therefore, a touch function of the lower side region of the electronic device is temporarily terminated, and the first touch region is selected to be adjusted to the upper side region of the electronic device. In other words, the first touch region is adjusted to the fifth region in the upper side region, so that the index finger of the user can perform the touch operation on the first touch region.

In this case, the adjusted first touch region is relatively far away from the four corners of the electronic device, and correspondingly; is relatively far away from the finger of the user, so that it is difficult to touch the first touch region. This avoids an accidental touch of the finger on the first touch region.

Figure 21:
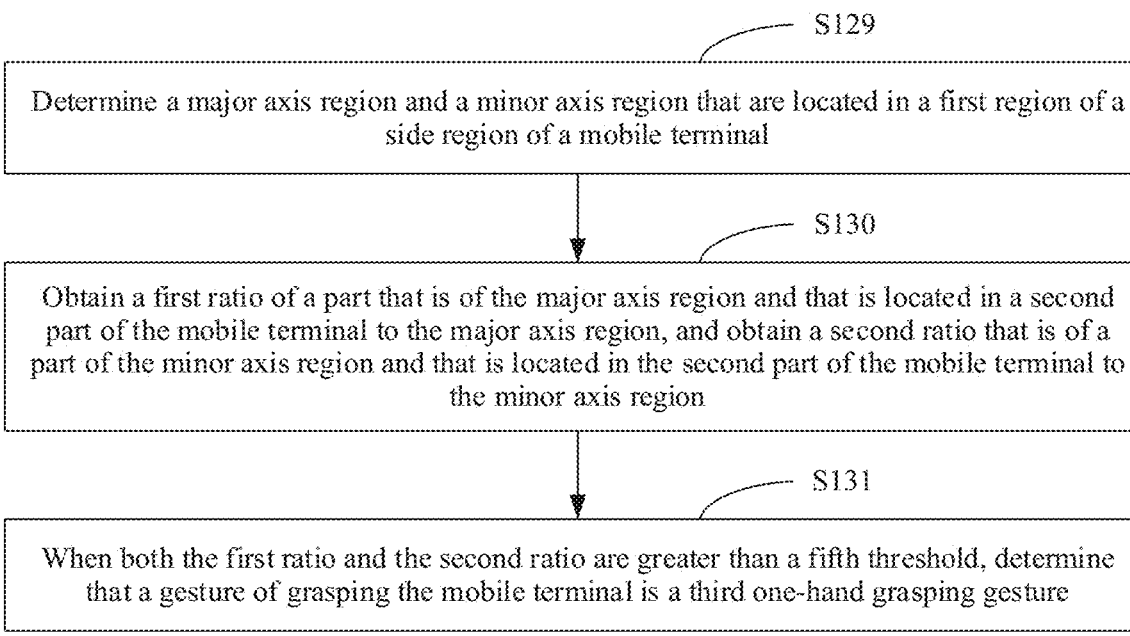
FIG. 21 is a schematic diagram of a working procedure of another touch region adjustment method according to an embodiment of this application.

In another feasible manner, referring to a schematic diagram of a working procedure shown in FIG. 21, the determining, based on the location of the first region on the second screen, the gesture of grasping the electronic device includes the following steps:

Step S129: Determine, based on lengths of first regions located in the side region of the electronic device, a major axis region and a minor axis region in the first regions located in the side region of the electronic device, where the major axis region is a region whose length is not less than a third threshold in the first regions, and the minor axis region is a first region whose length is not greater than a fourth threshold in the first regions.

An operation process of step S129 may be the same as an operation process of step S121, and reference may be made to each other. Details are not described herein again.

Step S130: Obtain a first ratio of a part that is of the major axis region and that is located in a second part of the electronic device to the major axis region, and obtain a second ratio of a part that is of the minor axis region and that is located in the second part of the electronic device to the minor axis region.

Step S131: When both the first ratio and the second ratio are greater than a fifth threshold, determine that the gesture of grasping the electronic device is a third one-hand grasping gesture.

When both the first ratio and the second ratio are greater than the fifth threshold, it indicates that when the user grasps the electronic device, most of the location such as the thenar, the thumb, or the palm is located in the second part of the electronic device, and most of the other fingers than the thumb are also located in the second part of the electronic device.

The electronic device is divided into a first part and the second part along a dividing line, and a direction of the dividing line is parallel to a width direction of the electronic device. Generally, the dividing line is located in a middle location of the electronic device. When the electronic device is placed in a vertical state, the dividing line divides the electronic device into two parts: an upper half region and a lower half region. The first part is the lower half region of the electronic device, and the first part is the upper half region of the electronic device.

Figure 22:
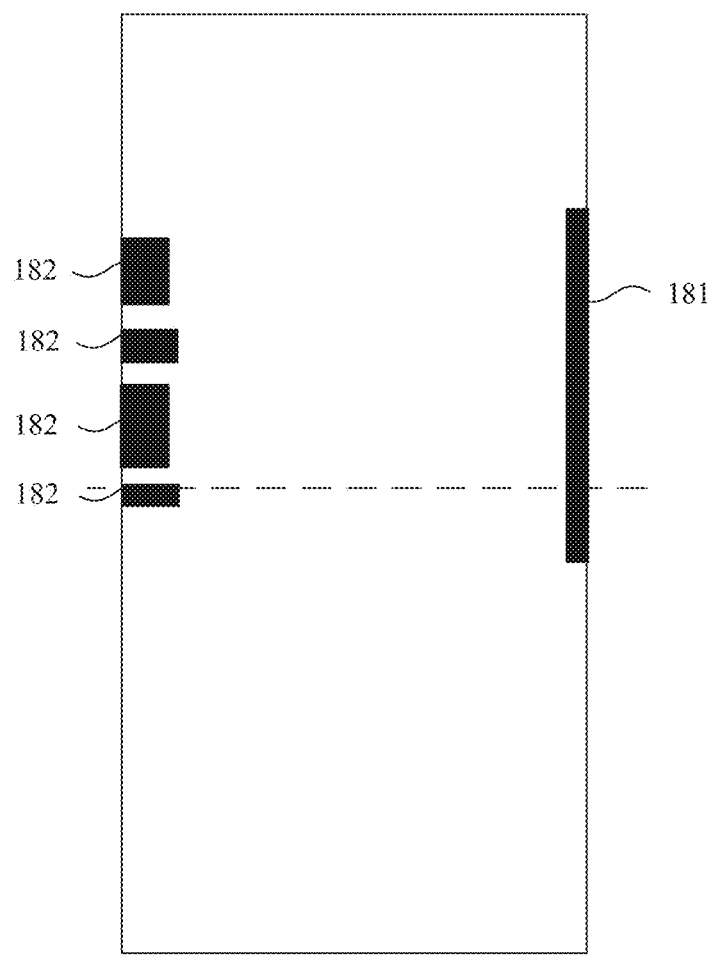
FIG. 22 is a schematic diagram of a first region of another electronic device according to an embodiment of this application.

In this case, it can be learned that first regions corresponding to the third one-hand grasping gesture are shown in FIG. 22. In FIG. 22, parts in black are first regions in the side regions, and the first regions include a major axis region 181 and minor axis regions 182. In addition, a dashed line in FIG. 22 is a dividing line.

Referring to FIG. 21, in some embodiments, when a part of or all the major axis region is located in a lower half region of a side region, and some or all the minor axis regions are located in an upper half region of another side region, the electronic device determines that the grasping gesture is the third one-hand grasping gesture.

It can be learned from FIG. 21 and FIG. 22 that, in some embodiments, when a part of or all the major axis region is located in an upper half region of a side region 1 of the electronic device, and some or all the minor axis regions are located in an upper half region of a side region 2 of the electronic device, the electronic device determines that both the side region 1 and the side region 2 are non-touch regions.

In addition, when the gesture of grasping the electronic device is the third one-hand grasping gesture, adjusting the location of the touch region on the second screen based on the gesture of grasping the electronic device includes the following step:

suspending a touch function of a first touch region, where the first touch region is a touch region located in the side region of the electronic device.

In this embodiment of this application, suspending a touch function of a touch region means that even if the touch region receives a touch operation, the electronic device no longer performs the function corresponding to the touch region.

Figure 23:
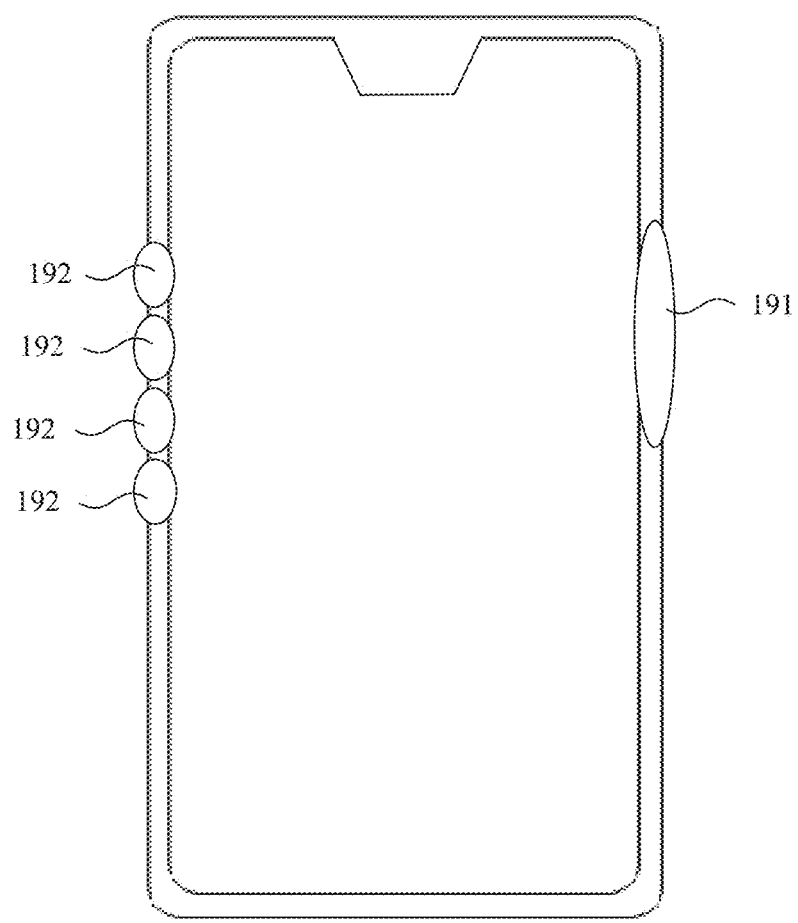
FIG. 23 is a schematic diagram of a third one-hand grasping gesture according to an embodiment of this application.

A schematic diagram of the third one-hand grasping gesture is shown in FIG. 23. In the schematic diagram, a location 191 such as a thumb, thenar, or a palm is included, and when the location contacts the electronic device, a major axis region appears. In addition, other fingers 192 than the thumb are included, and when the other fingers 192 contact the electronic device, minor axis regions appear. It may be determined from FIG. 23 that because both the first ratio and the second ratio are greater than the fifth threshold, it indicates that most of the location such as the palm, the thumb, or the thenar of the user is located in the second part of the electronic device, and most of the other fingers than the thumb are also located in the second part of the electronic device. In this case, current grasping of the electronic device by the user is generally an abnormal operation of the user. Therefore, it is determined that the touch function of the side region is suspended, to avoid an accidental touch on the first touch region.

The foregoing embodiments separately disclose methods for determining the first one-hand grasping gesture, the second one-hand grasping gesture, the third one-hand grasping gesture, and the landscape grasping gesture when the second screen includes the side region of the electronic device, and manners of adjusting the first touch region when the user separately grasps the electronic device by using the first one-hand grasping gesture, the second one-hand grasping gesture, the third one-hand grasping gesture, and the landscape grasping gesture, where the first touch region is a touch region located in the side region of the electronic device.

In addition, the second screen may further include the rear region of the electronic device. In this case, a corresponding touch region is disposed in the rear region of the electronic device. In this embodiment of this application, the touch region disposed in the rear region of the electronic device may be referred to as a second touch region.

For example, when a surround display is applied to the electronic device, the second screen includes the side region and the rear region of the electronic device. In this case, when grasping the electronic device, the user may further accidentally touch the second touch region.

In addition, a foldable display may alternatively be applied to the electronic device. The foldable display includes a first display and a second display. When the first display and the second display are in a folded state, and an included angle between the first display and the second display is relatively small, that is, a schematic diagram of the first display and the second display is shown in FIG. 4B, one of the first display and the second display is usually used as a display screen, and the display screen is the first screen and is configured to display an image. The other display is the rear of the electronic device. In this case, the other display and the side region of the electronic device are used as the second screen.

When the second screen includes the rear region of the electronic device, to reduce an accidental touch on the second touch region, the gesture of grasping the electronic device may further be determined based on a location of the first region in the rear region, and a location of the touch region on the second screen is adjusted based on the gesture of grasping the electronic device.

Figure 24:
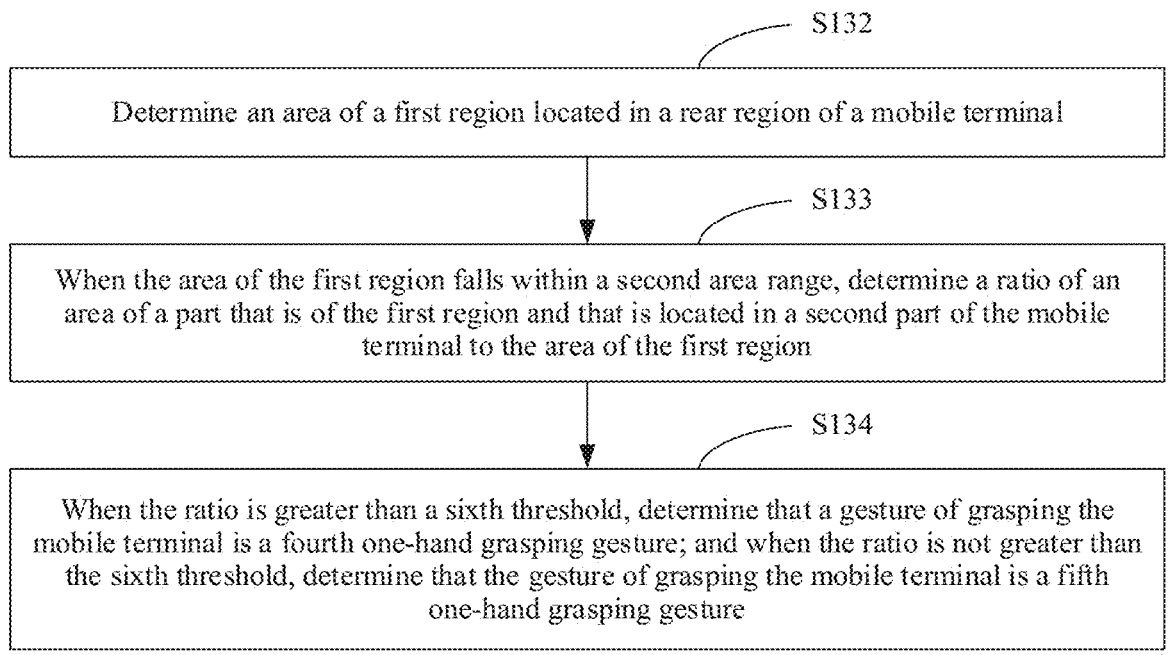
FIG. 24 is a schematic diagram of a working procedure of another touch region adjustment method according to an embodiment of this application.

In a feasible implementation, referring to a schematic diagram of a working procedure shown in FIG. 24, the determining, based on the location of the first region on the second screen, the gesture of grasping the electronic device includes the following steps:

Step S132: Determine an area of the first region located in the rear region of the electronic device.

Step S133: When the area of the first region falls within a second area range, determine a ratio of an area of a part that is of the first region and that is located in a second part of the electronic device to the area of the first region.

The electronic device is divided into a first part and the second part along a dividing line, and a direction of the dividing line is parallel to a width direction of the electronic device. Generally, the dividing line is located in a middle location of the electronic device. When the electronic device is placed in a vertical state, the dividing line divides the electronic device into two parts: an upper half region and a lower half region. The first part is the lower half region of the electronic device, and the first part is the upper half region of the electronic device.

Step S134: When the ratio is greater than a sixth threshold, determine that the gesture of grasping the electronic device is a fourth one-hand grasping gesture; and when the ratio is not greater than the sixth threshold, determine that the gesture of grasping the electronic device is a fifth one-hand grasping gesture.

Figure 25:
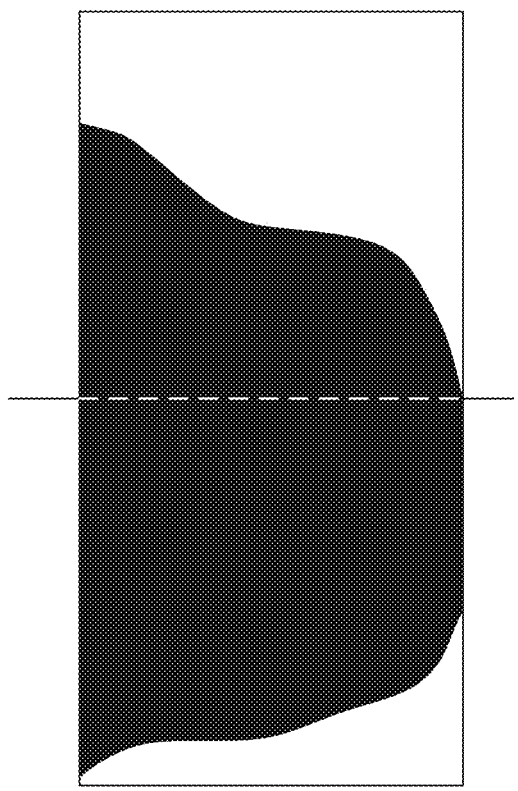
FIG. 25 is a schematic diagram of a first region of another electronic device according to an embodiment of this application.
Figure 26:
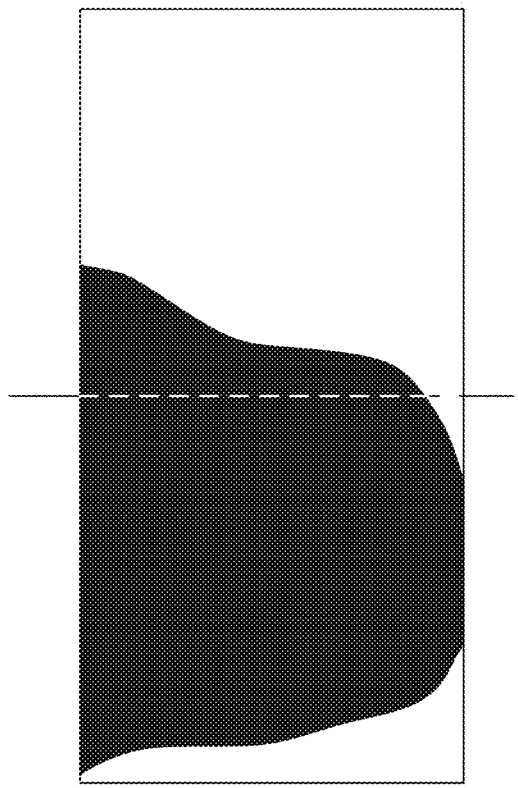
FIG. 26 is a schematic diagram of a first region of another electronic device according to an embodiment of this application.

To clarify first regions corresponding to the fourth one-hand grasping gesture and the fifth one-hand grasping gesture, the embodiments of this application separately disclose FIG. 25 and FIG. 26. In FIG. 25 and FIG. 26, a part in black is a first region in the side region. In addition, a dashed line in FIG. 25 and FIG. 26 is the dividing line.

When the ratio is greater than the sixth threshold, a schematic diagram of the first region is shown in FIG. 25. It can be learned from FIG. 25 that the fourth one-hand grasping gesture means that the electronic device is grasped with one hand, and most of the palm of the user is located in the second part of the electronic device. In addition, when the ratio is not greater than the sixth threshold, a schematic diagram of the first region is shown in FIG. 26. It can be learned from FIG. 26 that the fourth one-hand grasping gesture means that the electronic device is grasped with one hand, and most of the palm of the user is located in the first part of the electro device.

In addition, when the gesture of grasping the electronic device is the fourth one-hand grasping gesture, adjusting the location of the touch region on the second screen based on the gesture of grasping the electronic device includes the following step:

suspending a touch function of the second touch region, where the second touch region is a touch region located in the rear region of the electronic device.

Figure 27:
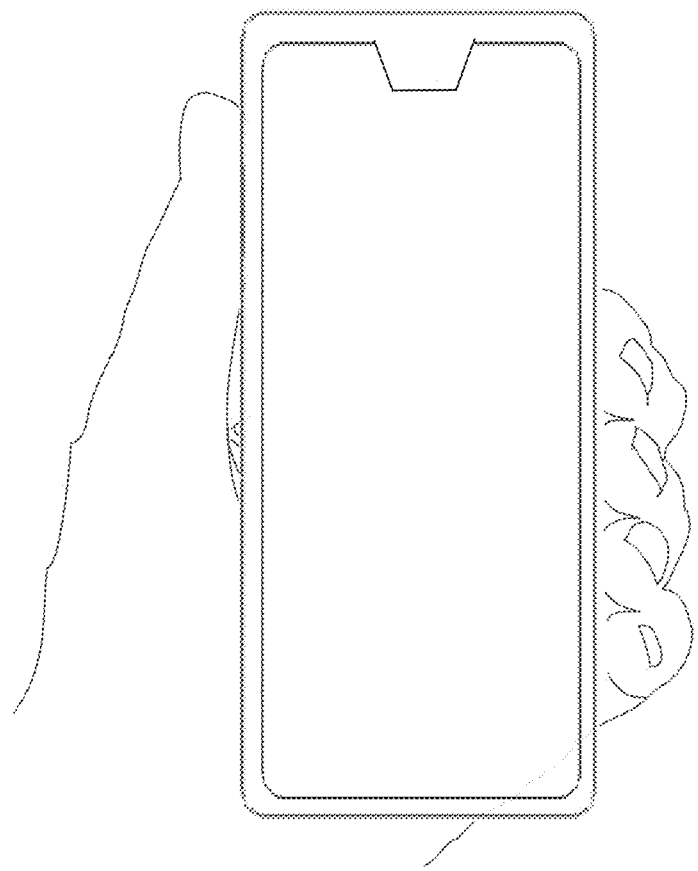
FIG. 27 is a schematic diagram of a fourth one-hand grasping gesture according to an embodiment of this application.

The fourth one-hand grasping gesture means that the electronic device is grasped with one hand, and most of the palm of the user is located in the second part of the electronic device. In other words, a schematic diagram of the fourth one-hand grasping gesture is shown in FIG. 27. In this case, current grasping of the electronic device by the user is generally an abnormal operation of the user. Therefore, it is determined that the touch function of the rear region is suspended, to avoid an accidental touch on the second touch region.

In addition, when the gesture of grasping the electronic device is the fifth one-hand grasping gesture, adjusting the location of the touch region on the second screen based on the gesture of grasping the electronic device includes the following steps:

First, a sixth region located in the rear region of the electronic device and whose distance from the first region is a fourth distance h4 is determined.

Then, the second touch region is adjusted to the sixth region. The second touch region is a touch region located in the side region of the electronic device.

Figure 28:
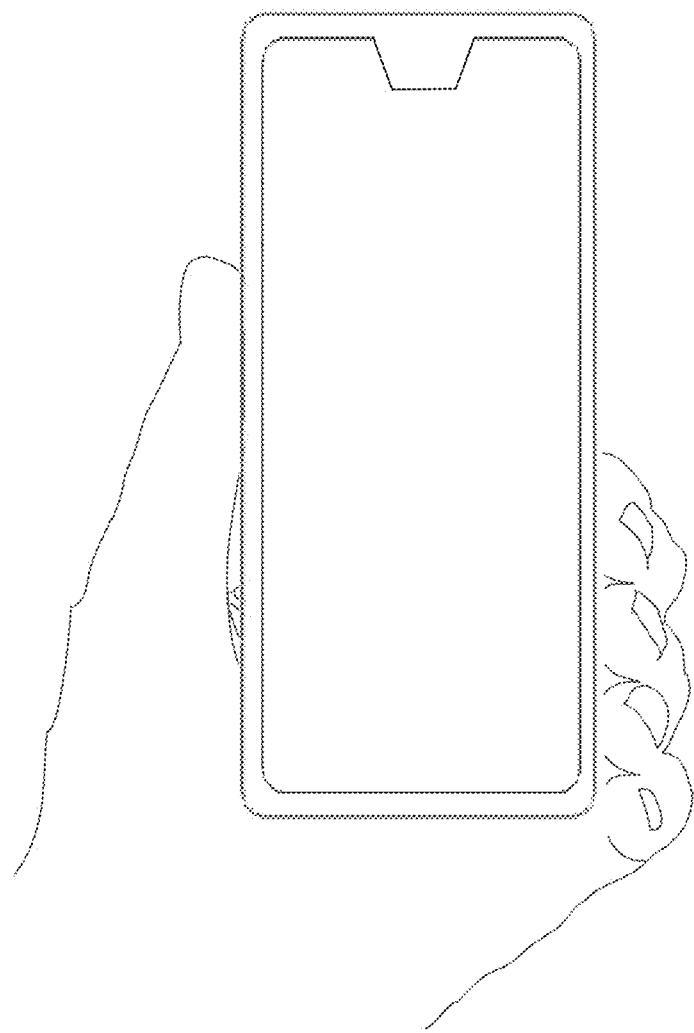
FIG. 28 is a schematic diagram of a fifth one-hand grasping gesture according to an embodiment of this application.

The fifth one-hand grasping gesture means that the electronic device is grasped with one hand, and most of the palm of the user is located in the first part of the electronic device. In other words, a schematic diagram of the fifth one-hand grasping gesture is shown in FIG. 28. In this case, the user adjusts the second touch region to the sixth region, so that the adjusted second touch region can be far away from the palm of the user, to avoid the accidental touch on the second touch region.

Further, when the foldable display is applied to the electronic device, the electronic device needs to determine the included angle between the first display and the second display. When the included angle between the first display and the second display is relatively small, the electronic device further determines one of the displays as the rear region of the electronic device.

In this embodiment of this application, one or more sensors may be disposed in the electronic device, and the included angle between the first display and the second display is determined based on data detected by the one or more sensors.

For example, a gyroscope and an acceleration sensor may be disposed on each of the first display and the second display of the electronic device. The gyroscope disposed on the first display may detect a rotational angular velocity when the first display rotates, and the acceleration sensor on the first display may detect an acceleration generated when the first display moves. Correspondingly, the gyroscope disposed on the second display may detect a rotational angular velocity when the second display rotates, and the acceleration sensor on the second display may detect an acceleration generated when the second display moves. Then, the included angle between the first display and the second display may be obtained through calculation based on the rotational angular velocity and the acceleration of the first display and the rotational angular velocity and the acceleration of the second display.

After the included angle between the first display and the second display is determined, the included angle between the first display and the second display is compared with an angle threshold (for example, 10 degrees). When the included angle between the first display and the second display is less than the angle threshold, it is generally considered that the included angle between the first display and the second display is relatively small. Therefore, one of the displays is determined as the display screen to display an image, and the other display is used as the rear region of the electronic device.

In this case, the other display may also be used as the second screen, so that the user can touch the display. For example, the first display is set as the display screen, and the second display is set as the second screen and disposed with the second touch region. The second touch region is used to adjust volume and brightness. When the first display plays a video, the user may touch the second touch region on the second display, to adjust volume and brightness of the played video. Correspondingly, the electronic device may determine, by performing operations in step S132 to step S134, the gesture of grasping the electronic device, and adjust the second touch region based on the gesture of grasping the electronic device.

However, the electronic device needs to determine which display in the foldable display is used as the second screen. Because the display screen of the electronic device needs to display an image for viewing by the user, the display screen in the foldable display is usually a display facing the user, and correspondingly, the other display is used as the second screen. In other words, in the first display and the second display, a display that does not face the user is the second screen. Accordingly, the electronic device may determine the first display or the second display as the second screen in a plurality of manners.

In a feasible implementation, when the foldable display is applied to the electronic device, and the included angle between the first display and the second display included in the foldable display is less than the angle threshold, before the gesture of grasping the electronic device is determined based on the location of the first region on the second screen, the method further includes the following steps:

when an infrared sensor is disposed on the first display, determining whether the infrared sensor disposed on the first display detects an infrared signal radiated by a human body; and when the infrared sensor disposed on the first display detects the infrared signal, determining that the second display is the second screen.

In the foregoing solution, when the infrared sensor disposed on the first display detects the infrared signal radiated by the human body, it indicates that the first display faces the user. In this case, it may be determined that the first display is the display screen, and correspondingly, the second display is the second screen.

Further, when an infrared sensor is disposed on each of the first display and the second display, the electronic device may further separately determine whether the infrared sensor disposed on the first display and the infrared sensor disposed on the second display detect the infrared signal radiated by the human body, and determine that a display corresponding to an infrared sensor that does not detect the infrared signal radiated by the human body is the second screen.

In another feasible implementation, when the foldable display is applied to the electronic device, and the included angle between the first display and the second display included in the foldable display is less than the angle threshold, before the gesture of grasping the electronic device is determined based on the location of the first region on the second screen, the method further includes the following steps:

when a camera is disposed on the first display, determining whether the camera disposed on the first display captures a face image; and when the camera disposed on the first display screen captures the face image, determining that the second display is the second screen.

In the foregoing solution, when the camera disposed on the first display captures the face image, it indicates that the first display faces the user. In this case, it may be determined that the first display is the display screen, and correspondingly, the second display is the second screen.

Further, when a camera is disposed on each of the first display and the second display, the electronic device may further separately determine whether the camera disposed on the first display and the camera disposed on the second display capture the face image, and determine that a display corresponding to a camera that does not capture the face image is the second screen.

In another feasible implementation, when the foldable display is applied to the electronic device, and the included angle between the first display and the second display included in the foldable display is less than the angle threshold, before the gesture of grasping the electronic device is determined based on the location of the first region on the second screen, the method further includes the following steps:

when an optical proximity sensor is disposed on the first display, determining whether ambient light detected by the optical proximity sensor disposed on the first display falls within a preset light intensity range; and when the ambient light detected by the optical proximity sensor disposed on the first display falls within the preset light intensity range, determining that the second display is the second screen.

In a process of applying the electronic device, the user usually blocks a display facing the user, so that light intensity of ambient light received by the display facing the user is reduced. In this embodiment of this application, first intensity of ambient light detected by an optical proximity sensor disposed on the display screen may be determined by using a plurality of tests in advance in a process in which the user applies the electronic device. Based on this, a light intensity range including the first intensity is set.

In this case, when the ambient light detected by the optical proximity sensor disposed on the first display falls within the preset light intensity range, it indicates that the first display faces the user. In this case, it may be determined that the first display is the display screen, and correspondingly, the second display is the second screen.

Further, when an optical proximity sensor is disposed on each of the first display and the second display, the electronic device may further separately determine whether ambient light detected by the proximity sensor disposed on the first display and the proximity sensor disposed on the second display falls within the preset light intensity range, and determine that a display corresponding to an optical proximity sensor by which detected ambient light does not fall within the preset light intensity range is the second screen.

The foregoing embodiments separately disclose methods for determining a display as the second screen based on the infrared sensor, the camera, and the optical proximity sensor. Certainly, the electronic device may alternatively determine, in another manner, a display that is in the foldable display and that does not face the user, and determine the display as the second screen. This is not limited in this embodiment of this application.

Further, in this embodiment of this application, after the location of the touch region on the second screen is adjusted based on the gesture of grasping the electronic device, the method further includes:

when the area of the first region decreases, adjusting the touch region to an initial location. The initial location is a location at which the touch region is located before the location of the touch region on the second screen is adjusted based on the gesture of grasping the electronic device.

When the area of the first region decreases, it indicates that the user no longer grasps the electronic device, so that the touch region may be adjusted to the initial location. In this case, because the user no longer grasps the electronic device, even if the touch region is adjusted to the initial location, the touch region on the second screen is not accidentally touched. In addition, when the touch region is at the initial location, the touch region is usually closer to a use habit of the user, thereby facilitating use of the user and improving use experience of the user.

The following describes a touch region adjustment method provided in an embodiment of this application with reference to the accompanying drawings.

First, an information exchange manner of side screens provided in this embodiment of this application is described.

In some embodiments of this application, the side screen may receive a touch operation of a user. In response to the detected touch operation, an electronic device may control content displayed on another screen of the electronic device, or adjust a function parameter (for example, display brightness, Bluetooth on and off, or flash on and off) of the electronic device. A touch operation 1 may be an operation such as a tap, a double tap, a long press, or a flick.

In an implementation, a control is displayed on the side screen of the electronic device. The electronic device detects the touch operation 1 performed on the control, and enables, in response to the touch operation 1, a function 1 triggered by the touch operation 1.

Figure 29:
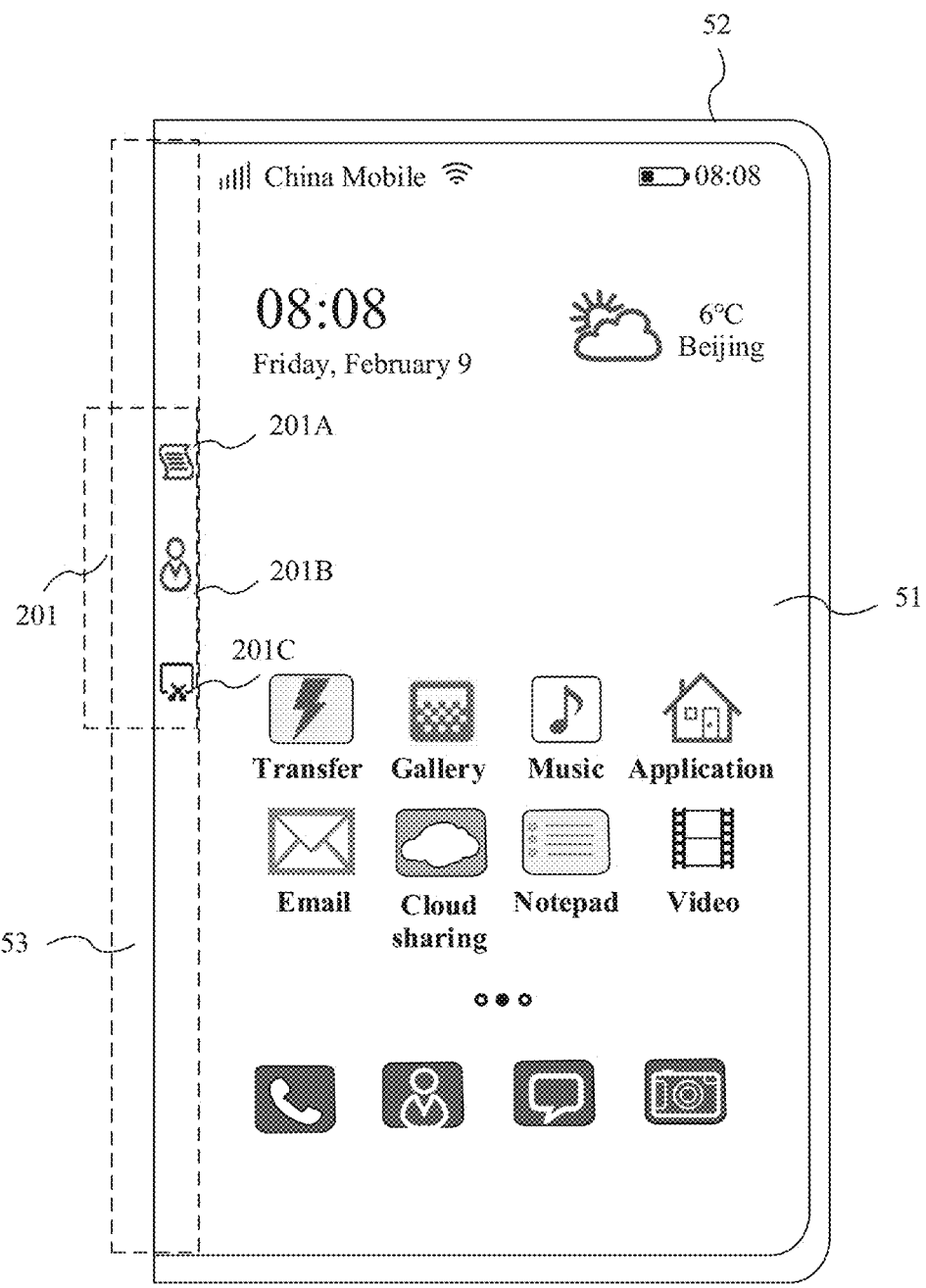
FIG. 29 is a schematic diagram of display content of a side screen according to an embodiment of this application.

For example, as shown in FIG. 29, the electronic device on which a foldable display is configured shown in FIG. 7C is used as an example. The side screen displays a control box 201, and the control box 201 includes a memo icon 201A, a voice assistant icon 201B, and a screenshot icon 201C.

The memo icon 201A may receive a touch operation (for example, a tap operation) of the user. In response to the touch operation, the electronic device may display a memo interface.

The smart assistant icon 201B may receive a touch operation (for example, a tap operation) of the user. In response to the touch operation, the electronic device may start a voice assistant.

The screenshot icon 201O may receive a touch operation (for example, a tap operation) of the user. In response to the touch operation, the electronic device may capture and save an interface currently displayed on the display 194.

In another implementation, no control is displayed on the side screen of the electronic device. The electronic device may identify a touch operation 2 based on a touch track, touch duration, and the like of the touch operation 2 on the side screen, to determine and enable a function 2 triggered by the touch operation 2.

Figure 30A:
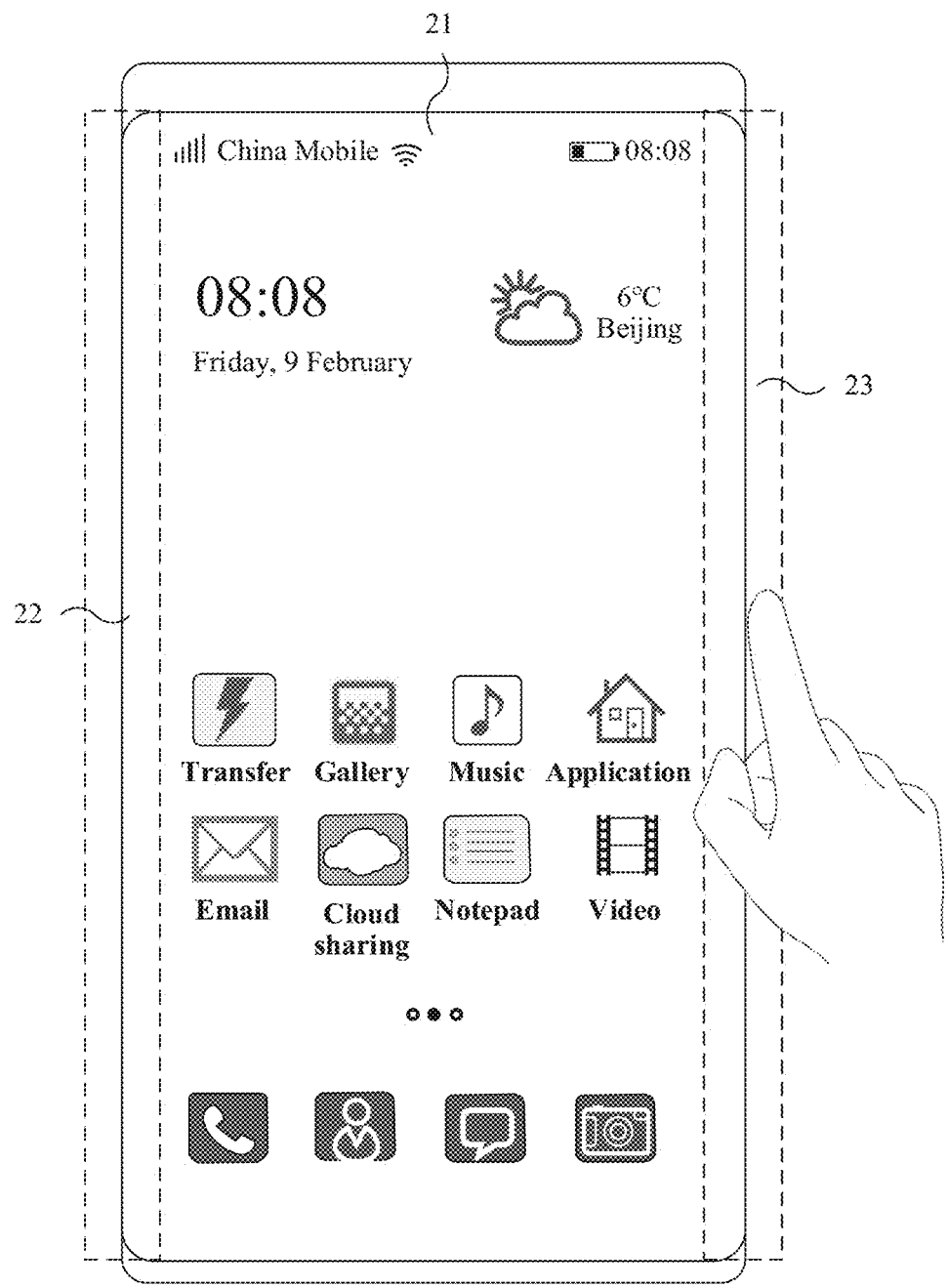
FIG. 30A to FIG. 30D are schematic diagrams of information interaction on a side screen according to an embodiment of this application.
Figure 30B:
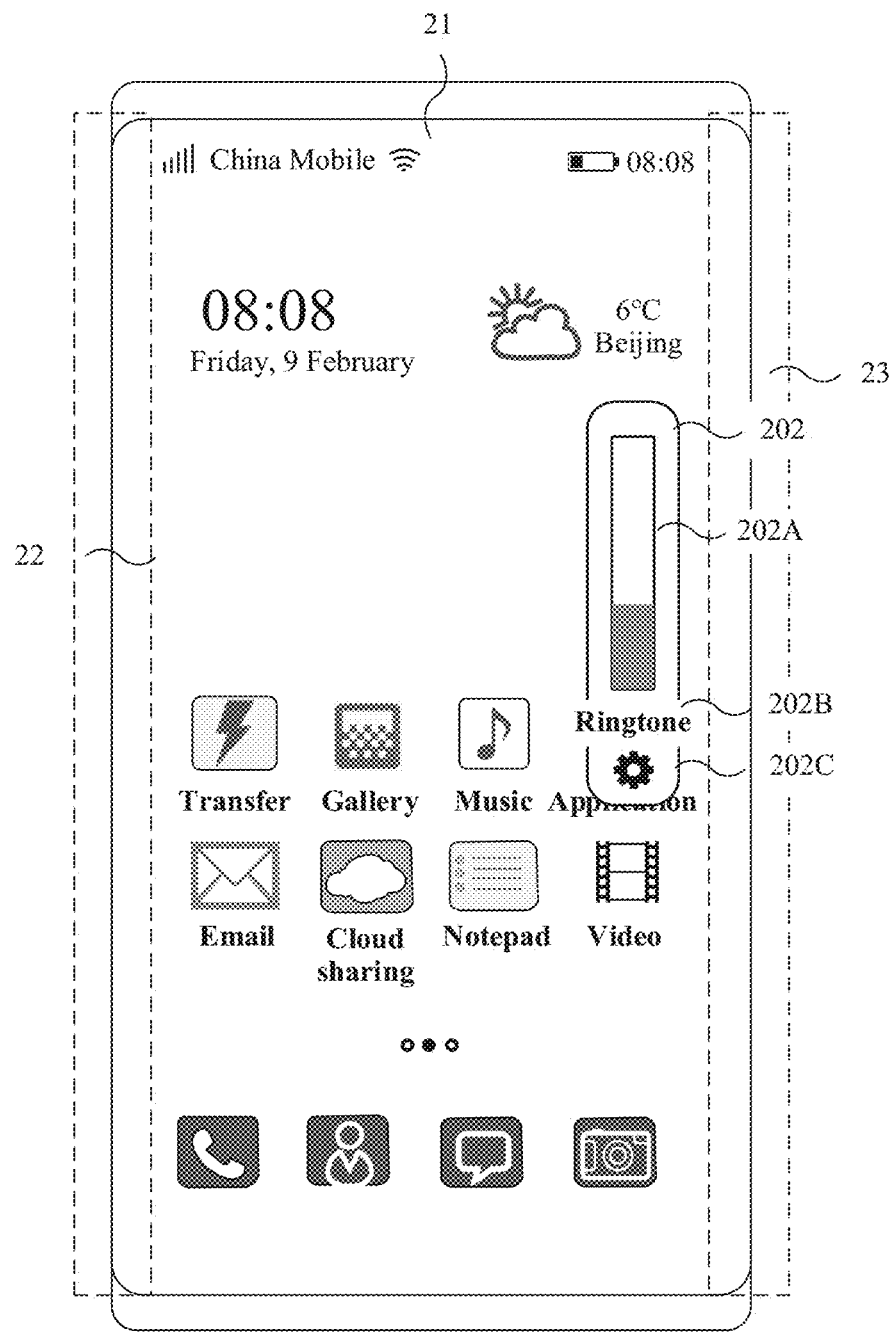

For example, as shown in FIG. 30A and FIG. 30B, the electronic device on which a curved display is configured shown in FIG. 5B is used as an example. The user double-taps the side screen 23 of the electronic device, and the electronic device displays a volume adjustment box 202 in response to the detected user operation. The volume adjustment box 202 may include a volume adjustment bar 202A, a volume type 202B, and a volume setting control 202C.

The volume type 202B is used to represent a volume type corresponding to the volume adjustment bar 202A, for example, a ringtone, an alarm clock, or media. A length of a shadow part in the volume adjustment bar 202A is used to represent current volume of the volume type 202B.

Figure 30C:
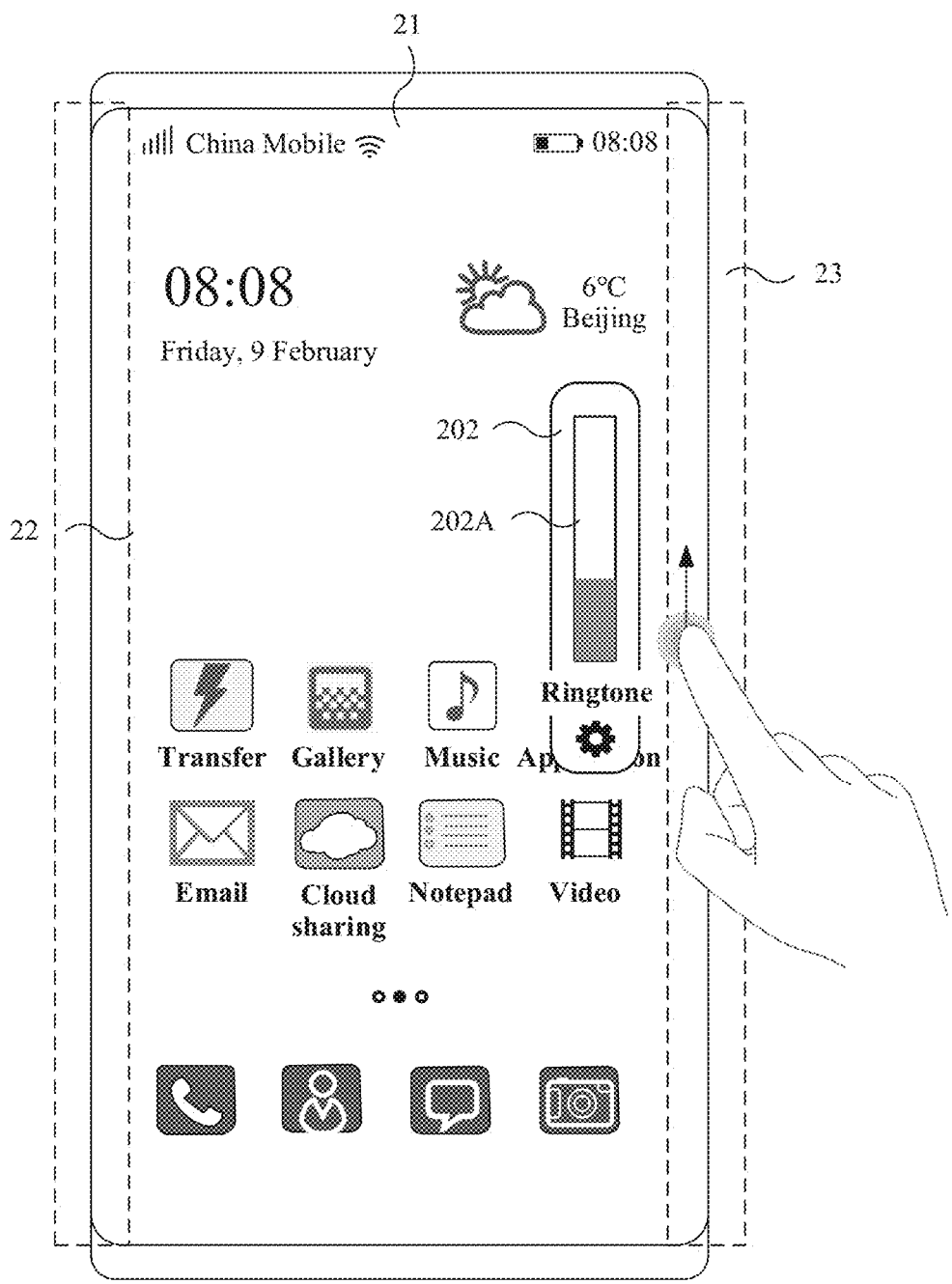
Figure 30D:
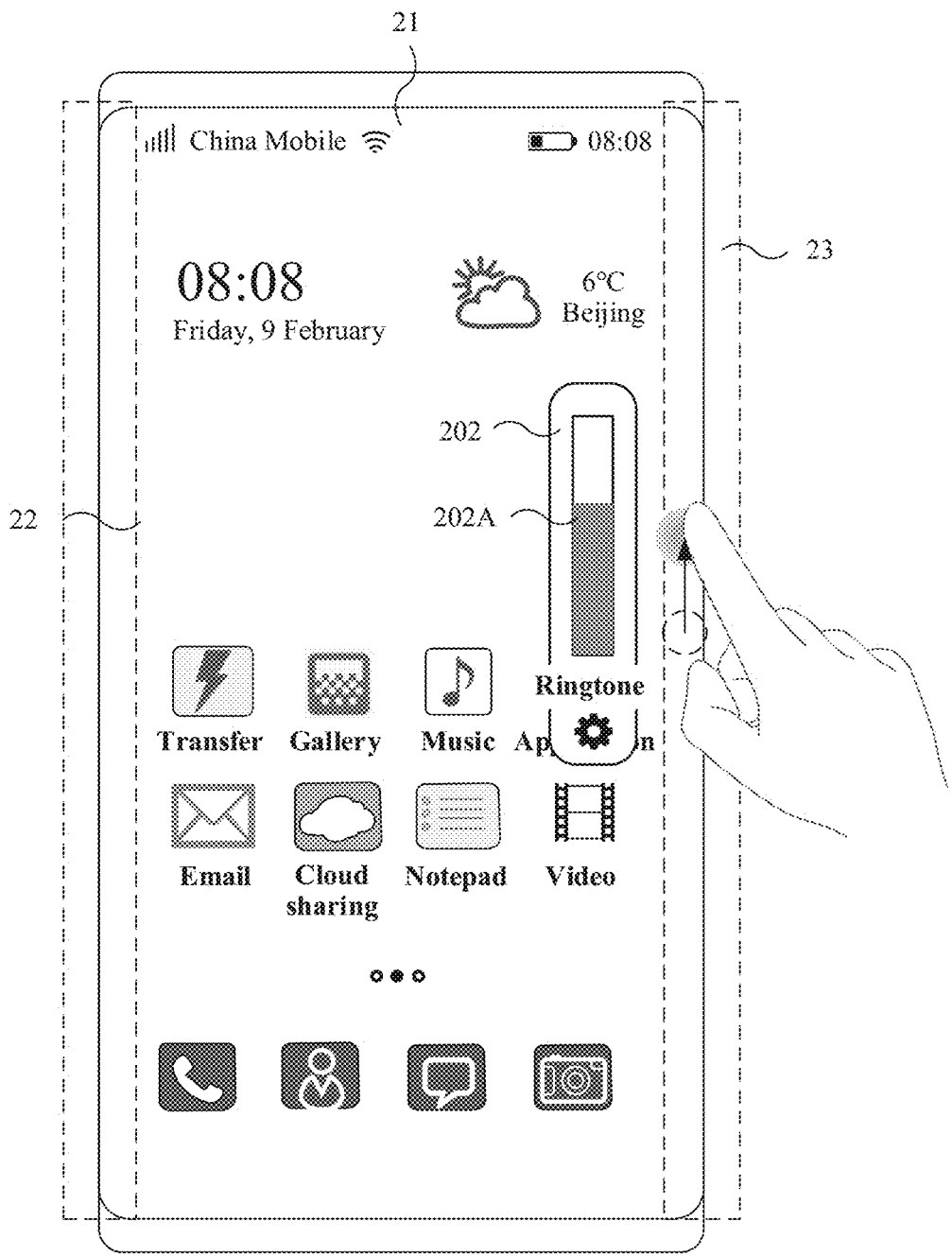

The volume setting control 202C may receive a touch operation (for example, a tap operation). In response to the user operation, the electronic device may display a volume setting interface. For example, as shown in FIG. 30C and FIG. 30D, a finger of the user slides upward on the side screen 23. In response to the detected user operation, the electronic device increases volume of the ringtone and the length of the shadow part in the volume adjustment bar based on a distance slid by the user.

Not limited to functions such as volume control, screenshot, voice assistant, and memo provided in the foregoing embodiments, functions triggered by a touch operation performed on the side screen may further include functions such as photographing, call answering, screen recording, and quick payment. In this embodiment of this application, a correspondence between the touch operation and a function triggered by the touch operation may be determined in a plurality of manners. For example, the correspondence may be defaulted when the electronic device is delivered from a factory, or may be customized by the user, or may be determined by the electronic device based on a currently running application, or may be determined by the electronic device based on a frequency of using the application function by the user. This is not specifically limited herein.

Then, the following describes how to determine a touch region and a non-touch region on the side screen based on a contact surface of the user holding the electronic device.

There is a plurality of holding states in which the user holds the electronic device, and a longitudinal holding state and a horizontal holding state may be mainly included. The longitudinal holding state means that the user mainly holds the electronic device by grasping a side surface corresponding to a long side of the electronic device, and the side screen may be disposed on the side surface corresponding to the long side of the electronic device. The horizontal holding state means that the user mainly grasps the electronic device by grasping a side surface corresponding to a short side of the electronic device. The longitudinal holding state may include left-hand longitudinal holding, right-hand longitudinal holding, two-hand longitudinal holding, and the like. The horizontal holding state may include left-hand horizontal holding, right-hand horizontal holding, two-hand horizontal holding, and the like.

In some embodiments of this application, when the electronic device detects no touch input for holding the side screen, the electronic device may determine that the entire side screen is a touchable region. In other words, the electronic device may respond to a touch input for the side screen and perform a function corresponding to the touch input. For example, as shown in FIG. 30A and FIG. 30B, in response to a double-tap operation on the side screen 23, the electronic device may display the volume adjustment box 202.

The following first specifically describes the several holding states in the embodiments of this application.

1. Left-Hand Longitudinal Holding

Figure 31A:
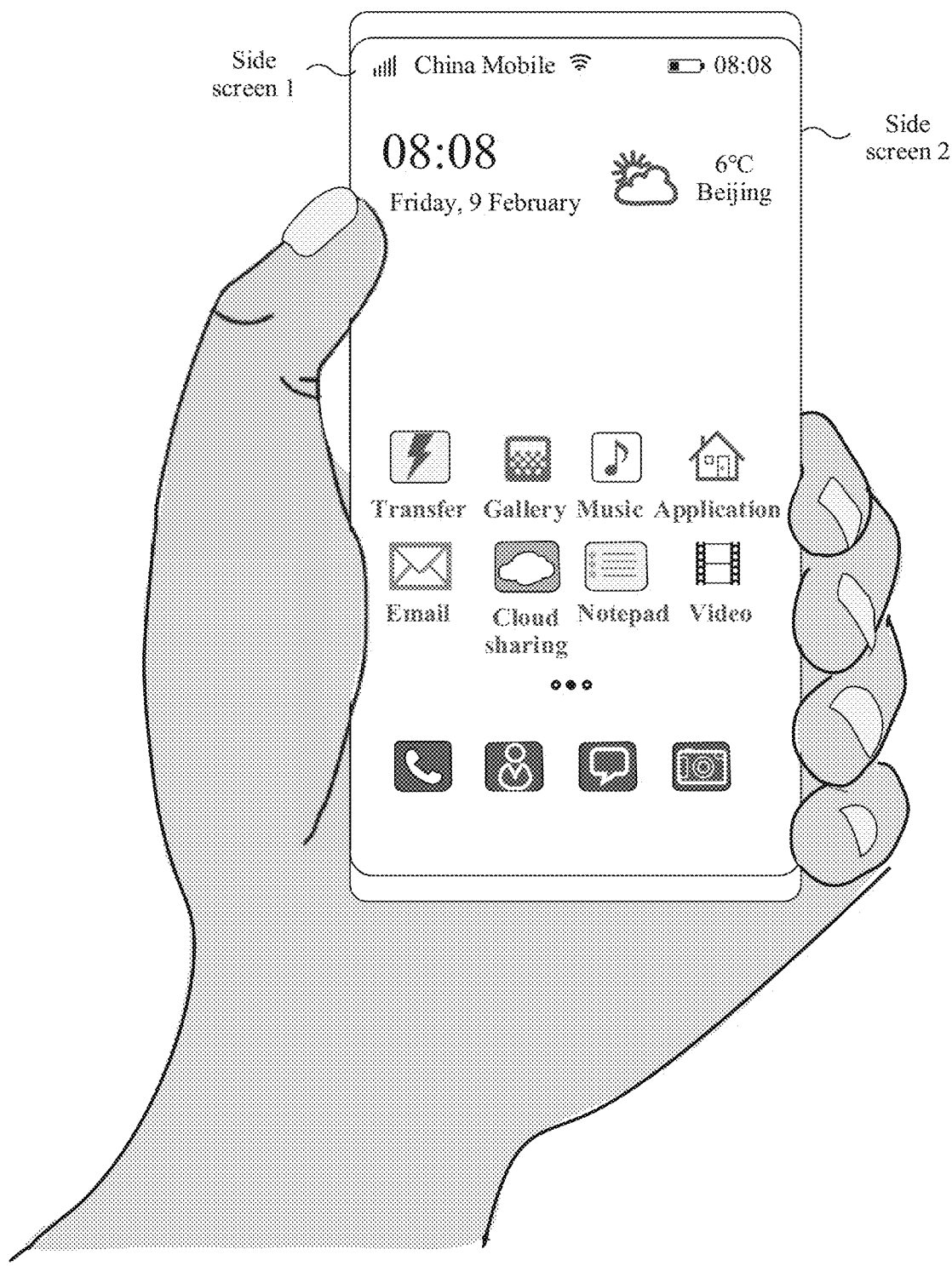
FIG. 31A to FIG. 31C are schematic diagrams of left-hand longitudinal holding according to an embodiment of this application.

For example, FIG. 31A is a schematic diagram of longitudinally holding an electronic device with a left hand according to an embodiment of this application.

Figure 31B:
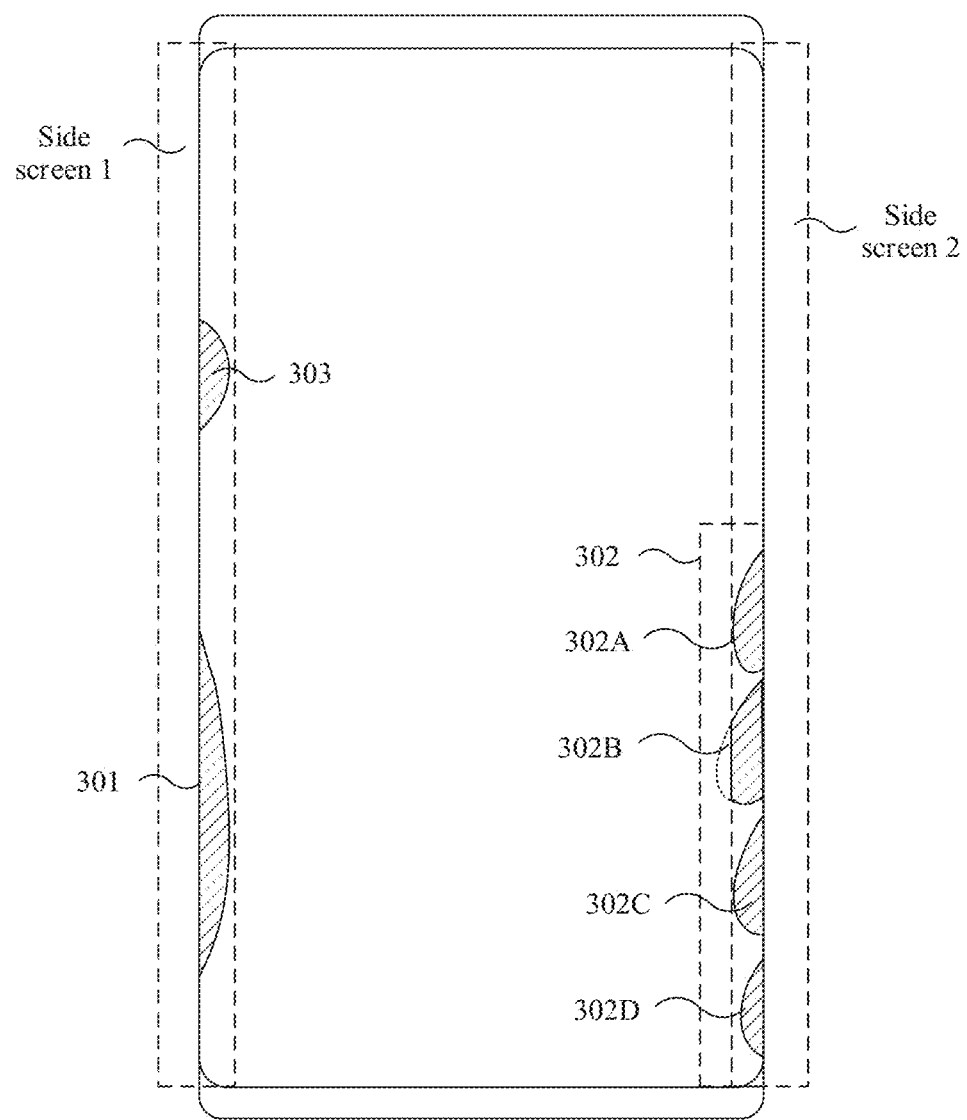

For an electronic device on which side screens are disposed on both sides, FIG. 31B is a schematic diagram of a contact surface in a left one-hand longitudinal holding state. As show in FIG. 31B, the electronic device includes a side screen 1 and a side screen 2. A contact region between a user and a display 194 may include a thenar contact surface 301 formed on the side screen 1 by the thenar of the palm, and a contact surface set 302 formed on the side screen 2 by other fingers (namely, other fingers than the thumb) of the user. In some embodiments, in the left-hand longitudinal holding state, the contact region between the user and the display 194 may further include a finger putting contact surface 303 formed on the side screen 1 by the thumb of the user.

In the left-hand longitudinal holding state, another finger of the user (namely, a finger other than the thumb) in contact with the side screen 2 may include one or more of four fingers: an index finger, a middle finger, a ring finger, and a little finger. For example, as shown in FIG. 31B the other fingers in contact with the side screen 1 include the four fingers. The contact surface set 302 includes a finger grasping contact surface 302A, a finger grasping contact surface 302B, a finger grasping contact surface set 302C, and a finger grasping contact surface 302D that respectively correspond to the four fingers.

It can be learned from FIG. 31B that the contact surfaces in the contact surface set 302 are sequentially arranged along a long side of the electronic device. In some embodiments of this application, a maximum distance between two adjacent contact surfaces in the contact surface set 302 is less than a distance threshold 1.

Figure 31C:
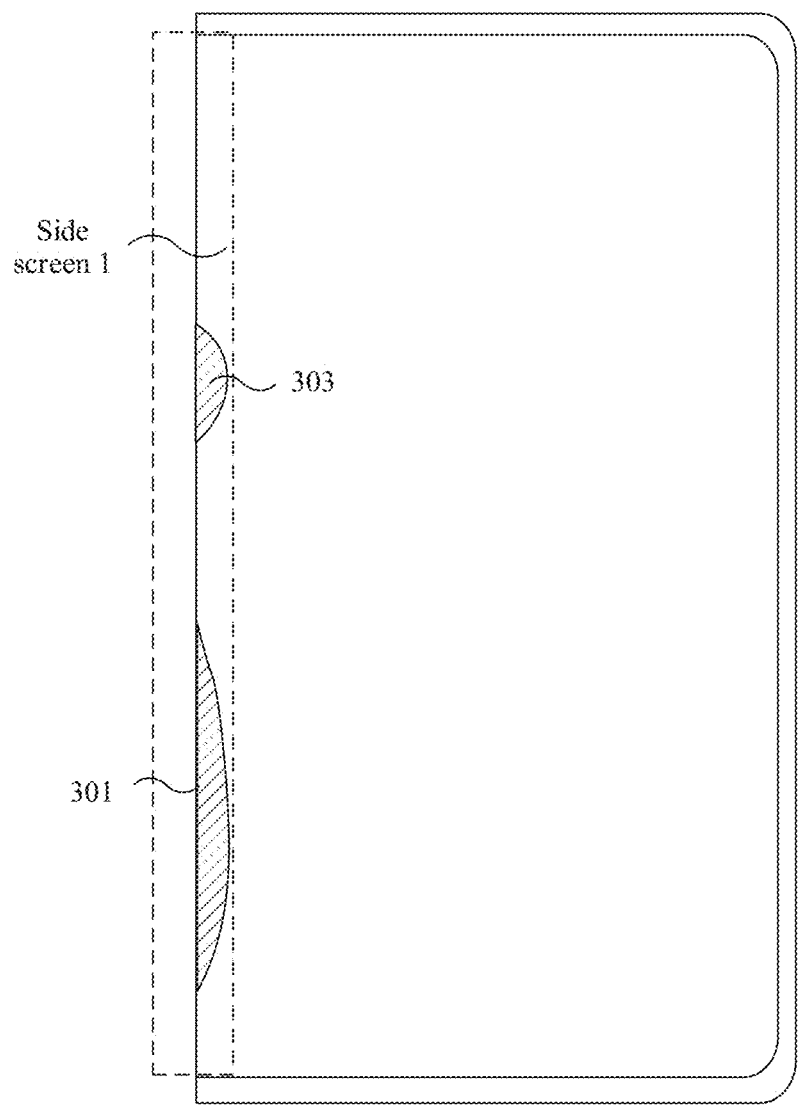

For an electronic device on which a side screen is disposed on only one side, FIG. 31C is a schematic diagram of a contact surface in a left-hand longitudinal holding state. As shown in FIG. 31C, the electronic device includes a side screen 1. A contact region between a user and a display 194 may include a thenar contact surface 301, and may further include a finger putting contact surface 303.

In this embodiment of this application, a contact surface formed with a side screen when the user holds the electronic device may be referred to as a side contact surface. The thenar contact surface 301, the finger grasping contact surface 302A, the finger grasping contact surface 302B, the finger grasping contact surface 302C, the finger grasping contact surface 302D, and the finger putting contact surface 303 shown in FIG. 31B are side contact surfaces. The side screen includes a part of or all the side contact surface. For example, the side screen 1 includes the entire thenar contact surface 301, and the side screen 2 includes the entire finger grasping contact surface 302B.

It should be noted that a feature of the finger putting contact surface 302D formed by the user holding the electronic device is different from a feature of a finger tapping contact surface formed by a normal touch operation (for example, a tap or a double tap) of the user. Generally, a touch area of a finger putting contact surface formed by the user holding the electronic device is larger, and touch duration is longer.

2. Right-Hand Longitudinal Holding

Figure 32A:
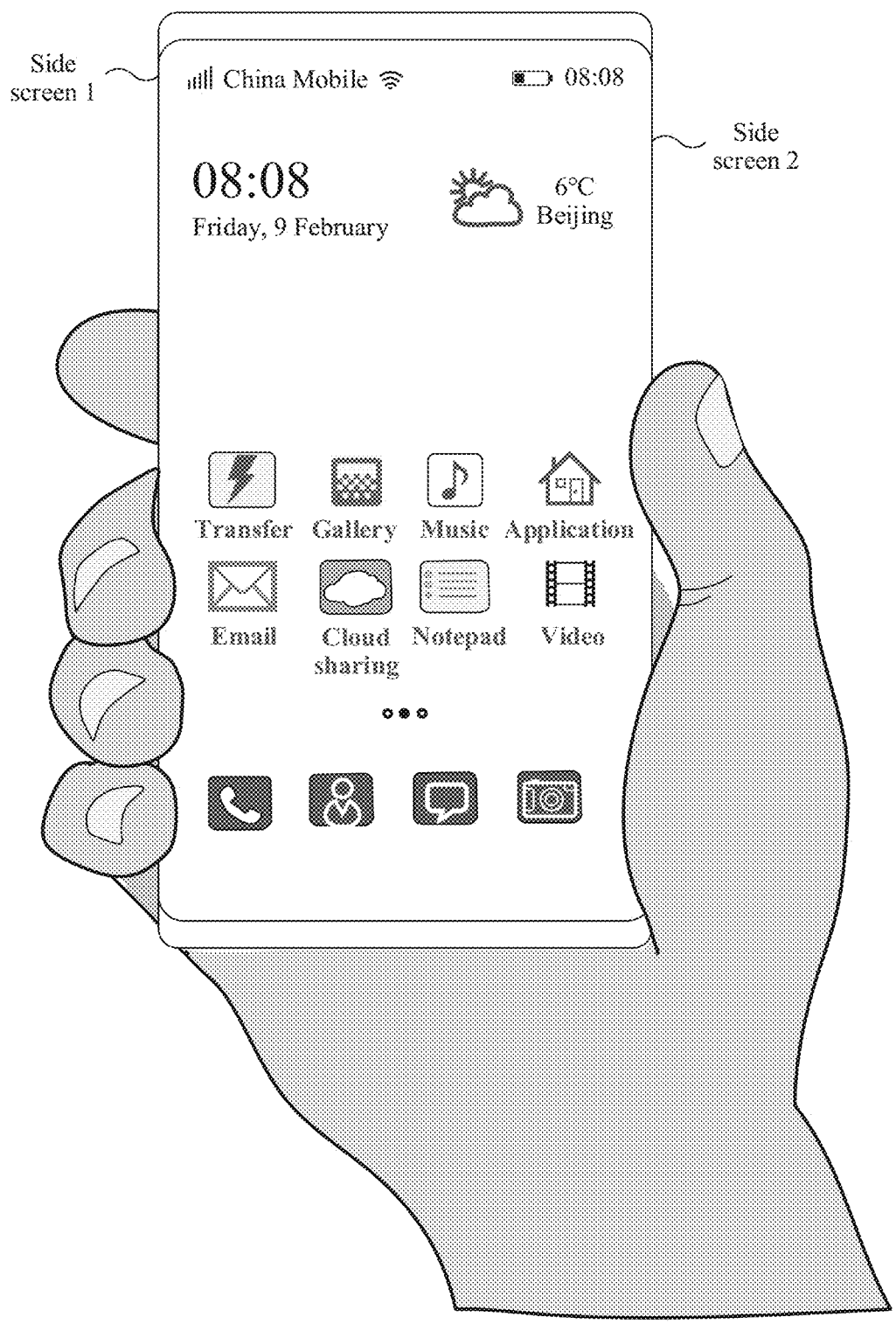
FIG. 32A to FIG. 32C are schematic diagrams of right-hand longitudinal holding according to an embodiment of this application.
Figure 32B:
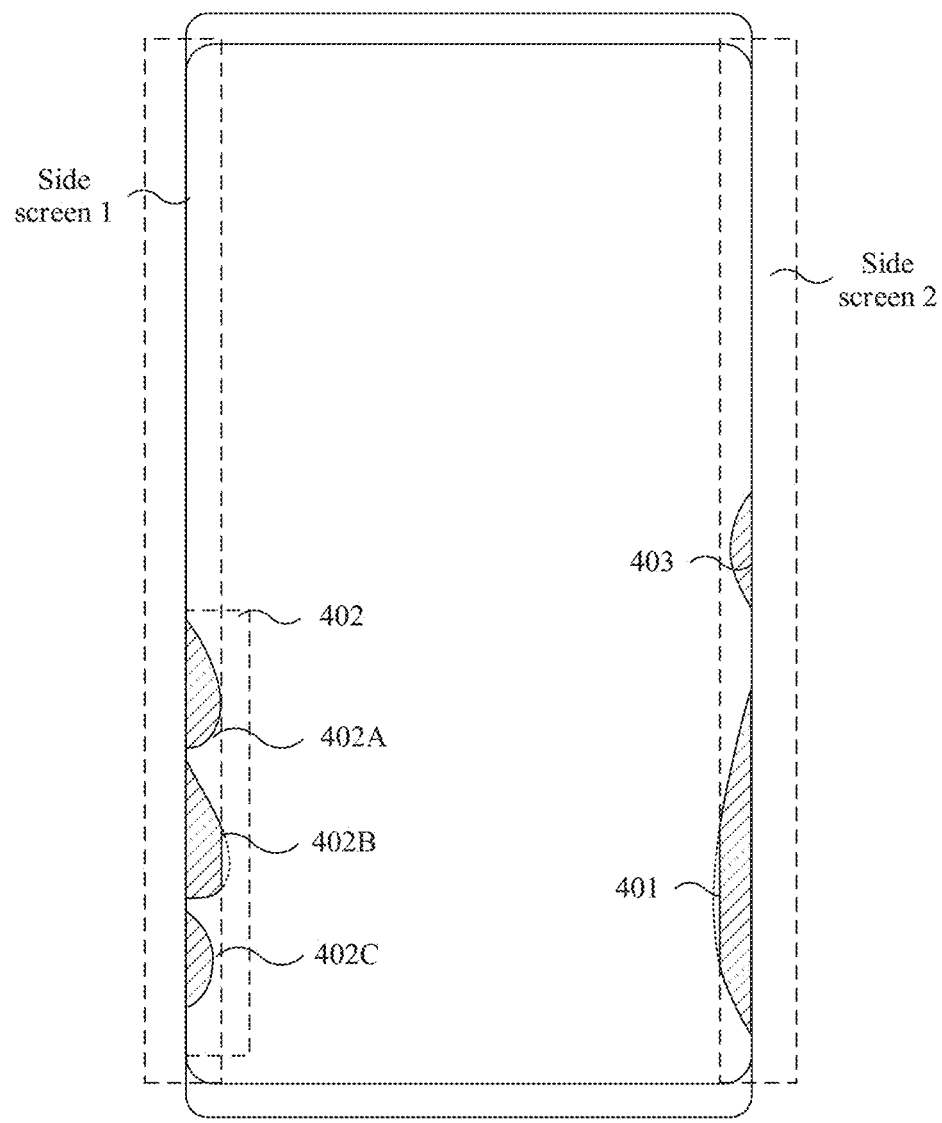

For example, FIG. 32A is a schematic diagram of longitudinally holding an electronic device with a right hand according to an embodiment of this application. For an electronic device on which side screens are disposed on both sides, FIG. 32B is a schematic diagram of a contact surface corresponding to FIG. 32A. In the schematic diagram of the contact surface shown in FIG. 32B, when the electronic device is longitudinally held with a single right hand, a contact region between a user and a display 194 may include a thenar contact surface 401 formed on a side screen 2 by the thenar of the palm, and a contact surface set 402 formed on a side screen 1 by other fingers of the user. In some embodiments, in a right-hand longitudinal holding state, the contact region between the user and the display 194 may further include a finger putting contact surface 403 formed on the side screen 2 by the thumb.

Similarly, in the right-hand longitudinal holding state, another finger of the user in contact with the side screen 2 may include one or more of four fingers: an index finger, a middle finger, a ring finger, and a little finger. For example, as shown in FIG. 32B, the other fingers grasping the side screen 1 include three fingers. The contact surface set 402 includes a finger grasping contact surface 402A, a finger grasping contact surface 402B, and a finger grasping contact surface 402D that respectively correspond to the three fingers.

It may be understood that when the user longitudinally holds the electronic device with the right hand, the thumb of the user may alternatively not contact the side screen 2.

Figure 32C:
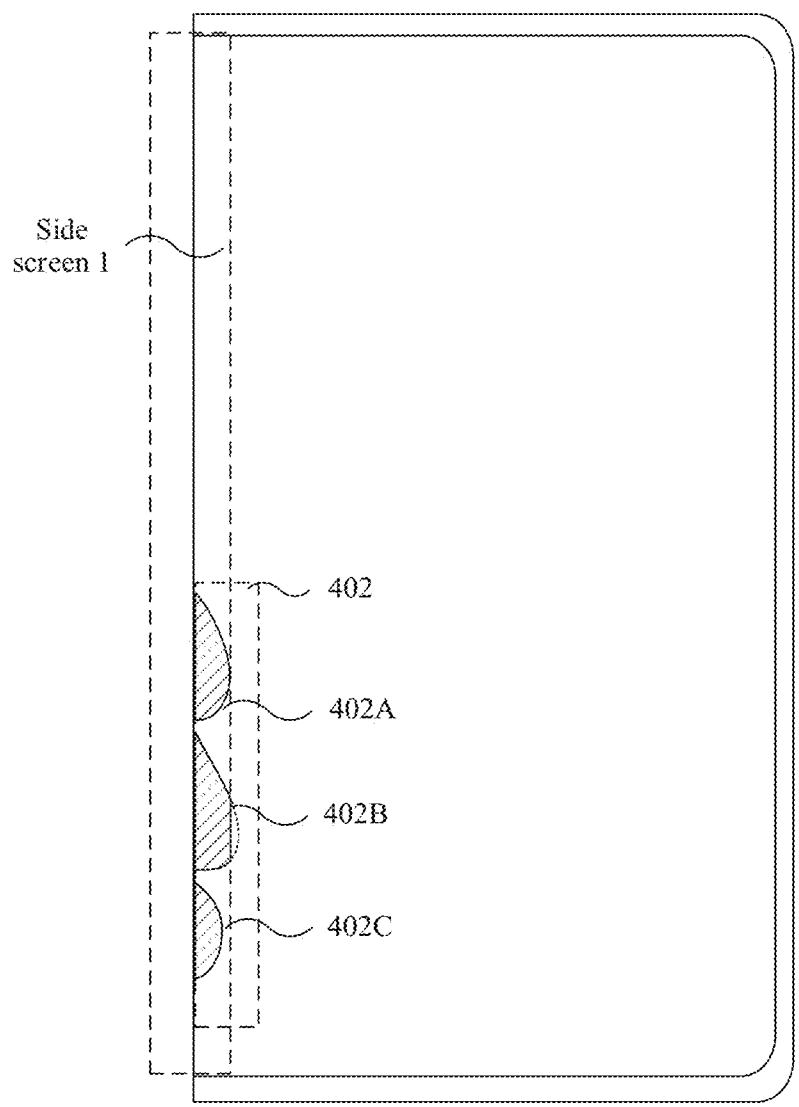

For an electronic device on which a side screen is disposed on only one side, FIG. 32C is a schematic diagram of a contact surface in a right-hand longitudinal holding state. As shown in FIG. 32C, the electronic device includes a side screen 1. A contact region between a user and a display 194 may include a contact surface set 402.

3. Two-Hand Longitudinal Holding

Figure 33A:
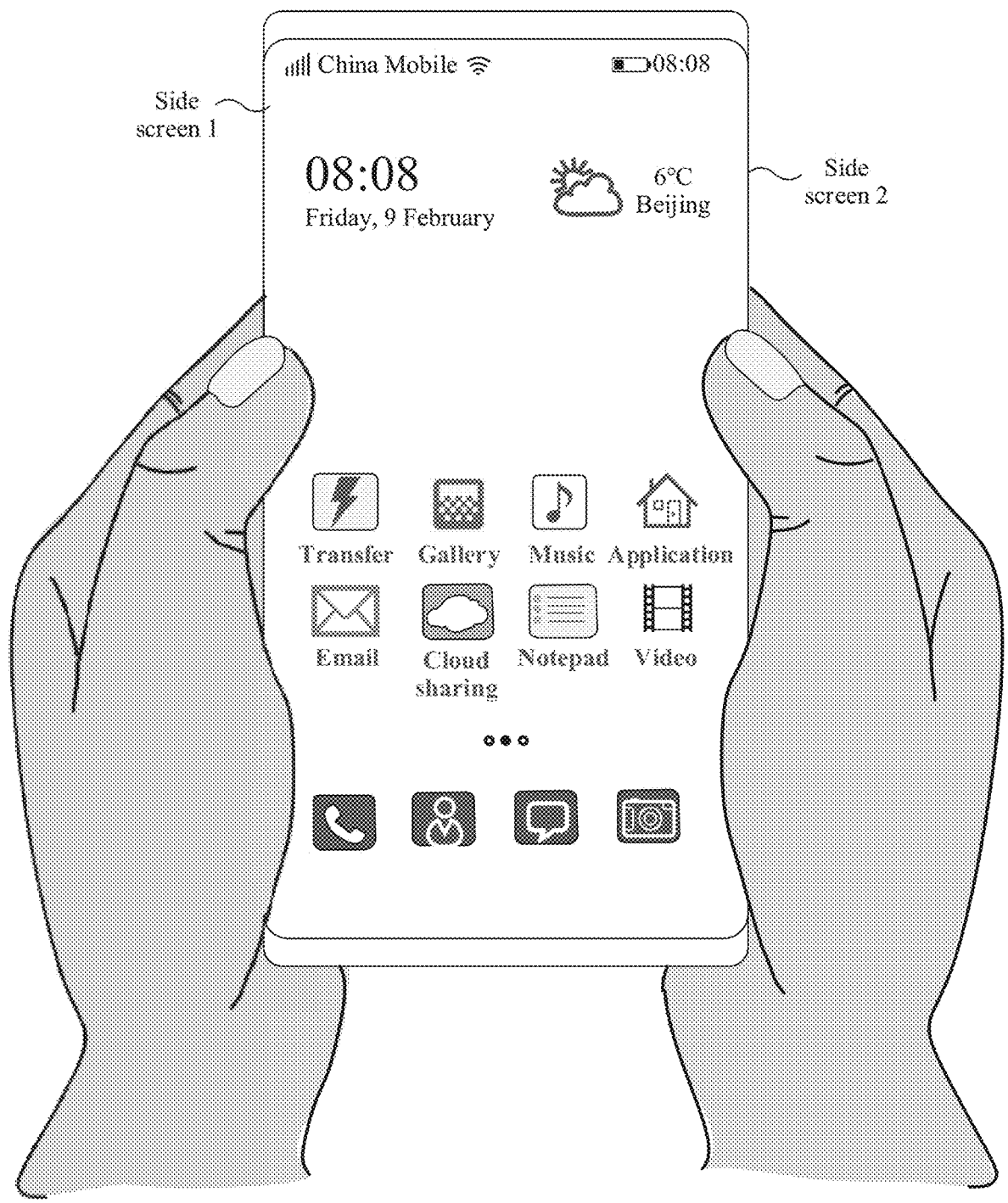
FIG. 33A and FIG. 33B are schematic diagrams of two-hand longitudinal holding according to an embodiment of this application.
Figure 33B:
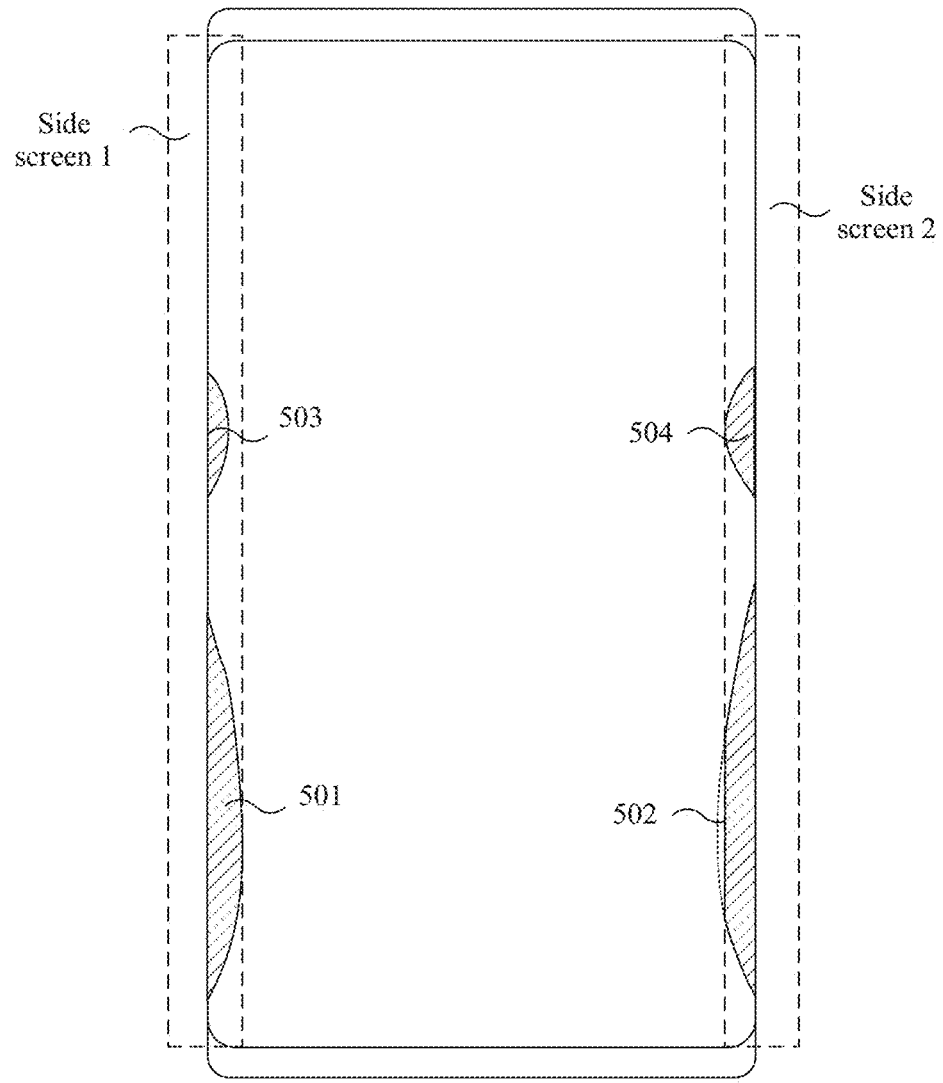

For example, FIG. 33A is a schematic diagram of longitudinally holding an electronic device with two hands according to an embodiment of this application. For an electronic device on which side screens are disposed on both sides, FIG. 33B is a schematic diagram of a contact surface corresponding to FIG. 33A. When the electronic device is longitudinally held with two hands, a contact region between a user and a side screen of a display 194 may include a thenar contact surface 501 formed on a side screen 1 by thenar of a palm, and a thenar contact surface 502 formed on a side screen 2 by thenar of a palm. In some embodiments, in a two-hand longitudinal holding state, the contact region between the user and the display 194 may further include a linger putting contact surface 503 formed on the side screen 1 by a thumb and a finger putting contact surface 504 formed on the side screen 2 by a thumb.

It may be understood that when the user longitudinally holds the electronic device with two hands, thumbs of both hands of the user may alternatively not contact the side screen 1 and/or the side screen 2.

For an electronic device on which a side screen is disposed on only one side, for a contact surface in a two-hand longitudinal holding state, refer to FIG. 31C.

4. Left-Hand Horizontal Holding

Figure 34A:
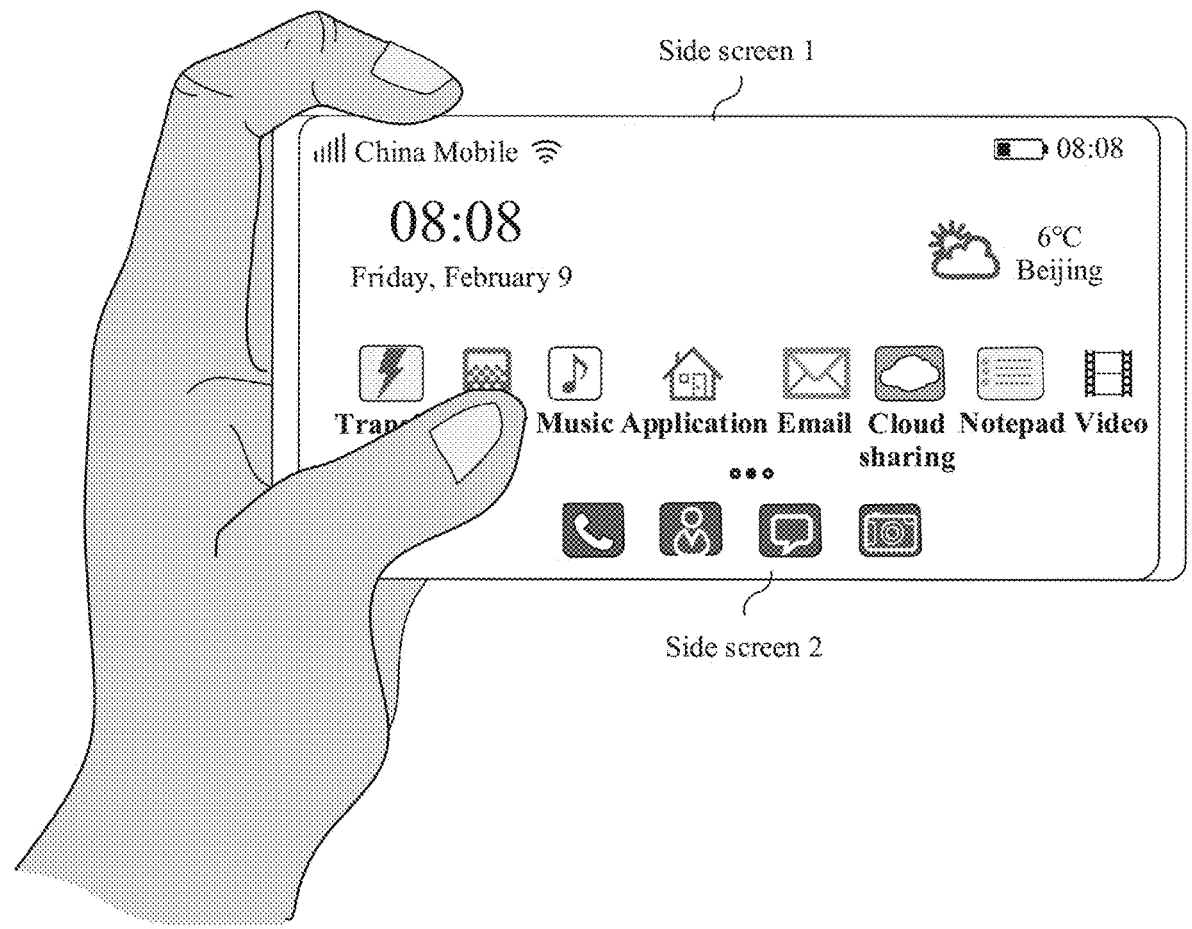
FIG. 34A to FIG. 34D are schematic diagrams of left-hand horizontal holding according to an embodiment of this application.
Figure 34B:
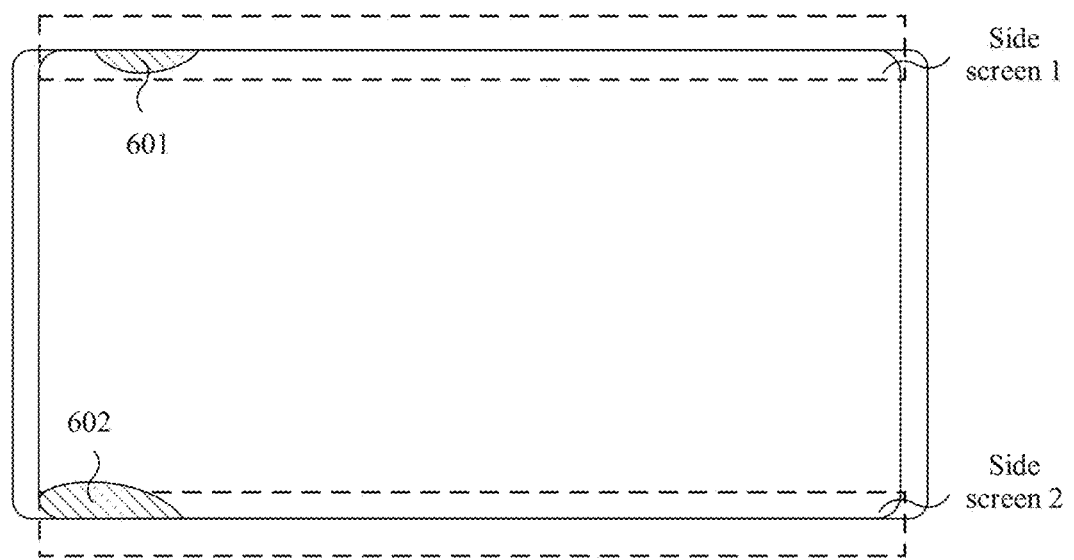

For example, FIG. 34A is a schematic diagram of horizontally holding an electronic device with a left hand according to an embodiment of this application. For an electronic device on which side screens are disposed on both sides, FIG. 34B is a schematic diagram of a contact surface corresponding to FIG. 34A. When the electronic device is horizontally held with a single left hand, a contact region between a user and a display 194 may include a finger putting contact surface 601 formed on a left end of a side screen 1 by a finger of the user and a thumb-index web contact surface 602 formed on a left end of a side screen 2 by the thumb-index web. The side screen 1 is located above the side screen 2.

Figure 34C:
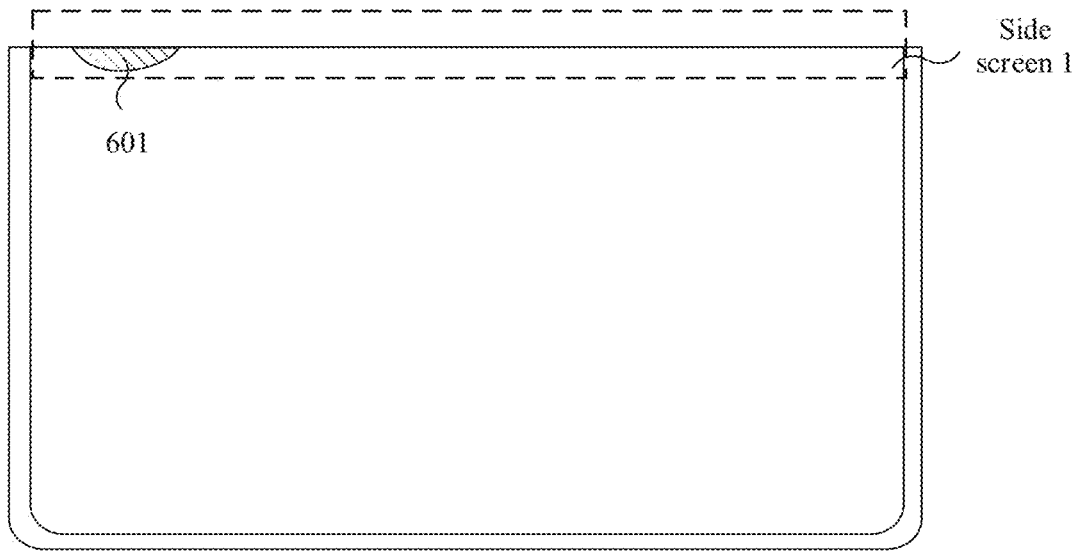
Figure 34D:
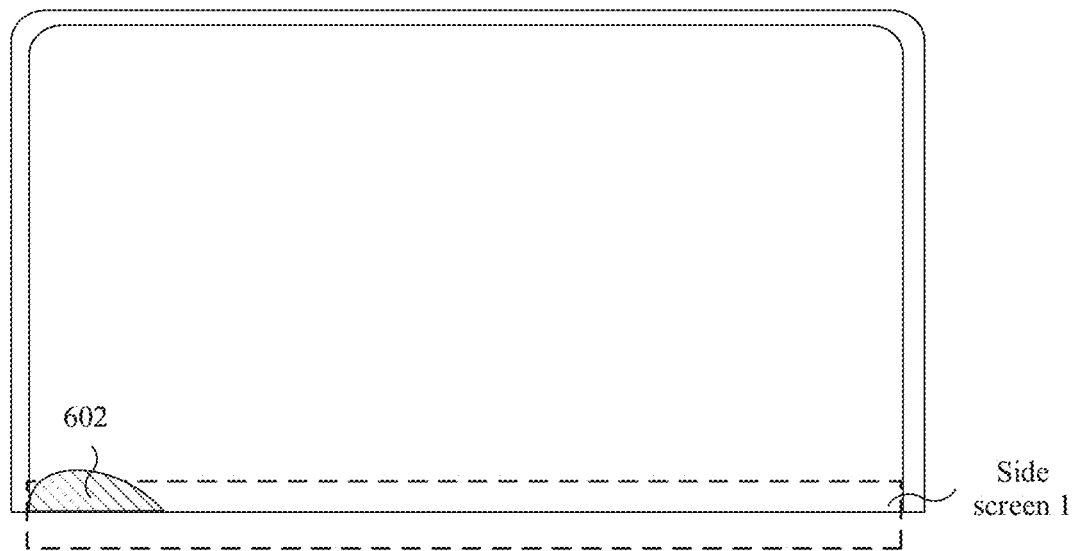

For an electronic device on which a side screen is disposed on only one side, FIG. 34C and FIG. 34D are schematic diagrams of a contact surface in a left-hand longitudinal holding state. As shown in FIG. 34C, a side screen 1 is located above another screen of the electronic device, and a contact region between a user and a display 194 may include a finger putting contact surface 601 formed on a left end of the side screen 1 by a finger of the user. As shown in FIG. 34D, a side screen 1 is located below another screen of the electronic device, and a contact region between a user and a display 194 may include a thumb-index web contact surface 602 formed on a left end of the side screen 1 by the thumb-index web.

It may be understood that both the finger putting contact surface and the thumb-index web contact surface shown in FIG. 34B to FIG. 34D are side contact surfaces.

5. Right-Hand Horizontal Holding

Figure 35A:
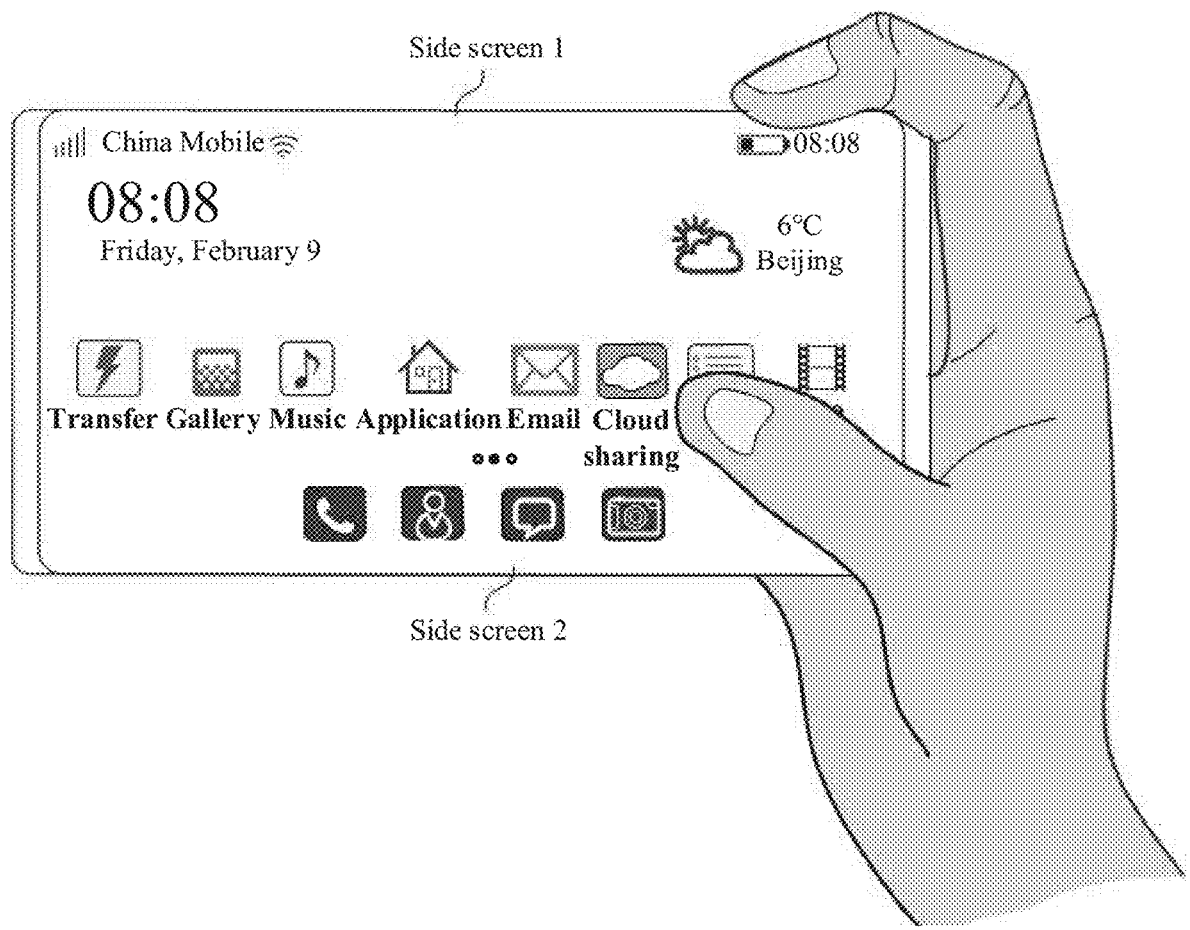
FIG. 35A to FIG. 35D are schematic diagrams of right-hand horizontal holding according to an embodiment of this application.
Figure 35B:
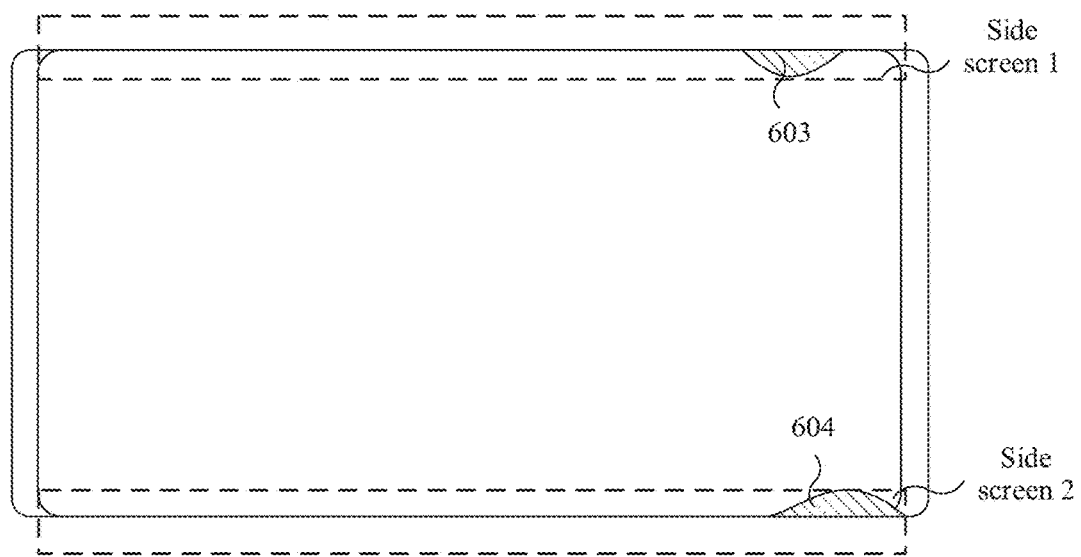

For example, FIG. 35A is a schematic diagram of horizontally holding an electronic device with a right hand according to an embodiment of this application. For an electronic device on which side screens are disposed on both sides, FIG. 35B is a schematic diagram of a contact surface corresponding to FIG. 35A. When the electronic device is horizontally held with a single right hand, a contact region between a user and a display 194 may include a finger putting contact surface 603 formed on a right end of a side screen 1 by a finger of the user and a thumb-index web contact surface 604 formed on a right end of a side screen 2 by the thumb-index web. The side screen 1 is located above the side screen 2.

Figure 35C:
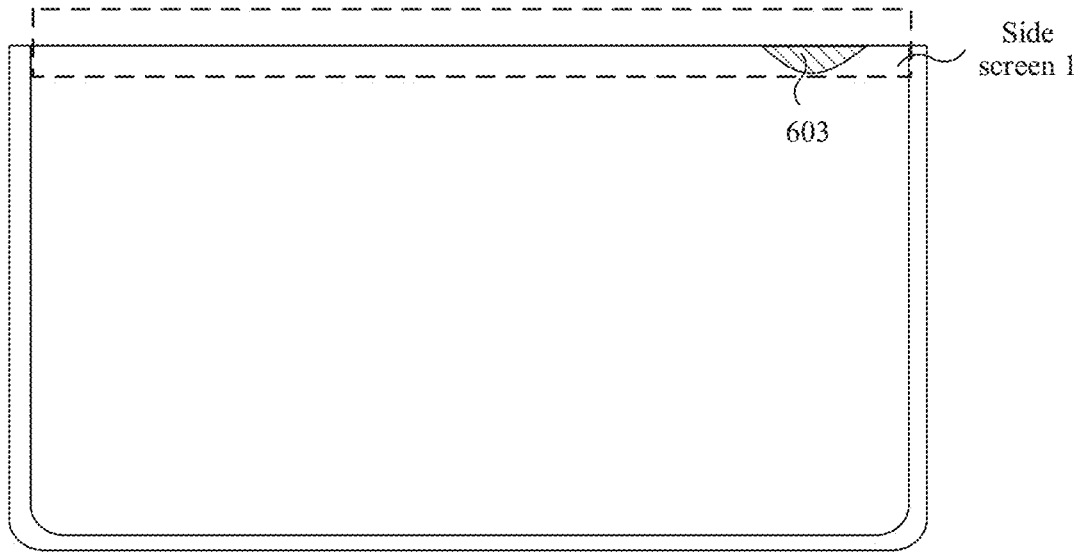
Figure 35D:
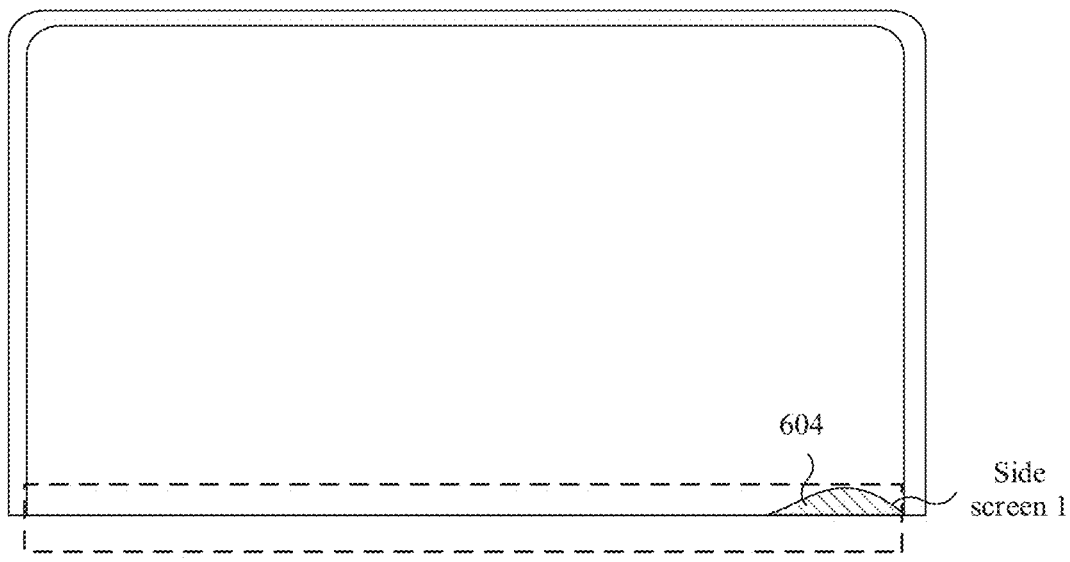

For an electronic device on which a side screen is disposed on only one side, FIG. 35C and FIG. 35D are schematic diagrams of a contact surface in a right-hand horizontal holding state. As shown in FIG. 35C, a side screen 1 is located above another screen of the electronic device, and a contact region between a user and a display 194 may include a finger putting contact surface 603 formed on a right end of the side screen 1 by a finger of the user. As shown in FIG. 35D, a side screen 1 is located below another screen of the electronic device, and a contact region between a user and a display 194 may include a thumb-index web contact surface 604 formed on a right end of the side screen 1 by the thumb-index web.

6. Two-Hand Horizontal Holding

Figure 36A:
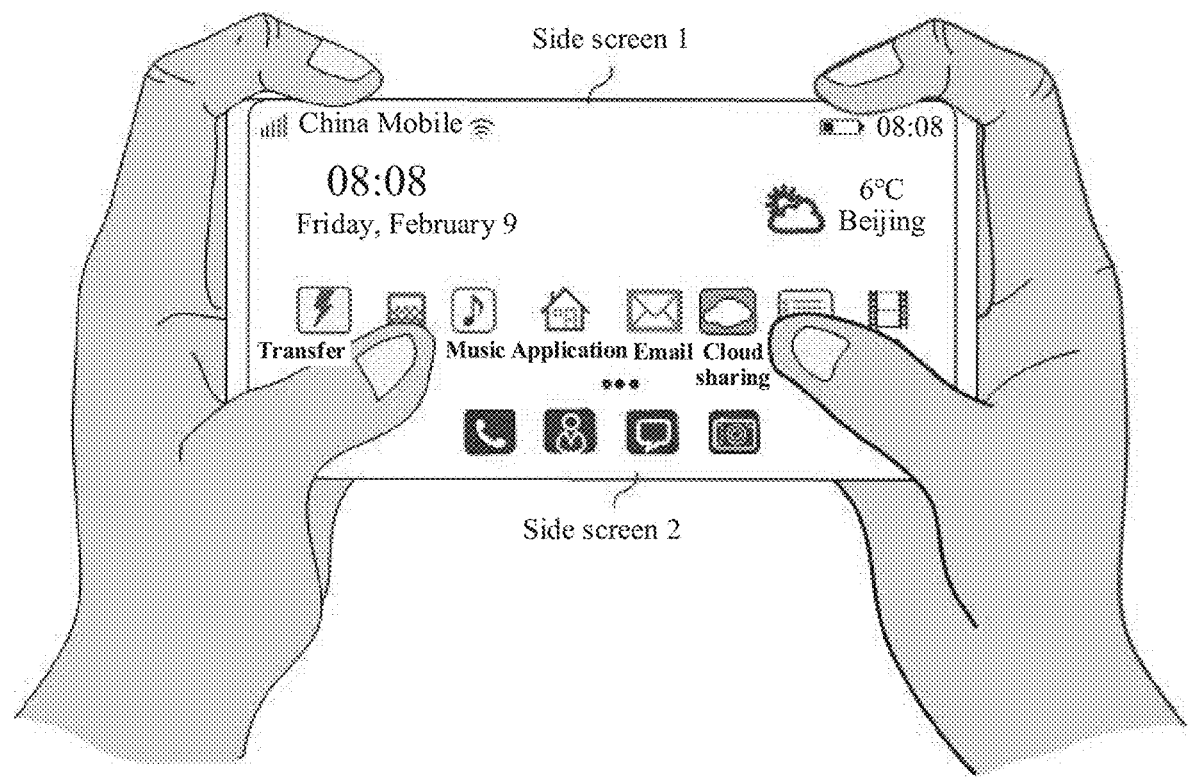
FIG. 36A to FIG. 36D are schematic diagrams of two-hand horizontal holding according to an embodiment of this application.
Figure 36B:
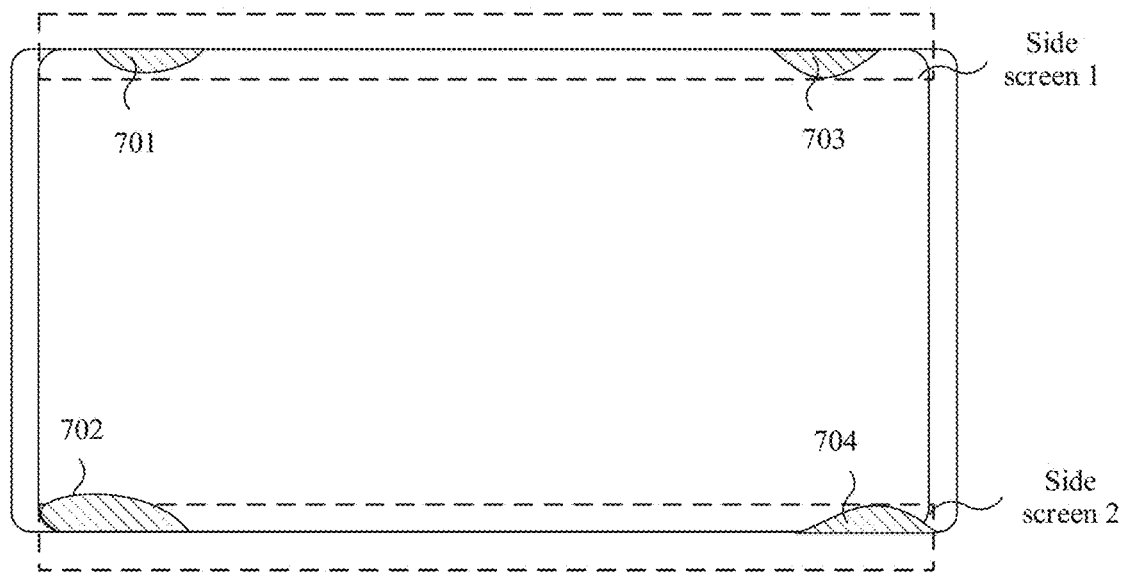

For example, FIG. 36A is a schematic diagram of horizontally holding an electronic device with two hands according to an embodiment of this application. For an electronic device on which side screens are disposed on both sides. FIG. 36B is a schematic diagram of a contact surface corresponding to FIG. 36A. When the electronic device is horizontally held with two hands, a contact region between a user and a display 194 may include: a finger putting contact surface 701 formed on a left end of a side screen 1 by a finger of the user, a thumb-index web contact surface 702 formed on a fell end of a side screen 2 by a thumb-index web, a finger putting contact surface 703 formed on a right end of the side screen 1 by a finger of the user, and a thumb-index web contact surface 704 formed on a right end of the side screen 2 by a thumb-index web. The side screen 1 is located above the side screen 2.

Figure 36C:
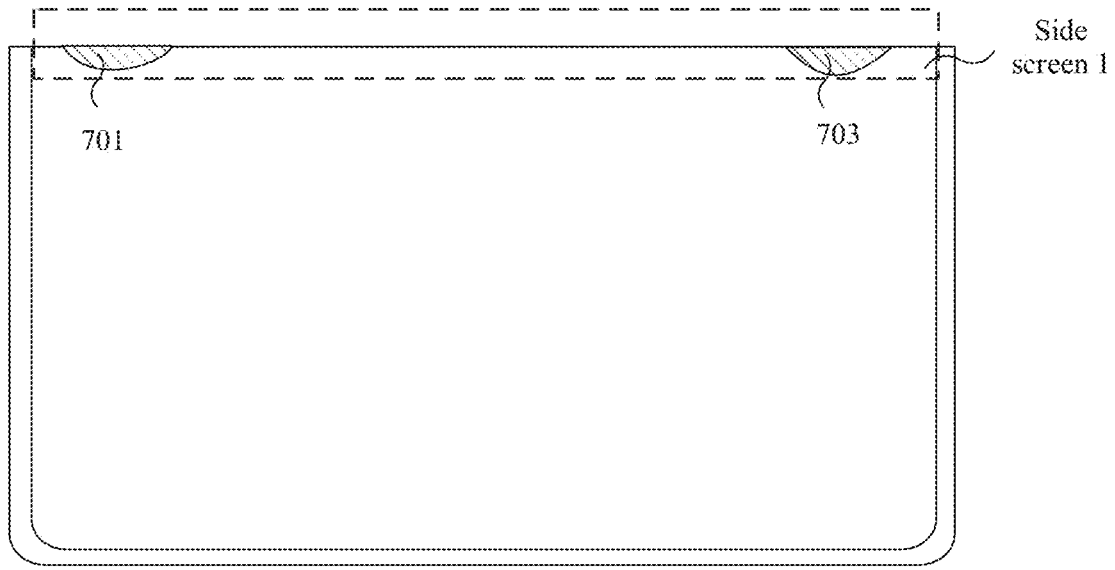
Figure 36D:
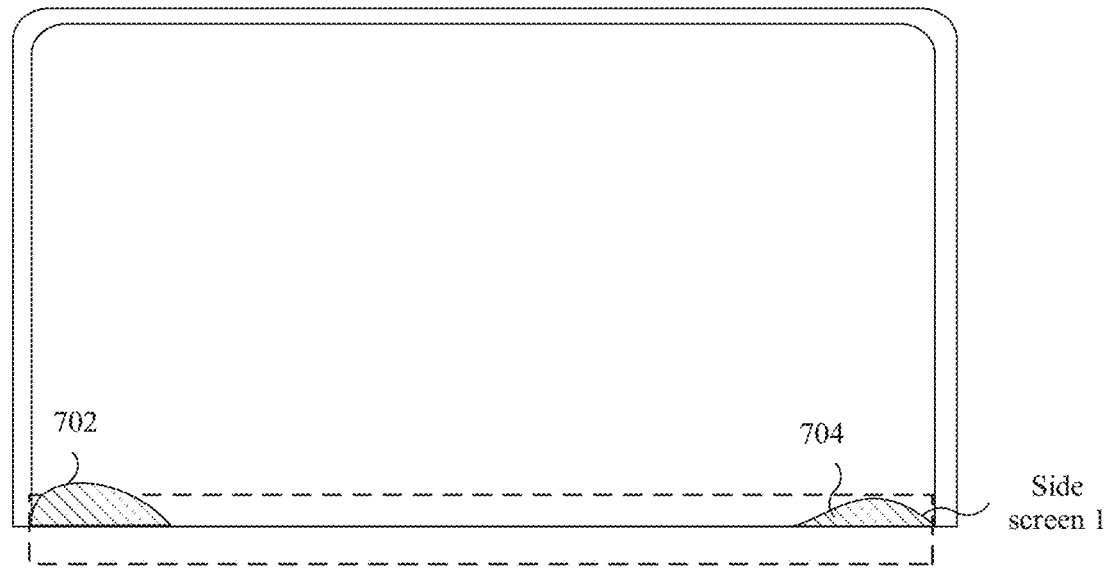

For an electronic device on which a side screen is disposed on only one side, FIG. 36C and FIG. 36D are schematic diagrams of a contact surface in a two-hand horizontal holding state. As shown in FIG. 36C, a side screen 1 is located above another screen of the electronic device, and a contact region between a user and a display 194 may include a finger putting contact surface 701 formed on a left end of the side screen 1 by a finger of the user and a finger putting contact surface 703 formed on a right end of the side screen 1 by a finger of the user. As shown in FIG. 36D, a side screen 1 is located below another screen of the electronic device, and a contact region between a user and a display 194 may include a thumb-index web contact surface 702 formed on a left end of the side screen 2 by a thumb-index web and a thumb-index web contact surface 704 formed on a right end of the side screen 1 by a thumb-index web.

The electronic device including two side screens shown in FIG. 31A to FIG. 36C may be the electronic device configured with a curved display in FIG. 5A or the electronic device configured with a surround display in FIG. 6A. The electronic device including one side screen shown in FIG. 31A to FIG. 36C may be the electronic device configured with a foldable display in FIG. 7A and the side screen 1 may be the side screen 53 in FIG. 7A.

It can be learned from FIG. 31A to FIG. 33B that, for the electronic device configured with two side screens, when the user longitudinally holds the electronic device, at least one side screen has a contact surface with the thenar of the palm. When the user longitudinally holds the electronic device with one hand, a side screen has a contact surface with the thenar of the palm, and a side screen has a contact surface with one or more fingers the user other than the thumb. When the user longitudinally holds the electronic device with two hands, the two side screens each have a contact surface with the thenar of the palm.

It can be learned from FIG. 34A to FIG. 36D that when the user horizontally holds the electronic device, a contact surface between the user and the side screen is located at one or both ends of the side screen. For the electronic device configured with two side screens, when the user horizontally holds the electronic device with one hand, ends that are of the two side screens and that are on a same side each have a contact surface, and the contact surfaces are respectively a finger putting contact surface and a thumb-index web contact surface. When the user holds the electronic device horizontally with two hands, two finger putting contact surfaces are located at both ends of an upper side, screen, and two thumb-index web contact surfaces are located at both ends of a lower side screen. For the electronic device configured with one side screen, when the user horizontally holds the electronic device with one hand, when the side screen is located above, one end of the side screen has a finger contact surface; and when the side screen is located below, one end of the side screen has a thumb-index web contact surface. In some embodiments, when the user horizontally holds the electronic device with two hands, a distance between contact surfaces at two ends of a side screen is usually greater than a distance threshold 1.

In this embodiment of this application, the electronic device may obtain a landscape/portrait mode of the electronic device by using an acceleration sensor and/or a gyro sensor, to determine whether the electronic device is in portrait mode or landscape mode and determine a location relationship between the side screen 1 and the side screen 2. For example, the side screen 1 is located above the side screen 2.

In some embodiments, that a contact surface is located on a side screen may mean that a part of or all the contact surface is located on the side screen.

It should be noted that the holding states shown in FIG. 31A to FIG. 36D are examples of various holding states provided in the embodiments of this application, and constitute no limitation on the embodiments of this application. In addition to the holding states shown in FIG. 31A to FIG. 36D, the embodiments of this application may further include another holding state. This is not specifically limited herein.

2. Based on a feature of a contact surface on which a user holds an electronic device, the following specifically describes how to determine a touch region and a non-touch region on a side screen based on the contact surface on which the user holds the electronic device.

In some embodiments of this application, touch information of the contact surface may include one or more pieces of information such as a location of the contact surface, a height along a long side of the electronic device, a width along the long side of the electronic device, an area of the contact surface, capacitance information of the contact surface, and touch duration of the contact surface. The capacitance information of the contact surface may include a capacitance signal of each coordinate point in a touch array corresponding to the contact surface, for example, a capacitance change amount of each coordinate point. The touch information of the contact surface may further include another parameter. This is not specifically limited herein.

In some embodiments of this application, the electronic device may determine a type of a side contact surface based on touch information of the side contact surface. A type of the side contact surface formed by holding the electronic device by the user may include: a thenar contact surface, a finger grasping contact surface, a finger putting contact surface, a thumb-index web contact surface, and the like.

In some embodiments of this application, the electronic device may adaptively adjust the touch region and the non-touch region on the side screen based on a location of the side contact surface on the side screen and the touch information of the side contact surface. In this embodiment of this application, a specific implementation of determining the touch region and the non-touch region on the side screen may include but is not limited to the following two implementations.

In an implementation 1, the electronic device may determine a touch region and a non-touch region on a side screen based on a location of a side contact surface on the side screen and touch information of the side contact surface.

In an implementation 2, the electronic device may determine a holding state of the user based on locations of side contact surfaces on one or two side screens and the locations of the side contact surfaces, to further determine a touch region and a non-touch region on the two side screens of the electronic device in the holding state.

In an implementation 3, for the surround display shown in FIG. 6A and the foldable display shown in FIG. 7A, when the user longitudinally grasps the electronic device, a grasping surface of a palm of the user also includes a display screen, namely, a rear screen. The electronic device may determine a touch region and a non-touch region on two side screens of the electronic device based on touch information of a contact surface between the palm of the user and the rear screen.

In the implementation 1, determining the touch region and the non-touch region on the side screen may specifically include but is not limited to a case 1 to a case 6.

Case 1:

In some embodiments of this application, the electronic device determines, based on the touch information of the side contact surface, that the side contact surface on the side screen includes the thenar contact surface. The electronic device determines, based on a location of the thenar contact surface, locations of the touch region and the non-touch region on the side screen.

Figure 37A:
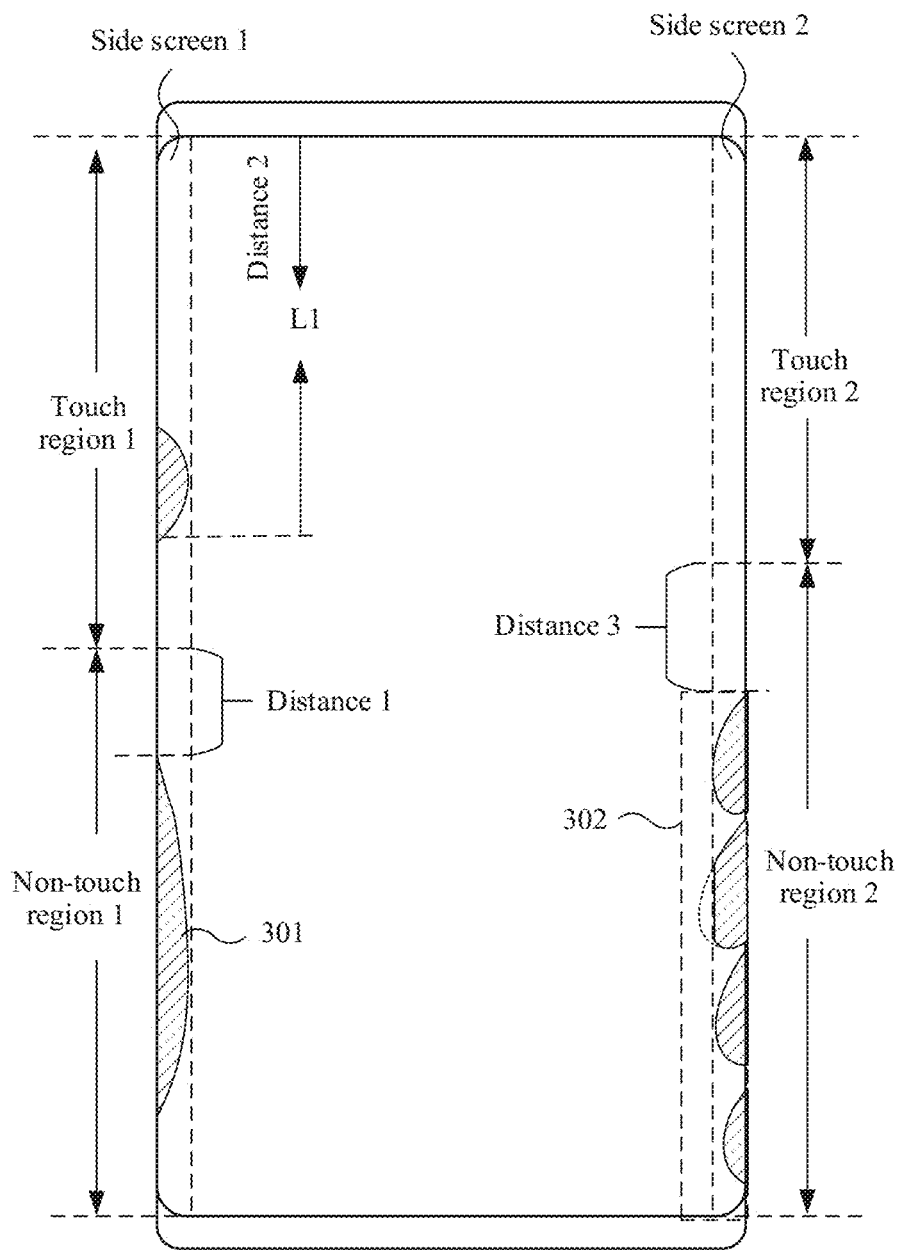
FIG. 37A to FIG. 37B are schematic diagrams of a touch region and a non-touch region according to an embodiment of this application.
Figure 37B:
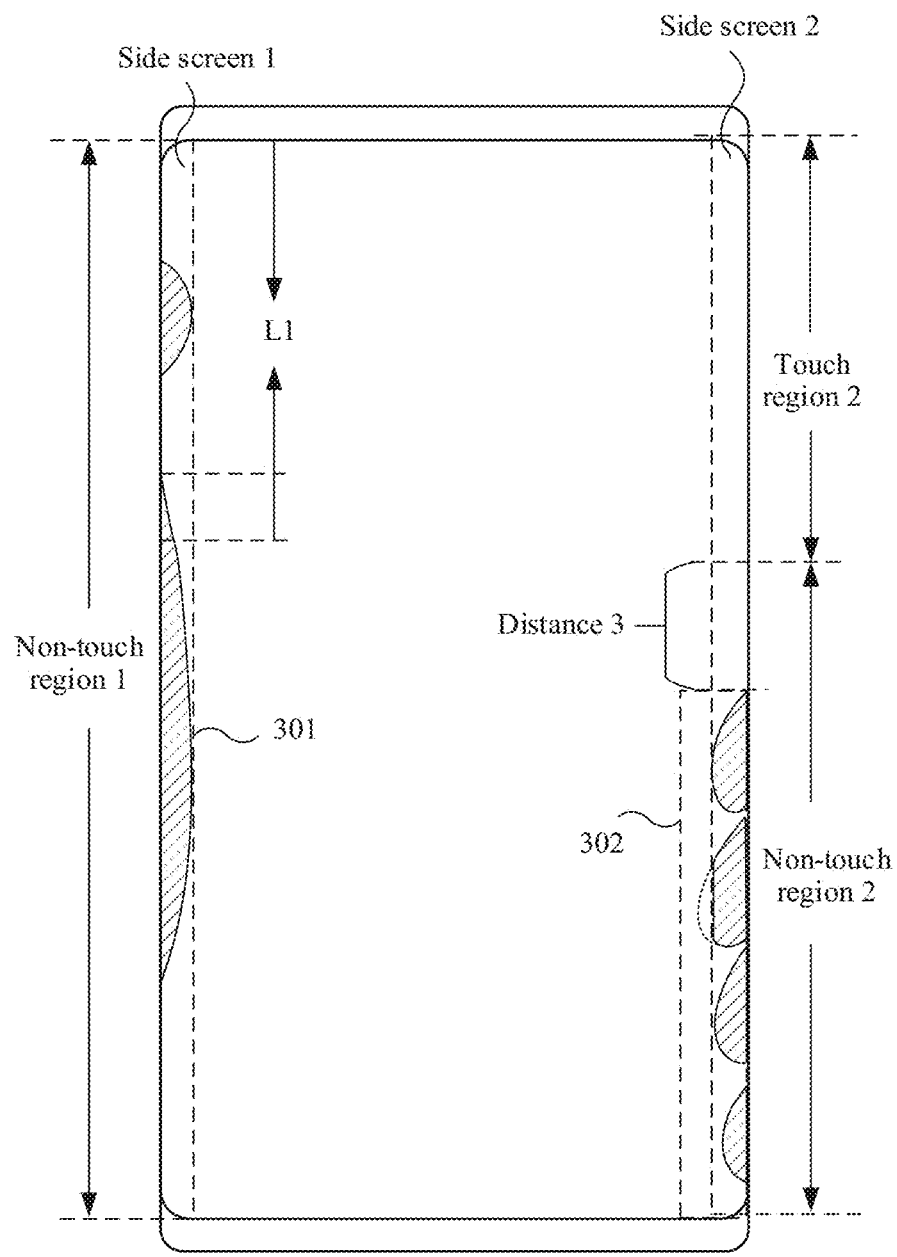
Figure 37C:
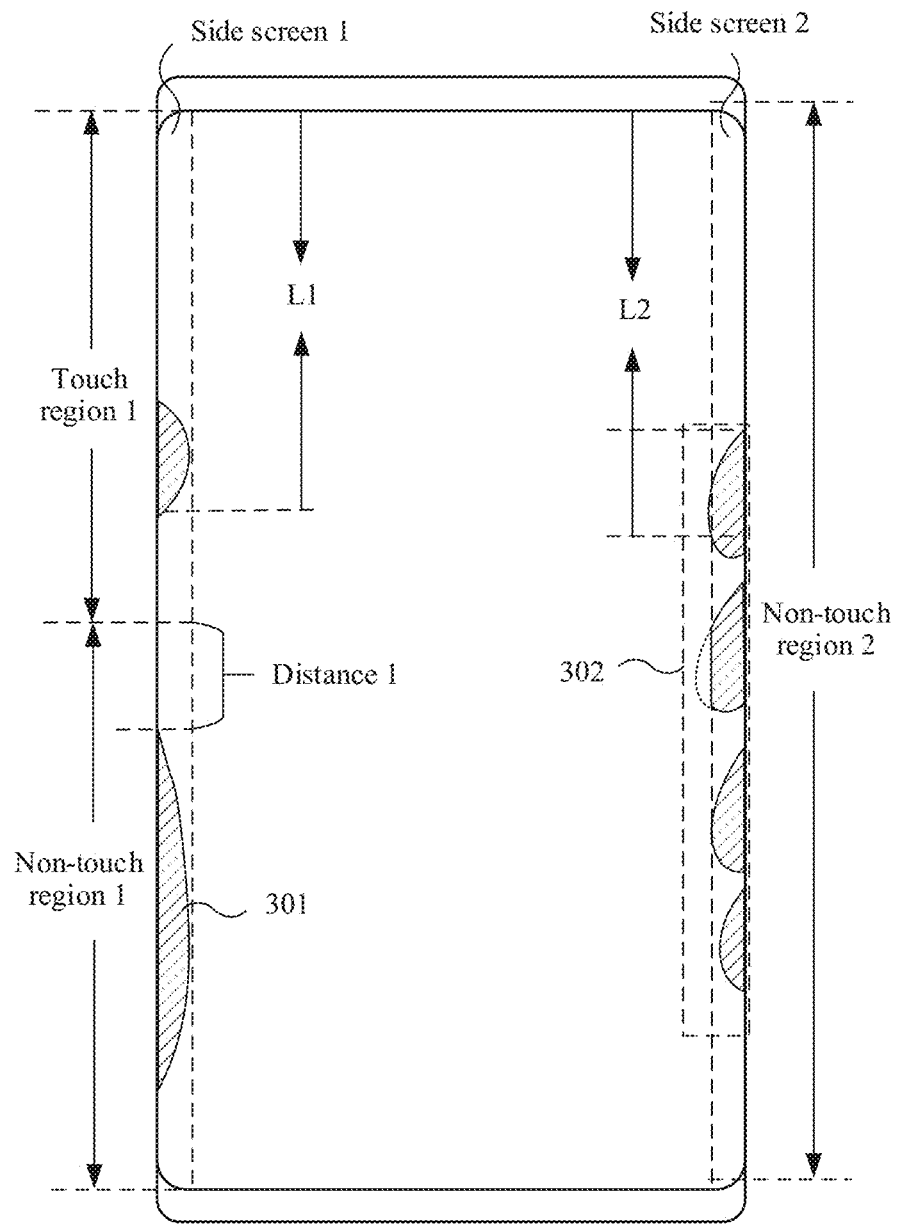
Figure 37D:
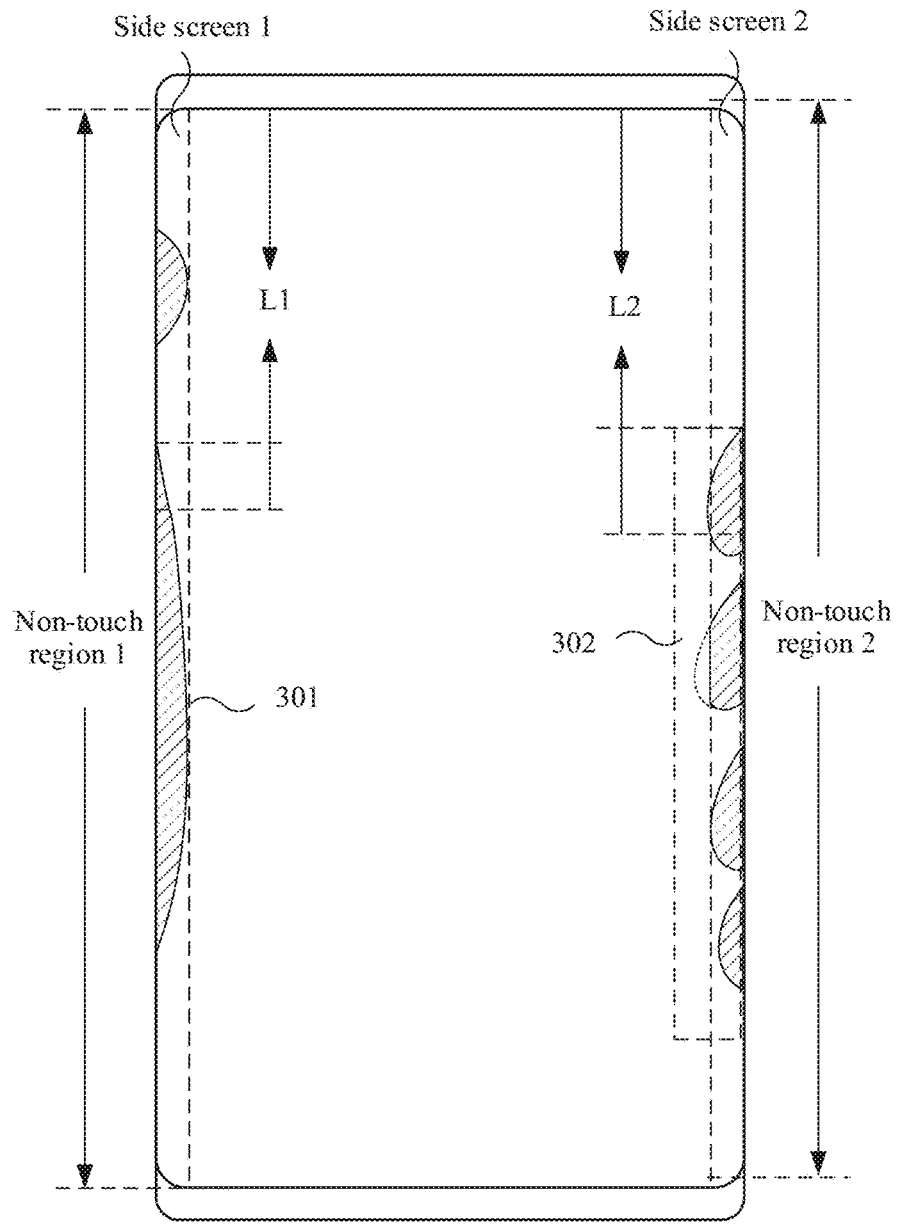

For example, as shown in FIG. 37A to FIG. 37D, the electronic device determines that a side contact surface on a side screen 1 includes a thenar contact surface 301. In some embodiments, as shown in FIGS. 37A and 37C, when a shortest distance between the thenar contact surface 301 and the top of the side screen 1 is greater than or equal to L1, the electronic device determines that a touch region 1 on the side screen 1 is located between the top of the side screen 1 and the thenar contact surface 301, and a region other than the touch region 1 on the side screen 1 is a non-touch region 1. As shown in FIG. 37B and FIG. 37D, when the shortest distance between the thenar contact surface 301 and the top of the side screen 1 is less than L1, the electronic device determines that the entire side screen 1 is the non-touch region 1. A shortest distance between the touch region 1 and the thenar contact surface 301 in FIG. 37A and FIG. 37C is equal to a distance 1. In some embodiments, a shortest distance between the touch region 1 and the top of the side screen 1 is a distance 2.

For example, L1 is equal to half of a length of a long side of a display; the distance 1 may be equal to a height of five coordinate points; and the distance 2 equals a height of zero or three coordinate points.

Referring to FIG. 8B, in this embodiment of this application, a height of a coordinate point refers to a height of a grid in a touchscreen array of the touch sensor 50 along the long side of the electronic device, and a width of the coordinate point refers to a width of the grid along a short side of the electronic device.

Similarly, for the electronic device in the right-hand longitudinal holding state shown in FIG. 31B, the electronic device in the two-hand longitudinal holding state shown in FIG. 32B, and the electronic device with only one side screen shown in FIG. 30C, when the side screen includes the thenar contact surface, the touch region and the non-touch region on the side screen may also be determined according to the foregoing implementation. Details are not described herein again.

In some embodiments, the electronic device determines that the electronic device is in landscape mode. When a shortest distance between the thenar contact surface 301 and the top (or the bottom) of a side screen 2 is greater than or equal to L1, the electronic device determines that the touch region 1 on the side screen 1 is located between the top (or the bottom) of the side screen and the thenar contact surface 301, and a region other than the touch region 1 on the side screen 1 is the non-touch region 1. When the shortest distance between the thenar contact surface 301 and the top of the side screen and the shortest distance between the thenar contact surface 301 and the bottom of the side screen are both less than L2, the electronic device determines that the entire side screen 1 is the non-touch region 1. The shortest distance between the touch region 1 and the thenar contact surface 301 is equal to the distance 1. In some embodiments, the shortest distance between the touch region 1 and the top (or the bottom) of the side screen is the distance 2.

In some embodiments, the electronic device is in landscape mode. When the side screen 1 is located below another screen, the side screen 1 is the non-touch region 1.

It should be noted that, as shown in FIG. 37A, the top of the side screen 1 refers to a top boundary line of the side screen 1, and the bottom of the side screen 1 refers to a bottom boundary line of the side screen 1. In this embodiment of this application, a distance between a contact surface and the top of the side screen 1 may refer to a shortest distance between the contact surface and the top boundary line of the side screen 1, and a distance between the contact surface and the bottom of the side screen 1 may refer to a shortest distance between the contact surface and the bottom boundary line of the side screen 1. In an implementation, the top boundary line of the side screen 1 overlaps with an extension line of a top boundary line of a front screen, and the bottom boundary line of the side screen 1 overlaps with an extension line of a bottom boundary line of the front screen.

Case 2:

In some embodiments of this application, the electronic device determines, based on the touch information of the side contact surface, that the side contact surface on the side screen includes a contact surface set. The electronic device determines, based on a location of the contact surface set, locations of the touch region and the non-touch region on the side screen.

For example, as shown in FIG. 37A to FIG. 37D, the electronic device determines that a side contact surface on a side screen 2 includes a contact surface set 302. The contact surface set 302 includes at least four finger grasping contact surfaces, and a shortest distance between any two adjacent contact surfaces is less than a distance threshold 1. In some embodiments, as shown in FIG. 37A and FIG. 37B, when a shortest distance between the contact surface set 302 and the top of the side screen 2 is greater than or equal to L2, the electronic device determines that a touch region 2 on the side screen 2 is located between the top of the side screen 2 and the contact surface set 302, and a region other than the touch region 2 on the side screen 2 is a non-touch region 2. As shown in FIG. 37C and FIG. 37D, when the shortest distance between the contact surface set 302 and the top of the side screen 2 is less than L2, the electronic device determines that the entire side screen 2 is the non-touch region 2. A shortest distance between the touch region 2 and the contact surface set 302 in FIG. 37A and FIG. 37B is equal to a distance 3. In some embodiments, a shortest distance between the touch region 2 and the top of the side screen 2 is a distance 4.

For example, L2 is equal to half of a length of a long side of a display; the distance 3 may be equal to a height of five coordinate points; and the distance 4 equals a height of zero or three coordinate points.

Similarly, for the electronic device in the right-hand longitudinal holding state shown in FIG. 31B and the electronic device with only one side screen shown in FIG. 31C, when the side screen includes the contact surface set 302, the touch region and the non-touch region on the side screen may also be determined according to the foregoing implementation. Details are not described herein again.

In some embodiments, the electronic device determines that the electronic device is in landscape mode. When a shortest distance between the contact surface set 302 and the top (or the bottom) of the side screen 2 is greater than or equal to L2, the electronic device determines that the touch region 2 on the side screen 2 is located between the top (or the bottom) of the side screen and the contact surface set 302, and a region other than the touch region 2 on the side screen 2 is the non-touch region 2. When the shortest distance between the contact surface set 302 and the top of the side screen 2 and the shortest distance between the contact surface set 302 and the bottom of the side screen 2 are both less than L2, the electronic device determines that the entire side screen 2 is the non-touch region 2. The shortest distance between the touch region 2 and the contact surface set 302 is equal to the distance 3. In some embodiments, a shortest distance between the touch region 2 and the top (or the bottom) of the side screen 2 is the distance 4.

In some embodiments, the electronic device is in landscape mode. When the side screen 2 is located below another screen, the side screen 2 is the non-touch region 2.

Case 3:

In some embodiments of this application, when the electronic device determines, based on the touch information of the side contact surface, that the side contact surface on the side screen includes the finger putting contact surface, and a distance between the finger putting contact surface and one end of the side screen is greater than or equal to L5, the electronic device determines, based on a location of the finger putting contact surface, that the touch region on the side screen is located between the end of the side screen and the finger putting contact surface.

Figure 38A:
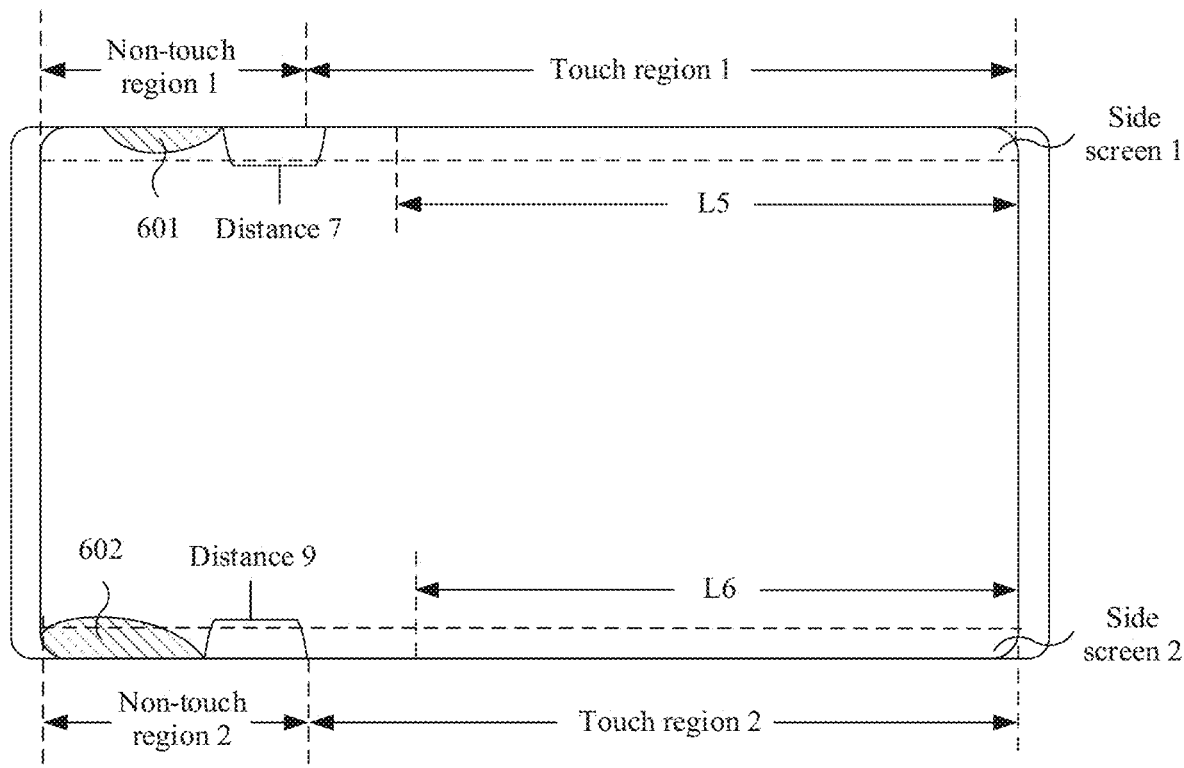
FIG. 38A to FIG. 38C are schematic diagrams of a touch region and a non-touch region according to an embodiment of this application.
Figure 38B:
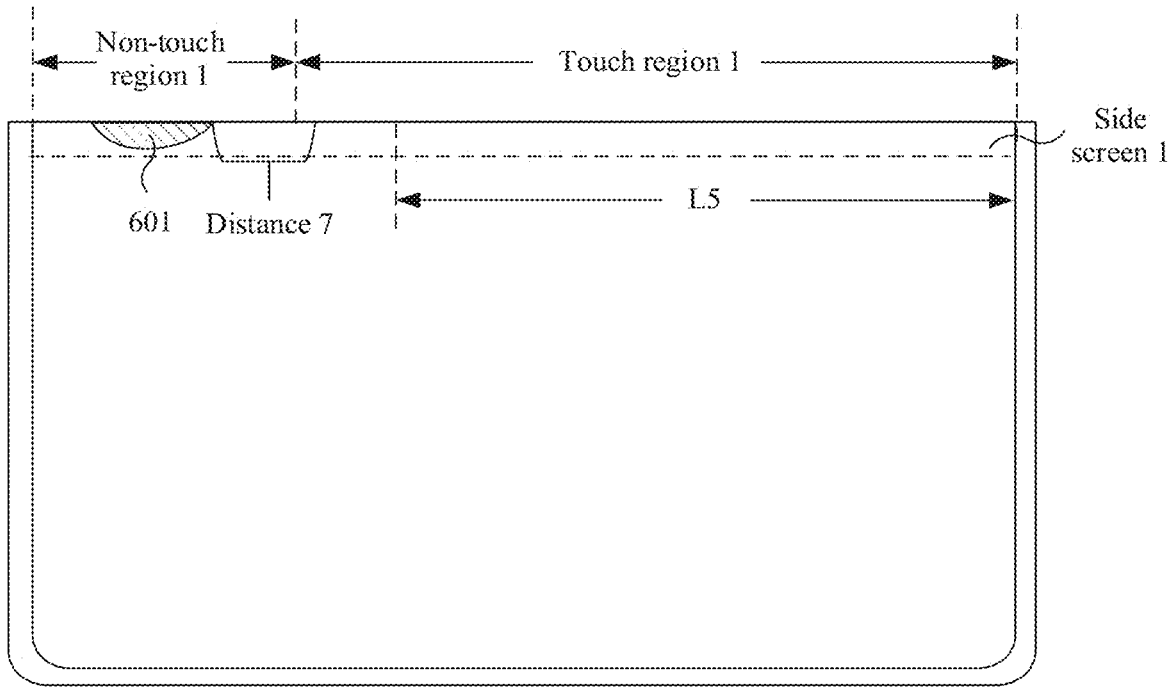

For example, for an electronic device configured with two side screens shown in FIG. 38A and an electronic device configured with one side screen shown in FIG. 38B, when a side screen 1 includes a finger putting contact surface 601, and a distance between the finger putting contact surface 601 and the top of a right end of the side screen 1 is greater than or equal to L5, the electronic device determines that a touch region 1 on the side screen 1 is located between the right end of the side screen and the finger putting contact surface 601. A shortest distance between the touch region 1 and the finger putting contact surface 601 is equal to a distance 7. In some embodiments, a shortest distance between the touch region 1 and the top of the right end of the side screen is equal to a distance 8.

Case 4:

In some embodiments of this application, when the electronic device determines, based on the touch information of the side contact surface, that the side contact surface on the side screen includes the thumb-index web contact surface, and a distance between the thumb-index web contact surface and one end of the side screen is greater than or equal to L6, the electronic device determines, based on a location of the thumb-index web contact surface, that the touch region on the side screen is located between the end of the side screen and the thumb-index web contact surface.

For example, for the electronic device configured with two side screens shown in FIG. 38A, when a left end of a side screen 2 includes a thumb-index web contact surface 602, and a distance between the thumb-index web contact surface 602 and the top of a right end of the side screen 2 is greater than or equal to L6, the electronic device determines that a touch region 2 on the side screen 2 is located between the right end of the side screen and the thumb-index web contact surface 602. A shortest distance between the touch region 2 and the thumb-index web contact surface 602 is equal to a distance 9. In some embodiments, a shortest distance between the touch region 1 and the top of the right end of the side screen is equal to a distance 10.

Figure 38C:
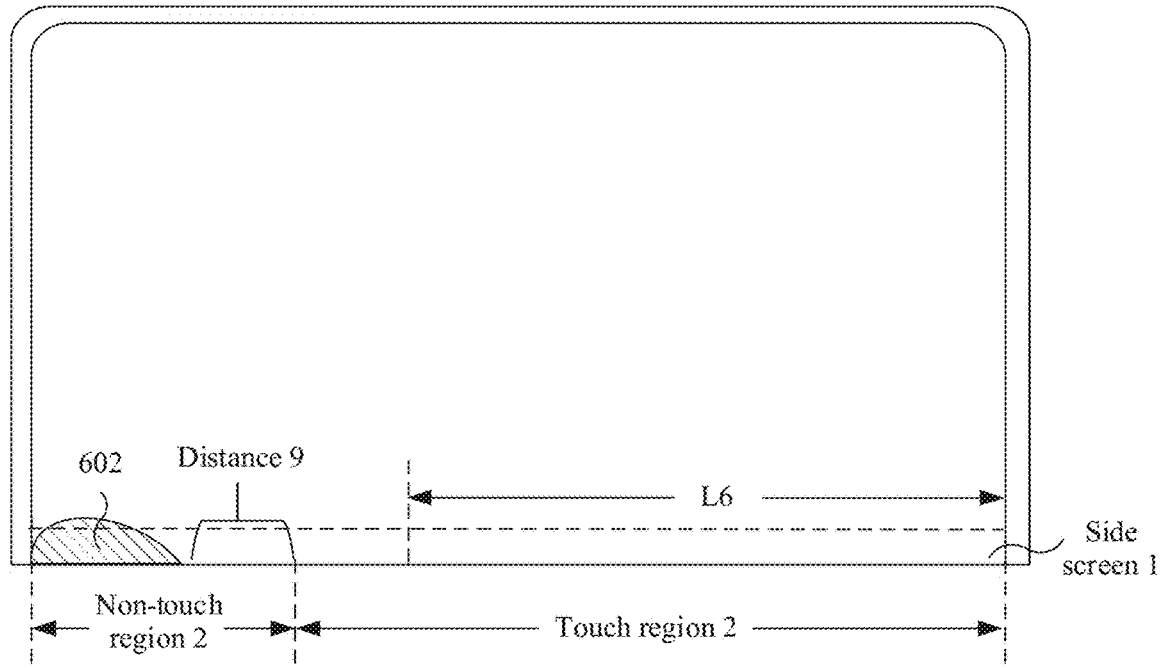

Similarly, for the electronic device with only one side screen shown in FIG. 38C, a touch region and a non-touch region on the side screen may also be determined according to the foregoing implementation. Details are not described herein again.

Case 5:

In some embodiments of this application, the side screen includes two finger putting contact surfaces. When a shortest distance between the two finger putting contact surfaces is greater than or equal to L7, the electronic device determines that the touch region on the side screen is located between the two finger putting contact surfaces.

For example, referring to FIG. 39A to FIG. 39D, a left end of a side screen 1 includes a finger putting contact surface 701 and a right end includes a finger putting contact surface 703. For an electronic device configured with two side screens shown in FIG. 39A and an electronic device configured with one side screen shown in FIG. 39B, when a shortest distance between the finger putting contact surface 701 and the finger putting contact surface 703 is greater than or equal to L7, the electronic device determines that a touch region 1 on the side screen 1 is located between the finger putting contact surface 701 and the finger putting contact surface 703. For an electronic device configured with two side screens shown in FIG. 39C and an electronic device configured with one side screen shown in FIG. 39D, when a shortest distance between the finger putting contact surface 701 and the finger putting contact surface 703 is less than L7, the electronic device determines that the entire side screen 1 is a non-touch region 1. A shortest distance between the touch region 1 and the finger putting contact surface 701 is equal to a distance 7, and a shortest distance between the touch region 1 and the finger putting contact surface 703 is also the distance 7.

Case 6:

In some embodiments of this application, the side screen includes two thumb-index web contact surfaces. When a shortest distance between the two thumb-index web contact surfaces is greater than or equal to L8, the electronic device determines that the touch region on the side screen is located between the two thumb-index web putting contact surfaces.

For example, referring to FIG. 39A to FIG. 39G, a left end of a side screen 2 includes a thumb-index web contact surface 702 and a right end includes a thumb-index web contact surface 704. For the electronic device configured with two side screens shown in FIG. 39A, when a shortest distance between the thumb-index web contact surface 702 and the thumb-index web contact surface 704 on the side screen 2 is greater than or equal to L8, the electronic device determines that a touch region 2 on the side screen 2 is located between the thumb-index web contact surface 702 and the thumb-index web contact surface 704. For an electronic device configured with two side screens shown in FIG. 39F, when a shortest distance between the thumb-index web contact surface 702 and the thumb-index web contact surface 704 on the side screen 2 is less than 8, the electronic device determines that the entire side screen 2 is a non-touch region 2. A shortest distance between the touch region 2 and the thumb-index web contact surface 702 is equal to a distance 9, and a shortest distance between the touch region 1 and the thumb-index web contact surface 704 is also the distance 9.

Figure 39A:
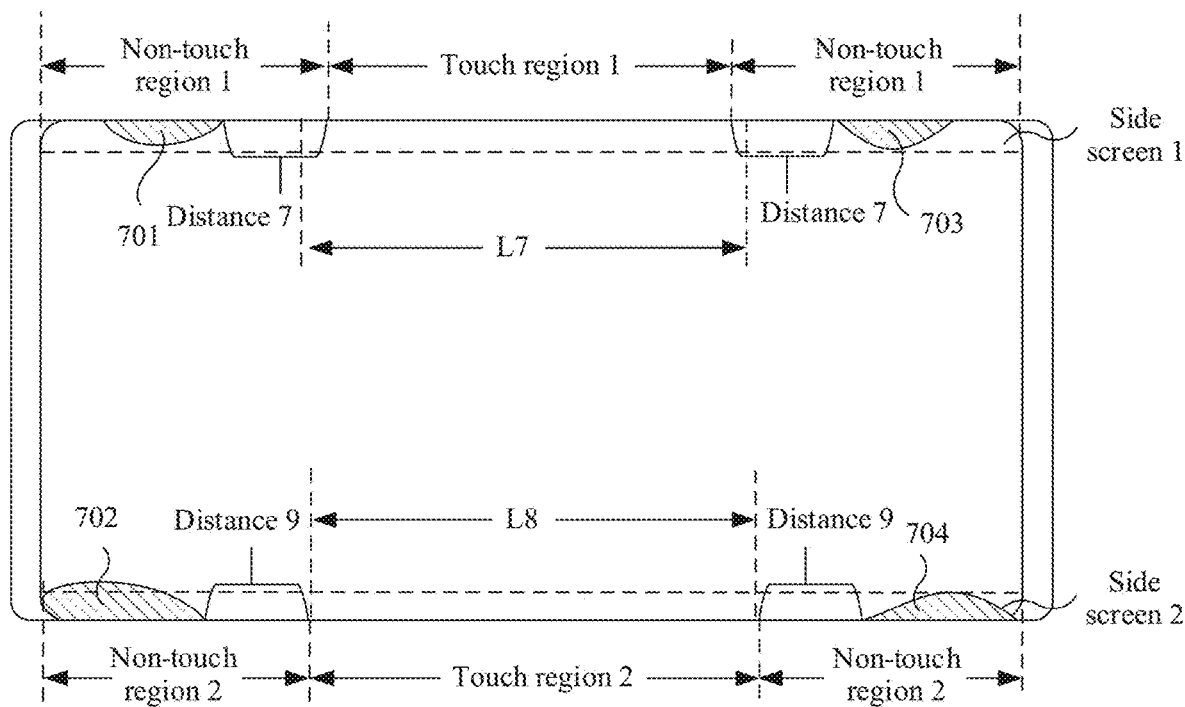
FIG. 39A to FIG. 39G are schematic diagrams of a touch region and a non-touch region according to an embodiment of this application.
Figure 39B:
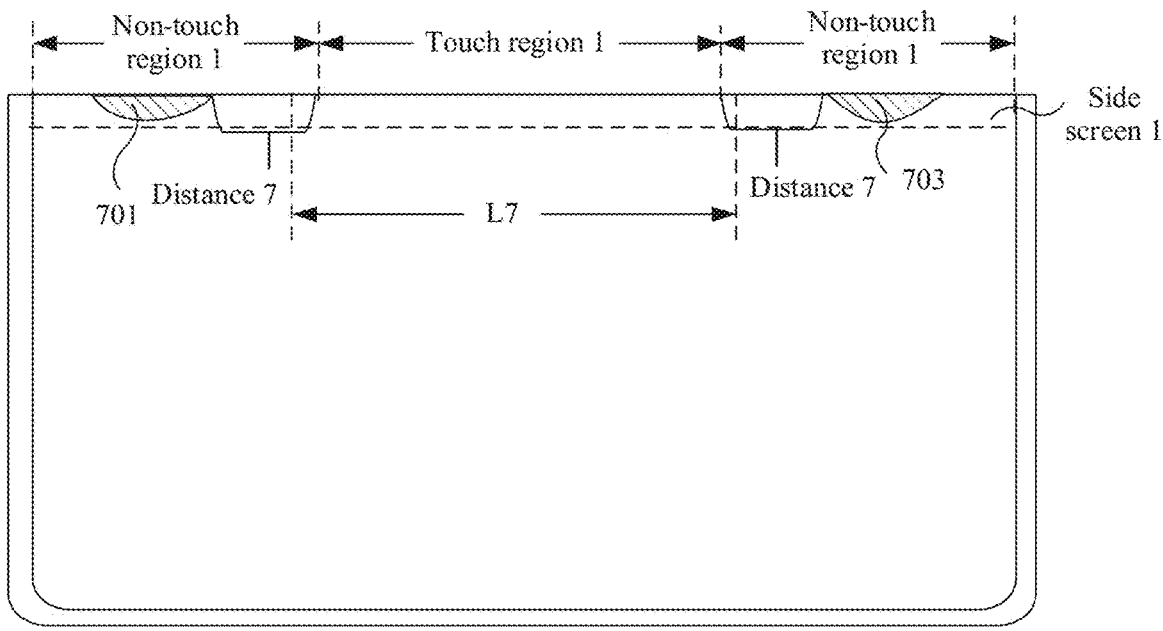
Figure 39C:
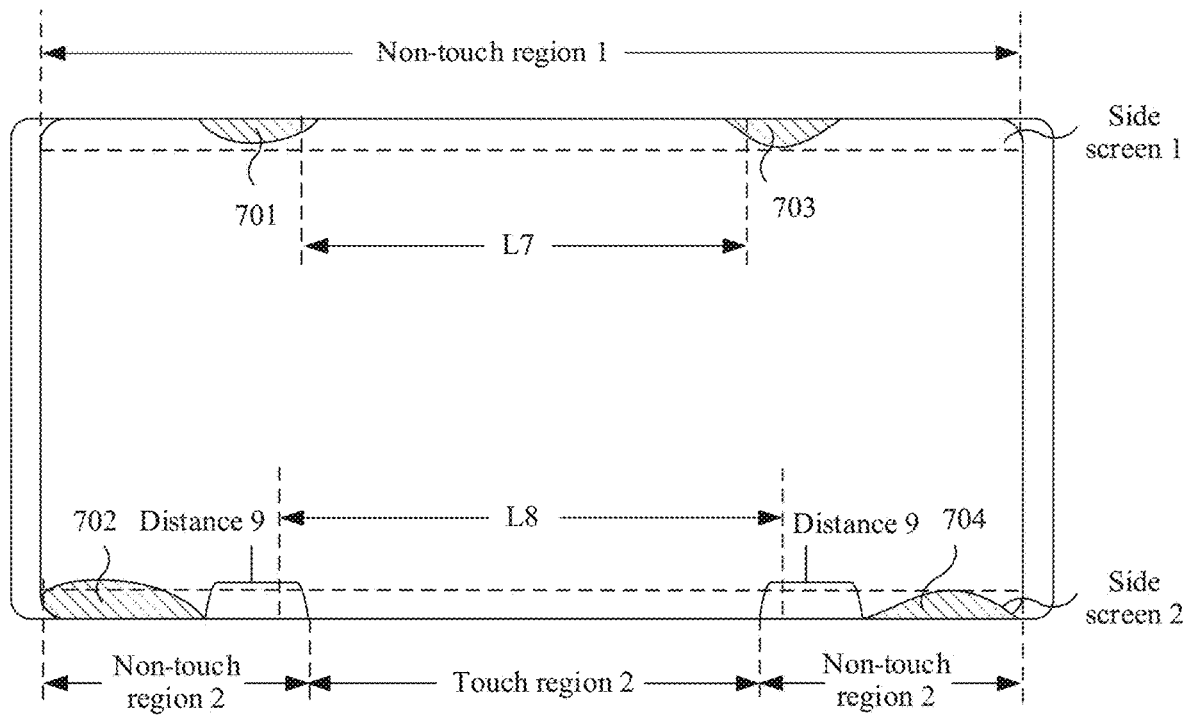
Figure 39D:
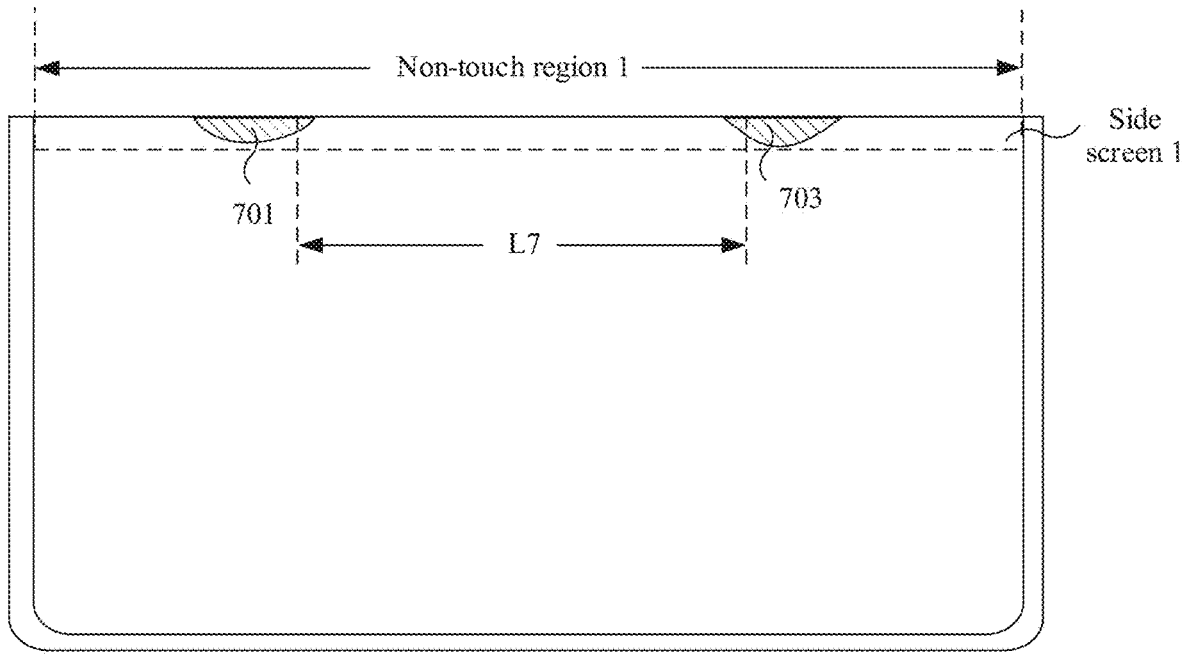
Figure 39E:
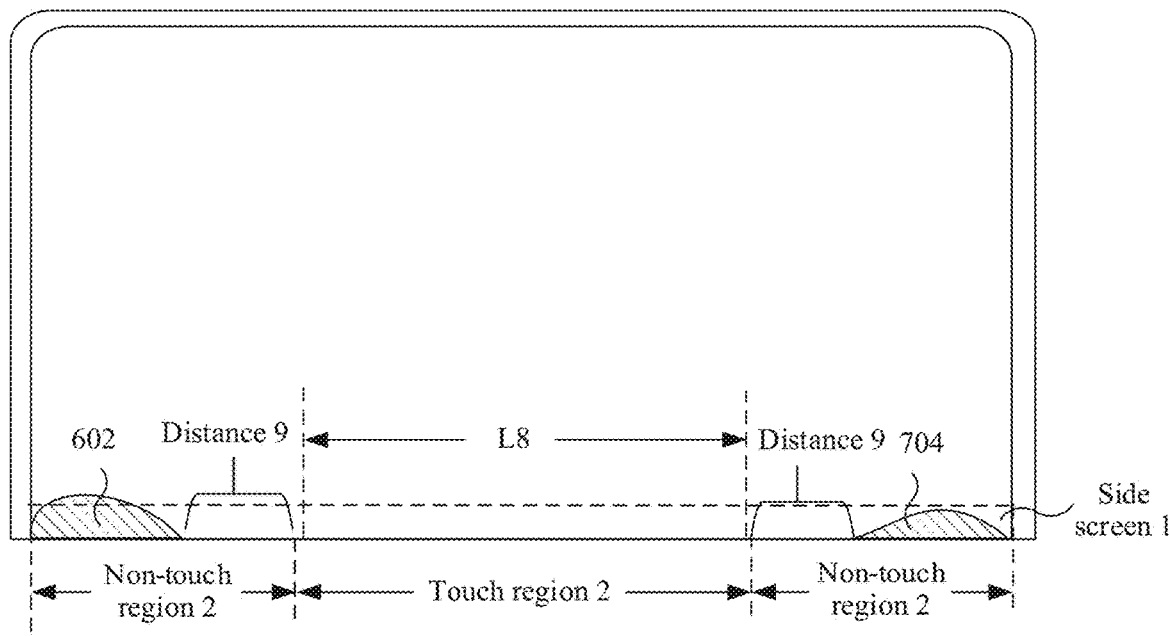

Similarly, for an electronic device with only one side screen shown in FIG. 39E, a touch region and a non-touch region on the side screen may also be determined according to the foregoing implementation. Details are not described herein again.

Figure 39F:
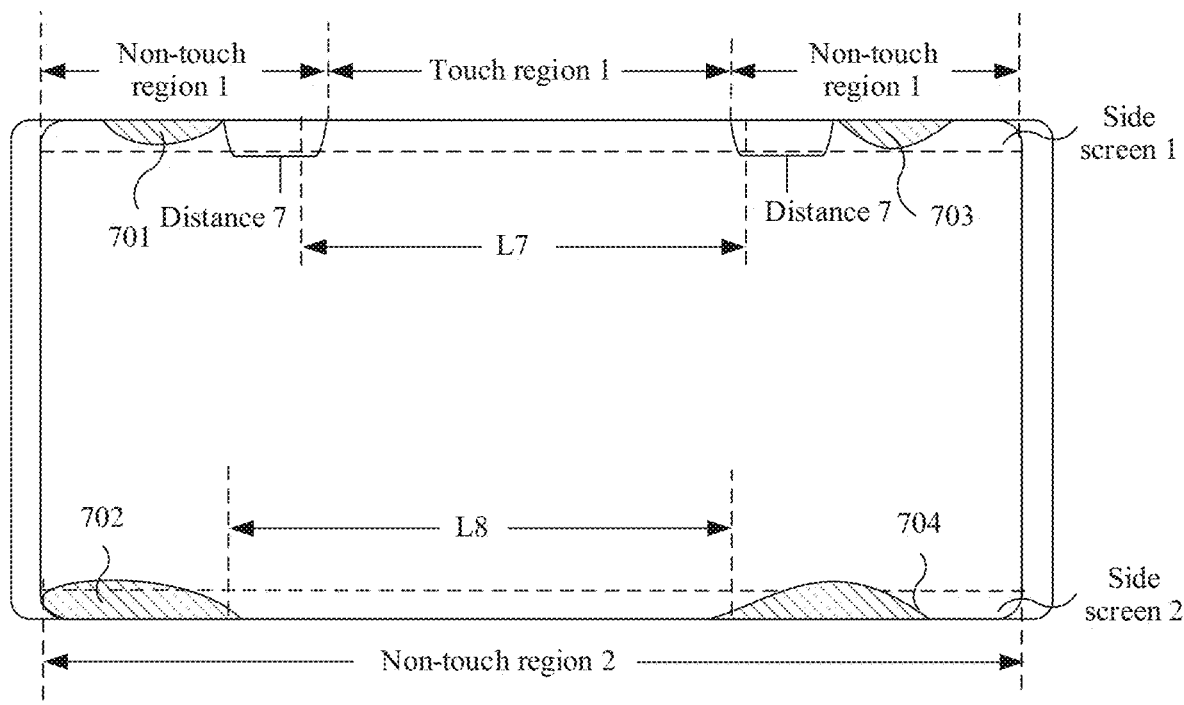
Figure 39G:
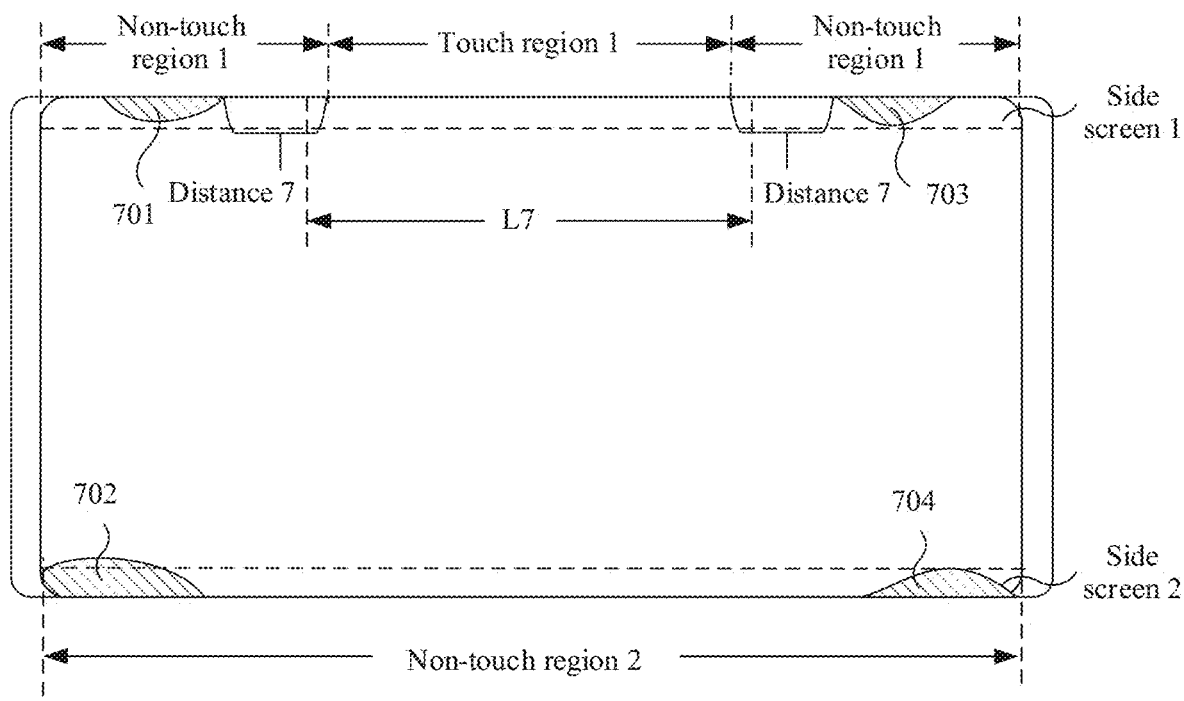

In some embodiments of this application, as shown in FIG. 39G, when the electronic device determines that one side screen includes two thumb-index web contact surfaces, the electronic device determines that the entire side screen is a non-touch region.

In some embodiments of this application, when the electronic device determines that the electronic device is in landscape mode, and one side screen includes two thumb-index web contact surfaces, the electronic device determines that the entire side screen is a non-touch region.

In the implementation 2, determining the touch region and the non-touch region on the side screen may specifically include but is not limited to a case 7 to a case 12.

Case 7:

In some embodiments of this application, the electronic device includes two side screens. When a side contact surface on one side screen includes a thenar contact surface, and a side contact surface on the other side screen includes a contact surface set, the electronic device determines that the user longitudinally holds the electronic device with one hand. Then, the electronic device determines a touch region and a non-touch region on each side screen based on locations of the thenar contact surface and the contact surface set on the side screens.

For example, as shown in FIG. 37A to FIG. 37D, the electronic device includes the side screen 1 and the side screen 2. When the side contact surface on the side screen 1 includes the thenar contact surface 301, and the side contact surface on the side screen 2 includes the contact surface set 302, the electronic device determines that the user longitudinally holds the electronic device with a left hand. Then, the electronic device determines the touch region and the non-touch region on each side screen based on locations of the thenar contact surface 301 and the contact surface set 302 on the side screens.

For example, in some embodiments, as shown in FIG. 37A, when the shortest distance between the thenar contact surface 301 and the top of the side screen 1 is greater than or equal to L1, and the shortest distance between the contact surface set 302 and the top of the side screen 2 is greater than or equal to L2, the electronic device determines that the touch region 1 on the side screen 1 is located between the top of the side screen 1 and the thenar contact surface 301, and the touch region 2 on the side screen 2 is located between the top of the side screen 1 and the contact surface set 302. As shown in FIG. 37B, when the shortest distance between the thenar contact surface 301 and the top of the side screen 1 is less than L1, and the shortest distance between the contact surface set 302 and the top of the side screen 2 is greater than or equal to L2, the electronic device determines that the entire side screen 1 is the non-touch region 1, and the touch region 2 on the side screen 2 is located between the top of the side screen 2 and the contact surface set 302. As shown in FIG. 37C, when the shortest distance between the thenar contact surface 301 and the top of the side screen 1 is greater than or equal to L1, and the shortest distance between the contact surface set 302 and the top of the side screen 2 is less than L2, the electronic device determines that the touch region 1 on the side screen 1 is located between the top of the side screen 1 and the thenar contact surface 301, and the entire side screen 2 is a non-touch region. As shown in FIG. 37D, when the shortest distance between the thenar contact surface 301 and the top of the side screen 1 is less than L1, and the shortest distance between the contact surface set 302 and the top of the side screen 2 is less than L2, the electronic device determines that the entire side screen 1 is the non-touch region 1 and the entire side screen 2 is the non-touch region 2. As shown in FIG. 37A to FIG. 37D, when the touch region 1 exists on the side screen 1, the shortest distance between the touch region 1 and the thenar contact surface 301 is equal to the distance 1. When the touch region 2 exists on the side screen 2, the shortest distance between the touch region 2 and the contact surface set 302 is equal to the distance 3. In some embodiments, the shortest distance between the touch region 1 and the top of the side screen is the distance 2, and the shortest distance between the touch region 2 and the top of the side screen is the distance 4.

In some embodiments of this application, when the electronic device determines that the side contact surface on the side screen 1 includes a thenar contact surface, and the side contact surface on the side screen 2 includes a contact surface set of finger grasping contact surfaces, the electronic device determines that the user longitudinally holds the electronic device with a right hand. Then, the electronic device determines a touch region and a non-touch region on each side screen based on locations of the thenar contact surface and the contact surface set on the side screens. Similarly, in a right-hand longitudinal holding state, for how to determine the touch region and the non-touch region on the side screen, refer to an embodiment related to left-hand longitudinal holding. Details are not described herein again.

Case 8:

In some embodiments of this application, the electronic device includes two side screens. When side contact surfaces of the two side screens each include a thenar contact surface, the electronic device determines that the user longitudinally holds the electronic device with two hands. Then, the electronic device determines a touch region and a non-touch region on each side screen based on a location of the thenar contact surface on the side screen.

For example, as shown in FIG. 40A to FIG. 40D, when the electronic device determines that a side contact surface on a side screen 1 includes a thenar contact surface 501, and a side contact surface on a side screen 2 includes a thenar contact surface 502, the electronic device determines that the user longitudinally holds the electronic device with two hands. Then, the electronic device determines the touch region and the non-touch region on each side screen based on locations of the thenar contact surface 501 and the thenar contact surface 502 on the side screens.

Figure 40A:
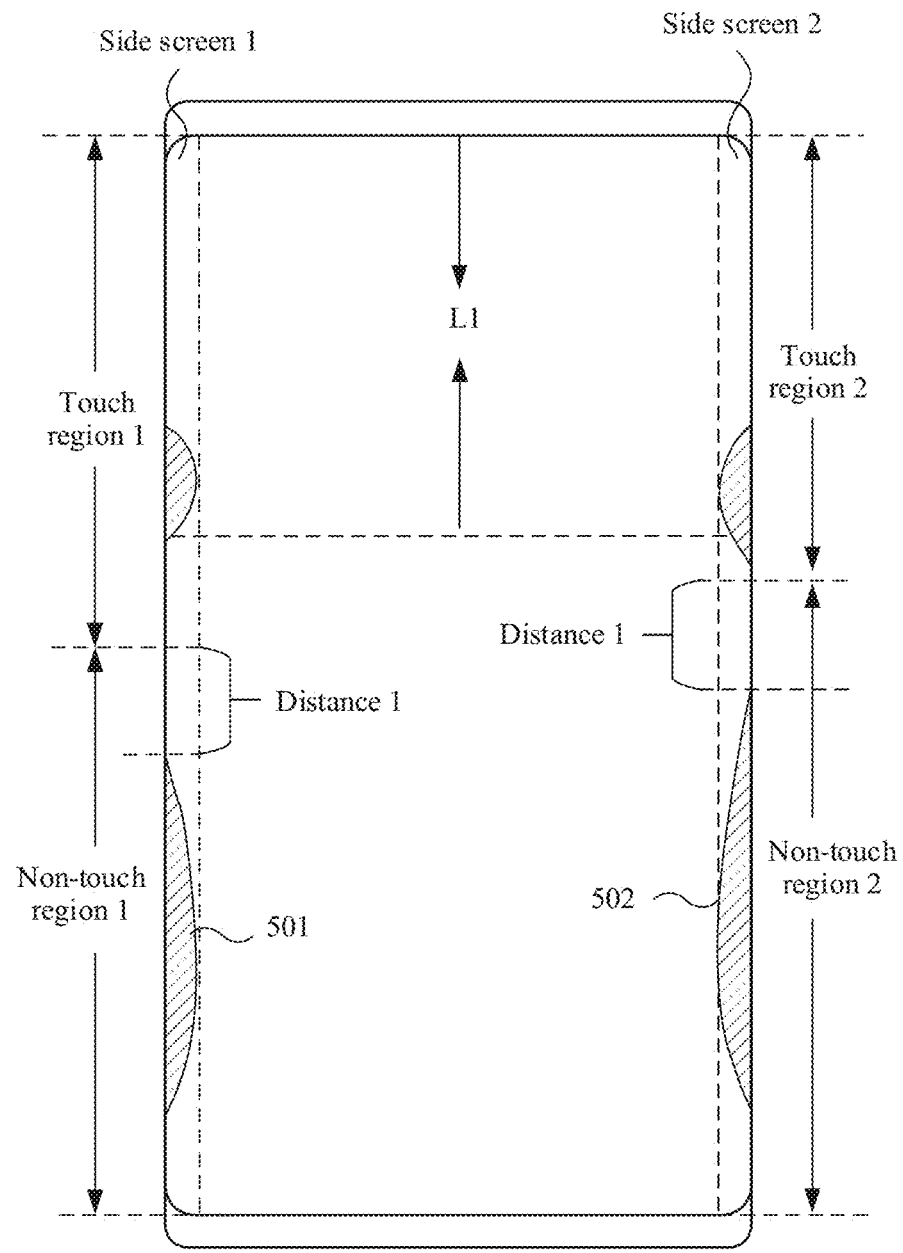
FIG. 40A to FIG. 40D are schematic diagrams of a touch region and a non-touch region according to an embodiment of this application.
Figure 40B:
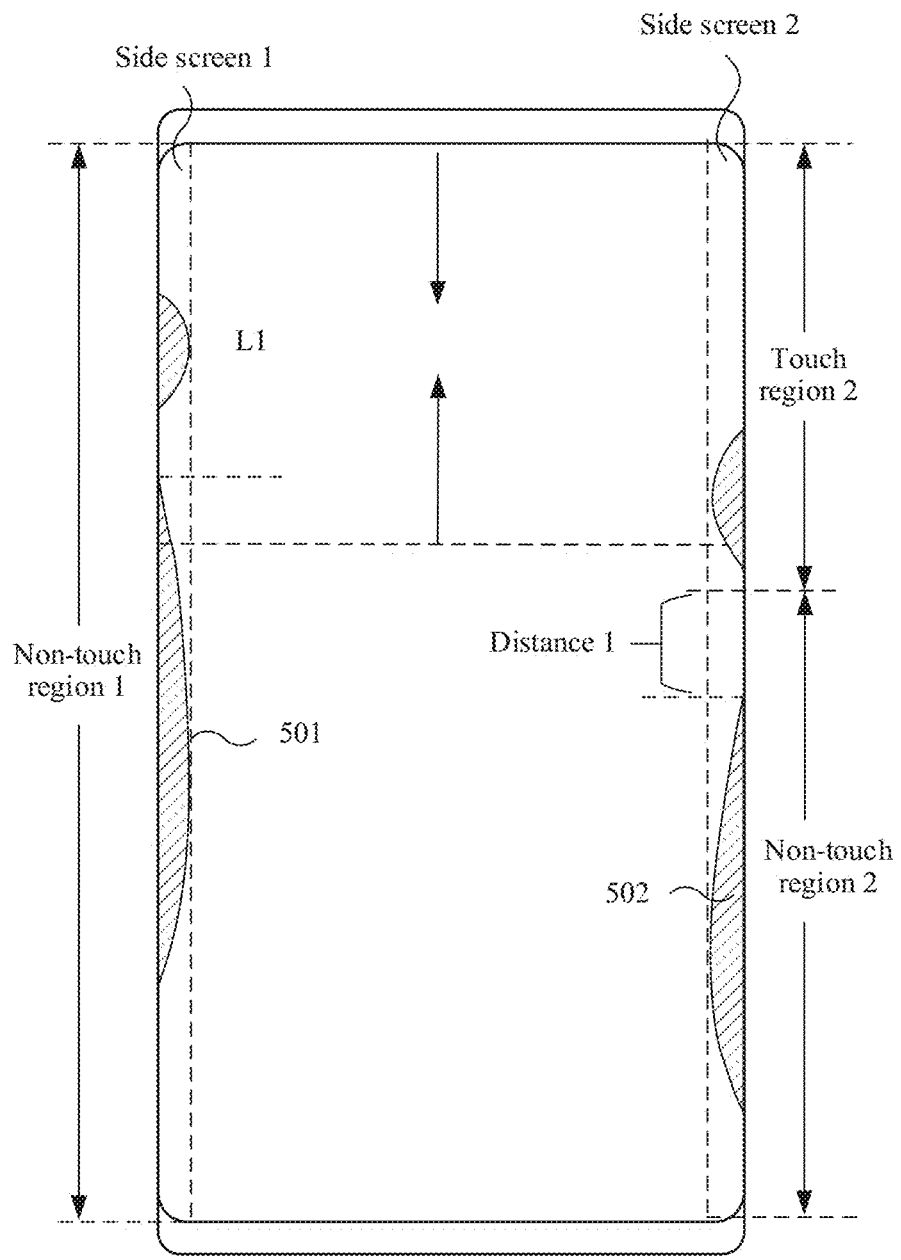
Figure 40C:
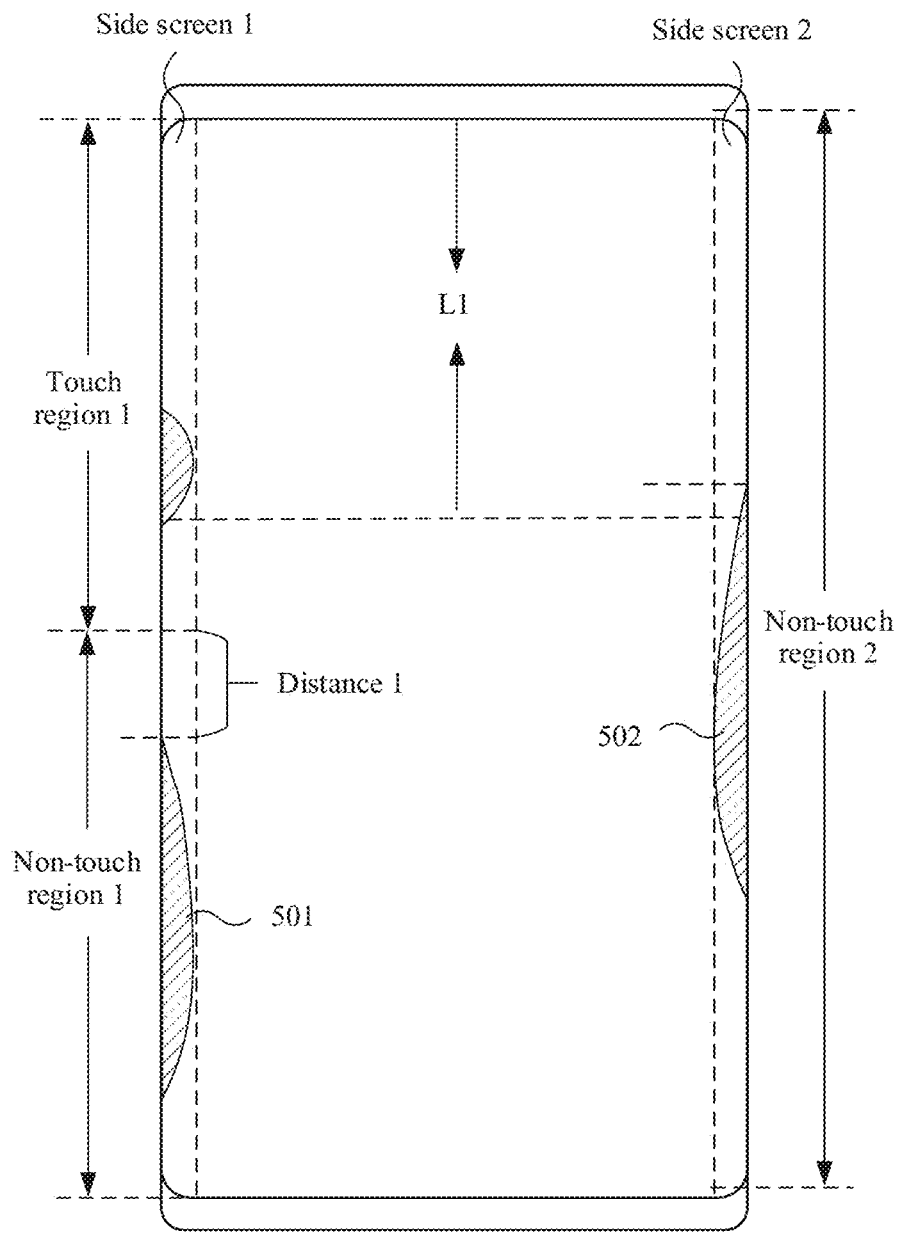
Figure 40D:
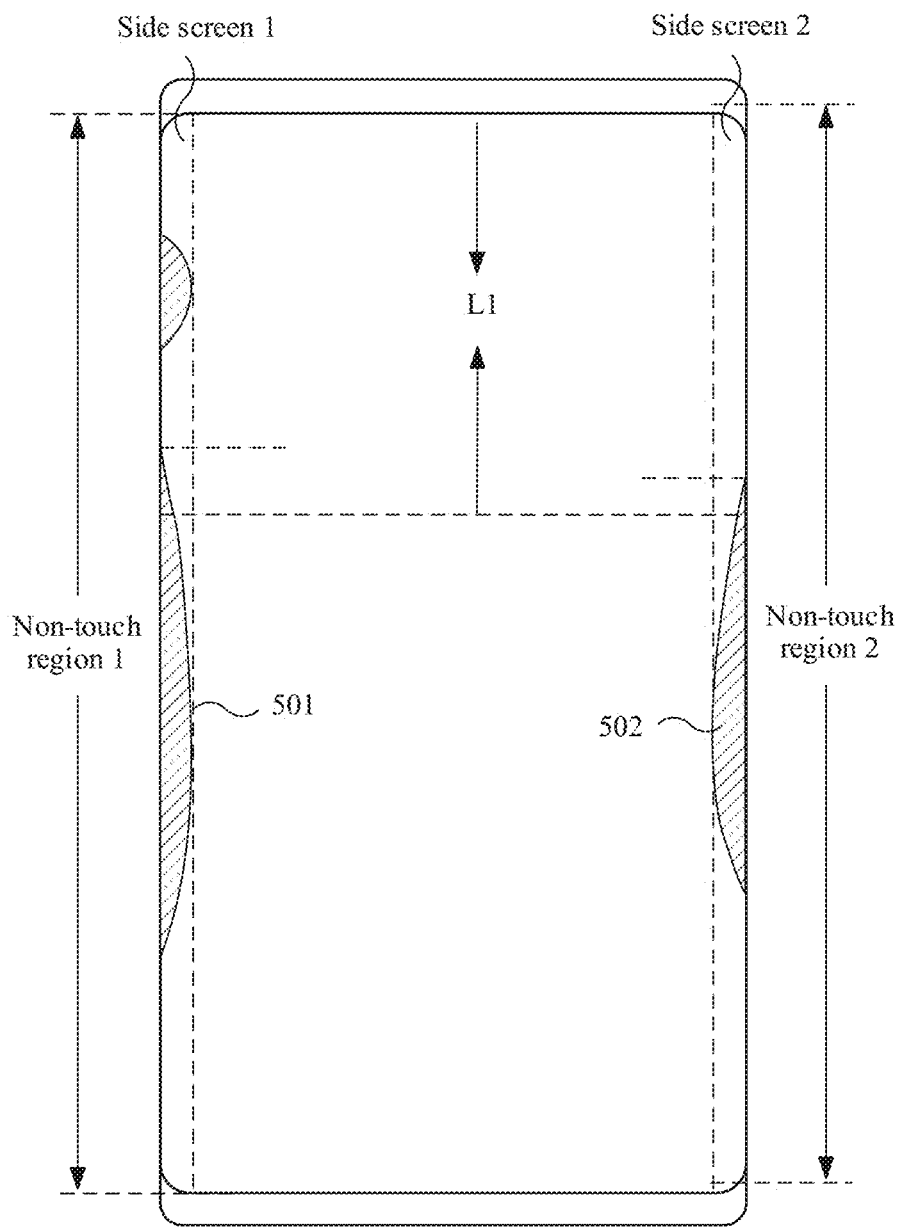

As shown in FIG. 40A, when a shortest distance between the thenar contact surface 501 and the top of the side screen 1 is greater than or equal to L1, and a shortest distance between the thenar contact surface 502 and the top of the side screen 2 is greater than or equal to L1, the electronic device determines that a touch region 1 on the side screen 1 is located between the top of the side screen 1 and the thenar contact surface 501, and a touch region 2 is located between the top of the side screen 2 and the thenar contact surface 502. As shown in FIG. 40B, when the shortest distance between the thenar contact surface 501 and the top of the side screen 1 is less than L1, and the shortest distance between the thenar contact surface 502 and the top of the side screen 2 is greater than or equal to L1, the electronic device determines that the entire side screen 1 is a non-touch region 1, and the touch region 2 on the side screen 2 is located between the top of the side screen 2 and the thenar contact surface 502. As shown in FIG. 40C, when the shortest distance between the thenar contact surface 301 and the top of the side screen 1 is greater than or equal to L1, and the shortest distance between the thenar contact surface 502 and the top of the side screen 2 is less than L1, the electronic device determines that the touch region 1 on the side screen 1 is located between the top of the side screen 1 and the thenar contact surface 301, and the entire side screen 2 is a non-touch region. As shown in FIG. 40D, when the shortest distance between the thenar contact surface 301 and the top of the side screen 1 is less than L1, and the shortest distance between the thenar contact surface 502 and the top of the side screen 2 is less than L1, the electronic device determines that the entire side screen 1 is the non-touch region 1 and the entire side screen 2 is a non-touch region 2. As shown in FIG. 40A to FIG. 40D, when the touch region 1 exists on the side screen 1, a shortest distance between the touch region 1 and the thenar contact surface 501 is equal to a distance 1; and when the touch region 2 exists on the side screen 2, a shortest distance between the touch region 1 and the thenar contact surface 502 is equal to the distance 1. In some embodiments, a distance between the touch region 1 and the top of the side screen is a distance 2, and a distance between the touch region 2 and the top of the side screen is the distance 2.

Case 9:

In some embodiments of this application, the electronic device includes two side screens. The electronic device determines that a side contact surface on one side screen includes a finger putting contact surface, a side contact surface on the other side screen includes a thumb-index web contact surface, a distance between the finger putting contact surface and the top of an end of the side screen is greater than or equal to L5, and a distance between the thumb-index web contact surface and the top of a same end of the other side screen is greater than or equal to L6. In this case, the electronic device determines that the user horizontally holds the electronic device with one hand. The electronic device determines a touch region and a non-touch region on each side screen based on locations of the finger putting contact surface and the thumb-index web contact surface.

In some embodiments of this application, for example, as shown in FIG. 38A, the electronic device determines that a side contact surface on the side screen 1 includes only the finger putting contact surface 601, a side contact surface on the side screen 2 includes only the thumb-index web contact surface 602, the distance between the finger putting contact surface 601 and the top of the right end of the side screen 1 is greater than or equal to L5, and the distance between the thumb-index web contact surface 602 and the top of the right end of the side screen 2 is greater than or equal to L6. In this case, the electronic device determines that the user horizontally holds the electronic device with a left hand. The electronic device determines that the touch region 1 on the side screen 1 is located between the right end of the side screen 1 and the finger putting contact surface 601, and determines that the touch region 2 on the side screen 2 is located between the right end of the side screen 2 and the thumb-index web contact surface 602. The shortest distance between the touch region 1 and the finger putting contact surface 601 is equal to the distance 7, and the shortest distance between the touch region 2 and the thumb-index web contact surface 602 is equal to the distance 9.

In some embodiments, the electronic device determines that the electronic device is in landscape mode, the side screen 1 is above the side screen 2, the side contact surface on the side screen 1 includes only the finger putting contact surface 601, the side contact surface on the side screen 2 includes only the thumb-index web contact surface 602, the distance between the finger putting contact surface 601 and the top of the right end of the side screen 1 is greater than or equal to L5, and the distance between the thumb-index web contact surface 602 and the top of the right end of the side screen 2 is greater than or equal to L6. In this case, the electronic device determines that the user horizontally holds the electronic device with the left hand. The electronic device determines that the touch region 1 on the side screen 1 is located between the right end of the side screen 1 and the finger putting contact surface 601, and determines that the entire side screen 2 is the non-touch region 2. The shortest distance between the touch region 1 and the finger putting contact surface 601 is equal to the distance 7.

Case 10:

In some embodiments of this application, the side screen includes two finger putting contact surfaces. When a distance between one finger putting contact surface and the top of an end of the side screen is less than a distance threshold 2, and a distance between the other finger putting contact surface and the top of another end of the side screen is also less than the distance threshold 2, the electronic device determines that the user horizontally holds the electronic device with two hands. Then, the electronic device determines a touch region and a non-touch region on the side screen based on locations of the finger putting contact surfaces.

For example, referring to FIG. 39A to FIG. 39D, the left end of the side screen 1 includes the finger putting contact surface 701, and the right end includes the finger putting contact surface 703. When the distance between the finger putting contact surface 701 and the top of the left end of the side screen 1 is less than the distance threshold 2, and the distance between the finger putting contact surface 703 and the top of the right end of the side screen 1 is less than the distance threshold 2, the electronic device determines that the user horizontally holds the electronic device with two hands. Then, as shown in FIG. 39A and FIG. 39B, when the shortest distance between the finger tapping contact surface 701 and the finger putting contact surface 703 is greater than or equal to L7, the electronic device determines that the touch region 1 on the side screen 1 is located between the finger putting contact surface 701 and the finger putting contact surface 703. As shown in FIG. 39C and FIG. 39D, when the shortest distance between the finger putting contact surface 701 and the finger putting contact surface 703 is less than L7, the electronic device determines that the entire side screen 1 is the non-touch region 1. The shortest distance between the touch region 1 and the finger putting contact surface 701 is equal to the distance 7, and the shortest distance between the touch region 1 and the finger putting contact surface 703 is also the distance 7.

In some embodiments, when the electronic device determines that the electronic device is in landscape mode, the side screen 1 includes the finger putting contact surface 701 and the finger putting contact surface 703, the distance between the finger putting contact surface 701 and the top of the left end of the side screen 1 is less than the distance threshold 2, and the distance between the finger putting contact surface 703 and the top of the right end of the side screen 1 is less than the distance threshold 2, the electronic device determines that the user horizontally holds the electronic device with two hands. Then, the electronic device determines the touch region and the non-touch region on the side screen based on the locations of the finger putting contact surfaces. For details, refer to the foregoing embodiments. Details are not described herein again.

Case 11:

In some embodiments of this application, the side screen includes two thumb-index web contact surfaces. When a distance between one thumb-index web contact surface and the top of an end of the side screen is less than a distance threshold 3, and a distance between the other thumb-index web contact surface and the top of another end of the side screen is also less than the distance threshold 3, the electronic device determines that the user horizontally holds the electronic device with two hands. Then, the electronic device determines a touch region and a non-touch region on the side screen based on locations of the thumb-index web contact surfaces.

For example, referring to FIG. 39A to FIG. 39D, the left end of the side screen 2 includes the thumb-index web contact surface 702 and the right end includes the thumb-index web contact surface 704. When a distance between the thumb-index web contact surface 702 and the top of the left end of the side screen 2 is less than the distance threshold 3, and a distance between the thumb-index web contact surface 704 and the top of the right end of the side screen 2 is less than the distance threshold 3, the electronic device determines that the user horizontally holds the electronic device with two hands. Then, as shown in FIG. 39A and FIG. 39E, when the shortest distance between the thumb-index web contact surface 702 and the thumb-index web contact surface 704 on the side screen 2 is greater than or equal to L8, the electronic device determines that the touch region 2 on the side screen 2 is located between the thumb-index web contact surface 702 and the thumb-index web contact surface 704. As shown in FIG. 39F, when the shortest distance between the thumb-index web contact surface 702 and the thumb-index web contact surface 704 on the side screen 2 is less than L8, the electronic device determines that the entire side screen 2 is the non-touch region 2. The shortest distance between the touch region 2 and each of the two thumb-index web contact surfaces is equal to the distance 9.

In some embodiments of this application, as shown in FIG. 39G, when the electronic device determines that one side screen includes two thumb-index web contact surfaces, the electronic device determines that the user horizontally holds the electronic device with two hands. Then, the electronic device determines that the entire side screen is a non-touch region.

In some embodiments of this application, when the electronic device determines that the electronic device is in landscape mode, and one side screen includes two thumb-index web contact surfaces, the electronic device determines that the user horizontally holds the electronic device with two hands. Then, the electronic device determines that the entire side screen is a non-touch region.

Case 12:

In some embodiments of this application, the electronic device includes two side screens. When one side screen includes two finger putting contact surfaces, and the other side screen includes two thumb-index web contact surfaces, the electronic device determines that the user horizontally holds the electronic device with two hands. Then, the electronic device determines a touch region and a non-touch region on each side screen based on locations of the finger putting contact surfaces and the thumb-index web contact surfaces.

In some embodiments of this application, for example, referring to FIG. 39A, FIG. 39C, FIG. 39F, and FIG. 39G, when the left end of the side screen 1 includes the finger putting contact surface 701, the right end of the side screen 1 includes the finger putting contact surface 703, the left end of the side screen 2 includes the thumb-index web contact surface 702, and the right end of the side screen 2 includes the thumb-index web contact surface 704, the electronic device determines that the user horizontally holds the electronic device with two hands. In some embodiments, as shown in FIG. 39A, when the shortest distance between the finger putting contact surface 701 and the finger putting contact surface 703 is greater than or equal to L7, and the shortest distance between the thumb-index web contact surface 702 and the thumb-index web contact surface 704 is greater than or equal to L8, the electronic device determines that the touch region 1 on the side screen 1 is located between the finger putting contact surface 701 and the finger putting contact surface 703, and the touch region 2 on the side screen 2 is located between the thumb-index web contact surface 702 and the thumb-index web contact surface 704. In some embodiments, as shown in FIG. 39C, when the shortest distance between the finger putting contact surface 701 and the finger putting contact surface 703 is less than L7, and the shortest distance between the thumb-index web contact surface 702 and the thumb-index web contact surface 704 is greater than or equal to L8, the electronic device determines that the entire side screen 1 is the non-touch region 1, and the touch region 2 on the side screen 2 is located between the thumb-index web contact surface 702 and the thumb-index web contact surface 704. In some embodiments, as shown in FIG. 39F, when the shortest distance between the finger putting contact surface 701 and the finger putting contact surface 703 is greater than or equal to L7, and the shortest distance between the thumb-index web contact surface 702 and the thumb-index web contact surface 704 is less than L8, the electronic device determines that the touch region 1 on the side screen 1 is located between the finger putting contact surface 701 and the finger putting contact surface 703, and the entire side screen 2 is the non-touch region 2. The shortest distance between the touch region 1 and each of the two finger putting contact surfaces is equal to the distance 7, and the shortest distance between the touch region 2 and each of the two thumb-index web contact surfaces is equal to the distance 9. In another implementation, as shown in FIG. 39G, the electronic device determines that the entire side screen 2 is the non-touch region 2.

In the implementation 3, determining the touch region and the non-touch region on the side screen may specifically include but is not limited to the following case.

Case 13:

For the surround display shown in FIG. 6A and the foldable display shown in FIG. 7A, when the user longitudinally grasps the electronic device, the grasping surface of the palm of the user also includes the display screen. For example, when the user longitudinally grasps the electronic device with a left hand, FIG. 41A to FIG. 41D are schematic diagrams of a contact surface 304 between the palm of the user and the rear screen of the electronic device. It may be understood that, because the palm is not planar, a formed contact surface may also be irregular, and the contact surface 304 may include a plurality of independent contact surfaces. The contact surface 304 is merely a schematic diagram provided in this embodiment of this application, and constitutes no limitation on this embodiment of this application.

In some embodiments of this application, the electronic device determines, based on touch information of the contact surface 304 on the rear screen, that the user longitudinally holds the electronic device with one hand, to further determine the touch region and the non-touch region on the side screen.

Figure 41A:
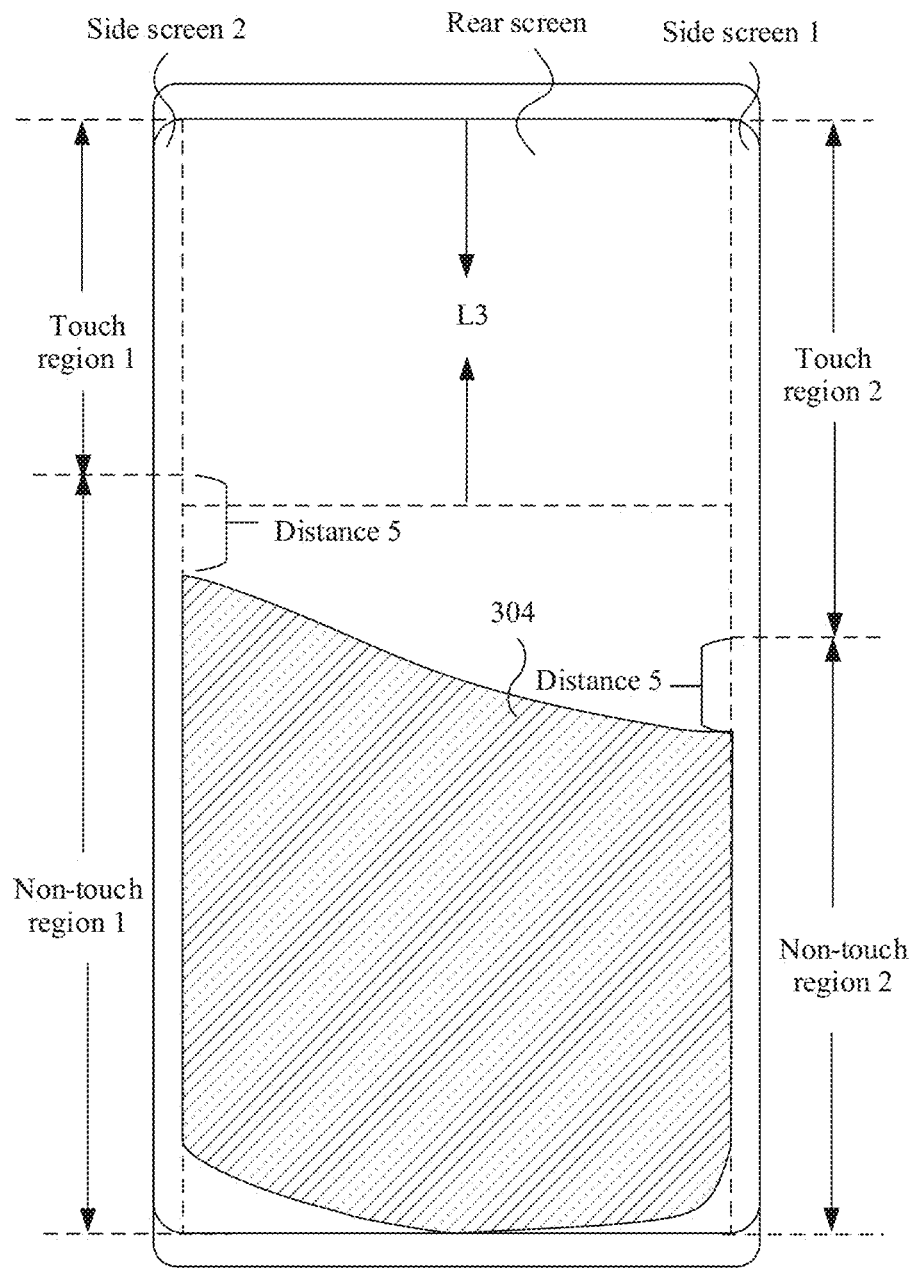
FIG. 41A to FIG. 41F are schematic diagrams of a touch region and a non-touch region according to an embodiment of this application.
Figure 41B:
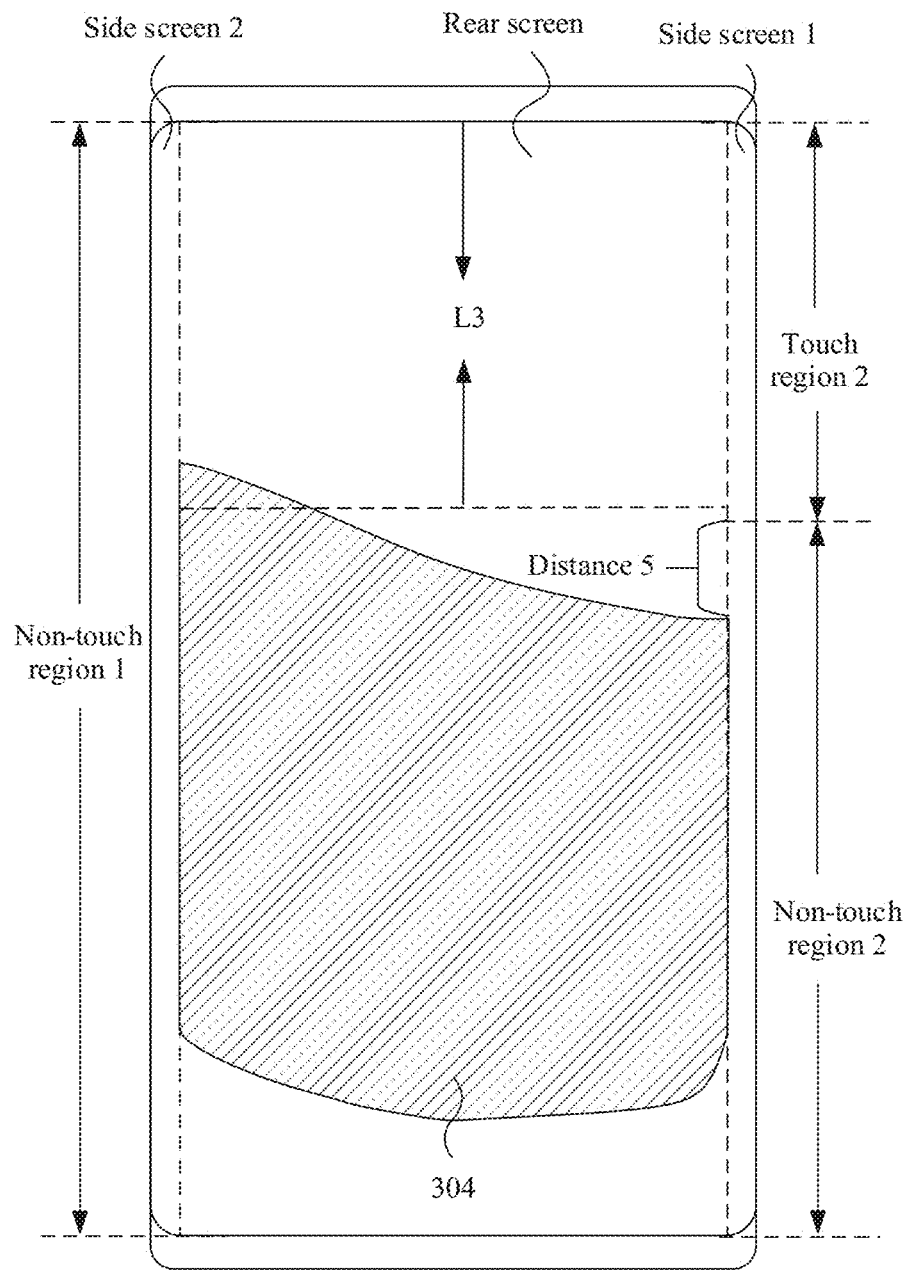

For example, as shown in FIG. 41A, when a shortest distance between a left side of the contact surface 304 and the top of a display 194 is greater than or equal to L3, a side screen 1 includes a touch region 1, a shortest distance between the touch region 1 and the left side of the contact surface 304 is a distance 5, and a distance between the touch region 1 and the top of the side screen is a distance 6. As shown in FIG. 41B, when the shortest distance between the left side of the contact surface 304 and the top of the display 194 is less than L3, the side screen 1 is a non-touch region 1.

Figure 41C:
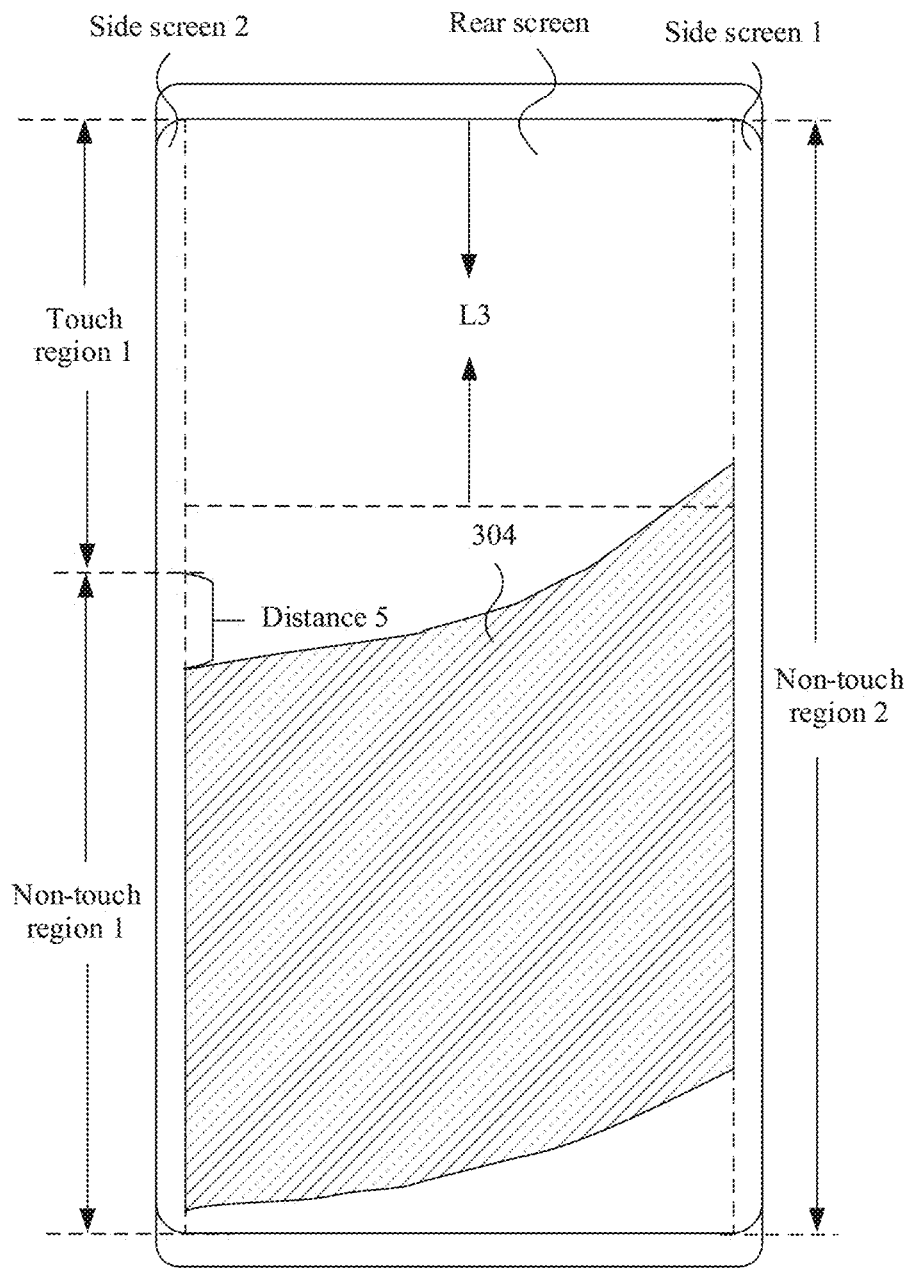
Figure 41D:
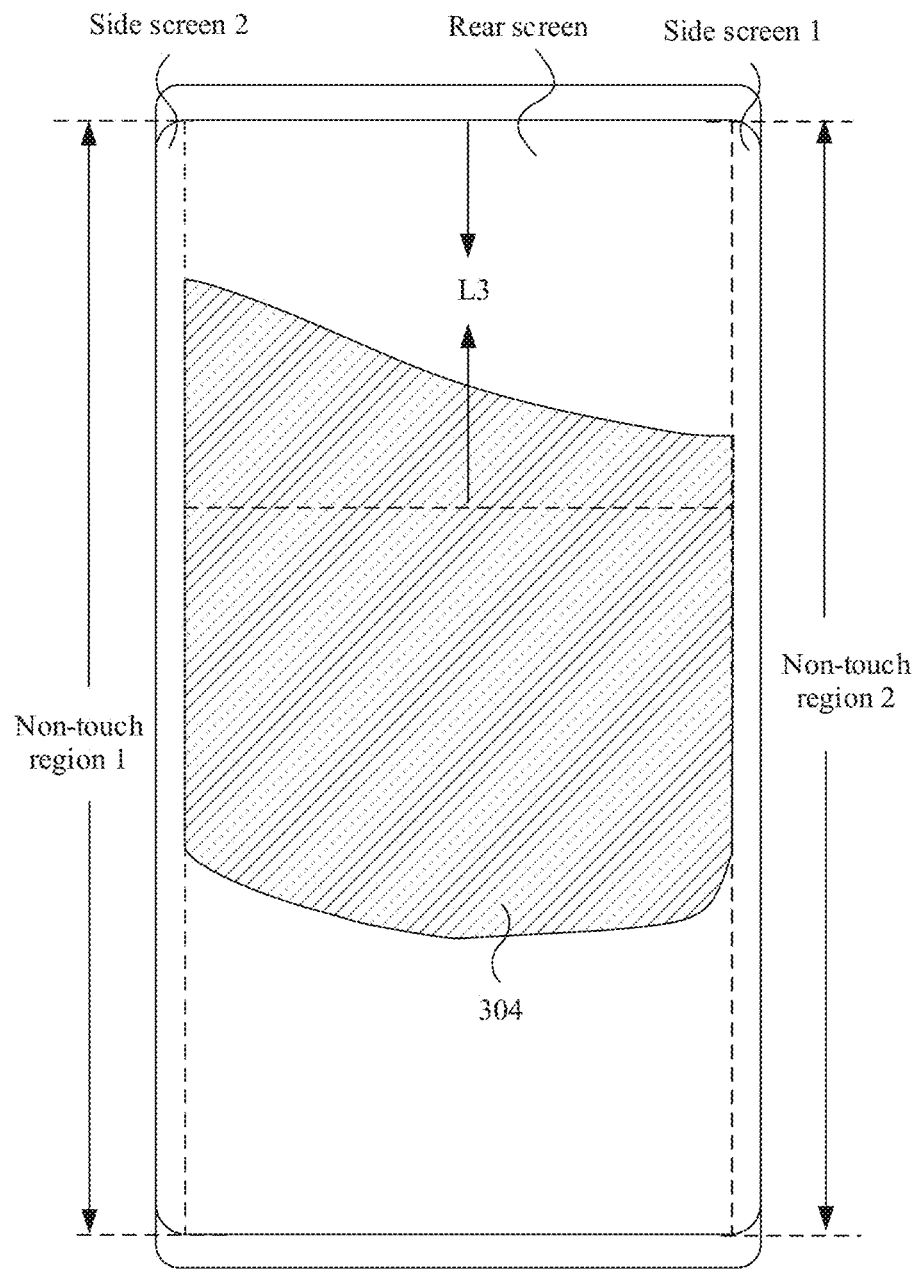

Similarly, as shown in FIG. 41A and FIG. 41B, when a shortest distance between a right side of the contact surface 304 and the top of the display 194 is greater than or equal to L3, a side screen 2 includes a touch region 2, a shortest distance between the touch region 2 and the left side of the contact surface 304 is the distance 5, and a distance between the touch region 2 and the top of the side screen is the distance 6. As shown in FIG. 41C and FIG. 41D, when the shortest distance between the right side of the contact surface 304 and the top of the display 194 is less than L3, the side screen 2 is a non-touch region 2. It can be learned from FIG. 41D that the shortest distance between the left side of the contact surface 304 and the top of the display 194 and the shortest distance between the right side of the contact surface 304 and the top of the display 194 are both less than L3. In this case, both the side screen 1 and the side screen 2 are non-touch regions.

In some embodiments of this application, when the user longitudinally grasps the electronic device, the rear screen may also exchange information with the user. The electronic device may further determine a touch region and a non-touch region on the rear screen based on a location of the contact surface 304.

Figure 41E:
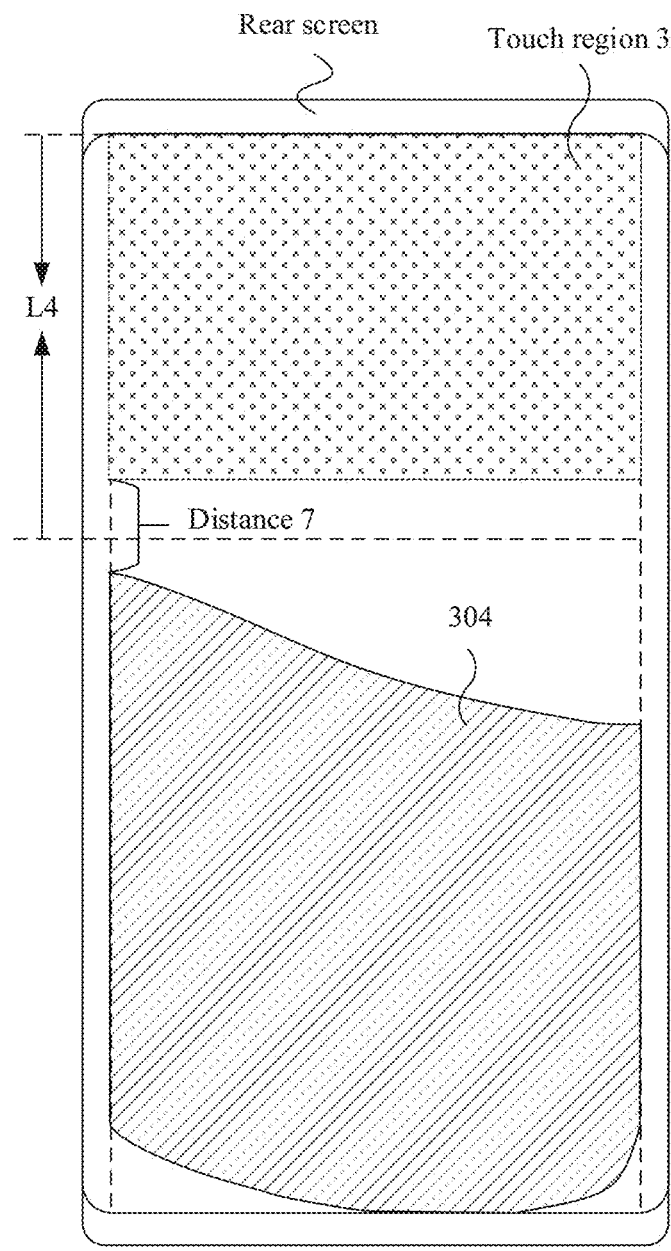
Figure 41F:
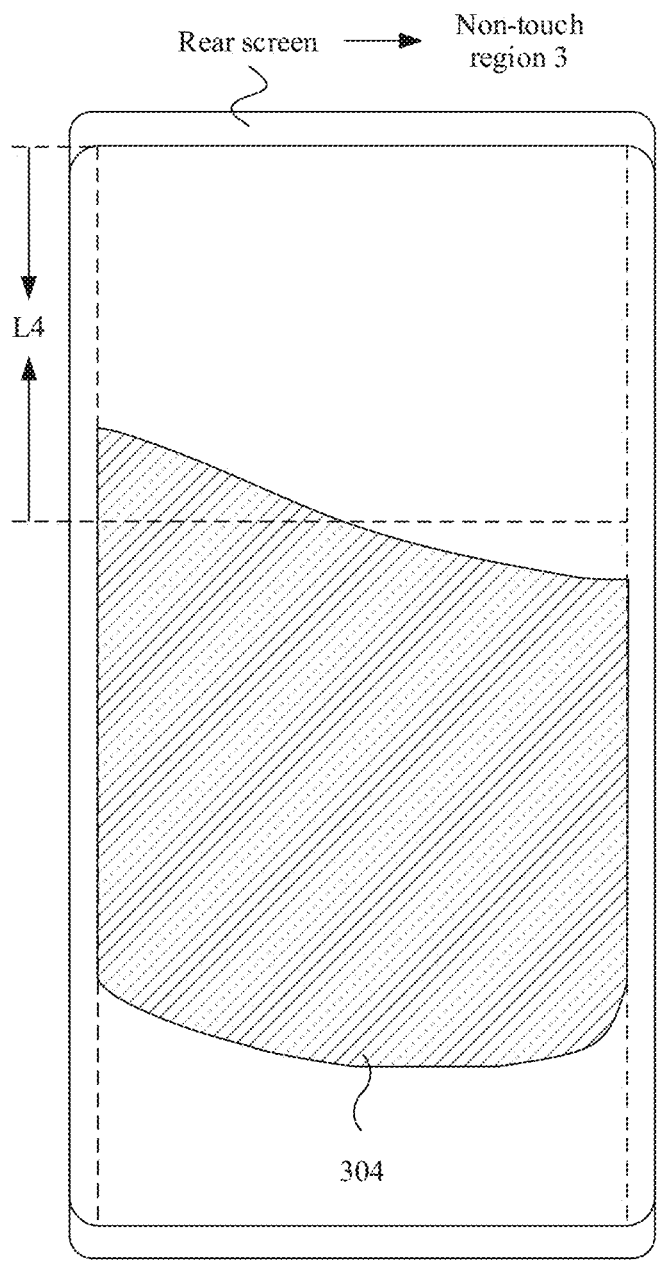

For example, as shown in FIG. 41E, when a shortest distance between the contact surface 304 and the top of the display 194 is greater than or equal to L4, the rear screen includes a touch region 3, and a shortest distance between the touch region 3 and the contact surface 304 along the long side of the electronic device is a distance 11. As shown in FIG. 41F, when the shortest distance between the contact surface 304 and the top of the display 194 is less than L4, the rear screen is a non-touch region.

In this embodiment of this application, any two parameters in the distance 1, the distance 3, the distance 5, the distance 7, and the distance 9 may or may not be equal; any two parameters in the distance 2, the distance 4, the distance 6, the distance 7, and the distance 8 may or may not be equal; any two parameters in L1, L2, L3, L4, L5, and L6 may or may not be equal; and L7 and L8 may or may not be equal. These are not specifically limited herein.

In this embodiment of this application, L1 may also be referred to as a first preset value, L2 may also be referred to as a second preset value, L5 may also be referred to as a third preset value, L6 may also be referred to as a fourth preset value, L7 may also be referred to as a fifth preset value, and L8 may also be referred to as a sixth preset value.

It can be learned from FIG. 29 that, when the user does not hold the electronic device, a touch operation 1 performed on the side screen may trigger a function 1, and a touch operation 2 performed on the side screen may trigger a function 2. In this embodiment of this application, after the electronic device determines the touch region and the non-touch region on the side screen based on a contact surface held by the user, the electronic device responds only to a touch operation performed on the touch region on the side screen.

In some embodiments of this application, a control is displayed on the side screen of the electronic device. The electronic device determines the touch region on the side screen based on the contact surface held by the user, and adjusts the control to be displayed in the touch region on the side screen. The electronic device detects the touch operation 1 performed on the foregoing control in the touch region, and starts, in response to the touch operation 1, the function 1 triggered by the touch operation 1.

Figure 42:
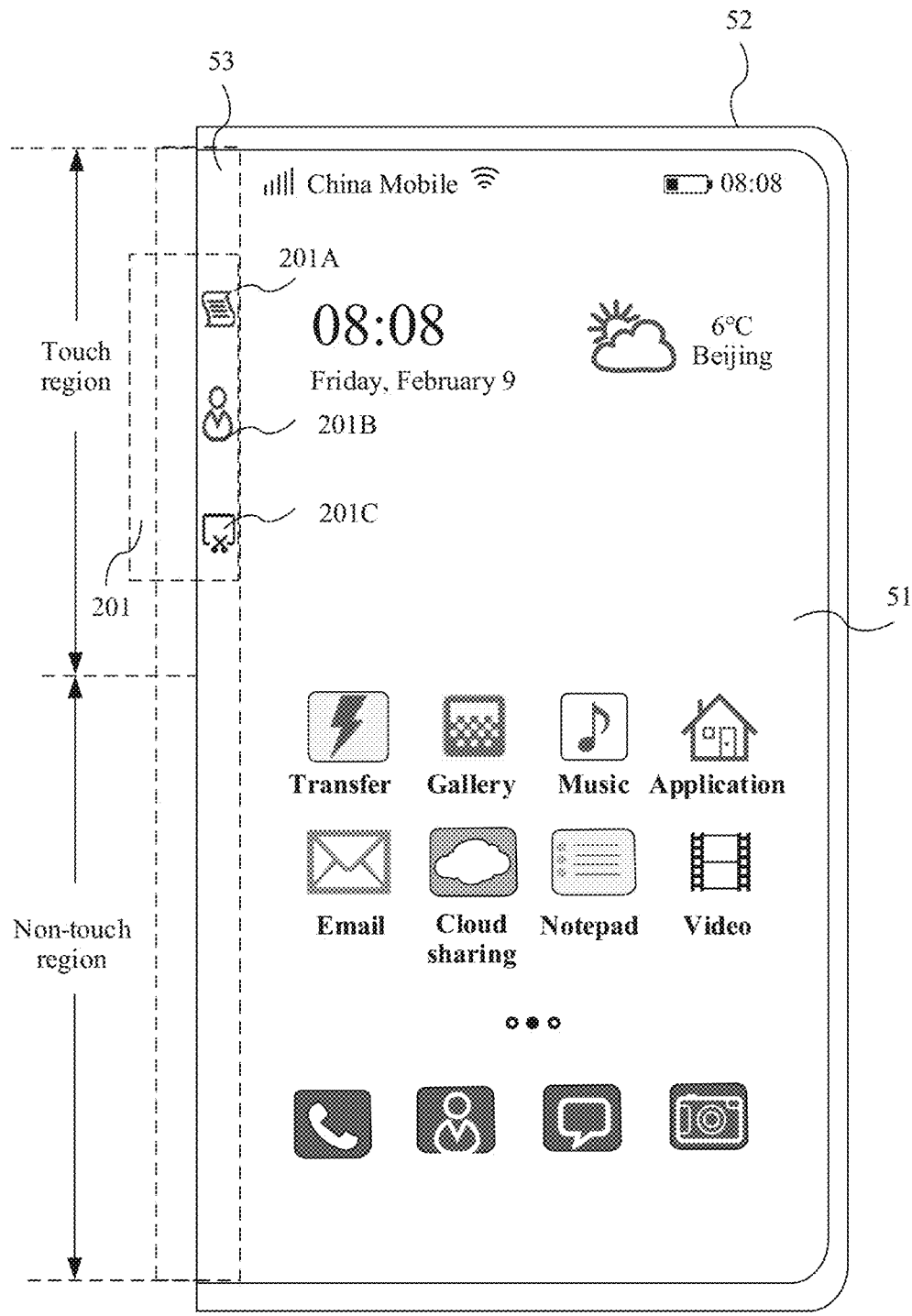
FIG. 42 is a schematic diagram of display content of a side screen according to an embodiment of this application.

For example, as shown in FIG. 42, after determining the touch region on the side screen based on the contact surface held by the user, the electronic device adjusts a control box 201 on the side screen to be displayed in the touch region on the side screen.

In another implementation, no control is displayed on the side screen of the electronic device, and the electronic device determines the touch region on the side screen based on the grasping contact surface of the user. The electronic device may identify the touch operation 2 based on a touch track, touch duration, and the like of the touch operation 2 on the touch region on the side screen, to determine and enable the function 2 triggered by the touch operation 2.

It may be understood that when the user holds the electronic device, the electronic device determines the touch region on the side screen based on the contact surface held by the user, and the touch region on the side screen may exchange information with the user, to provide a preset function of the side screen. In other words, a touch operation triggering the preset function needs to be performed on the touch region on the side screen.

The following describes how to determine a type of a side contact surface.

Figure 44:
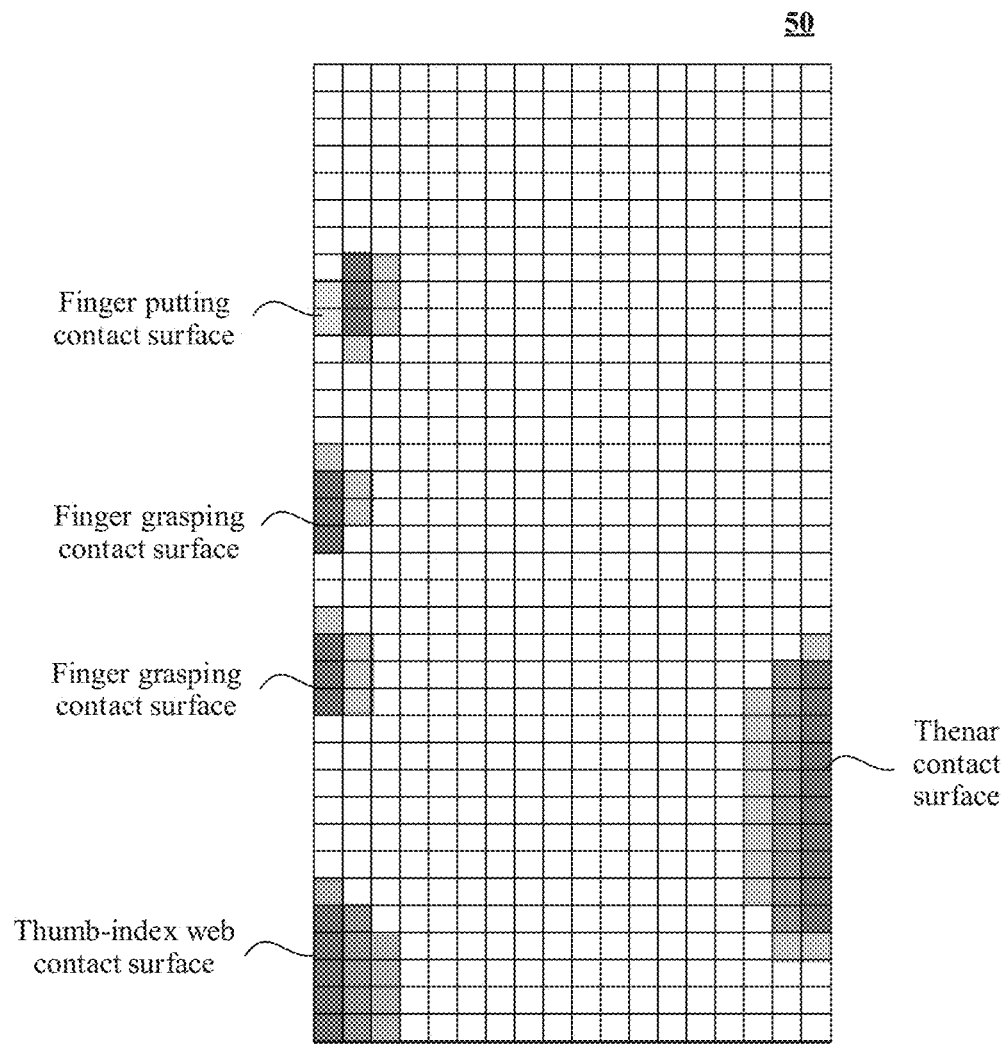
FIG. 44 is a schematic diagram of a capacitance signal of a contact surface according to an embodiment of this application.

For example. FIG. 44 is a schematic diagram of capacitance of a side contact surface on a touch sensor of a screen according to an embodiment of this application. A darker color of a coordinate point in FIG. 44 indicates a stronger capacitance signal value. Features of touch information of different types of side contact surfaces are different.

It should be noted that a finger tapping contact surface in a normal touch operation has the following features: A capacitance signal at a center of the contact surface is strongest; a capacitance signal at an edge is relatively weak; the contact surface is elliptical; a width of the contact surface is relatively small; and a difference between the width of the contact surface and a height of the contact surface is small. For example, the width is a width of three coordinate points, and the height is a height of three coordinate points. As shown in FIG. 44, a finger putting contact surface in the side contact surface has the following features: A feature and shape of a capacitance signal of the contact surface are similar to a feature and shape of a capacitance signal of the finger tapping contact surface; compared with the finger tapping contact surface, pressing force used when the user holds a mobile terminal to form the finger putting contact surface is greater; and therefore, an area of the contact surface is larger, and touch duration of the contact surface is longer. For example, the width is a width of three coordinate points, and the height is a height of four coordinate points.

A thenar contact surface in the side contact surface has the following features: A capacitance signal of a most edge coordinate column of the contact surface is the strongest; the farther away from a side of the display, the weaker a capacitance signal; a signal change trend is relatively smooth; a shape of the contact surface is strip-shaped; and a height of the contact surface is relatively large, and a difference from a width of the contact surface is relatively large. For example, the width is a width of three coordinate points, and the height is a height of 12 coordinate points.

A finger grasping contact surface in the side contact surface has the following features: Compared with the finger tapping contact surface, the contact surface has a relatively weak capacitance signal in a most edge coordinate column closest to a side screen; the farther away from the side of the display, the weaker a capacitance signal; the signal changes greatly; a shape of the contact surface is strip-shaped; a width of the contact surface is smaller than that of the finger tapping contact surface; and a height of the contact surface is smaller than that of the thenar contact surface. For example, the width is a width of two coordinate points, and the height is a height of four coordinate points.

A thumb-index web contact surface in the side contact surface has the following features: Similar to the thenar contact surface, the contact surface has the strongest capacitance signal in a most edge coordinate column closest to a side screen; the farther away from the side of the display, the weaker a capacitance signal; a signal change trend is relatively smooth; a shape of the contact surface is strip-shaped; and a height of the contact surface is smaller than that of the thenar contact surface. For example, the width is a width of three coordinate points, and the height is a height of six coordinate points.

In some embodiments of this application, the electronic device may train the type of the side contact surface by using a neural network, to identify the type of the side contact surface.

It should be noted that, in this embodiment of this application, a width of a contact surface is a maximum length of the contact surface along a short side of the mobile terminal, and a height of the contact surface is a maximum length of the contact surface along a long side of the mobile terminal. A most edge coordinate column of the contact surface is a coordinate column, closest to the long side of the mobile terminal, in a touchscreen array that corresponds to the contact surface and that is on a touchscreen of the mobile terminal. A secondary edge coordinate column of the contact surface is a coordinate column, second closest to the long side of the mobile terminal, in the touchscreen array that corresponds to the contact surface and that is on the touchscreen of the mobile terminal.

In this embodiment of this application, a capacitance signal strength may also be referred to as a capacitance value, and a contact surface may also be referred to as a contact region.

In addition, in this embodiment of this application, to avoid interference caused by an object such as sweat on the touchscreen, the electronic device may first exclude an interference contact surface from contact surfaces on the touchscreen based on touch information of the contact surfaces. In some embodiments, the electronic device may determine that a contact surface of which an average value of capacitance signals is less than or equal to a first threshold is an interference contact surface. In some embodiments, the electronic device may determine that a contact surface whose area is less than or equal to a second threshold is an interference contact surface. In some embodiments, the electronic device may determine that a contact surface of which an average value of capacitance signals is less than or equal to a first threshold and whose area is less than or equal to a second threshold is an interference contact surface.

In some embodiments of this application, the electronic device may determine a type of a contact surface based on a feature of touch information of the side contact surface. In this embodiment of this application, the type of the side contact surface includes but is not limited to the thenar contact surface, the finger tapping contact surface, the finger grasping contact surface, and the thumb-index web contact surface.

In some embodiments of this application, when the touch information of the side contact surface meets a first preset condition, it is determined that the contact surface is a thenar contact surface.

In an implementation, the first preset condition is that a height of the side contact surface is greater than a first height threshold. In an implementation, the first preset condition is that a height of the side contact surface is greater than a first height threshold, and a ratio of capacitance signal strength of a most edge coordinate column of the side contact surface to capacitance signal strength of a secondary edge coordinate column falls within a first ratio range, where a value in the first ratio range is greater than or equal to 1. In an implementation, the first preset condition is that a ratio of a height of the side contact surface to a width of the side contact surface is greater than a first height ratio, and a ratio of capacitance signal strength of a most edge coordinate column of the side contact surface to capacitance signal strength of a secondary edge coordinate column falls within a first ratio range, where a value in the first ratio range is greater than or equal to 1. In an implementation, the first preset condition is that a ratio of a height to a width of the side contact surface is greater than a first height ratio, and an area of the side contact surface is greater than a first area threshold. In an implementation, the first preset condition is that a ratio of a height to a width of the side contact surface is greater than a first height ratio, an area of the side contact surface is greater than a first area threshold, and a ratio of capacitance signal strength of a most edge coordinate column of the side contact surface to capacitance signal strength of a secondary edge coordinate column falls within a first ratio range, where a value in the first ratio range is greater than or equal to 1.

For example, the first height ratio is equal to 5, the first ratio range is greater than 1 and less than or equal to 1.1, the height threshold is a height of six coordinate points, and the first area threshold is an area of 15 coordinate points.

In some embodiments, the capacitance signal strength of the most edge coordinate column of the contact surface refers to an average value of capacitance signal strength of all coordinate points in the most edge coordinate column of the contact surface; and the capacitance signal strength of the secondary edge coordinate column of the contact surface refers to an average value of capacitance signal strength of all coordinate points in the secondary edge coordinate column of the contact surface.

In some embodiments of this application, when the touch information of the side contact surface meets a second preset condition, it is determined that the contact surface is a finger grasping contact surface.

In an implementation, the second preset condition is that the height of the side contact surface falls within a first height range, and the ratio of the capacitance signal strength of the most edge coordinate column of the side contact surface to the capacitance signal strength of the secondary edge coordinate column falls within a second ratio range, where a value in the second ratio range is greater than 1. In an implementation, the second preset condition is that the height of the side contact surface falls within a first height range, and the ratio of the height to the width of the side contact surface falls within a third ratio range. In an implementation, the second preset condition is that the height of the side contact surface falls within a first height range, the ratio of the height to the width of the side contact surface falls within a third ratio range, and the ratio of the capacitance signal strength of the most edge coordinate column of the side contact surface to the capacitance signal strength of the secondary edge coordinate column falls within a second ratio range, where a value in the second ratio range is greater than 1. In an implementation, the second preset condition is that the area of the side contact surface falls within a first area range, the ratio of the height to the width of the side contact surface falls within a third ratio range, and the ratio of the capacitance signal strength of the most edge coordinate column of the side contact surface to the capacitance signal strength of the secondary edge coordinate column falls within a second ratio range, where a value in the second ratio range is greater than 1.

In some embodiments of this application, a value in the first height range is less than the first height threshold, a value in the second ratio range is greater than or equal to a value in the first ratio range, a value in the third ratio range is less than the first height ratio, and a value in the first area range is less than the first area threshold.

For example, the first height range is a height of three coordinate points to a height of five coordinate points, the first ratio range is greater than 1.1 and less than or equal to 1.3, the third ratio range is 2 to 3, and the first area range is an area of 6 coordinate points to an area of 12 coordinates points.

In some embodiments of this application, when the touch information of the side contact surface meets a third preset condition, it is determined that the contact surface is a finger putting contact surface.

In an implementation, the third preset condition is that the height of the side contact surface falls within a second height range, and the ratio of the capacitance signal strength of the most edge coordinate column of the side contact surface to the capacitance signal strength of the secondary edge coordinate column falls within a fourth ratio range, where a value in the fourth ratio range is less than 1. In an implementation, the second preset condition is that the height of the side contact surface falls within a second height range, and the ratio of the height to the width of the side contact surface falls within a fifth ratio range. In an implementation, the second preset condition is that the height of the side contact surface falls within a third height range, the ratio of the height to the width of the side contact surface falls within a fifth ratio range, and the ratio of the capacitance signal strength of the most edge coordinate column of the side contact surface to the capacitance signal strength of the secondary edge coordinate column falls within a fourth ratio range, where a value in the fourth ratio range is less than 1. In an implementation, the third preset condition is that the area of the side contact surface falls within a second area range, the ratio of the height to the width of the side contact surface falls within a fifth ratio range, and the ratio of the capacitance signal strength of the most edge coordinate column of the side contact surface to the capacitance signal strength of the secondary edge coordinate column falls within a fourth ratio range, where a value in the fourth ratio range is less than 1.

In some embodiments of this application, a value in the second height range is less than the first height threshold, a value in the fifth ratio range is less than the first height ratio, the value in the fifth ratio range is less than or equal to the value in the third ratio range, and a value in the second area range is less than the first area threshold. In an implementation, the second height range is equal to the first height range.

For example, the second height range is a height of three coordinate points to a height of five coordinate points, the first ratio range is greater than 0.8 and less than or equal to 1, the third ratio range is 1 to 2, and the second area range is an area of 4 coordinate points to an area of 12 coordinates points.

In some embodiments of this application, when the touch information of the side contact surface meets a fourth preset condition, it is determined that the contact surface is a thumb-index web contact surface.

In an implementation, the fourth preset condition is that the height of the side contact surface falls within a third height range, and the ratio of the capacitance signal strength of the most edge coordinate column of the side contact surface to the capacitance signal strength of the secondary edge coordinate column falls within a six ratio range, where a value in the six ratio range is greater than 1. In an implementation, the fourth preset condition is that the height of the side contact surface falls within a third height range, and the ratio of the height to the width of the side contact surface falls within a seventh ratio range. In an implementation, the fourth preset condition is that the height of the side contact surface falls within a third height range, the ratio of the height to the width of the side contact surface falls within a seventh ratio range, and the ratio of the capacitance signal strength of the most edge coordinate column of the side contact surface to the capacitance signal strength of the secondary edge coordinate column falls within a sixth ratio range, where a value in the sixth ratio range is greater than 1. In an implementation, the fourth preset condition is that the area of the side contact surface falls within a third area range, the ratio of the height to the width of the side contact surface falls within a seventh ratio range, and the ratio of the capacitance signal strength of the most edge coordinate column of the side contact surface to the capacitance signal strength of the secondary edge coordinate column falls within a sixth ratio range, where a value in the sixth ratio range is greater than 1.

In some embodiments of this application, a value in the third height range is less than or equal to the first height threshold; the value in the third height range is greater than or equal to the value in the first height range, and is greater than or equal to the value in the second height range; the value in the sixth ratio range is less than or equal to the value in the second ratio range; a value in the seventh ratio range is less than the first height ratio, and is greater than or equal to the value in the fifth ratio range; and a value in the third area range is greater than or equal to the value in the second area range, and is greater than or equal to the value in the third area range. In an implementation, the sixth ratio range is equal to the first ratio range.

For example, the third height range is a height of four coordinate points to a height of eight coordinate points, the sixth ratio range is greater than 1 and less than or equal to 1.1, the seventh ratio range is 1 to 3, and the second area range is an area of 6 coordinate points to an area of 15 coordinates points.

In addition to the foregoing manners of identifying the contact surface type, the contact surface type may alternatively be identified in this embodiment of this application in another implementation. This is not specifically limited in this embodiment of this application.

Figure 43:
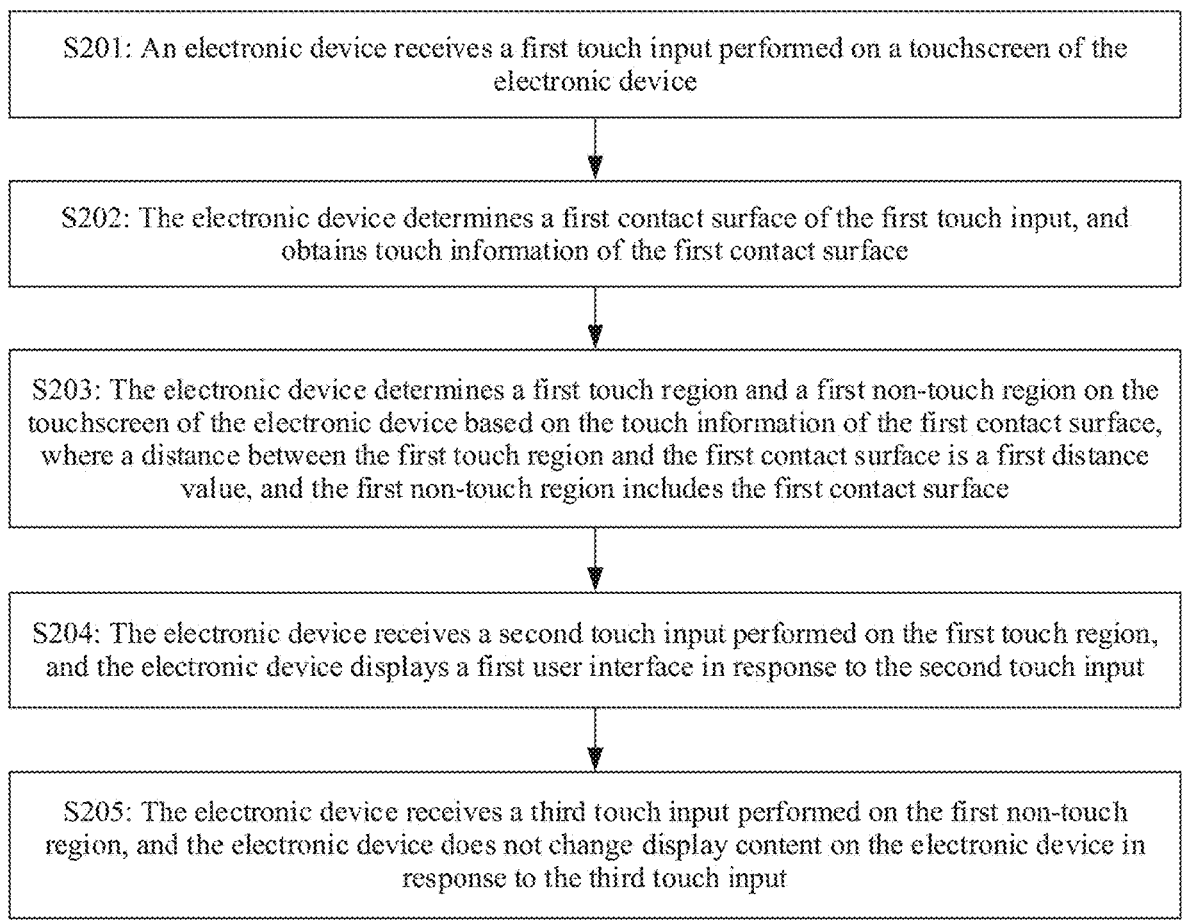
FIG. 43 is a schematic diagram of a working procedure of another touch region adjustment method according to an embodiment of this application.

The following describes a touch region adjustment method provided in an embodiment of this application. For example, as shown in FIG. 43, the method includes but is not limited to step S201 to step S205.

S201: An electronic device receives a first touch input performed on a touchscreen of the electronic device.

S202: The electronic device determines a first contact surface of the first touch input, and obtains touch information of the first contact surface.

S203: The electronic device determines a first touch region and a first non-touch region on the touchscreen of the electronic device based on the touch information of the first contact surface, where a distance between the first touch region and the first contact surface is a first distance value, and the first non-touch region includes the first contact surface.

S204: The electronic device receives a second touch input performed on the first touch region, and the electronic device displays a first user interface in response to the second touch input.

S205: The electronic device receives a third touch input performed on the first non-touch region, and the electronic device does not change display content on the electronic device in response to the third touch input.

It should be noted that, referring to FIG. 37A to FIG. 41F, the first touch input may be a touch input for holding the electronic device by a hand of a user, and the first contact surface may be a contact region formed on the touchscreen when the hand of the user holds the electronic device. Referring to FIG. 37A to FIG. 40D, the first contact surface may be a side contact surface formed by the hand of the user and the side screen. Referring to FIG. 41A to FIG. 41D, the first contact surface may alternatively be a contact surface formed by the hand of the user and the rear screen.

In some embodiments of this application, the first contact surface is located on a first side screen of the touchscreen, and the electronic device determines the first touch region and the first non-touch region on the first side screen based on the touch information of the first contact surface. A region other than the first touch region on the first side screen is the first non-touch region.

In some embodiments of this application, when the touch information of the first contact surface meets a first preset condition, the electronic device determines that a type of the first contact surface is a thenar contact surface. Referring to FIG. 37A, FIG. 37C, FIG. 40A, and FIG. 40C, when a distance between the thenar contact surface and a first end of the first side screen is greater than or equal to a first preset value, the electronic device determines that the first touch region is located between the first end of the first side screen and the thenar contact surface. Referring to FIG. 37A and FIG. 37C, the first side screen may be the shown side screen 1, and the first touch region may be the touch region 1. Referring to FIG. 40A and FIG. 40C, the first side screen may be the side screen 2, the first touch region may be the touch region 2, the first end of the first side screen may be the top of the electronic device, the first preset value may be L1, and the first distance value may be the distance 1.

In some embodiments, the first end of the first side screen may alternatively be the top or the bottom of the first side screen.

In some embodiments of this application, when the touch information of the first contact surface meets a second preset condition, the electronic device determines that a type of the first contact surface is a finger grasping contact surface, and the first contact surface is a finger grasping contact surface closest to the top of the electronic device. Referring to FIG. 37A and FIG. 37B, when a distance between the finger grasping contact surface and the first end of the first side screen is greater than or equal to a second preset value, the electronic device determines that the first touch region is located between the first end of the first side screen and the finger grasping contact surface. The first side screen may be the side screen 2 shown in FIG. 37A and FIG. 37B, the first touch region may be the touch region 2, the first end of the first side screen may be the top of the electronic device, the second preset value may be L2, and the first distance value may be the distance 3.

In some embodiments of this application, when the touch information of the first contact surface meets a third preset condition, the electronic device determines that a type of the first contact surface is a finger putting contact surface. Referring to FIG. 38A and FIG. 38B, when a distance between the finger puffing contact surface and a first end of the first side screen is greater than or equal to a third preset value, the electronic device determines that the first touch region is located between the first end of the first side screen and the finger grasping contact surface. The first side screen may be the side screen 1 shown in FIG. 38A and FIG. 38B, the first touch region may be the touch region 1, the first end of the first side screen may be the top or the bottom of the electronic device, the third preset value may be L5, and the first distance value may be the distance 7.

In some embodiments of this application, when the touch information of the first contact surface meets a fourth preset condition, the electronic device determines that a type of the first contact surface is a thumb-index web contact surface. Referring to FIG. 38A and FIG. 38C, when a distance between the finger putting contact surface and a first end of the first side screen is greater than or equal to a fourth preset value, the electronic device determines that the first touch region is located between the first end of the first side screen and the finger grasping contact surface. Referring to FIG. 38A, the first side screen may be the side screen 1, and the first touch region may be the touch region 1. Referring to FIG. 38C, the first side screen may be the side screen 2, the first touch region may be the touch region 2, the first end of the first side screen may be the top or the bottom of the electronic device, the fourth preset value may be L6, and the first distance value may be the distance 9.

For the first preset condition, the second preset condition, the third preset condition, and the fourth preset condition, refer to the foregoing embodiments. Details are not described herein again.

In some embodiments of this application, referring to FIG. 41A to FIG. 41D, the first contact surface is located on a rear screen of the touchscreen. When a distance between a first side of the first contact surface and the top of a first side screen on the touchscreen is greater than or equal to a seventh preset value, the electronic device determines that the first touch region on the first side screen is located between the top of the first side screen and the first side, where the first side is adjacent to the first side screen, and a distance between the first contact surface and the first side is the first distance value. Referring to FIG. 41A and FIG. 41C, the first side screen may be the side screen 1, and the first touch region may be the touch region 1. Referring to FIG. 41B, the first side screen may be the side screen 2, the first touch region may be the touch region 2, a first end of the first side screen may be the top of the electronic device, the seventh preset value may be L3, and the first distance value may be the distance 5.

In some embodiments, referring to FIG. 29, the electronic device displays the control box 201 on the side screen. Referring to FIG. 42, the electronic device determines a touch region on the side screen based on the touch information of the contact surface on the touchscreen, and adjusts a display location of the control box 201 to the touch region. The touch region shown in FIG. 42 may be referred to as the first touch region, and the touch region shown in FIG. 42 may receive a second touch input performed on a control (for example, a control 201A) of the control box 201 by the user. In response to the second touch input, the electronic device may display a first user interface triggered by the control 201A. A non-touch region shown in FIG. 42 may be referred to as the first non-touch region. The electronic device receives a third touch input performed on the non-touch region shown in FIG. 42, and does not change the display content on the electronic device. In another implementation, no control is displayed on the side screen of the electronic device, and the electronic device determines the first touch region and the first non-touch region on the side screen based on the first contact surface. For a second touch operation performed on the first touch region, the electronic device may perform a function triggered by the second touch operation, for example, display the first user interface. For a third touch operation performed on the first non-touch region, the electronic device does not perform a function corresponding to the third touch operation, and does not change the display content on the electronic device.

In some embodiments of this application, the first contact surface is located on a first side screen of the touchscreen. Before step S203, step S206 is further included.

S206: The electronic device determines a second contact surface of the first touch input, and obtains touch information of the second contact surface, where the second contact surface is located on the first side screen.

Step S203 may specifically include that the electronic device determines the first touch region and the first non-touch region on the first side screen based on the touch information of the first contact surface and the touch information of the second contact surface, where a distance between the first touch region and the second contact surface is the first distance value.

In some embodiments of this application, when both the touch information of the first contact surface and the touch information of the second contact surface meet a third preset condition, the electronic device determines that a type of the first contact surface is a finger putting contact surface. Referring to FIG. 39A and FIG. 39B, when a distance between two finger putting contact surfaces is greater than or equal to a fifth preset value, the electronic device determines that the first touch region is located between the two finger putting contact surfaces. The first side screen may be the side screen 1, the first touch region may be the touch region 1, the fifth preset value may be L7, and the first distance value may be the distance 7.

In some embodiments of this application, when both the touch information of the first contact surface and the touch information of the second contact surface meet a fourth preset condition, the electronic device determines that a type of the first contact surface is a thumb-index web contact surface. Referring to FIG. 39A and FIG. 39C, when a distance between two thumb-index web contact surfaces is greater than or equal to a sixth preset value, the electronic device determines that the first touch region is located between the two thumb-index web contact surfaces. The first side screen may be the side screen 2, the first touch region may be the touch region 2, the sixth preset value may be L8, and the first distance value may be the distance 9.

In some embodiments of this application, the first contact surface is located on a first side screen of the touchscreen. Before step S203, step S207 is further included.

S207: The electronic device determines a fifth contact surface of the first touch input, and obtains touch information of the fifth contact surface, where the fifth contact surface is located on a second side screen of the touchscreen.

Step S203 may specifically include that the electronic device determines the first touch region and the first non-touch region on the first side screen based on the touch information of the first contact surface, and determines a second touch region and a second non-touch region on the second side screen based on the touch information of the fifth contact surface. A distance between the second touch region and the fifth contact surface is a second distance value, a region other than the first touch region on the first side screen is the first non-touch region, and a region other than the second touch region on the second side screen is the second non-touch region.

In some embodiments of this application, when the touch information of the first contact surface meets a first preset condition, and the touch information of the fifth contact surface meets a second preset condition, the electronic device determines that a type of the first contact surface is a thenar contact surface, and a type of the fifth contact surface is a finger grasping contact surface. Referring to FIG. 37A, when a distance between the thenar contact surface and the top of the first side screen is greater than or equal to a first preset value, the electronic device determines that the first touch region is located between the top of the first side screen and the thenar contact surface; and when a distance between the finger grasping contact surface and the top of the second side screen is greater than or equal to a second preset value, the electronic device determines that the second touch region is located between the top of the second side screen and the finger grasping contact surface. The first side screen may be the side screen 1, the first touch region may be the touch region 1, the second side screen may be the side screen 2, the second touch region may be the touch region 2, the first preset value may be L1, the second preset value may be L2, the first distance value may be the distance 1, and the distance 1 is equal to the distance 2.

In some embodiments of this application, when touch information of both the first contact surface and the fifth contact surface meet a second preset condition, the electronic device determines that types of both the first contact surface and the fifth contact surface are thenar contact surfaces. Referring to FIG. 40A, when a distance between the thenar contact surface 501 and the top of the first side screen is greater than or equal to a first preset value, the electronic device determines that the first touch region is located between the top of the first side screen and the thenar contact surface; and when a distance between the thenar contact surface 502 and the top of the second side screen is greater than or equal to the first preset value, the electronic device determines that the second touch region is located between the top of the second side screen and the thenar contact surface. The first side screen may be the side screen 1, the first touch region may be the touch region 1, the second side screen may be the side screen 2, the second touch region may be the touch region 2, and the first distance value may be the distance 1.

In some embodiments of this application, when the touch information of the first contact surface meets a third preset condition, and the touch information of the fifth contact surface meets a fourth preset condition, the electronic device determines that a type of the first contact surface is a finger putting contact surface, and a type of the fifth contact surface is a thumb-index web contact surface. Referring to FIG. 37A, when a distance between the thenar contact surface and the top of the first side screen is greater than or equal to a third preset value, the electronic device determines that the first touch region is located between the top of the first side screen and the thenar contact surface; and when a distance between the finger grasping contact surface and the top of the second side screen is greater than or equal to a fourth preset value, the electronic device determines that the second touch region is located between the top of the second side screen and the finger grasping contact surface. The first side screen may be the side screen 1, the first touch region may be the touch region 1, the second side screen may be the side screen 2, the second touch region may be the touch region 2, the third preset value may be L5, the fourth preset value may be L6, the first distance value may be the distance 7, and the distance 7 is equal to the distance 9.

In some embodiments of this application, the first contact surface is located on a first side screen of the touchscreen. Before step S203, step S208 is further included.

S207: The electronic device determines a sixth contact surface of the first touch input, and obtains touch information of the sixth contact surface, where the sixth contact surface is located on a second side screen of the touchscreen.

Step S203 may specifically include that the electronic device determines the first touch region and the first non-touch region on the first side screen based on the touch information of the first contact surface, and determines, based on the touch information of the sixth contact surface, that the second side screen is a non-touch region.

In some embodiments of this application, when the touch information of the first contact surface meets a first preset condition, and the touch information of the fifth contact surface meets a second preset condition, the electronic device determines that a type of the first contact surface is a thenar contact surface, and a type of the fifth contact surface is a finger grasping contact surface. Referring to FIG. 37A, when a distance between the thenar contact surface and the top of the first side screen is greater than or equal to a first preset value, the electronic device determines that the first touch region is located between the top of the first side screen and the thenar contact surface; and when a distance between the finger grasping contact surface and the top of the second side screen is less than a second preset value, the electronic device determines that the second side screen is a non-touch region. The first side screen may be the side screen 1, the first touch region may be the touch region 1, the second side screen may be the side screen 2, the first preset value may be L1, the second preset value may be L2, and the first distance value may be the distance 1.

In some embodiments of this application, when touch information of both the first contact surface and the fifth contact surface meet a second preset condition, the electronic device determines that types of both the first contact surface and the fifth contact surface are thenar contact surfaces. Referring to FIG. 40A, when a distance between the thenar contact surface 501 and the top of the first side screen is greater than or equal to a first preset value, the electronic device determines that the first touch region is located between the top of the first side screen and the thenar contact surface; and when a distance between the thenar contact surface 502 and the top of the second side screen is less than the first preset value, the electronic device determines that the second side screen is a non-touch region. The first side screen may be the side screen 1, the first touch region may be the touch region 1, the second side screen may be the side screen 2, and the first distance value may be the distance 1.

In some embodiments of this application, when the touch information of the first contact surface meets a third preset condition, and the touch information of the fifth contact surface meets a fourth preset condition, the electronic device determines that a type of the first contact surface is a finger putting contact surface, and a type of the fifth contact surface is a thumb-index web contact surface. Referring to FIG. 37A, when a distance between the thenar contact surface and the top of the first side screen is greater than or equal to a third preset value, the electronic device determines that the first touch region is located between the top of the first side screen and the thenar contact surface; and when a distance between the finger grasping contact surface and the top of the second side screen is less than a fourth preset value, the electronic device determines that the second side screen is a non-touch region. The first side screen may be the side screen 1, the first touch region may be the touch region 1, the second side screen may be the side screen 2, the third preset value may be L5, the fourth preset value may be L6, and the first distance value may be the distance 7.

In some embodiments of this application, after step 203, the method further includes step S208 to step S211.

S208: The electronic device receives a fourth touch input performed on the touchscreen.

S209: The electronic device determines a third contact surface of the fourth touch input, and obtains touch information of the third contact surface.

S210: The electronic device determines, based on the touch information of the third contact surface, that the first side screen on the touchscreen is a non-touch region.

S211: The electronic device receives a fifth touch input performed on the first side screen, and the electronic device does not change the display content on the electronic device in response to the fifth touch input.

For example, the fifth touch input is a double-tap operation. Referring to FIG. 30A and FIG. 30B, when the entire side screen is a touch region, for a fifth touch input performed on the side screen, the electronic device may display a volume adjustment box. After determining, based on the touch information of the third contact surface, that the side screen is a non-touch region, the electronic device does not change the display content on the electronic device for the fifth touch input performed on the side screen.

Referring to FIG. 37A to FIG. 41D, the fourth touch input may be a touch input when the user holds the electronic device. Referring to FIG. 37A to FIG. 40D, the third contact surface may be a side contact surface formed by the hand of the user and the side screen. Referring to FIG. 41A to FIG. 41D, the third contact surface may alternatively be a contact surface formed by the hand of the user and the rear screen.

In some embodiments of this application, when the touch information of the first contact surface meets a first preset condition, the electronic device determines that a type of the first contact surface is a thenar contact surface. Referring to FIG. 37B, when a distance between the thenar contact surface and a first end of the first side screen is less than a first preset value, the electronic device determines that the first side screen is a non-touch region. The first side screen may be the shown side screen 1, the first end of the first side screen may be the top of the electronic device, and the first preset value may be L1.

In some embodiments of this application, when the touch information of the first contact surface meets a second preset condition, the electronic device determines that a type of the first contact surface is a finger grasping contact surface, and the first contact surface is a finger grasping contact surface closest to the top of the electronic device. Referring to FIG. 37D, when a distance between the finger grasping contact surface and a first end of the first side screen is less than a second preset value, the electronic device determines that the first side screen is a non-touch region. The first side screen may be the side screen 2, the first end of the first side screen may be the top of the electronic device, and the second preset value may be L2.

In some embodiments of this application, when the touch information of the first contact surface meets a third preset condition, the electronic device determines that a type of the first contact surface is a finger putting contact surface. When a distance between the finger putting contact surface and a first end of the first side screen is less than a third preset value, the electronic device determines that the first side screen is a non-touch region.

In some embodiments of this application, when the touch information of the first contact surface meets a fourth preset condition, the electronic device determines that a type of the first contact surface is a thumb-index web contact surface. When a distance between the finger putting contact surface and a first end of the first side screen is less than a fourth preset value, the electronic device determines that the first side screen is a non-touch region.

In some embodiments of this application, before step S210, the foregoing method further includes step S212.

S212: The electronic device determines a fourth contact surface of the fourth touch input, and obtains touch information of the fourth contact surface, where the fourth contact surface is located on the first side screen.

Step S210 may specifically include that the electronic device determines, based on the touch information of the third contact surface and the touch information of the fourth contact surface, that the first side screen is a non-touch region.

It may be understood that, based on touch information of two contact surfaces on one side screen, the electronic device may determine that the entire side screen is a non-touch region. This effectively reduces an accidental touch risk.

In some embodiments of this application, when both the touch information of the third contact surface and the touch information of the fourth contact surface meet a third preset condition, the electronic device determines that a type of the first contact surface is a finger putting contact surface. Referring to FIG. 39C and FIG. 39D, when a distance between two finger putting contact surfaces is less than a fifth preset value, the electronic device determines that the first side screen is a non-touch region. The first side screen may be the side screen 1, and the fifth preset value may be L7.

In some embodiments of this application, when both the touch information of the first contact surface and the touch information of the second contact surface meet a fourth preset condition, the electronic device determines that a type of the first contact surface is a thumb-index web contact surface. Referring to FIG. 39A and FIG. 39C, when a distance between two thumb-index web contact surfaces is less than a sixth preset value, the electronic device determines that the first side screen is a non-touch region. The first side screen may be the side screen 2, and the fifth preset value may be L8.

The following describes a hardware system of an electronic device according to an embodiment of this application.

Figure 45:
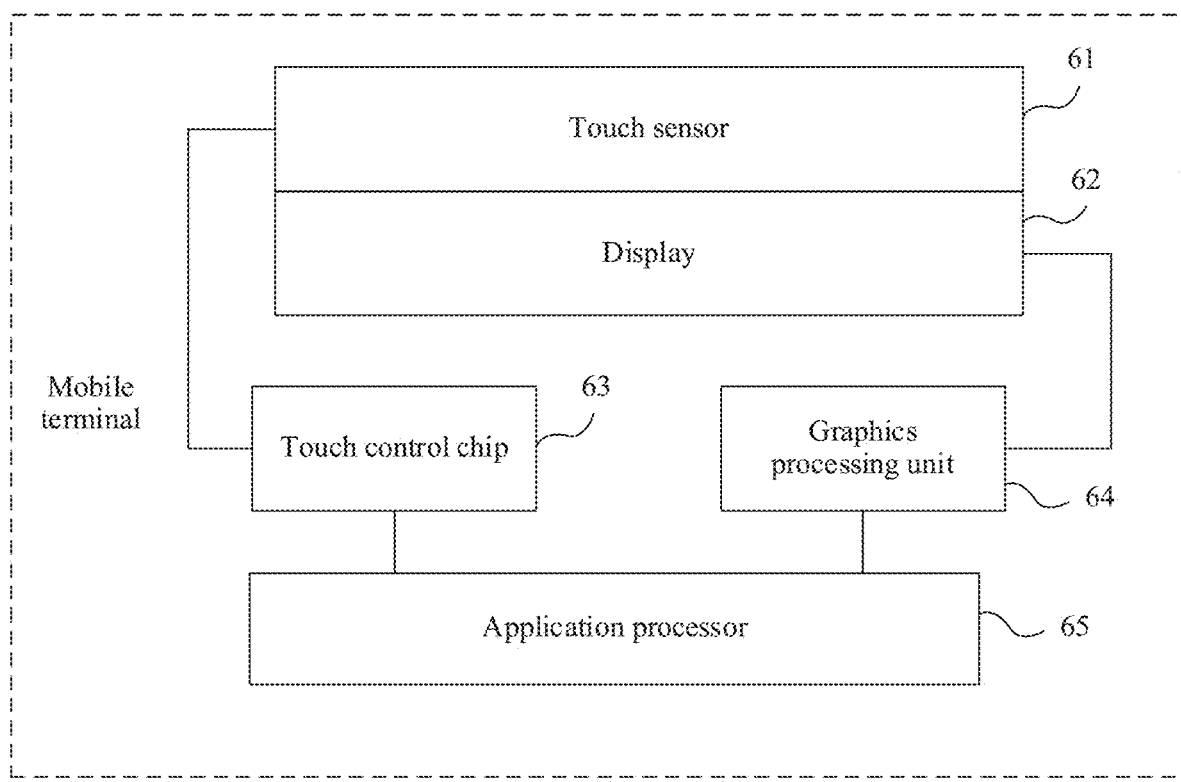
FIG. 45 is a schematic diagram of a hardware system according to an embodiment of this application.

In some embodiments of this application, for example, as shown in FIG. 45, the hardware system may include a touch sensor 61, a display 62, a touch control chip 63, a graphics processing unit (graphics processing unit, GPU) 64, and an application processor (application processor, AP) 65. The display 62 may be the display 194 in the foregoing embodiment, and the touch sensor 61 may be the touch sensor 180K in the foregoing embodiment. Details are not described herein again.

The touch sensor 61 may be configured to detect a capacitance signal generated by a touch operation, and upload the capacitance signal generated by the touch operation of a user to the touch control chip 63. Specifically, referring to the related embodiment in FIG. 7B, the touch sensor 61 may detect a capacitance signal of a capacitive array, and send the capacitance signal of the capacitive array to the touch control chip 63.

The touch control chip 63 may determine, based on all capacitance signals on a capacitive matrix that are detected by the touch sensor 61, a capacitance signal that meets a touch condition. For example, the touch condition may be that capacitance value signal strength is greater than a threshold 1. In some embodiments of this application, the touch control chip 63 reports, to the application processor 65, the capacitance signal that meets the touch condition and a coordinate point of the capacitance signal. Based on the coordinate point of the capacitance signal, the application processor 65 may invoke an anti-accidental touch algorithm to determine a touch region and a non-touch region on a side screen. Then, the application processor 65 performs event identification and response based on a coordinate point, located in the touch region, that is reported by the touch control chip 63.

It may be understood that the touch control chip 63 filters out a capacitance signal whose capacitance value signal strength is less than or equal to the threshold 1, and reports a capacitance signal whose capacitance value signal strength is greater than the threshold 1 to the application processor 65, so that an invalid interference signal can be avoided.

In some embodiments of this application, the touch control chip 63 determines the capacitance signal that meets the touch condition and a coordinate point of the capacitance signal. Based on the coordinate point of the capacitance signal, the touch control chip 63 may invoke an anti-accidental touch algorithm to determine a touch region and a non-touch region on a side screen. The touch control chip 63 reports a coordinate point located in the touch region to the application processor 65, and the application processor 65 performs event identification and response based on the coordinate point reported by the touch control chip 63.

In this embodiment of this application, a software system of the electronic device may use a layered architecture, an event-driven architecture, a microkernel architecture, a microservice architecture, or a cloud architecture. In an embodiment of this application, an Android system with a layered architecture is used as an example to describe a software structure of the electronic device.

Figure 46:
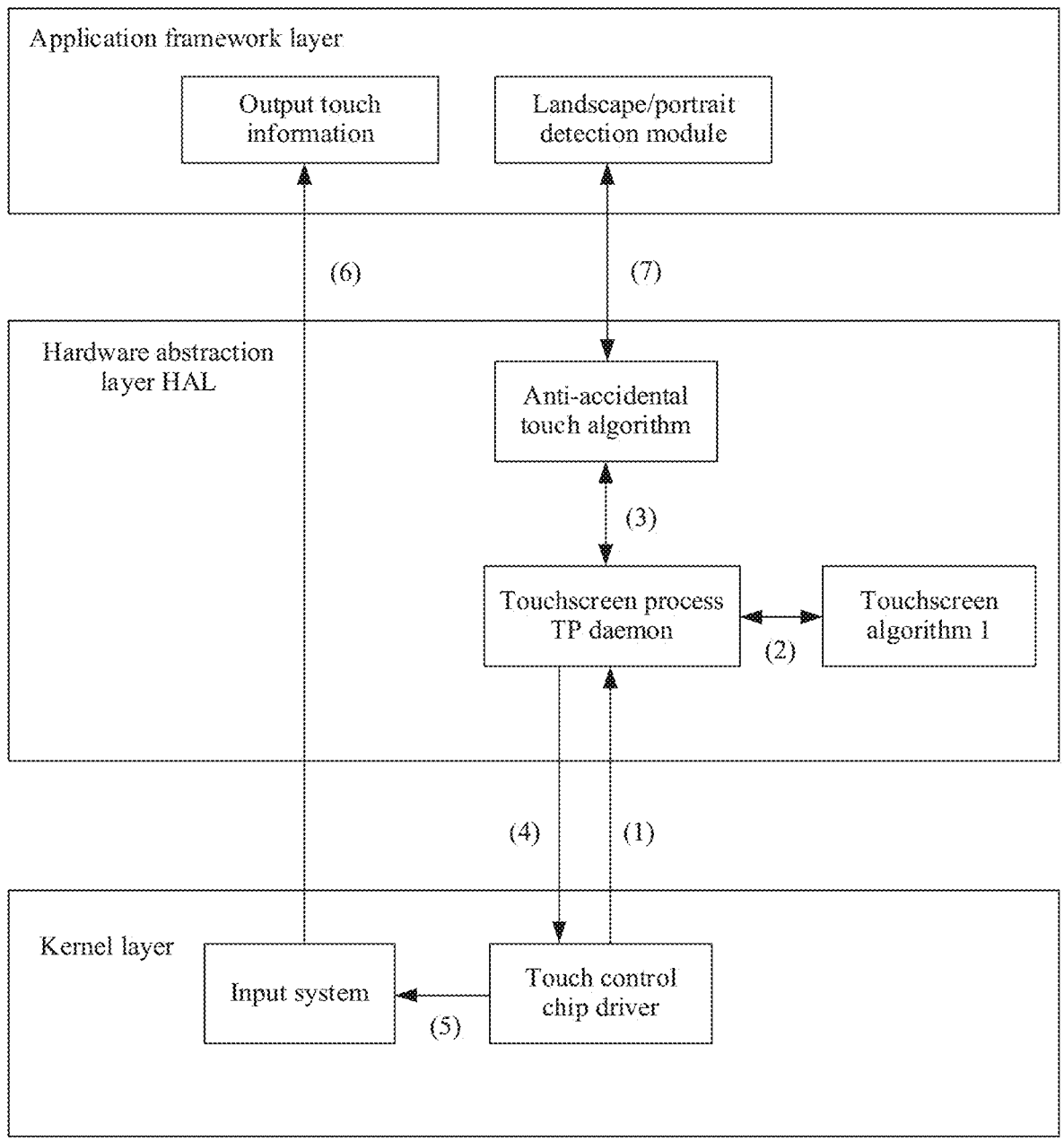
FIG. 46 is a schematic diagram of a software system according to an embodiment of this application.

FIG. 46 is an example block diagram of the software structure of the electronic device according to this embodiment of this application. The electronic device may determine the touch region and the non-touch region on the side screen based on touch information of a contact surface when a user holds the electronic device. This effectively reduces a misoperation risk in a process of interaction between the user and the side screen, and improves user experience.

As shown in FIG. 46, in the layered architecture, software is divided into several layers, and each layer has a clear role and task. The layers communicate with each other through a software interface. In some embodiments, the Android system may be divided into an application framework layer, a hardware abstraction layer (hardware abstraction layer, HAL), and a kernel (kernel) layer from top to bottom.

An application layer includes a series of application packages, such as "smart home", "Bluetooth", and "WLAN", and may further include applications such as "camera", "gallery", "phone", "music", and "video".

The application framework layer provides an application programming interface (application programming interface, API) and a programming framework for an application at the application layer. The application framework layer includes some predefined functions.

The Android runtime includes a kernel library and a virtual machine. The Android runtime is responsible for scheduling and management of the Android system.

The kernel library includes two parts: a functional function that needs to be invoked by a Java language and a kernel library of Android.

The application layer and the application framework layer run in the virtual machine. The virtual machine executes java files at the application layer and the application framework layer as binary files. The virtual machine is configured to perform functions such as object lifecycle management, stack management, thread management, security and exception management, and garbage collection.

The kernel layer is a layer between hardware and software. The kernel layer may include a display driver, a sensor driver, a touch IC driver, and may further include a camera driver, an audio driver, and the like. The HAL layer and the kernel layer (kernel) may perform corresponding operations in response to a function invoked by the application framework layer.

In some embodiments of this application, when the touch sensor 61 receives a touch operation, a corresponding hardware interruption is sent to the touch control chip, and the touch control chip 63 sends touch information 1 of the touch operation to the touch control chip driver at the kernel layer. The touch information 1 includes a coordinate point at which the user holds a side contact surface of the electronic device. The kernel layer sends the touch information 1 to a touchscreen process (TP Daemon) through a path (1). The TP Daemon invokes a touchscreen algorithm 1 (TP Algorithm) through a path (2) to obtain feature information of the touch information 1. The TP Daemon invokes the anti-accidental touch algorithm through the path (3), and determines the touch region and the non-touch region on the side screen based on the feature information, to further determine, in the touch information 1, valid touch information 2 other than information about the non-touch region. The TP Daemon sends the touch information 2 to the touch control chip driver through a path (4). The touch control chip driver sends the touch information 2 to an input system through a path (5). The application framework layer obtains the touch information 2 from the input system through a path (6), identifies an application function corresponding to the touch information 2, and then starts the application function. For example, the touch information 2 corresponds to a double-tap event of the touch region on the side screen, and the application framework layer invokes the kernel layer to start the display driver, to display a volume adjustment box 202 by using the display 194.

In some embodiments, when the TP Daemon invokes the anti-accidental touch algorithm through the path (3), and determines the touch region and the non-touch region on the side screen based on the feature information, the anti-accidental touch algorithm is used to obtain a landscape/portrait mode of the electronic device from a landscape/portrait detection module through a path (7), and determine the touch region and the non-touch region on the side screen based on the feature information and the landscape/portrait mode of the electronic device, to further determine, in the touch information 1, the valid touch information 2 other than information about the non-touch region.

The various illustrative logical units and circuits described in the embodiments of the present invention may implement or operate the described functions by using a general-purpose processor, a digital information processor, an application-specific integrated circuit (ASIC), a field programmable date array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital information processor and a microprocessor, a plurality of microprocessors, one or more microprocessors in combination with a digital information processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

All parts in this specification are described in a progressive manner. For same or similar parts in the embodiments, mutual reference may be made, and each embodiment focuses on a difference from another embodiment. Especially, apparatus and system embodiments are basically similar to a method embodiment, and therefore are described briefly; for related parts, refer to descriptions in the method embodiment.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

A person skilled in the art may clearly understand that, the technologies in the embodiments of this application may be implemented by software in addition to a necessary general hardware platform. Based on such an understanding, the technical solutions in the embodiments of this application essentially or the part contributing to the conventional technology may be implemented in a form of a software product. The computer software product may be stored in a storage medium, for example, a ROM/RAM, a magnetic disk, or an optical disc, and include several instructions for enabling a computer device (which may be a personal computer, a server, a network device, or the like) to perform the methods described in the embodiments or some parts of the embodiments of this application.

For same or similar parts in the embodiments in this specification, refer to each other. Especially, the embodiment is basically similar to the method embodiment, and therefore is described briefly. For related parts, refer to the descriptions in the method embodiment.

The foregoing implementations of this application do not constitute a limitation on the protection scope of this application.

What is claimed is:

1. A touch region adjustment method implemented by an electronic device, wherein the touch region adjustment method comprises:
  receiving, on a touchscreen of the electronic device, a first touch input;
  determining a first contact surface of the first touch input, wherein the first contact surface is located on a side screen on the touchscreen;
  obtaining first touch information of the first contact surface, wherein the first touch information comprises capacitance information and one or more of a first height of the first contact surface, a first width of the first contact surface, or an area of the first contact surface;
  determining, based on the first touch information, a touch region and a first non-touch region on the side screen, wherein a first distance between the touch region and the first contact surface comprises a first distance value, and wherein the first non-touch region comprises the first contact surface;
  determining that the touch region is located between a first end of the side screen and the first contact surface when a second distance between the first contact surface and the first end is greater than or equal to a first preset value;

determining that a type of the first contact surface is a thenar contact surface when the first touch information meets a first preset condition, wherein the first preset condition comprises that:

the first height is greater than a first height threshold and a first ratio of a first capacitance value of a most edge coordinate column of the first contact surface to a second capacitance value of a secondary edge coordinate column of the first contact surface is within a first ratio range, wherein a first value in the first ratio range is greater than or equal to 1, wherein the most edge coordinate column is closest to a long side of the electronic device and in a touchscreen array corresponding to the first contact surface on the touchscreen, and wherein the secondary edge coordinate column is second closest to the long side and in the touchscreen array;

the first height is greater than the first height threshold, a second ratio of the first height to the first width is greater than a first height ratio, and the first ratio is within the first ratio range; or the second ratio is greater than the first height ratio, the area is greater than a first area threshold, and the first ratio is within the first ratio range;

receiving, on the touch region, a second touch input;

displaying, in response to the second touch input, a first user interface;

receiving, on the first non-touch region, a third touch input; and skipping changing, in response to the third touch input, display content on the electronic device.

2. The touch region adjustment method of claim 1, wherein a region other than the touch region on the side screen is the first non-touch region.

3. The touch region adjustment method of claim 1, further comprising:

determining a second contact surface of the first touch input located on the side screen before determining the touch region and the first non-touch region;

obtaining second touch information of the second contact surface before determining the touch region and the first non-touch region; and further determining, based on the second touch information, the touch region and the first non-touch region on the side screen, wherein a third distance between the touch region and the second contact surface comprises the first distance value, wherein the first touch information further comprises one or more of the first height of the first contact surface, the first width of the first contact surface, or a first area of the first contact surface, wherein the second touch information comprises one or more of a second height of the second contact surface, a second width of the second contact surface, or a second area of the second contact surface, and wherein a region other than the touch region on the side screen is the first non-touch region.

4. The touch region adjustment method of claim 1, wherein the first contact surface is located on a rear screen of the electronic device, and wherein the touch region adjustment method further comprises:

identifying that a third distance between a first side of the first contact surface and a top of the side screen is greater than or equal to a second preset value, wherein the first side is adjacent to the side screen, wherein a fourth distance between the first contact surface and the first side comprises the first distance value, and wherein a region other than the touch region on the side screen is the first non-touch region; and determining, in response to identifying that the third distance is greater than or equal to the second preset value, that the touch region on the side screen is located between the top and the first side.

5. The touch region adjustment method according to claim 1, wherein the first end is either a top of the side screen or a bottom of the side screen.

6. The touch region adjustment method of claim 1, wherein after determining the touch region and the first non-touch region, the touch region adjustment method further comprises:

receiving, on the touchscreen, a fourth touch input;

determining a second contact surface of the fourth touch input located on the side screen;

obtaining second touch information of the second contact surface, wherein the second touch information comprises one or more of a second height of the second contact surface, a second width of the second contact surface, or an area of the second contact surface;

determining, based on the second touch information, that the side screen is a second non-touch region;

receiving, on the side screen, a fifth touch input; and skipping changing, in response to the fifth touch input, the display content.

7. The touch region adjustment method of claim 6, further comprising:

determining a third contact surface of the fourth touch input before determining that the side screen is the second non-touch region, wherein the third contact surface is located on the side screen;

obtaining third touch information of the third contact surface before determining that the side screen is the second non-touch region; and further determining, based on the third touch information, that the side screen is the second non-touch region.

8. The touch region adjustment method of claim 1, further comprising:

further determining that the type is a finger grasping contact surface when the first touch information meets a second preset condition; and further determining that the touch region is located between the first end and the first contact surface when the second distance is greater than or equal to a second preset value, wherein the first contact surface comprises a finger grasping contact surface closest to the first end, wherein the second preset condition comprises that:

the first height is within a first height range and the first ratio is within a second ratio range, wherein a second value in the first height range is less than or equal to the first height threshold, wherein a third value in the second ratio range is greater than or equal to 1, and wherein the third value is greater than or equal to the first value;

the first height is within the first height range, the second ratio is within a third ratio range, and the first ratio is within the second ratio range, wherein a fourth value in the third ratio range is less than or equal to the first height ratio; or the second ratio is within the third ratio range, the area is within a first area range, and the first ratio is within the second ratio range, wherein a fifth value in the first area range is less than or equal to the first area threshold.

9. The touch region adjustment method of claim 8, further comprising:
further determining that the type is a finger putting contact surface when the first touch information meets a third preset condition; and
further determining that the touch region is located between the first end and the first contact surface when the second distance is greater than or equal to a third preset value,
wherein the third preset condition comprises that:
the first height is within a second height range and the first ratio is within a fourth ratio range, wherein a sixth value in the second height range is less than or equal to the first height threshold, wherein a seventh value in the fourth ratio range is less than or equal to 1;
the first height is greater than the second height range, the second ratio is within a fifth ratio range, and the first ratio is within the fourth ratio range, wherein an eighth value in the fifth ratio range is less than or equal to the fourth value; or
the second ratio is within the fifth ratio range, the area is within a second area range, and the first ratio is within the fourth ratio range, wherein the third value is less than or equal to the first area threshold.

10. The touch region adjustment method of claim 9, further comprising:
further determining that the type is a thumb-index web contact surface when the first touch information meets a fourth preset condition; and
further determining that the touch region is located between the first end and the first contact surface when the second distance is greater than or equal to a fourth preset value,
wherein the fourth preset condition comprises that:
the first height is within a third height range and the first ratio is within a sixth ratio range, wherein a ninth value in the third height range is less than or equal to the first height threshold and is greater than or equal to the sixth value, wherein a tenth value in the sixth ratio range is greater than or equal to 1 and is less than or equal to the third value;
the first height is greater than the third height range, the second ratio is within a seventh ratio range, and the first ratio is within the sixth ratio range, wherein an eleventh value in the seventh ratio range is less than or equal to the first height ratio and is greater than or equal to the eighth value; or
the second ratio is within the seventh ratio range, the area is within a third area range, and the first ratio is within the sixth ratio range, wherein a twelfth value in the third area range is less than or equal to the first area threshold.

11. The touch region adjustment method of claim 3, further comprising:
determining that a type of the first contact surface is a finger putting contact surface when the first touch information and the second touch information meet a first second preset condition; and
determining that the touch region is located between the first contact surface and the second contact surface when a third distance between the first contact surface and the second contact surface is greater than or equal to a first second value,
wherein the second preset condition comprises that:
each of the first height and the second height is within a first height range, a first ratio of a first capacitance value of a first most edge coordinate column of the first contact surface to a second capacitance value of a first secondary edge coordinate column of the first contact surface is within a first ratio range, and a second ratio of a third capacitance value of a second most edge coordinate column of the second contact surface to a fourth capacitance value of a second secondary edge coordinate column of the second contact surface is within the first ratio range, wherein a first value in the first ratio range is less than or equal to 1;
each of the first height and the second height is greater than the first height range, a third ratio of the first height to the first width is within a second ratio range, a fourth ratio of the second height to the second width is within the second ratio range, and each of the first ratio and the second ratio is within the first ratio range; or
each of the third ratio and the fourth ratio is within the second ratio range, each of the first area and the second area is within a first area range, and each of the first ratio and the second ratio is within the first ratio range.

12. The touch region adjustment method of claim 11, further comprising:
further determining that the type is a thumb-index web contact surface when the first touch information and the second touch information meet a third preset condition; and
further determining that the touch region is located between the first contact surface and the second contact surface when the third distance is greater than or equal to a third preset value,
wherein the third preset condition comprises that:
each of the first height and the second height is within a second height range and each of the first ratio and the second ratio is within a third ratio range, wherein a second value in the third ratio range is greater than or equal to 1, and wherein a third value in the second height range is greater than or equal to a fourth value in the first height range;
each of the first height and the second height is greater than the second height range, each of the third ratio and the fourth ratio is within a fourth ratio range, and each of the first ratio and the second ratio is within the third ratio range, wherein a fifth value in the fourth ratio range is greater than or equal to a sixth value in the second ratio range; or
each of the third ratio and the fourth ratio is within the fourth ratio range, each of the first area and the second area is within a second area range, and each of the first ratio and the second ratio is within the third ratio range, wherein a seventh value in the second area range is greater than or equal to an eighth value in the first area range.

13. The touch region adjustment method of claim 6, further comprising:
identifying that the second touch information meets a second preset condition and a third distance between the second contact surface and a first end of the side screen is less than a second preset value; and
further determining, in response to identifying that the second touch information meets the second preset condition and the third distance is less than the second preset value, that the side screen is the second non-touch region, wherein the second preset condition comprises that:
the second height is greater than a first height threshold and a first ratio of a first capacitance value of a most edge coordinate column of the second contact surface to a second capacitance value of a secondary edge coordinate column of the second contact surface is within a first ratio range, wherein a value in the first ratio range is greater than or equal to 1;

the second height is greater than the first height threshold, a second ratio of the height to the second width is greater than a first height ratio, and the first ratio is within the first ratio range; or the second ratio is greater than the first height ratio, the area is greater than a first area threshold, and the first ratio is within the first ratio range.

14. The touch region adjustment method of claim 7, wherein before determining that the side screen is the second non-touch region, the touch region adjustment method further comprises:

identifying that the second touch information and the third touch information meet a second preset condition and a third distance between the second contact surface and the third contact surface is less than a second preset value; and further determining, in response to identifying that the second touch information and the third touch information meet the second preset condition and the third distance is less than the second preset value, that the side screen is the second non-touch region, wherein the second preset condition comprises that:
each of the second height and a third height of the third contact surface is within a height range, a first ratio of a first capacitance value of a first most edge coordinate column of the second contact surface to a second capacitance value of a first secondary edge coordinate column of the second contact surface is within a first ratio range, and a second ratio of a third capacitance value of a second most edge coordinate column of the third contact surface to a fourth capacitance value of a second secondary edge coordinate column of the third contact surface is within the first ratio range, wherein a value in the first ratio range is less than or equal to 1;

each of the second height and the third height is greater than the height range, a third ratio of the second height to the second width is within a second ratio range, a fourth ratio of the third height to a third width of the third contact surface is within the second ratio range, and each of the first ratio and the second ratio is within the first ratio range; or each of the third ratio and the fourth ratio is within the second ratio range, each of the area and a second area of the third contact surface is within an area range, and each of the first ratio and the second ratio is within the first ratio range.

15. An electronic device comprising:
a touchscreen configured to:
receive a first touch input;
receive a second touch input; and
receive a third touch input;
a side screen located on the touchscreen; and
a processor coupled to the touchscreen and configured to:
determine a first contact surface of the first touch input;
obtain first touch information of the first contact surface, wherein the first touch information comprises capacitance information and one or more of a height of the first contact surface, a first width of the first contact surface, or an area of the first contact surface;
determine, based on the first touch information, a touch region and a first non-touch region on the side screen, wherein a first distance between the touch region and the first contact surface comprises a first distance value, wherein the first non-touch region comprises the first contact surface, wherein the second touch input is received on the touch region, and wherein the third touch input is received on the first non-touch region;
determine that the touch region is located between a first end of the side screen and the first contact surface when a second distance between the first contact surface and the first end is greater than or equal to a first preset value;
determine that a type of the first contact surface is a thenar contact surface when the first touch information meets a first preset condition, wherein the first preset condition comprises that:
the height is greater than a first height threshold and a first ratio of a first capacitance value of a most edge coordinate column of the first contact surface to a second capacitance value of a secondary edge coordinate column of the first contact surface is within a first ratio range, wherein a first value in the first ratio range is greater than or equal to 1, wherein the most edge coordinate column is closest to a long side of the electronic device and in a touchscreen array corresponding to the first contact surface on the touchscreen, and wherein the secondary edge coordinate column is second closest to the long side and in the touchscreen array;
the height is greater than the first height threshold, a second ratio of the height to the first width is greater than a first height ratio, and the first ratio is within the first ratio range; or
the second ratio is greater than the first height ratio, the area is greater than a first area threshold, and the first ratio is within the first ratio range;
display a first user interface in response to the second touch input; and
skip changing, in response to the third touch input, display content on the electronic device.

16. The electronic device of claim 15, wherein a region other than the touch region on the side screen comprises the first non-touch region.

17. The electronic device of claim 15, wherein the processor is further configured to:
determine a second contact surface of the first touch input located on the side screen;
obtain second touch information of the second contact surface; and
further determine, based on the second touch information and on the side screen, the touch region and the first non-touch region, wherein a second distance between the touch region and the second contact surface comprises the first distance value, wherein the first touch information further comprises one or more of the first height of the first contact surface, the first width of the first contact surface, or a first area of the first contact surface, wherein the second touch information further comprises one or more of a second height of the second contact surface, a second width of the second contact surface, or a second area of the second contact surface, and wherein a region other than the touch region on the side screen is the first non-touch region.

18. The electronic device of claim 15, wherein the touchscreen is further configured to:
receive a fourth touch input; and
receive, on the side screen, a fifth touch input, and
wherein the processor is further configured to:
determine a second contact surface of the fourth touch input that is located on the side screen;
obtain second touch information of the second contact surface, wherein the second touch information comprises one or more of a second height of the second contact surface, a second width of the second contact surface, or an area of the second contact surface;
determine, based on the second touch information, that the side screen is a second non-touch region; and
skip changing, in response to the fifth touch input, the display content.

19. A computer program product comprising computer-executable instructions that are stored on a non-transitory computer-readable medium and that, when executed by a processor, cause an electronic device to:
receive, on a touchscreen of the electronic device, a first touch input;
determine a first contact surface of the first touch input, wherein the first contact surface is located on a side screen on the touchscreen;
obtain first touch information of the first contact surface, wherein the first touch information comprises capacitance information and one or more of a height of the first contact surface, a width of the first contact surface, or an area of the first contact surface;
determine, based on the first touch information, a touch region and a non-touch region on the touchscreen, wherein a distance between the touch region and the first contact surface comprises a distance value, and wherein the non-touch region comprises the first contact surface;
determine that the touch region is located between a first end of the side screen and the first contact surface when a second distance between the first contact surface and the first end is greater than or equal to a first preset value;
determine that a type of the first contact surface is a thenar contact surface when the first touch information meets a first preset condition, wherein the first preset condition comprises that:
the height is greater than a first height threshold and a first ratio of a first capacitance value of a most edge coordinate column of the first contact surface to a second capacitance value of a secondary edge coordinate column of the first contact surface is within a first ratio range, wherein a first value in the first ratio range is greater than or equal to 1, wherein the most edge coordinate column is closest to a long side of the electronic device and in a touchscreen array corresponding to the first contact surface on the touchscreen, and wherein the secondary edge coordinate column is second closest to the long side and in the touchscreen array;
the height is greater than the first height threshold, a second ratio of the height to the width is greater than a first height ratio, and the first ratio is within the first ratio range; or
the second ratio is greater than the first height ratio, the area is greater than a first area threshold, and the first ratio is within the first ratio range;
receive, on the touch region, a second touch input;
display, in response to the second touch input, a user interface;
receive, on the non-touch region, a third touch input; and
skip changing, in response to the third touch input, display content on the electronic device.

20. The computer program product of claim 19, wherein a region other than the touch region on the side screen is the first non-touch region.

* * * * *

UNITED STATES PATENT AND TRADEMARK OFFICE
CERTIFICATE OF CORRECTION

PATENT NO. : 11,907,526 B2
APPLICATION NO. : 17/783407
DATED : February 20, 2024
INVENTOR(S) : Hang Li, Weigang Cai and Junyong Zhang It is certified that error appears in the above-identified patent and that said Letters Patent is hereby corrected as shown below:

In the Claims

Claim 11, Column 83, Line 62: "first second preset condition; and" should read "second preset condition; and"

Signed and Sealed this
Ninth Day of April, 2024

Katherine Kelly Vidal
*Director of the United States Patent and Trademark Office*